US012059051B2

(12) United States Patent
Bologna et al.

(10) Patent No.: US 12,059,051 B2
(45) **Date of Patent: *Aug. 13, 2024**

(54) SYSTEM AND METHOD FOR DESIGNING AND MANUFACTURING A PROTECTIVE SPORTS HELMET

(71) Applicant: Riddell, Inc., Des Plaines, IL (US)

(72) Inventors: Vittorio Bologna, Des Plaines, IL (US); Murphy Gillogly, Des Plaines, IL (US); Thad M. Ide, Des Plaines, IL (US)

(73) Assignee: Riddell, Inc., Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,190

(22) Filed: Aug. 1, 2022

(65) Prior Publication Data

US 2022/0369755 A1 Nov. 24, 2022

Related U.S. Application Data

(63) Continuation of application No. 16/543,371, filed on Aug. 16, 2019, now Pat. No. 11,399,589.

(Continued)

(51) Int. Cl.

*A42C 2/00* (2006.01)
*A42B 3/04* (2006.01)

(Continued)

(52) U.S. Cl.

CPC ................ *A42C 2/007* (2013.01); *A42B 3/04* (2013.01); *G06T 17/00* (2013.01); *B29L 2031/4821* (2013.01)

(58) Field of Classification Search

CPC ........... A42C 2/007; A42B 3/04; G06T 17/00; B29L 2031/4821

See application file for complete search history.

(56) References Cited

U.S. PATENT DOCUMENTS

| | | | |
|---|---|---|---|
| 676,293 | A | 6/1901 | Wright |
| 1,060,220 | A | 4/1913 | White |

(Continued)

FOREIGN PATENT DOCUMENTS

| | | | |
|---|---|---|---|
| CA | 2778050 | A1 | 4/2011 |
| CH | 692011 | | 1/2002 |

(Continued)

OTHER PUBLICATIONS

European Search Report dated Sep. 1, 2016 in corresponding EP Appln. No. 14740903.1 (7 pages).

(Continued)

*Primary Examiner* — Tajash D Patel

(74) *Attorney, Agent, or Firm* — Barnes & Thornburg LLP

(57) ABSTRACT

The invention relates to a protective sports helmet purposely designed for a selected group of helmet wearers from amongst a larger population of helmet wearers. A multi-step method for helmet design starts by collecting information from a population of players that may include information about the shape of a player's head and the impacts the player has sustained. This information is then processed to create player population information that is sorted to create categories. Advanced mathematical techniques are utilized to further sort these categories into player groups or data sets based on player attributes. Once the player groups are identified, another multi-step process is utilized to design optimized helmet prototype models for each player group. These optimized helmet prototype models are then further processed into complete helmet models by determining a structural design and chemical composition that is manufacturable and has mechanical properties that are substantially similar to the optimized helmet prototype model. Physical helmet prototypes are then created and tested using (Continued)

a unique helmet standard derived from information associated with each player group. Once the prototypes pass testing, the complete helmet models can be manufactured to create actual stock helmets or stock helmet components for future players whose characteristics and attributes place them within the selected player group.

51 Claims, 95 Drawing Sheets

Related U.S. Application Data

(60) Provisional application No. 62/778,559, filed on Dec. 12, 2018, provisional application No. 62/770,453, filed on Nov. 21, 2018, provisional application No. 62/719,130, filed on Aug. 16, 2018.

(51) Int. Cl.
*G06T 17/00* (2006.01)
*B29L 31/48* (2006.01)

(56) References Cited

U.S. PATENT DOCUMENTS 1,244,559 A 10/1917 Fayette
1,522,952 A 1/1925 Goldsmith
1,655,007 A 1/1928 Boettge
1,691,202 A 11/1928 Van
1,705,879 A 3/1929 Rodgers
D81,055 S 4/1930 Heater
1,808,966 A 6/1931 Morgan
1,841,232 A 1/1932 Wells
2,140,716 A 12/1938 Pryale
2,293,308 A 8/1942 Riddell, Sr.
2,296,335 A 9/1942 Brady
2,515,807 A 7/1950 Arthu
2,634,415 A 4/1953 Turner
2,688,747 A 9/1954 Marx
2,785,404 A 3/1957 Strohm
3,039,109 A 6/1962 Simpson
3,088,002 A 4/1963 Henry
3,116,490 A 1/1964 Zbikowski
3,153,792 A 10/1964 Marietta
3,153,973 A 10/1964 Marietta
3,155,981 A 11/1964 McKissick
3,166,761 A 1/1965 Strohm
3,174,155 A 3/1965 Pitman
3,186,004 A 6/1965 Carlini
3,197,784 A 8/1965 Richard
3,208,080 A 9/1965 Hirsch
3,273,162 A 9/1966 Andrews, III
3,274,613 A 9/1966 Sowle
3,296,582 A 1/1967 Ide
3,344,433 A 10/1967 Stapenhill
3,364,499 A 1/1968 Kwoka
3,373,443 A 3/1968 Marietta
3,418,657 A 12/1968 Lastnik
3,447,162 A 6/1969 Aileo
3,447,163 A 6/1969 Bothwell
3,462,763 A 8/1969 Schneider
3,501,772 A 3/1970 Wyckoff
3,551,911 A 1/1971 Holden
3,566,409 A 3/1971 Hopper
3,568,210 A 3/1971 Marietta
3,582,990 A 6/1971 Frieder
3,590,388 A 7/1971 Holt
3,600,714 A 8/1971 Greathouse
3,609,764 A 10/1971 Morgan
3,616,463 A 11/1971 Theodore et al.
3,629,864 A 12/1971 Latina
3,713,640 A 1/1973 Margan
3,720,955 A 3/1973 Rawlings
3,729,744 A 5/1973 Rappleyea
3,761,959 A 10/1973 Dunning
3,785,395 A 1/1974 Andreasson
3,787,895 A 1/1974 Belvedere
3,815,152 A 6/1974 Bednarczuk
3,818,508 A 6/1974 Lammers
3,820,163 A 6/1974 Rappleyea
3,843,970 A 10/1974 Marietta
3,845,389 A 10/1974 Phillips
3,860,966 A 1/1975 Brown
3,872,511 A 3/1975 Nichols
3,882,547 A 5/1975 Morgan
3,897,597 A 8/1975 Kasper
3,946,441 A 3/1976 Johnson
3,972,038 A 7/1976 Fletcher
3,992,721 A 11/1976 Morton
3,999,220 A 12/1976 Keltner
4,006,496 A 2/1977 Marker
4,023,209 A 5/1977 Frieder
4,023,213 A 5/1977 Rovani
4,038,700 A 8/1977 Gyory
4,054,953 A 10/1977 De Barsy
4,060,855 A 12/1977 Rappleyea
4,064,565 A 12/1977 Griffiths
4,101,983 A 7/1978 Dera
4,124,208 A 11/1978 Burns
4,134,155 A 1/1979 Robertson
4,136,403 A 1/1979 Walther
4,168,542 A 9/1979 Small
D257,073 S 9/1980 Jenkins
4,223,409 A 9/1980 Lee
4,239,106 A 12/1980 Aileo
4,282,610 A 8/1981 Steigerwald
4,287,613 A 9/1981 Schulz
4,300,242 A 11/1981 Nava
4,307,471 A 12/1981 Lovell
4,345,338 A 8/1982 Frieder, Jr.
4,354,284 A 10/1982 Gooding
D267,287 S 12/1982 Gooding
4,363,140 A 12/1982 Correale
4,370,759 A 2/1983 Zide
4,375,108 A 3/1983 Gooding
4,404,690 A 9/1983 Farquharson
D271,249 S 11/1983 Farquharson
D271,347 S 11/1983 Bourque
4,432,099 A 2/1984 Grick
4,466,138 A 8/1984 Gessalin
4,478,587 A 10/1984 Mackal
4,534,068 A 8/1985 Mitchell
4,558,470 A 12/1985 Mitchell
4,566,137 A 1/1986 Gooding
4,586,200 A 5/1986 Poon
4,587,677 A 5/1986 Clement
4,590,801 A 5/1986 Merhav
4,665,569 A 5/1987 Santini
4,691,556 A 9/1987 Mellander
4,724,549 A 2/1988 Herder
D295,902 S 5/1988 Foulkes
4,763,275 A 8/1988 Carlin
4,766,614 A 8/1988 Cantwell
4,776,043 A 10/1988 Coleman
D298,367 S 11/1988 Ball
D299,978 S 2/1989 Chiarella
4,853,980 A 8/1989 Zarotti
4,856,119 A 8/1989 Hermann
4,903,346 A 2/1990 Reddemann
4,916,759 A 4/1990 Arai
4,937,888 A 7/1990 Straus
4,982,452 A 1/1991 Chaise
4,996,724 A 3/1991 Dextrase
4,996,877 A 3/1991 Stewart
5,014,365 A 5/1991 Schulz
5,023,958 A 6/1991 Rotzin
5,031,246 A 7/1991 Kronenberger
5,035,009 A 7/1991 Wingo, Jr.
5,056,162 A 10/1991 Tirums
5,101,517 A 4/1992 Douglas
5,101,580 A 4/1992 Lyden
5,136,728 A 8/1992 Kamata
5,150,479 A 9/1992 Oleson

(56) References Cited

U.S. PATENT DOCUMENTS

| | | | |
|---|---|---|---|
| 5,175,889 | A | 1/1993 | Infusino |
| 5,204,998 | A | 4/1993 | Liu |
| 5,221,088 | A | 6/1993 | McTeigue |
| 5,231,703 | A | 8/1993 | Garneau |
| 5,263,203 | A | 11/1993 | Kraemer |
| 5,271,103 | A | 12/1993 | Darnell |
| 5,272,773 | A | 12/1993 | Kamata |
| 5,293,649 | A | 3/1994 | Corpus |
| 5,298,208 | A | 3/1994 | Sibley |
| 5,309,576 | A | 5/1994 | Broersma |
| 5,315,718 | A | 5/1994 | Barson |
| D348,752 | S | 7/1994 | Ho |
| 5,327,588 | A | 7/1994 | Garneau |
| 5,345,614 | A | 9/1994 | Tanaka |
| 5,383,363 | A | 1/1995 | Kulmaczewski |
| 5,408,879 | A | 4/1995 | Vreeburg |
| D358,003 | S | 5/1995 | Losi, II |
| 5,450,631 | A | 9/1995 | Egger |
| 5,461,730 | A | 10/1995 | Carrington |
| D364,487 | S | 11/1995 | Tutton |
| 5,475,878 | A | 12/1995 | Dawn |
| 5,515,546 | A | 5/1996 | Shifrin |
| 5,517,691 | A | 5/1996 | Blake |
| 5,517,695 | A | 5/1996 | Murray |
| 5,518,802 | A | 5/1996 | Colvin |
| 5,522,091 | A | 6/1996 | Rudolf |
| D371,867 | S | 7/1996 | Losi, II |
| D371,869 | S | 7/1996 | Chen |
| D372,342 | S | 7/1996 | Chen |
| 5,534,343 | A | 7/1996 | Landi |
| 5,544,367 | A | 8/1996 | March, II |
| 5,546,609 | A | 8/1996 | Rush, III |
| 5,553,330 | A | 9/1996 | Carveth |
| 5,561,866 | A | 10/1996 | Ross |
| D378,624 | S | 3/1997 | Chartrand |
| 5,615,132 | A | 3/1997 | Horton |
| 5,645,077 | A | 7/1997 | Foxlin |
| 5,661,854 | A | 9/1997 | March, II |
| 5,666,670 | A | 9/1997 | Ryan |
| 5,697,099 | A | 12/1997 | Siska, Jr. |
| 5,704,707 | A | 1/1998 | Gebelein |
| 5,708,988 | A | 1/1998 | McGuine |
| 5,713,082 | A | 2/1998 | Bassette |
| 5,723,786 | A | 3/1998 | Klapman |
| 5,732,414 | A | 3/1998 | Monica |
| 5,745,028 | A | 4/1998 | Hock |
| 5,774,901 | A | 7/1998 | Minami |
| 5,787,513 | A | 8/1998 | Sharmat |
| 5,794,271 | A | 8/1998 | Hastings |
| 5,799,337 | A | 9/1998 | Brown |
| 5,819,206 | A | 10/1998 | Horton |
| 5,829,065 | A | 11/1998 | Cahill |
| 5,833,796 | A | 11/1998 | Matich |
| 5,856,811 | A | 1/1999 | Shih |
| 5,867,840 | A | 2/1999 | Hirosawa |
| 5,883,145 | A | 3/1999 | Hurley |
| 5,891,372 | A | 4/1999 | Besset |
| 5,896,590 | A | 4/1999 | Fleisch |
| 5,916,181 | A | 6/1999 | Socci |
| 5,930,840 | A | 8/1999 | Arai |
| 5,940,890 | A | 8/1999 | Dallas |
| 5,941,272 | A | 8/1999 | Feldman |
| 5,943,706 | A | 8/1999 | Miyajima |
| 5,950,243 | A | 9/1999 | Winters |
| 5,950,244 | A | 9/1999 | Fournier |
| 5,953,761 | A | 9/1999 | Jurga |
| 5,956,777 | A | 9/1999 | Popovich |
| 5,978,972 | A | 11/1999 | Stewart |
| 5,978,973 | A | 11/1999 | Chartrand |
| 6,002,994 | A | 12/1999 | Lane |
| 6,009,563 | A | 1/2000 | Swanson |
| 6,032,297 | A | 3/2000 | Barthold |
| 6,032,530 | A | 3/2000 | Hock |
| 6,056,674 | A | 5/2000 | Cook |
| 6,070,271 | A | 6/2000 | Williams |
| 6,073,271 | A | 6/2000 | Alexander |
| 6,079,053 | A | 6/2000 | Clover, Jr. |
| 6,088,840 | A | 7/2000 | Im |
| 6,089,251 | A | 7/2000 | Pestel |
| 6,090,044 | A | 7/2000 | Bishop |
| 6,128,786 | A | 10/2000 | Maddux |
| 6,131,196 | A | 10/2000 | Vallion |
| 6,138,284 | A | 10/2000 | Arai |
| 6,154,889 | A | 12/2000 | Moore, III |
| 6,178,560 | B1 | 1/2001 | Halstead |
| D437,472 | S | 2/2001 | Ruscitti |
| 6,186,145 | B1 | 2/2001 | Brown |
| 6,189,156 | B1 | 2/2001 | Loiars |
| 6,198,394 | B1 | 3/2001 | Jacobsen |
| 6,219,850 | B1 | 4/2001 | Halstead |
| 6,226,801 | B1 | 5/2001 | Alexander |
| D445,218 | S | 7/2001 | Watters |
| 6,259,944 | B1 | 7/2001 | Margulis |
| 6,261,042 | B1 | 7/2001 | Pratt |
| 6,272,692 | B1 | 8/2001 | Abraham |
| 6,282,724 | B1 | 9/2001 | Abraham |
| 6,292,952 | B1 | 9/2001 | Watters |
| 6,298,483 | B1 | 10/2001 | Schiebl |
| 6,298,497 | B1 | 10/2001 | Chartrand |
| 6,301,718 | B1 | 10/2001 | Rigal |
| 6,305,030 | B1 | 10/2001 | Brignone |
| 6,314,586 | B1 | 11/2001 | Duguid |
| 6,331,168 | B1 | 12/2001 | Socci |
| 6,332,228 | B1 | 12/2001 | Takahara |
| 6,339,849 | B1 | 1/2002 | Nelson |
| 6,351,853 | B1 | 3/2002 | Halstead |
| 6,360,376 | B1 | 3/2002 | Carrington |
| 6,361,507 | B1 | 3/2002 | Foxlin |
| 6,378,140 | B1 | 4/2002 | Abraham |
| 6,385,780 | B1 | 5/2002 | Racine |
| 6,389,607 | B1 | 5/2002 | Wood |
| 6,397,151 | B1 | 5/2002 | Yamagishi |
| 6,421,841 | B2 | 7/2002 | Ikeda |
| 6,434,755 | B1 | 8/2002 | Halstead |
| 6,441,747 | B1 | 8/2002 | Khair |
| 6,442,765 | B1 | 9/2002 | Fallon |
| 6,446,270 | B1 | 9/2002 | Durr |
| D465,067 | S | 10/2002 | Ide |
| 6,463,351 | B1 | 10/2002 | Clynch |
| 6,467,099 | B2 | 10/2002 | Dennis |
| 6,484,133 | B1 | 11/2002 | Vogt |
| 6,532,602 | B2 | 3/2003 | Watters |
| D475,486 | S | 6/2003 | Ide |
| 6,588,022 | B1 | 7/2003 | Anders |
| 6,604,246 | B1 | 8/2003 | Obreja |
| 6,611,782 | B1 | 8/2003 | Wooster |
| 6,611,789 | B1 | 8/2003 | Darley |
| 6,647,787 | B2 | 11/2003 | Fore |
| 6,658,671 | B1 | 12/2003 | Von Holst |
| 6,722,711 | B2 | 4/2004 | Kitzis |
| 6,730,047 | B2 | 5/2004 | Socci |
| 6,735,551 | B2 | 5/2004 | Voegeli |
| 6,748,250 | B1 | 6/2004 | Berman |
| D492,818 | S | 7/2004 | Ide |
| D496,762 | S | 9/2004 | Durocher |
| 6,785,985 | B2 | 9/2004 | Marvin |
| 6,798,392 | B2 | 9/2004 | Hartwell |
| 6,826,509 | B2 | 11/2004 | Crisco, III |
| 6,925,657 | B2 | 8/2005 | Takahashi |
| 6,925,851 | B2 | 8/2005 | Reinbold |
| 6,931,671 | B2 | 8/2005 | Skiba |
| 6,934,971 | B2 | 8/2005 | Ide |
| D512,534 | S | 12/2005 | Maddux |
| D521,191 | S | 5/2006 | Berger |
| 7,054,784 | B2 | 5/2006 | Flentov |
| D523,180 | S | 6/2006 | Frye |
| 7,062,795 | B2 | 6/2006 | Skiba |
| 7,111,329 | B2 | 9/2006 | Stroud |
| 7,234,812 | B2 | 6/2007 | Piorkowski |
| 7,240,376 | B2 | 7/2007 | Ide |
| 7,243,378 | B2 | 7/2007 | Desarmaux |
| 7,254,843 | B2 | 8/2007 | Talluri |
| 7,288,326 | B2 | 10/2007 | Elzey |
| 7,341,776 | B1 | 3/2008 | Milliren |

(56) References Cited

U.S. PATENT DOCUMENTS

| | | | |
|---|---|---|---|
| D570,055 | S | 5/2008 | Ferrara |
| D572,410 | S | 7/2008 | Udelhofen |
| D572,412 | S | 7/2008 | Udelhofen |
| D581,099 | S | 11/2008 | Ahn |
| D582,607 | S | 12/2008 | Ferrara |
| 7,328,462 | B1 | 12/2008 | Straus |
| 7,478,108 | B2 | 1/2009 | Townsend |
| D586,507 | S | 2/2009 | Fink |
| D587,852 | S | 3/2009 | Nimmons |
| D587,853 | S | 3/2009 | Nimmons |
| 7,526,389 | B2 | 4/2009 | Greenwald |
| 7,548,168 | B2 | 6/2009 | Ishikawa |
| D598,610 | S | 8/2009 | Soukup |
| D603,099 | S | 10/2009 | Bologna |
| D603,100 | S | 10/2009 | Bologna |
| 7,634,820 | B2 | 12/2009 | Rogers |
| 7,673,351 | B2 | 3/2010 | Copeland |
| D617,503 | S | 6/2010 | Szalkowski |
| 7,735,157 | B2 | 6/2010 | Ikeda |
| 7,743,640 | B2 | 6/2010 | Lampe |
| 7,774,866 | B2 | 8/2010 | Ferrara |
| 7,802,320 | B2 | 9/2010 | Morgan |
| D625,050 | S | 10/2010 | Chen |
| 7,832,023 | B2 | 11/2010 | Crisco |
| 7,841,025 | B1 | 11/2010 | Fink |
| 7,849,524 | B1 | 12/2010 | Williamson |
| 7,861,326 | B2 | 1/2011 | Harty |
| 7,870,617 | B2 | 1/2011 | Butler |
| 7,900,279 | B2 | 3/2011 | Kraemer |
| 7,917,972 | B1 | 4/2011 | Krueger |
| 7,930,771 | B2 | 4/2011 | Depreitere |
| 7,952,577 | B2 | 5/2011 | Harvill |
| 7,987,525 | B2 | 8/2011 | Summers |
| 8,026,396 | B2 | 9/2011 | Mitsuda |
| 8,069,498 | B2 | 12/2011 | Maddux |
| 8,087,099 | B2 | 1/2012 | Sawabe |
| 8,105,184 | B2 | 1/2012 | Lammer |
| 8,117,679 | B2 | 2/2012 | Pierce |
| 8,156,569 | B2 | 4/2012 | Cripton |
| 8,176,574 | B2 | 5/2012 | Bryant |
| 8,201,269 | B2 | 6/2012 | Maddux |
| D663,076 | S | 7/2012 | Parsons |
| 8,209,784 | B2 | 7/2012 | Larry |
| D666,779 | S | 9/2012 | Harris |
| 8,296,867 | B2 | 10/2012 | Rudd |
| 8,296,868 | B2 | 10/2012 | Belanger |
| 8,382,685 | B2 | 2/2013 | Vaccari |
| D679,058 | S | 3/2013 | Szalkowski |
| D681,280 | S | 4/2013 | Bologna |
| D681,281 | S | 4/2013 | Bologna |
| 8,418,270 | B2 | 4/2013 | Desjardins |
| 8,465,376 | B2 | 6/2013 | Bentley |
| 8,468,613 | B2 | 6/2013 | Harty |
| 8,524,338 | B2 | 9/2013 | Anderson |
| 8,544,117 | B2 | 10/2013 | Erb |
| 8,544,118 | B2 | 10/2013 | Brine, III |
| 8,566,968 | B2 | 10/2013 | Marzec |
| 8,572,767 | B2 | 11/2013 | Bryant |
| 8,621,671 | B1 | 1/2014 | Schiebl |
| D699,895 | S | 2/2014 | Hill |
| 8,640,267 | B1 | 2/2014 | Cohen |
| 8,656,520 | B2 | 2/2014 | Rush, III |
| 8,661,564 | B2 | 3/2014 | Dodd |
| 8,690,655 | B2 | 4/2014 | Meyer |
| 8,702,516 | B2 | 4/2014 | Bentley |
| 8,707,470 | B1 | 4/2014 | Novicky |
| 8,726,424 | B2 | 5/2014 | Thomas |
| 8,730,231 | B2 | 5/2014 | Snoddy |
| 8,739,317 | B2 | 6/2014 | Abernethy |
| 8,756,719 | B2 | 6/2014 | Veazie |
| D708,792 | S | 7/2014 | Aaskov |
| 8,776,272 | B1 | 7/2014 | Straus |
| 8,813,269 | B2 | 8/2014 | Nelson |
| 8,814,150 | B2 | 8/2014 | Ferrara |
| 8,819,871 | B2 | 9/2014 | Anthony |
| 8,826,468 | B2 | 9/2014 | Harris |
| 8,850,622 | B2 | 10/2014 | Finiel |
| 8,850,623 | B1 | 10/2014 | Mazzoccoli |
| 8,860,570 | B2 | 10/2014 | Thomas |
| 8,863,319 | B2 | 10/2014 | Knight |
| 8,874,251 | B2 | 10/2014 | Thornton |
| D718,002 | S | 11/2014 | Littrell, Jr. |
| 8,887,312 | B2 | 11/2014 | Bhatnagar |
| 8,887,318 | B2 | 11/2014 | Mazzarolo |
| 8,894,514 | B2 | 11/2014 | Jennings |
| 8,927,088 | B2 | 1/2015 | Faden |
| 8,955,169 | B2 | 2/2015 | Weber |
| 8,966,670 | B2 | 3/2015 | Cheng |
| 8,966,671 | B2 | 3/2015 | Rumbaugh |
| 9,017,806 | B2 | 4/2015 | Jacobsen |
| 9,026,396 | B2 | 5/2015 | Evans |
| 9,032,558 | B2 | 5/2015 | Leon |
| 9,095,179 | B2 | 8/2015 | Kwan |
| 9,107,466 | B2 | 8/2015 | Hoying |
| 9,113,672 | B2 | 8/2015 | Witcher |
| 9,119,431 | B2 | 9/2015 | Bain |
| 9,131,741 | B2 | 9/2015 | Maliszewski |
| 9,131,744 | B2 | 9/2015 | Erb |
| 9,141,759 | B2 | 9/2015 | Burich |
| 9,179,727 | B2 | 11/2015 | Grant |
| 9,182,208 | B2 | 11/2015 | Ebisawa |
| 9,185,946 | B2 | 11/2015 | Leary |
| 9,194,136 | B2 | 11/2015 | Cormier |
| D746,000 | S | 12/2015 | Daniels |
| 9,210,961 | B2 | 12/2015 | Torres |
| D747,040 | S | 1/2016 | Milam |
| D747,554 | S | 1/2016 | Daniel |
| 9,236,997 | B2 | 1/2016 | Yoon |
| 9,247,780 | B2 | 2/2016 | Gerardo |
| 9,249,853 | B2 | 2/2016 | Cormier |
| 9,257,054 | B2 | 2/2016 | Coza |
| D752,821 | S | 3/2016 | Bologna |
| D752,822 | S | 3/2016 | Bologna |
| D752,823 | S | 3/2016 | Bologna |
| 9,271,542 | B2 | 3/2016 | McCue |
| 9,289,024 | B2 | 3/2016 | Withnall |
| D753,346 | S | 4/2016 | Erb |
| 9,314,060 | B2 | 4/2016 | Giles |
| 9,314,062 | B2 | 4/2016 | Marz |
| 9,314,063 | B2 | 4/2016 | Bologna |
| 9,320,311 | B2 | 4/2016 | Szalkowski |
| 9,326,737 | B2 | 5/2016 | Simon |
| 9,332,800 | B2 | 5/2016 | Brown |
| 9,339,073 | B2 | 5/2016 | De La Fuente |
| 9,380,823 | B2 | 7/2016 | Johnson |
| 9,380,961 | B2 | 7/2016 | Borkholder |
| D764,116 | S | 8/2016 | Collette |
| 9,408,423 | B2 | 8/2016 | Guerra |
| 9,420,843 | B2 | 8/2016 | Cormier |
| 9,440,413 | B2 | 9/2016 | Lewis |
| 9,460,604 | B1 | 10/2016 | Daniel |
| 9,462,842 | B2 | 10/2016 | Hoshizaki |
| 9,468,249 | B2 | 10/2016 | Fraser |
| 9,474,316 | B2 | 10/2016 | Berry |
| 9,493,643 | B2 | 11/2016 | Li |
| 9,498,014 | B2 | 11/2016 | Wingo |
| 9,500,464 | B2 | 11/2016 | Coza |
| D773,742 | S | 12/2016 | Williams |
| 9,516,910 | B2 | 12/2016 | Szalkowski |
| 9,530,248 | B2 | 12/2016 | Zhang |
| 9,545,127 | B1 | 1/2017 | Sandifer |
| D778,504 | S | 2/2017 | Collette |
| 9,566,471 | B2 | 2/2017 | Deangelis |
| 9,572,390 | B1 | 2/2017 | Simpson |
| 9,572,391 | B2 | 2/2017 | McInnis |
| 9,572,402 | B2 | 2/2017 | Jarvis |
| 9,586,116 | B2 | 3/2017 | Churchman |
| 9,596,901 | B1 | 3/2017 | Anvari |
| 9,597,567 | B1 | 3/2017 | Tran |
| 9,603,404 | B2 | 3/2017 | Pocatko |
| D784,628 | S | 4/2017 | Fleming |
| 9,610,476 | B1 | 4/2017 | Tran |
| 9,622,531 | B1 | 4/2017 | Crispino |
| 9,622,533 | B2 | 4/2017 | Warmouth |

(56) References Cited

U.S. PATENT DOCUMENTS 9,629,409 B1 4/2017 Cannon, Jr.
9,642,410 B2 5/2017 Grice
9,648,915 B2 5/2017 Jennings
9,656,148 B2 5/2017 Bologna
9,693,594 B1 7/2017 Castro
9,702,516 B1 7/2017 Vasquez
9,711,146 B1 7/2017 Cronin
9,713,355 B2 7/2017 Daoust
9,724,588 B1 8/2017 Cronin
9,726,249 B2 8/2017 Horstemeyer
9,750,296 B2 9/2017 Knight
9,750,297 B1 9/2017 Mini Townson
9,756,891 B1 9/2017 McGhie
9,763,487 B1 9/2017 Brown, Jr.
9,763,488 B2 9/2017 Bologna
9,770,060 B2 9/2017 Infusino
9,775,396 B1 10/2017 Olivares Velasco
9,788,589 B2 10/2017 Lewis
9,788,593 B2 10/2017 Lebel
9,788,600 B2 10/2017 Wawrousek
9,791,336 B2 10/2017 Zhu
9,795,177 B1 10/2017 Weaver
9,795,180 B2 10/2017 Lowe
9,801,424 B2 10/2017 Mazzarolo
9,817,439 B2 11/2017 Gosieski
9,820,522 B2 11/2017 Prabhu
9,833,684 B2 12/2017 Warmouth
9,839,251 B2 12/2017 Pannikottu
9,841,075 B2 12/2017 Russo
9,849,361 B2 12/2017 Coza
D807,587 S 1/2018 Lebel
9,861,153 B2 1/2018 Finisdore
9,861,876 B2 1/2018 Vito
9,881,206 B2 1/2018 Hohteri
9,895,099 B2 2/2018 Rennaker
9,918,110 B2 3/2018 Anwar
9,924,756 B2 3/2018 Hyman
9,925,440 B2 3/2018 Davis
9,943,128 B2 4/2018 Atashbar
9,949,516 B2 4/2018 Pickett
9,962,118 B2 5/2018 Kozloski
9,962,905 B2 5/2018 Duoss
9,968,154 B2 5/2018 Tenenbaum
9,980,530 B2 5/2018 Hassan
9,986,779 B2 6/2018 Pritz
10,004,973 B2 6/2018 Weatherby
10,010,122 B2 7/2018 Kamradt
10,022,593 B2 7/2018 Krysiak
10,022,613 B2 7/2018 Tran
10,024,743 B2 7/2018 Davis
10,029,633 B2 7/2018 Phipps
10,039,338 B2 8/2018 Kelly
10,058,761 B2 8/2018 Thompson
10,071,282 B2 9/2018 Deangelis
10,071,301 B2 9/2018 Vock
10,085,508 B2 10/2018 Surabhi
10,085,509 B2 10/2018 Warmouth
10,092,055 B2 10/2018 Hector, Jr.
10,098,402 B2 10/2018 Booher, Sr.
10,105,076 B2 10/2018 Chu
10,105,584 B1 10/2018 Whitcomb
10,123,582 B2 11/2018 Crossman
10,130,133 B2 11/2018 Leon
10,130,134 B2 11/2018 Blair
10,136,691 B2 11/2018 Degolier
10,136,692 B2 11/2018 Ide
D836,253 S 12/2018 Erb
10,143,255 B2 12/2018 Golnaraghi
10,149,511 B2 12/2018 Vito
10,151,565 B2 12/2018 Fonte
10,158,685 B1 12/2018 Hobby
10,159,296 B2 12/2018 Pietrzak
10,165,818 B2 1/2019 Suddaby
10,167,922 B2 1/2019 McDonnell
10,172,406 B2 1/2019 Olivares Velasco
10,178,889 B2 1/2019 Wacter
10,182,135 B2 1/2019 Black
10,183,423 B2 1/2019 Nauman
10,200,834 B2 2/2019 Tran
10,201,743 B1 2/2019 Simpson
10,219,573 B2 3/2019 Podboy
10,226,094 B2 3/2019 Straus
10,238,950 B2 3/2019 Kuntz
10,241,205 B2 3/2019 Cavallaro
10,244,810 B2 4/2019 Martin
10,258,100 B1 4/2019 Erb
10,271,603 B2 4/2019 Briggs
D850,011 S 5/2019 Bologna
D850,012 S 5/2019 Bologna
D850,013 S 5/2019 Vittorio
10,278,444 B2 5/2019 Merrell
10,292,651 B2 5/2019 Kozloski
10,306,941 B2 6/2019 Durocher
10,306,942 B2 6/2019 Hoshizaki
10,315,095 B1 6/2019 Sneed
10,342,280 B2 7/2019 Valentino, Sr.
10,342,281 B2 7/2019 Fischer
10,342,283 B2 7/2019 Glover
10,349,696 B2 7/2019 Ogata
10,350,477 B2 7/2019 Schneider
10,357,075 B2 7/2019 Princip
10,362,829 B2 7/2019 Lowe
10,368,604 B2 8/2019 Linares
10,369,452 B2 8/2019 Jimenez
10,369,739 B2 8/2019 Cormier
10,376,009 B2 8/2019 Kennedy
10,376,010 B2 8/2019 Allen
10,376,210 B2 8/2019 Paris
10,384,394 B2 8/2019 McCluskey
10,433,609 B2 10/2019 Reinhall
10,455,883 B2 10/2019 Brown
10,463,099 B2 11/2019 Allen
10,493,697 B2 12/2019 Miller
10,506,840 B2 12/2019 Walterspiel
10,569,044 B2 2/2020 Dunn
10,588,372 B2 3/2020 Ho
10,647,879 B2 5/2020 Rolland
10,736,373 B2 8/2020 Chilson
10,780,338 B1 9/2020 Bologna
10,813,402 B2 10/2020 Posner
10,948,898 B1 3/2021 Pietrzak
11,020,909 B2 6/2021 Compton
11,033,796 B2 * 6/2021 Bologna ................ G06F 30/00
D927,084 S 8/2021 Bologna
11,089,832 B2 8/2021 Frieder, Jr.
D939,150 S 12/2021 Bologna
11,213,736 B2 1/2022 Bologna
D942,698 S 2/2022 Schneider
11,304,471 B2 4/2022 Light
11,311,060 B2 4/2022 Ferrara
11,399,589 B2 * 8/2022 Bologna ................. A42B 3/04
11,523,652 B2 12/2022 Hall
2001/0032351 A1 10/2001 Nakayama
2001/0039674 A1 11/2001 Shida
2002/0049507 A1 4/2002 Hameen-Anttila
2002/0060633 A1 5/2002 Crisco
2002/0114859 A1 8/2002 Cutler
2002/0116147 A1 8/2002 Vock
2002/0183657 A1 12/2002 Socci
2003/0014210 A1 1/2003 Vock
2003/0071766 A1 4/2003 Hartwell
2003/0163287 A1 8/2003 Vock
2004/0008106 A1 1/2004 Konczal
2004/0045078 A1 3/2004 Puchalski
2004/0117896 A1 6/2004 Madey
2004/0139531 A1 7/2004 Moore
2004/0163228 A1 8/2004 Piorkowski
2004/0181854 A1 9/2004 Primrose
2004/0204904 A1 10/2004 Ebisawa
2004/0225236 A1 11/2004 Wheeler
2004/0240198 A1 12/2004 Laar
2004/0250340 A1 12/2004 Piper
2005/0050617 A1 3/2005 Moore
2005/0177929 A1 8/2005 Greenwald

(56) References Cited

U.S. PATENT DOCUMENTS

2005/0241048 A1 11/2005 Cattaneo
2005/0241049 A1 11/2005 Ambuske
2005/0278834 A1 12/2005 Lee
2006/0031978 A1 2/2006 Pierce
2006/0038694 A1 2/2006 Naunheim
2006/0059606 A1 3/2006 Ferrara
2006/0074338 A1 4/2006 Greenwald
2006/0101559 A1 5/2006 Moore
2006/0112477 A1 6/2006 Schneider
2006/0143807 A1 7/2006 Udelhofen
2006/0189852 A1 8/2006 Greenwald
2007/0061106 A1 3/2007 Vock
2007/0094769 A1 5/2007 Lakes
2007/0119538 A1 5/2007 Price
2007/0157370 A1 7/2007 Joubert Des Ouches
2007/0266471 A1 11/2007 Lin
2007/0266481 A1 11/2007 Alexander
2008/0052808 A1 3/2008 Leick
2008/0086916 A1 4/2008 Ellis
2008/0092277 A1 4/2008 Kraemer
2008/0155734 A1 7/2008 Yen
2008/0163410 A1 7/2008 Udelhofen
2008/0172774 A1 7/2008 Ytterborn
2008/0250550 A1 10/2008 Bologna
2008/0256686 A1 10/2008 Ferrara
2008/0295228 A1 12/2008 Muskovitz
2009/0038055 A1 2/2009 Ferrara
2009/0044316 A1 2/2009 Udelhofen
2009/0057325 A1 3/2009 Tullio
2009/0106882 A1 4/2009 Nimmons
2009/0222964 A1 9/2009 Wiles
2009/0255036 A1 10/2009 Lim
2009/0260133 A1 10/2009 Del Rosario
2009/0265840 A1 10/2009 Favre-Felix
2009/0265841 A1 10/2009 Ferrara
2009/0274865 A1 11/2009 Wadley
2010/0043126 A1 2/2010 Morel
2010/0050323 A1 3/2010 Durocher
2010/0180362 A1 7/2010 Glogowski
2010/0251465 A1 10/2010 Milea
2010/0258988 A1 10/2010 Darnell
2010/0287687 A1 11/2010 Ho
2010/0319097 A1 12/2010 Turner
2010/0319110 A1 12/2010 Preston-Powers
2011/0047678 A1 3/2011 Barth
2011/0056004 A1 3/2011 Landi
2011/0107503 A1 5/2011 Morgan
2011/0167542 A1 7/2011 Bayne
2011/0203038 A1 8/2011 Jones
2011/0209272 A1 9/2011 Drake
2011/0215931 A1 9/2011 Callsen
2011/0225706 A1 9/2011 Pye
2011/0229685 A1 9/2011 Lin
2011/0271428 A1 11/2011 Withnall
2012/0036619 A1 2/2012 Ytterborn
2012/0036620 A1 2/2012 Harris
2012/0047634 A1 3/2012 Vaidya
2012/0060251 A1 3/2012 Schimpf
2012/0066820 A1 3/2012 Fresco
2012/0079646 A1 4/2012 Belanger
2012/0096631 A1 4/2012 King
2012/0151663 A1 6/2012 Rumbaugh
2012/0210498 A1 8/2012 Mack
2012/0220893 A1 8/2012 Benzel
2012/0297526 A1 11/2012 Leon
2012/0317705 A1 12/2012 Lindsay
2013/0007950 A1 1/2013 Arai
2013/0025032 A1 1/2013 Durocher
2013/0040524 A1 2/2013 Halldin
2013/0031700 A1 3/2013 Wacter
2013/0060168 A1 3/2013 Chu
2013/0061371 A1 3/2013 Phipps
2013/0061375 A1 3/2013 Bologna
2013/0067643 A1 3/2013 Musal
2013/0074248 A1 3/2013 Evans
2013/0122256 A1 5/2013 Kleiven
2013/0180034 A1 7/2013 Preisler
2013/0185837 A1 7/2013 Phipps
2013/0209977 A1 8/2013 Lathan
2013/0211774 A1 8/2013 Bentley
2013/0212783 A1 8/2013 Bonin
2013/0274778 A1 10/2013 Mercier
2013/0283503 A1 10/2013 Zilverberg
2013/0283504 A1 10/2013 Harris
2013/0298316 A1 11/2013 Jacob
2013/0340146 A1 12/2013 Dekker
2013/0340147 A1 12/2013 Giles
2014/0000012 A1 1/2014 Mustapha
2014/0007324 A1 1/2014 Svehaug
2014/0013492 A1 1/2014 Bottlang
2014/0020158 A1 1/2014 Parsons
2014/0033402 A1 2/2014 Donnadieu
2014/0035658 A1 2/2014 Osamu
2014/0052405 A1 2/2014 Wackym
2014/0072938 A1 3/2014 Krull
2014/0081601 A1 3/2014 Zhang
2014/0090155 A1 4/2014 Johnston
2014/0196198 A1 7/2014 Cohen
2014/0201889 A1 7/2014 Pietrzak
2014/0208486 A1 7/2014 Krueger
2014/0223641 A1 8/2014 Henderson
2014/0223644 A1 8/2014 Bologna
2014/0259326 A1 9/2014 Carlson
2014/0333446 A1 11/2014 Newlove
2014/0364772 A1 12/2014 Howard
2014/0373257 A1 12/2014 Turner
2015/0055085 A1 2/2015 Fonte
2015/0074875 A1 3/2015 Schimpf
2015/0080766 A1 3/2015 Ji
2015/0081076 A1 3/2015 Fernandes
2015/0109129 A1 4/2015 Merril
2015/0121609 A1 5/2015 Cote
2015/0157081 A1 6/2015 Hyman
2015/0157083 A1 6/2015 Lowe
2015/0165690 A1 6/2015 Tow
2015/0196252 A1 7/2015 Iuliano
2015/0208751 A1 7/2015 Day
2015/0223547 A1 8/2015 Wibby
2015/0230534 A1 8/2015 McGuckin, Jr.
2015/0238143 A1 8/2015 Meurer
2015/0246502 A1 9/2015 Lloyd
2015/0250250 A1 9/2015 Ellis
2015/0264991 A1 9/2015 Frey
2015/0272257 A1 10/2015 Pritz
2015/0272258 A1 10/2015 Preisler
2015/0305430 A1 10/2015 Rush
2015/0313305 A1 11/2015 Daetwyler
2015/0328512 A1 11/2015 Davis
2015/0331522 A1 11/2015 McMillen
2015/0359285 A1 12/2015 Rennaker, II
2015/0359477 A1 12/2015 Ramachandran
2015/0377694 A1 12/2015 Shepard, Jr.
2016/0018278 A1 1/2016 Jeter, II
2016/0029731 A1 2/2016 Magee
2016/0051013 A1 2/2016 Mitchell, Jr.
2016/0053843 A1 2/2016 Subhash
2016/0058092 A1 3/2016 Aldino
2016/0100794 A1 4/2016 Miller
2016/0113346 A1 4/2016 Lowe
2016/0128415 A1 5/2016 Tubbs
2016/0157544 A1 6/2016 Ning
2016/0183619 A1 6/2016 Del Ramo
2016/0198681 A1 7/2016 Fyfe
2016/0219964 A1 8/2016 Pisano
2016/0238099 A1 8/2016 Perino
2016/0242485 A1 8/2016 Carton
2016/0242486 A1 8/2016 Harris
2016/0255898 A1 9/2016 Cormier
2016/0255900 A1 9/2016 Browd
2016/0270473 A1 9/2016 Warmouth
2016/0271482 A1 9/2016 Garland
2016/0278467 A1 9/2016 Irwin
2016/0278470 A1 9/2016 Posner
2016/0286885 A1 10/2016 Hyman

(56) References Cited

U.S. PATENT DOCUMENTS

2016/0286891 A1 10/2016 Stramacchia
2016/0302496 A1 10/2016 Ferrara
2016/0318255 A1 11/2016 Ou
2016/0345651 A1 12/2016 Dvorak
2016/0349738 A1 12/2016 Sisk
2016/0370239 A1 12/2016 Cummings
2017/0010603 A1 1/2017 Ingleton
2017/0019629 A1 1/2017 Fukasawa
2017/0065017 A1 3/2017 Janson
2017/0065018 A1 3/2017 Lindsay
2017/0095014 A1 4/2017 King
2017/0105461 A1 4/2017 Hancock
2017/0105470 A1 4/2017 Eaton
2017/0143066 A1 5/2017 Avery
2017/0144024 A1 5/2017 Warners
2017/0164678 A1 6/2017 Allen
2017/0188648 A1 7/2017 Larrabee
2017/0188649 A1 7/2017 Allen
2017/0189786 A1 7/2017 Riggs
2017/0196291 A1 7/2017 Glover
2017/0196292 A1 7/2017 Reinhall
2017/0196294 A1 7/2017 Fischer
2017/0196295 A1 7/2017 Glover
2017/0209092 A1 7/2017 Crisco, III
2017/0215507 A1 8/2017 Straus
2017/0224042 A1 8/2017 Abraham
2017/0225032 A1 8/2017 Jones
2017/0232327 A1 8/2017 Kuntz
2017/0265556 A1 9/2017 Yang
2017/0273387 A1 9/2017 Sicking
2017/0295881 A1 10/2017 Martin
2017/0300755 A1 10/2017 Bose
2017/0303612 A1 10/2017 Morgan
2017/0318891 A1 11/2017 Walterspiel
2017/0332719 A1 11/2017 Aaron
2018/0000186 A1 1/2018 Brown
2018/0014771 A1 1/2018 Merchant-Borna
2018/0021661 A1 1/2018 Bologna
2018/0027913 A1 2/2018 Thiel
2018/0027914 A1 2/2018 Cook
2018/0042326 A1 2/2018 Mini Townson
2018/0049484 A1 2/2018 Markison
2018/0092428 A1 4/2018 Knight
2018/0098594 A1 4/2018 Marcus
2018/0098595 A1 4/2018 Steck
2018/0116543 A1 5/2018 Miller
2018/0125143 A1 5/2018 Herbert
2018/0132557 A1 5/2018 Torres
2018/0153246 A1 6/2018 Baldi
2018/0154242 A1 6/2018 Austin
2018/0184732 A1 7/2018 Plant
2018/0184745 A1 7/2018 Stone
2018/0200591 A1 7/2018 Davis
2018/0213874 A1 8/2018 Lanner
2018/0229436 A1 8/2018 Gu
2018/0265738 A1 9/2018 Rolland
2018/0304598 A1 10/2018 Drzal
2018/0326288 A1 11/2018 Simpson
2018/0332918 A1 11/2018 Nauman
2018/0343952 A1 12/2018 Lachance
2018/0343953 A1 12/2018 Erb
2018/0360154 A1 12/2018 Halldin
2019/0014848 A1 1/2019 Tutunaru
2019/0014850 A1 1/2019 Johnson, Jr.
2019/0021413 A1 1/2019 Abram
2019/0021434 A1 1/2019 Eiler
2019/0029352 A1 1/2019 Sadegh
2019/0045870 A1 2/2019 Safar
2019/0059498 A1 2/2019 Kovarik
2019/0075876 A1 3/2019 Burek
2019/0090574 A1 3/2019 Shaffer
2019/0090576 A1 3/2019 Guinta
2019/0090578 A1 3/2019 Tubbs
2019/0110546 A1 4/2019 Wacter
2019/0111658 A1 4/2019 Gupta
2019/0114690 A1 4/2019 Paquette
2019/0118486 A1 4/2019 Compton
2019/0133235 A1 5/2019 Domanskis
2019/0145740 A1 5/2019 Czerski
2019/0149644 A1 5/2019 Black
2019/0159540 A1 5/2019 Pradeep
2019/0166945 A1 6/2019 Martin
2019/0166946 A1 6/2019 Vito
2019/0174859 A1 6/2019 Schmidt
2019/0216158 A1 7/2019 Leclaire
2019/0216159 A1 7/2019 Vanhoutin
2019/0231018 A1 8/2019 Boutin
2019/0239589 A1 8/2019 Gamucci
2019/0290982 A1 9/2019 Davis
2019/0307199 A1 10/2019 Hall
2019/0328071 A1 10/2019 Stone
2019/0380419 A1 12/2019 Fischer
2020/0000169 A1 1/2020 Reinhall
2020/0022444 A1 1/2020 Stone
2020/0039162 A1 2/2020 Waatti
2020/0060374 A1 2/2020 Glover
2020/0188733 A1 * 6/2020 Beckwith ............ A42B 3/0433
2020/0205503 A1 * 7/2020 Vanhoutin ............. A42B 3/127
2020/0215415 A1 7/2020 Bologna
2021/0000209 A1 1/2021 Neubauer
2021/0001560 A1 1/2021 Cook
2021/0007432 A1 1/2021 Santiago
2021/0085011 A1 3/2021 Santiago
2021/0106091 A1 4/2021 Glover
2021/0187897 A1 6/2021 Reinhall
2021/0315306 A1 10/2021 Robinson
2021/0323263 A1 10/2021 Cagle
2023/0119234 A1 4/2023 Stoutamire

FOREIGN PATENT DOCUMENTS

CN 1735921 2/2006
CN 2870519 2/2007
CN 2896943 5/2007
CN 101204904 6/2008
CN 102972901 3/2013
CN 113423296 A 9/2021
DE 3222681 12/1983
DE 3338188 5/1985
DE 3603234 8/1987
DE 3632525 8/1996
DE 19745960 10/1997
DE 102014106024 10/2015
EP 0315498 5/1989
EP 0512193 11/1992
EP 571065 11/1993
EP 623292 11/1994
EP 630589 12/1994
EP 770338 5/1997
EP 1219189 A1 7/2002
EP 1388300 2/2004
EP 1538935 A1 6/2005
EP 1627575 A1 2/2006
EP 1708587 A1 10/2006
EP 1836913 A2 9/2007
EP 1972220 9/2008
EP 2042048 A2 4/2009
EP 2071969 A2 6/2009
EP 2103229 A2 9/2009
EP 2156761 A2 2/2010
EP 2289360 A2 3/2011
EP 2389822 A 11/2011
EP 2428129 A2 3/2012
EP 2525187 11/2012
EP 3000341 3/2016
EP 3130243 2/2017
GB 256430 8/1926
GB 2398476 8/2004
GB 2481855 A 1/2012
GB 2490894 11/2012
GB 2490894 A * 11/2012 ............ A42B 3/124
JP 2000045119 2/2000
JP 2000245888 9/2000
JP 2001020121 1/2001

(56) References Cited

FOREIGN PATENT DOCUMENTS

| | | | |
|---|---|---|---|
| NL | 2003713 | | 4/2011 |
| RU | 2150874 | | 6/2000 |
| RU | 2005129896 | | 4/2007 |
| RU | 2308763 | | 10/2007 |
| WO | 9534229 | | 12/1995 |
| WO | 1998023174 | | 6/1998 |
| WO | 9836213 | | 8/1998 |
| WO | 9904685 | | 2/1999 |
| WO | 9911152 | | 3/1999 |
| WO | 1999042012 | | 8/1999 |
| WO | 2000067998 | | 11/2000 |
| WO | 0152676 | | 7/2001 |
| WO | 2002028211 | | 4/2002 |
| WO | 2004023913 | | 3/2004 |
| WO | 2004052133 | | 6/2004 |
| WO | 2005000059 | | 1/2005 |
| WO | 2005060392 | | 7/2005 |
| WO | 2006036567 | | 4/2006 |
| WO | 2007013106 | | 2/2007 |
| WO | 2007047923 | | 4/2007 |
| WO | 2008085108 | A1 | 7/2008 |
| WO | 2010001230 | | 1/2010 |
| WO | 2011084660 | | 7/2011 |
| WO | 2011087435 | A1 | 7/2011 |
| WO | 2011148146 | | 12/2011 |
| WO | 2012047696 | | 4/2012 |
| WO | 2012074400 | | 6/2012 |
| WO | 2012099633 | | 7/2012 |
| WO | 2013033078 | A1 | 3/2013 |
| WO | 2017029488 | | 2/2017 |
| WO | 17171694 | | 10/2017 |
| WO | 2018072017 | | 4/2018 |
| WO | 2019195339 | | 10/2019 |
| WO | 2019200409 | | 10/2019 |
| WO | 2019237025 | | 12/2019 |

OTHER PUBLICATIONS

First Examination Report issued in Australian Appln. No. 2014207532 dated Apr. 13, 2017 (3 pages).

Office Action issued in Chinese Appln. No. 201480013229.7 dated Feb. 7, 2018 (26 pages).

Office Action issued in Chinese Appln. No. 201480013229.7 dated Mar. 13, 2017 (55 pages).

Office Action issued in EP Appln. No. 14740903.1 dated Aug. 3, 2017 (5 pages).

Office Action issued in Japanese Appln. No. 2015-553831 dated Dec. 12, 2017 (13 pages).

Office Action issued in Russian Appln. No. 2015129408 dated Dec. 27, 2017 (8 pages).

International Search Report and Written Opinion issued in PCT/US14/11877 dated Apr. 24, 2014 (12 pages).

First Examination Report issued in New Zealand Appln. No. 710449 dated Mar. 2, 2018 (5 pages).

International Search Report and Written Opinion issued in PCT/US2017/043132 on Sep. 28, 2017 (10 pages).

International Search Report and Written Opinion issued in PCT/US2019/062700 on Jan. 30, 2020 (17 pages).

Duma, Stefan M., Analysis of Real-time Head Accelerations in Collegiate Football Players, Jan. 2005, Clin J Sport Med, vol. 15, No. 1, pp. 3-8.

Foxlin et al., Miniature 6-DOF Inertial System for tracking HMDs, Apr. 13-14, 1998, SPIE, Helmet and Head-Mounted Displays III, AeroSense 98, vol. 3362.

Greenwald, Richard M., Head Impact Severity Measures for Evaluating Mild Traumatic Brain Injury Risk Exposure, Apr. 2008, Neurosurgery, 62(4), pp. 789-798.

International Search Report and Written Opinion issued in PCT/US2019/062697 on Feb. 3, 2020 (18 pages).

International Search Report and Written Opinion issued in PCT/US2019/066084 on Mar. 9, 2020 (13 pages).

International Search Report for PCT/US2005/032903 mailed Mar. 10, 2006.

International Search Report for PCT/US2006/000536 mailed Oct. 2, 2006.

Naunheim, Rosanne S., et al. “Comparison of impact data in hockey, football, and soccer.” Journal of Trauma and Acute Care Surgery 48.5 (2000): 938-941.

Written Opinion for PCT/US2006/000536 mailed Jul. 10, 2007.

Walmink et al., Interaction opportunities around helmet design, 4 pages (Year: 2014).

Yu et al., Motorcycle helmet safety design research, 5 pages (Year: 2010).

Echeta, I., Feng, X., Dutton, B et al. Review of defects in lattice structures manufactured by powder bed fusion, International Journal of Advanced Manufacturing Technology 106, 2649-2668 (2020), at https://doi.org/10.1007/s00170-019-04753-4 .

International Search Report and Written Opinion issued in PCT/US2019/046935 on Dec. 23, 2019 (17 pages).

Cai et al., A shape-based helmet fitting system for concussion protection, 4 pages (Year: 2015).

Tan et al., Ballistic impact analysis of an advanced combat helmet with interior cushioning system on a Hybrid3 headform, 5 pages ( Year: 2011).

Riddell Diamond Technology (on-line), dated Jun. 10, 2020. Retrieved from Internet Jun. 7, 2023, URL: http://web.archive.org/ web/20200610005724/http://content.riddell.com/Diamond/ (4 pages) (Year: 2020).

* cited by examiner 130.2.4.75, 230.2.4.75

EXAMPLE OUTPUT SHAPE BASED PLAYER DATA SETS FOR LEVEL SPECIFIC HELMETS

| CIRCUMFERENCE | HEAD SIZE CLUSTER(4) | STANDARD DEVIATION | T-TEST CIRCUMFERENCE | HEAD SIZE CLUSTER(3) | STANDARD DEVIATION | T-TEST CIRCUMFERENCE | HEAD SIZE CLUSTER(5) | STANDARD DEVIATION | T-TEST CIRCUMFERENCE |
|---|---|---|---|---|---|---|---|---|---|
| | | | | | | | | | |
| 19.2 | 19.2 | | | 19.2 | | | 19.2 | | |
| 19.4 | 19.4 | | | 19.4 | | | 19.4 | | |
| 19.9 | 19.9 | | | 19.9 | | | 19.9 | | |
| 20 | 20 | | | 20 | 0.481663783 | 1.8172E-05 | 20 | 0.386221008 | 0.101299021 |
| 20.4 | 20.4 | 0.481663783 | 0.000241907 | 20.4 | | | 20.4 | | |
| 21 | 21 | | | 21 | | | 21 | 0.424264069 | 0.118941723 |
| 21.4 | 21.4 | | | 21.4 | | | 21.4 | | |
| 21.6 | 21.6 | | | 21.6 | | | 21.6 | | |
| 21.8 | 21.8 | | | 21.8 | | | 21.8 | | |
| 22 | 22 | 0.384707681 | 0.000779609 | 22 | | | 22 | | |
| 22.2 | 22.2 | | | 22.2 | | | 22.2 | 0.316227766 | 0.000949226 |
| 22.5 | 22.5 | | | 22.5 | | | 22.5 | | |
| 22.7 | 22.7 | | | 22.7 | | | 22.7 | | |
| 22.8 | 22.8 | | | 22.8 | 0.610327781 | 7.5435E-06 | 22.8 | | |
| 23.2 | 23.2 | | | 23.2 | | | 23.2 | | |
| 23.4 | 23.4 | 0.442718872 | 0.000573133 | 23.4 | | | 23.4 | 0.37013511 | 0.0011875 |
| 23.6 | 23.6 | | | 23.6 | | | 23.6 | | |
| 23.8 | 23.8 | | | 23.8 | | | 23.8 | | |
| 24 | 24 | | | 24 | | | 24 | | |
| 24.2 | 24.2 | | | 24.2 | | | 24.2 | | |
| 24.4 | 24.4 | 0.316227766 | 8.78944E-07 | 24.4 | 0.43204938 | 3.50655E-07 | 24.4 | 0.374165739 | 2.2925E-06 |

14

10

12

| | X1 | X2 | X3 | X4 | X5 | X6 | X7 |
|---|---|---|---|---|---|---|---|
| 1 | + | + | + | — | + | — | — |
| 2 | — | + | + | + | — | + | — |
| 3 | — | — | + | + | + | — | + |
| 4 | + | — | — | + | + | + | — |
| 5 | — | + | — | — | + | + | + |
| 6 | + | — | + | — | — | + | + |
| 7 | + | + | — | + | — | — | + |
| 8 | — | — | — | — | — | — | — |

160.6.8.2

SYSTEM AND METHOD FOR DESIGNING AND MANUFACTURING A PROTECTIVE SPORTS HELMET

CROSS-REFERENCE TO OTHER APPLICATIONS

This application is a continuation of U.S. patent application Ser. No. 16/543,371, filed Oct. 16, 2019, which claims the benefit of U.S. Provisional Patent Application Ser. No. 62/778,559, filed Dec. 12, 2018, U.S. Provisional Patent Application Ser. No. 62/770,453, filed Nov. 21, 2018, and U.S. Provisional Patent Application Ser. No. 62/719,130, filed Aug. 16, 2018, the disclosure of which is hereby incorporated by reference in its entirety for all purposes.

U.S. Design patent application Ser. No. 29/671,111, entitled "Internal Padding Assembly of a Protective Sports Helmet," filed on Nov. 22, 2018, the disclosure of which is hereby incorporated by reference in its entirety for all purposes.

U.S. patent application Ser. No. 15/655,490 entitled "System And Methods For Designing And Manufacturing A Bespoke Protective Sports Helmet," filed on Jul. 20, 2017 and U.S. Provisional Patent Application Ser. No. 62/364,629 entitled "System And Methods For Designing And Manufacturing A Bespoke Protective Sports Helmet That Provides Improved Comfort And Fit To The Player Wearing The Helmet," filed on Jul. 20, 2016, the disclosure of which is hereby incorporated by reference in its entirety for all purposes.

U.S. Pat. No. 10,159,296 entitled "System and Method for Custom Forming a Protective Helmet for a Customers Head," filed on Jan. 15, 2014, U.S. Provisional Patent Application Ser. No. 61/754,469 entitled "System and method for custom forming sports equipment for a user's body part," filed Jan. 18, 2013, U.S. Provisional Patent Application Ser. No. 61/812,666 entitled "System and Method for Custom Forming a Protective Helmet for a User's Head," filed Apr. 16, 2013, U.S. Provisional Patent Application Ser. No. 61/875,603 entitled "Method and System for Creating a Consistent Test Line within Current Standards with Variable Custom Headforms," filed Sep. 9, 2013, and U.S. Provisional Patent Application Ser. No. 61/883,087 entitled "System and Method for Custom Forming a Protective Helmet for a Wearer's Head," filed Sep. 26, 2013, the disclosure of which is hereby incorporated by reference in its entirety for all purposes.

U.S. Pat. No. 9,314,063 entitled "Football Helmet with Impact Attenuation System," filed on Feb. 12, 2014 and U.S. Provisional Patent Application Ser. No. 61/763,802 entitled "Protective Sports Helmet with Engineered Energy Dispersion System," filed on Feb. 12, 2013, the disclosure of which is hereby incorporated by reference in its entirety for all purposes.

U.S. Design Pat. D850,011 entitled "Internal Padding Assembly of A Protective Sports Helmet," filed on Jul. 20, 2017, U.S. Design Pat. D850,012 entitled "Internal Padding Assembly of A Protective Sports Helmet," filed on Jul. 20, 2017, and U.S. Design Pat. D850,013 entitled "Internal Padding Assembly of A Protective Sports Helmet," filed on Jul. 20, 2017, the disclosure of which is hereby incorporated by reference in its entirety for all purposes.

U.S. Design Pat. D603,099 entitled "Sports Helmet," filed on Oct. 8, 2008, U.S. Design Pat. D764,716 entitled "Football Helmet," filed on Feb. 12, 2014, and U.S. Pat. No. 9,289,024 entitled "Protective Sports Helmet," filed on May 2, 2011, the disclosure of which is hereby incorporated by reference in its entirety for all purposes.

TECHNICAL FIELD

The invention relates to a protective helmet purposely designed and manufactured for a selected group of helmet wearers from amongst a larger population of helmet wearers. Specifically, this invention relates to protective helmets, where the helmet and/or a helmet component is purposely designed and manufactured using advanced techniques to tailor the protective helmet to the selected group of players who play a sport or engage in a sporting activity.

BACKGROUND OF THE INVENTION

Conventional protective sports helmets are worn by players or wearers (i.e., people who wear the helmet) across a variety of sports and sporting activities. Helmets for contact sports, such as those used in football, hockey, and lacrosse, typically include an outer shell, an energy attenuation assembly coupled to an interior surface of the shell, a faceguard or face mask, and a chin protector or strap that releasably secures the helmet on the wearer's head. However, these helmets lack components that are specifically designed for a select group of players that wear the helmets but that have different physical attributes, playing styles, and experiences. For example, the selected group of players may include only players or wearers that play one position (e.g., the quarterback position in American football), are at one skill level (e.g., NFL), or have one position and level (e.g., college lineman). Accordingly, there is an unmet need for the protective helmet that is a specifically designed helmet for the selected group of players from among the larger group of players who play a sport or engage in a sporting activity. There also is an unmet need for a helmet that uses advanced structures (e.g., lattice cells), advanced chemicals (e.g., light sensitive polymers), and advanced helmet design/manufacturing techniques (e.g., finite element models, neural networks, additive manufacturing) to create the protective helmet.

The description provided in the background section should not be assumed to be prior art merely because it is mentioned in or associated with the background section. The background section may include information that describes one or more aspects of the subject of the technology.

SUMMARY OF THE INVENTION

This disclosure generally provides a multi-step method with a number of processes and sub-processes that interact to allow for the design and manufacture of a protective helmet for a selected group of helmet wearers from amongst a larger population of helmet wearers. In the context of protective sports helmets worn by players, this multi-step method starts by collecting information from a population of players. This collection of information may include information about the shape of a player's head and information about the impacts the player has received while participating in the sport. This information is collected from numerous players and is then processed to create player population information. This player population information is then sorted to create categories based on at least one characteristic (e.g., player position) of the sport that the player population plays.

Advanced mathematical techniques are utilized to further sort these categories into player groups or data sets based on attributes of the individual players (e.g., shape of each player's head). Once the player groups (data sets) are identified, another multi-step process is utilized to design optimized helmet prototype models for each player group (data sets). These optimized helmet prototype models are then further processed into complete helmet models by determining a structural design and chemical composition that is manufacturable and has mechanical properties that are substantially similar to the optimized helmet prototype model. Physical helmet prototypes are then created from the complete helmet models using advanced manufacturing techniques (e.g., additive manufacturing). Each of the physical helmet prototypes is tested using a unique helmet standard derived from information associated with each player group. Once the physical helmet prototypes pass their testing with the unique helmet standard, the complete helmet models can be manufactured to create actual stock helmets or stock helmet components (e.g., energy attenuation assembly or members of the energy attenuation assembly) for future players whose characteristics and attributes place them within the selected player group.

BRIEF DESCRIPTION OF THE DRAWINGS

The drawing figures depict one or more implementations in accord with the present teachings, by way of example only, not by way of limitation. In the figures, like reference numerals, refer to the same or similar elements.

DETAILED DESCRIPTION

Figure 1:
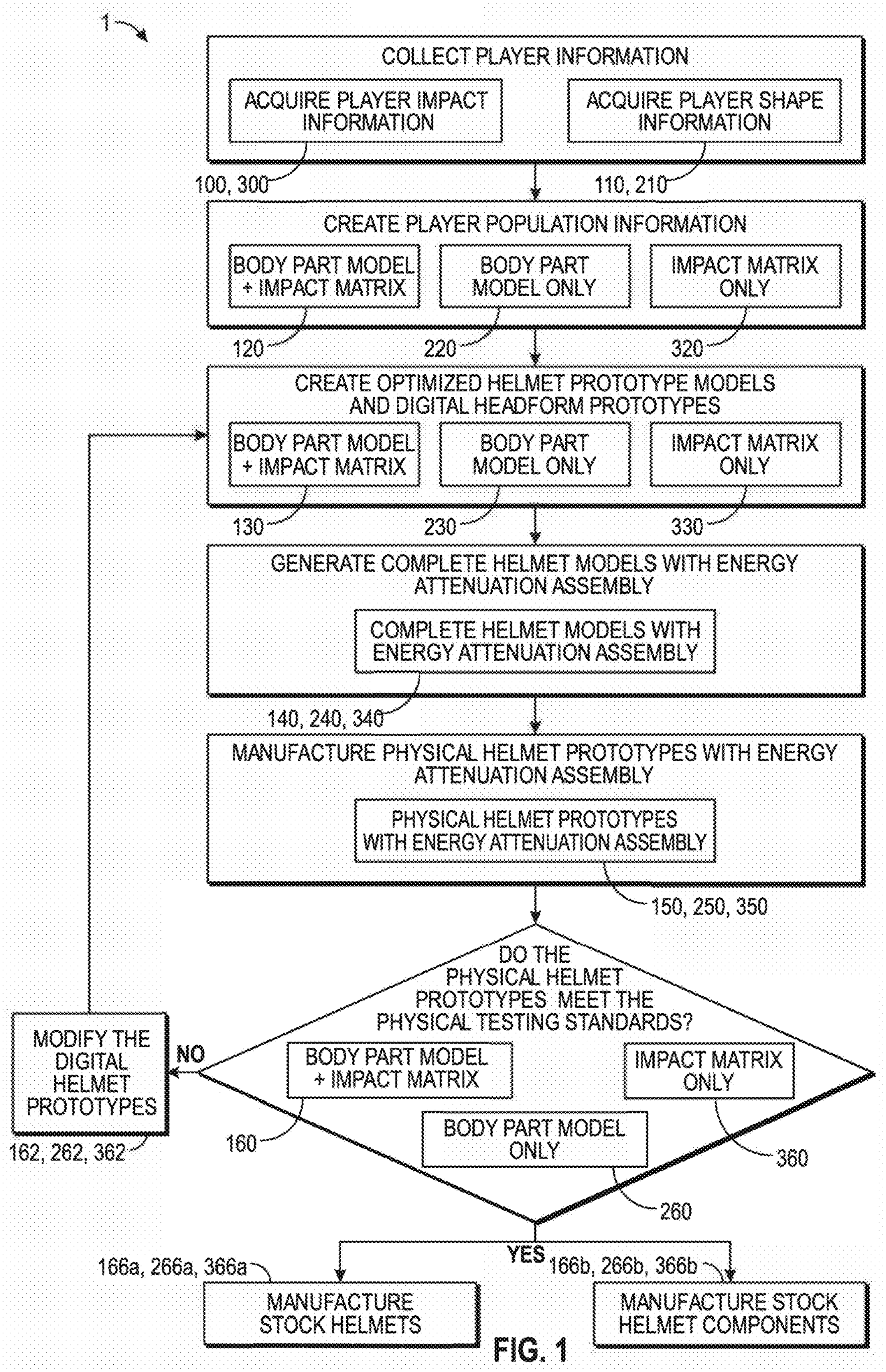
FIG. 1 is a flow chart showing a method of designing and manufacturing a protective helmet worn by a player based upon the collection and processing of player information and player population information.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the subject technology is capable of other and different configurations, several details are capable of modification in various respects, embodiments may be combine, steps in the flow charts may be omitted or performed in a different order, all without departing from the scope of the subject technology. Accordingly, the drawings and detailed description are to be regarded as illustrative in nature and not as restrictive.

A. Definitions

This section identifies a number of terms and definitions that are used throughout the Application. The term "player" is a person who wears the protective sports helmet, is gender neutral and is synonymous with the term "helmet wearer" or "wearer." The term "designer" is a person who designs, tests, manufactures the helmet.

The term "anatomical features" can include any one or any combination of the following: (i) dimensions, (ii) topography and/or (iii) contours of the player's body part including, but not limited to, the player's skull, facial region, eye region and jaw region. Because the disclosed helmet is worn on the player's head and the energy attenuation assembly makes contact with the player's hair, the "anatomical features" term also includes the type, amount and volume of the player's hair or lack thereof. For example, some players have long hair, while other players have no hair (i.e., are bald). While the present disclosure, as will be discussed in detail below, is capable of being applied to any body part of an individual but has particular application the human head. Therefore, any reference to a body part is understood to encompass the head and any reference to the head alone is intended to include applicability to any body part. For ease of discussion and illustration, discussion of the prior art and the present disclosure is directed to the human head, by way of example and is not intended to limit the scope of discussion to the human head.

The term "product region" or "component region" means a volume of the product that has a perimeter that is defined between two volumes of the energy attenuation members that have different mechanical properties.

The term "optimized helmet prototype model" is a digital or computerized model of a protective helmet that has been altered based upon information that has been gathered from a selected player group, wherein the information may be: (i) body part models and impact matrixes, (ii) only body part models, or (iii) only impact matrixes.

The term "complete helmet model" is a digital or computerized model of a protective helmet that is derived from an optimized helmet prototype model. In contrast to the optimized helmet prototype model that is not designed to be manufactured, the complete helmet model is designed to be manufactured.

Figure 46:
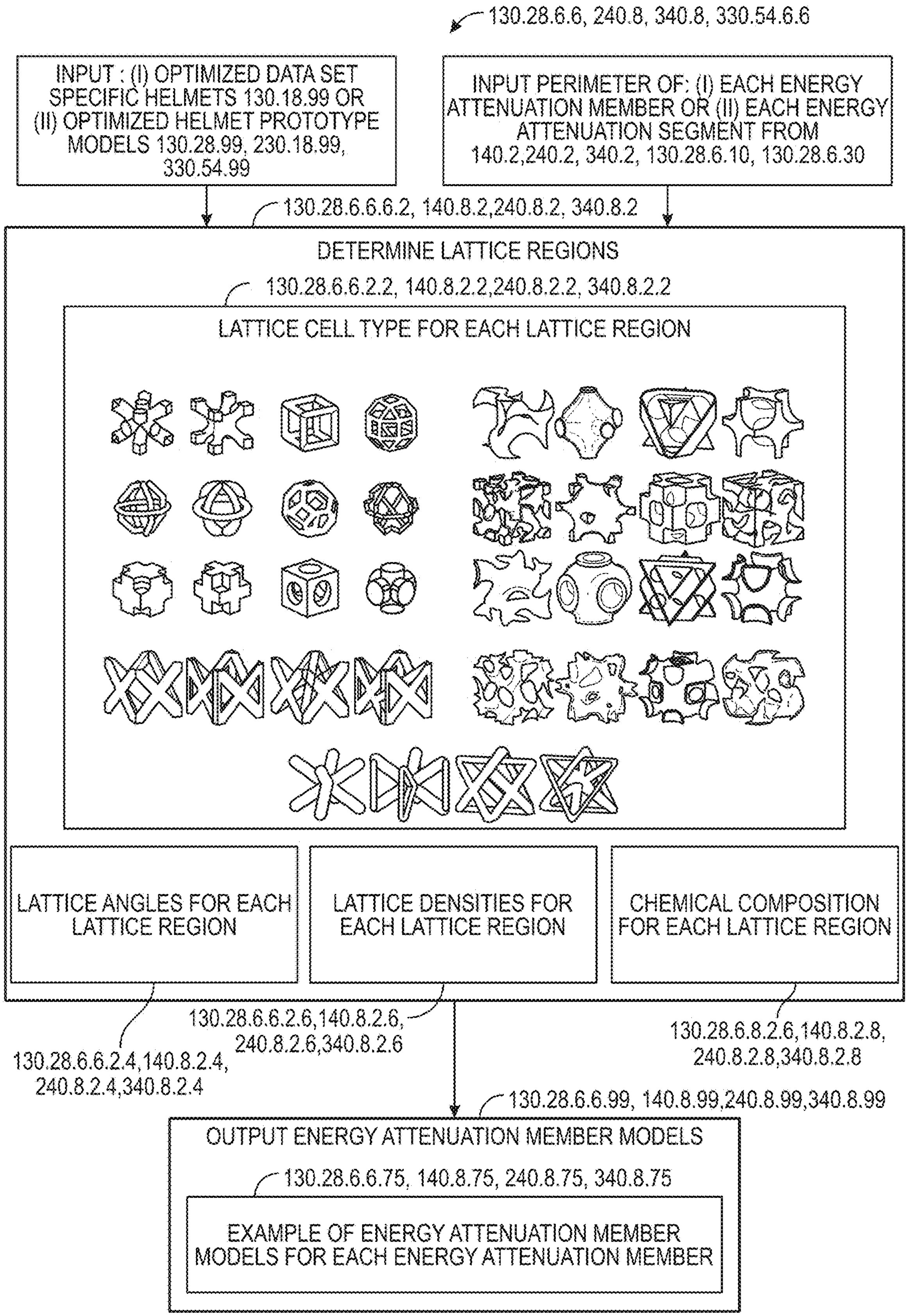
FIG. 46 is a flow chart showing a process of generating energy attenuation member models using a lattice engine.

The term "lattice cell" is the simplest repeating unit contained within the product. It should be understood that various types of lattice cells are contemplated by this disclosure, some of which are shown in FIG. 46. As shown in FIG. 46, some of the lattice cell types are comprised of a number of lattice struts that intersect with one another to form the specific geometry of the lattice cell. While the lattice cell's overall shape may change depending on various variables (e.g., lattice struts thicknesses and lattice struts lengths), the underlying geometry will not change for a given lattice cell. It should further be understood that minor variations in the specific geometry of the lattice cells due to manufacturing tolerances or product configuration will not be considered a new or different type of lattice cell. As will be discussed in great detail below, each product can have a single or multiple types of lattice cells.

The term "lattice cell region" is a volume of the product that is predominantly composed of one lattice cell type. As discussed above, the lattice struts thickness and/or the lattice struts lengths may change within this lattice region, but only minor variations in the lattice cell's underlying geometry is permitted within one lattice region. It should be understood that if there is more than a minor variation in the lattice cell's underlying geometry, then those lattice cells shall make up a new or second lattice cell region. As will be discussed in great detail below, each product can have a single or multiple lattice cell regions.

The term "lattice density" is the density a lattice cell, while the term "lattice density region" is a volume of the product that is predominantly composed of one density value. It should be understood that minor variations in the lattice densities due to manufacturing tolerances or a product's configuration will not be considered a new or additional lattice density region. It should be understood that if there is more than a minor variation in the lattice cell's underlying density, then those lattice cells shall make up a new or second lattice density region. As will be discussed in great detail below, each product can have a single or multiple lattice density regions.

The term "lattice angle" is the angle at which a lattice cell is positioned relative to a normal surface of the product and the term "lattice angle region" is a volume of the product that is predominantly composed of one angle value. It should be understood that minor variations in the lattice angles due to manufacturing tolerances or a product's configuration will not be considered a new or additional lattice angle region. It should be understood that if there is more than a minor variation in the angle of the lattice cell, then those lattice angles shall make up a new or second lattice angle region. As will be discussed in great detail below, each product can have a single or multiple lattice density regions.

The term "actual stock helmets" or "stock helmets" are helmets that are pre-manufactured helmets that are not specifically designed or bespoke for one player, but instead are designed for a "player group" from amongst a larger population of helmet wearers. Stock helmets provide a number of benefits to the helmet manufacturer, including but not limited to improved efficiencies in manufacturing, raw material usage and inventory management. The term "player group" is a group or subset of players that are part of larger population of players who participate in the sporting activity. In the context of helmets, the player group is a subset of players wearing helmets from amongst the broader group of players wearing helmets. The term "actual stock helmet components" or "stock helmet components" are pre-manufactured components for protective helmets that are not specifically designed for one player, but instead are designed for a defined player group from amongst a larger population of helmet wearers.

B. Introduction/Overview

Figure 24:
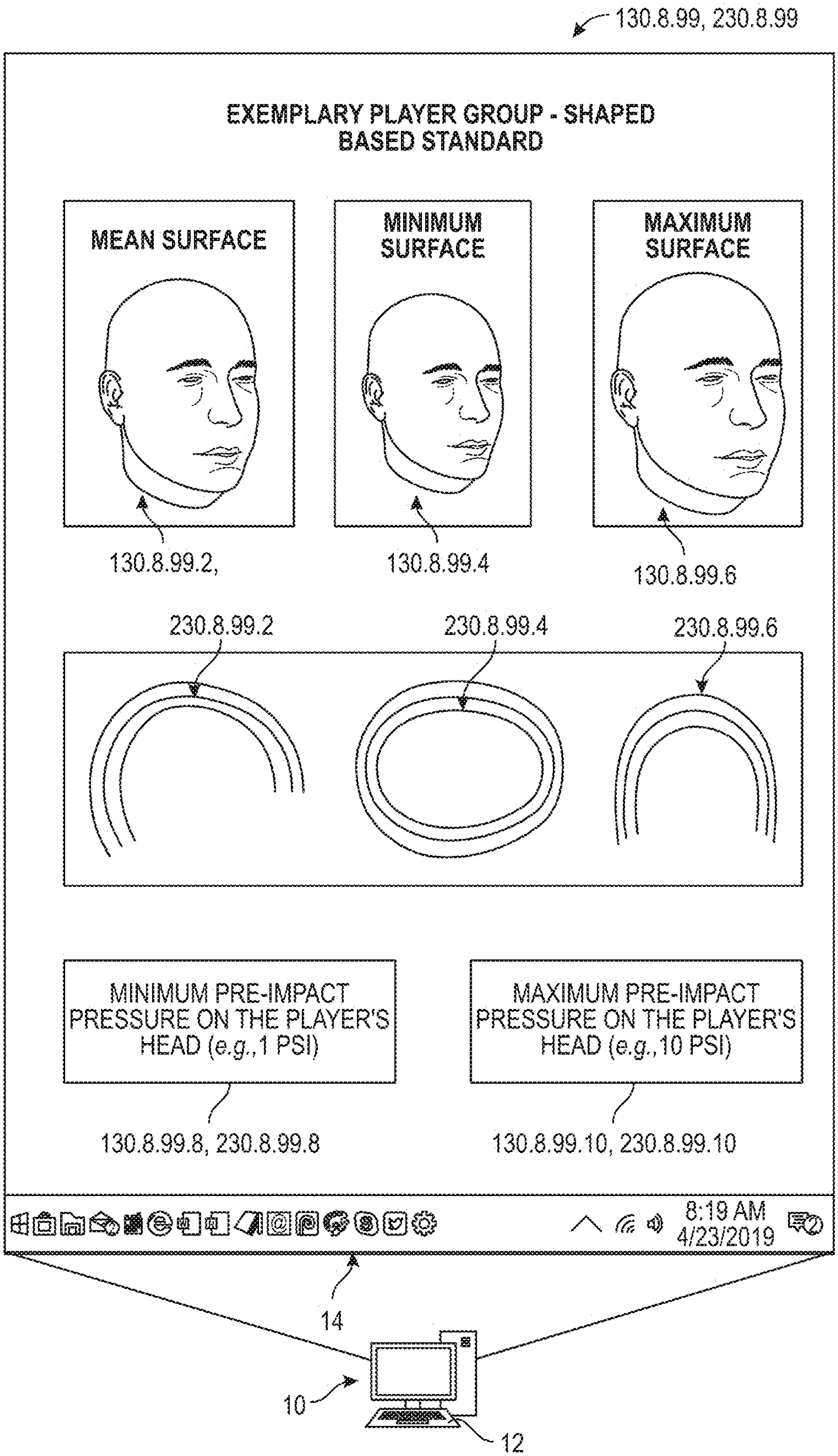
FIG. 24 shows the electronic device displaying exemplary aspects of the player-group shape based standard.

As will be explained in greater detail below, the flow chart shown in FIG. 1 shows a multi-step method 1 with a number of processes and sub-processes, which function together to design and manufacture a protective helmet for a selected group of players from amongst a larger population of helmet wearers. This multi-step method 1 starts by collecting information from a population of players in steps 100, 110, wherein this collection of information may include information about the shape of a player's head and information about the impacts the player has received while participating in the sport. This information is collected from numerous players and is then processed in step 120 to create player population information. Next, this information is used to create groups of players (i.e., shape based player data sets) in step 130.2 (see FIG. 16) by sorting the population of players into categories based on at least one characteristic (e.g., player position) of the sport that the population plays. Also in Step 130.2, advanced mathematical techniques (e.g., clustering algorithms) are utilized to further sort these categories into groups (e.g., shape based player data sets) based on attributes of the individual players (e.g., shape of each player's head). Once the shape based player data sets 130.2.2.99*a-d*, 130.2.4.99*a-d* (see FIGS. 17*a*-17*d* and 19*a*-19*d*) are identified in step 130.2 (see FIG. 16), a multi-step method is utilized to design optimized helmet prototype model 130.28.2.99, 130.28.4.99, 130.28.6.99 (collectively, 130.28.99) for each group (see FIGS. 43*b*, 44, 45). These optimized helmet prototype models 130.28.99 are then transformed into a complete helmet models 140.12.99 (see FIG. 51) in step 140 (see FIG. 16) by determining a structural design and chemical composition that is manufacturable and has mechanical properties that are substantially similar to the optimized helmet prototype model 130.28.99. Next, physical helmet prototypes 1000 are created in step 150 (see FIG. 16) from the complete helmet models 140.12.99 using advanced manufacturing techniques (e.g., additive manufacturing). Each of the physical helmet prototypes 1000 are tested using a unique helmet standard 130.8.99, 130.26.99 (see FIGS. 16, 24) that were derived from information associated with each group of players. Once the physical helmet prototypes 1000 pass their unique helmet standard 130.8.99, 130.26.99, the complete helmet models 140.12.99 can be mass manufactured to create the stock helmets 166*a* or helmet components 166*b* for future players whose characteristics and attributes place them within the selected group.

Figure 11:
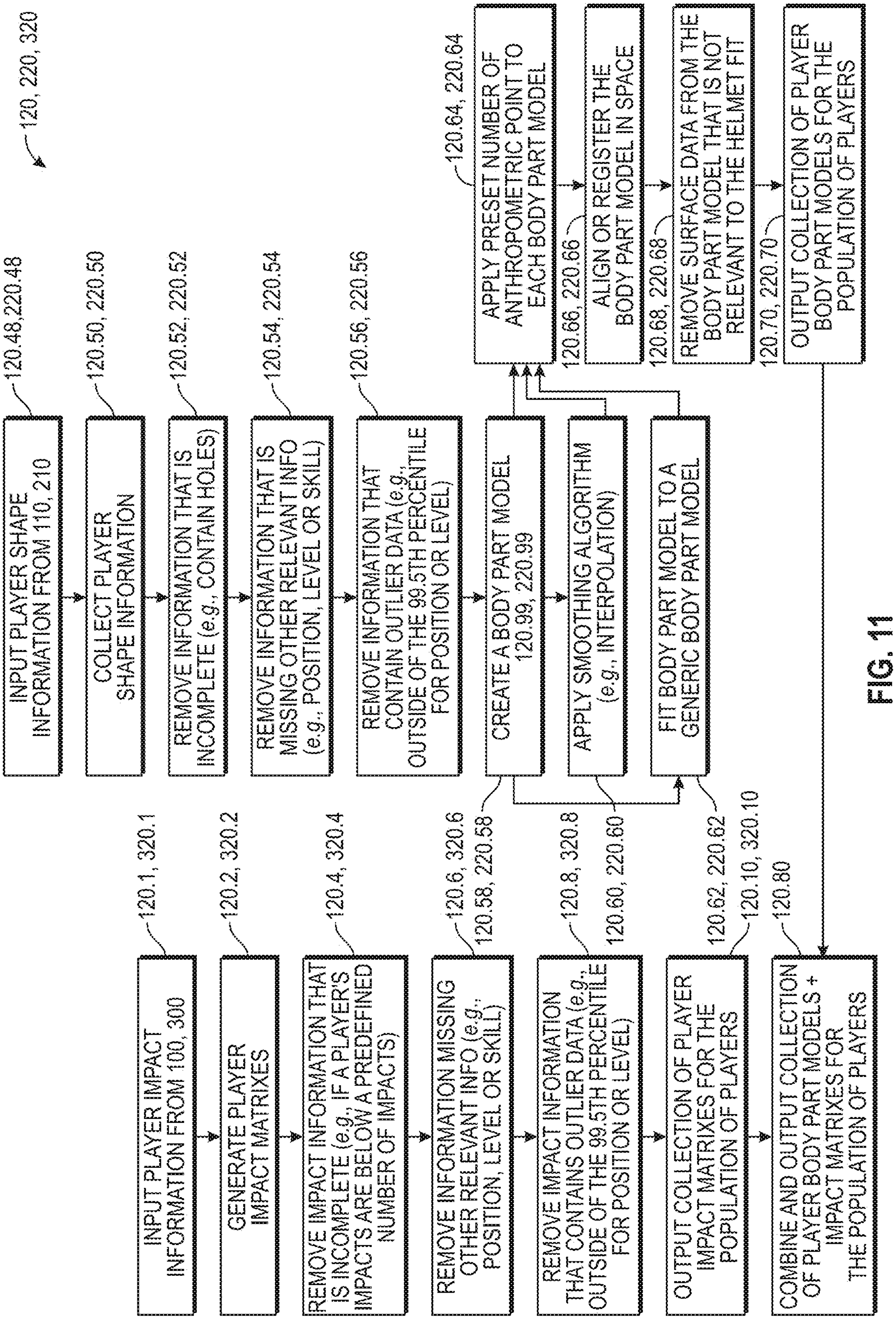
FIG. 11 is a flow chart showing a process for creating player population information.

The collection of information in steps 100, 110 includes collecting information about each player's level, player's position, information about the impacts the player receives while engaged in the contact sport and information about the shape of the player's head. Specifically, information about the impacts the player receives while playing the contact sport may be collected using a plurality of sensors 100.2.4.4*a-e* that are contained within the player's helmet and are specifically designed to analyze and record impact information. In addition, information about the shape of the player's head may be collected using a scanning apparatus 110.4.2. Once the above information is collected, operations are performed to prepare this information for further analysis. As shown in FIG. 11, said operations may include: (i) removal of information in steps 120.4-120.8, 120.52-120.56, (ii) creating models from this information in steps 120.58, (iii) refining the models in steps 120.60-120.62, (iv) aligning the models in steps 120.66, and (v) removing surface data from the models that is not relevant to the fitting of the helmet in steps 120.68.

Figure 25:
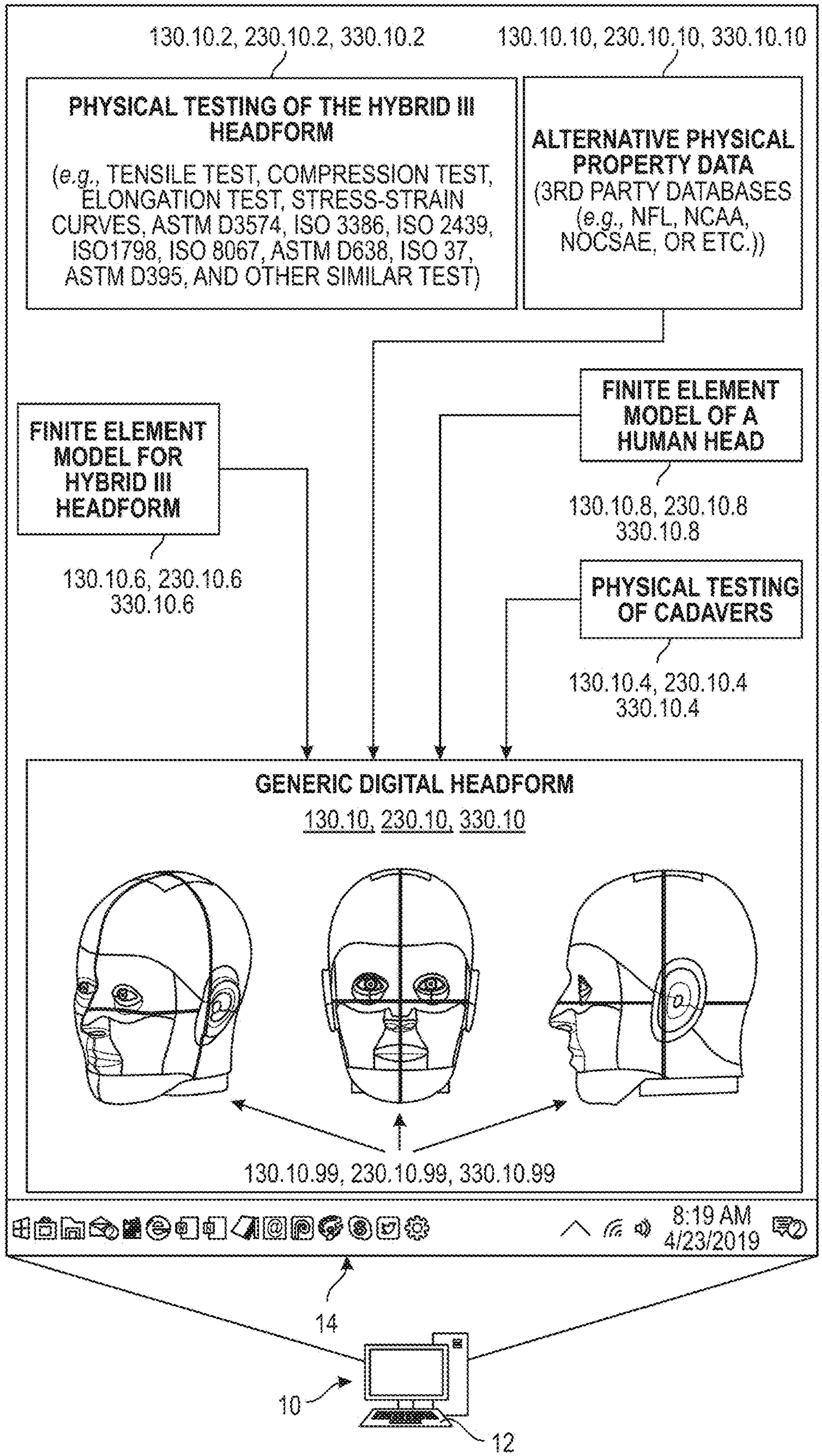
FIG. 25 shows the electronic device displaying a plurality of inputs for the creation of a generic digital headform and multiple views of 3D renderings of said headform.

The multi-step method of designing optimized helmet prototype models 130.28.99 (see FIGS. 43*b*, 44, 45) includes generation digital headform prototypes 130.12.99 (see FIG. 26) based upon a generic digital headform 130.10.99 (see FIG. 25) and the mean head shapes 130.8.99.2 (see FIG. 23) from each group of players that are contained within shape based player data sets 130.2.2.99*a-d*, 130.2.4.99*a-d*, 130.2.6 (collectively, 130.2.99, which are shown in FIGS. 16, 17*a*-17*d*, 19*a*-19*d*). These digital headform prototypes 130.12.99 will then be utilized to modify generic digital helmets 130.14.99 (see FIG. 27) in order to create specific helmets for each data set 130.16.99 (see FIG. 28*b*). In particular, [[a]] each data set specific helmet 130.16.99 is created for each data set 130.2.99. Each data set specific helmet 130.16.99 is then optimized based upon associated impact information, wherein the impact information is derived from impacts that are received by the players that are contained within each shape+impact based player or "HS+IBP" data sets 130.22.2.99, 130.22.4.99 (collectively, 130.22.99, see FIGS. 41-42). Finally, this optimized helmet prototype model 130.28.99 is compared against various unique helmet standards 130.8.99, 130.26.99 to ensure that it complies with these standards.

The optimized helmet prototype models 130.28.99 are then transformed into the complete helmet models 140.12.99 (see FIG. 51) to enable a designer to manufacture the optimized helmet prototype models 130.28.99. Each complete helmet model 140.12.99 may have various portions, which have different mechanical properties. Specifically, the mechanical properties of the energy attenuation assembly contained within one of the complete helmet models 140.12.99 may be configured such that: (i) one member in the energy attenuation assembly has different mechanical properties in comparison to all other members, (ii) one region contained within the energy attenuation assembly may have different mechanical properties in comparison to all other regions, or (iii) multiple regions contained within a single member may have different mechanical properties in comparison to each other. To create differing mechanical properties, the structural design and chemical composition of the energy attenuation assembly are altered. Alterations to the structural design may include changes to: (i) lattice cell type, (ii) lattice angle, or (iii) lattice density. In an exemplary embodiment, a rear combination energy attenuation member that was created using an additive manufacturing process may contain at least four different regions that have different mechanical properties.

Physical helmet prototypes 1000 are created in step 150 from the complete helmet models 140.12.99 using advanced manufacturing techniques. Examples of such advanced manufacturing techniques include additive manufacturing technologies, such as VAT photopolymerization, powder bed fusion, binder jetting, material jetting, sheet lamination, material extrusion, directed energy deposition, or a hybrid of these technologies. Once the physical helmet prototypes 1000 are created, each of the physical helmet prototypes 1000 are tested using a unique helmet standard 130.8.99, 130.26.99 that were derived from information associated with each group of players. Once the physical helmet prototypes 1000 pass their unique helmet standard 130.8.99, 130.26.99, the complete helmet models 140.12.99 can be mass manufactured to create the stock helmets 166*a* or helmet components 166*b* for future players whose characteristics and attributes place them within the selected group.

In addition to applying to a football player, hockey player, lacrosse player, the disclosure contained herein may be applied to helmets for: baseball player, cyclist, polo player, equestrian rider, rock climber, auto racer, motorcycle rider, motocross racer, skier, skater, ice skater, snowboarder, snow skier and other snow or water athletes, skydiver, boxing, sparring, wrestling, and water polo or any other athlete in a sport. Other industries also use protective headwear, such as construction, soldier, firefighter, pilot, other military person, or other workers in need of a safety helmet, where similar technologies and methods may also be applied. The method, system, and devices described herein may be applicable to other body parts (e.g., shins, knees, hips, chest, shoulders, elbows, feet and wrists) and corresponding gear or clothing (e.g., shoes, shoulder pads, elbow pads, wrist pads).

C. Collecting Information

This multi-step method starts by collecting information in steps 100, 110, which may include information about the shape of a player's head and the impacts the player receives while participating in the sport.

1. Collecting Impact Information

Figure 2A:
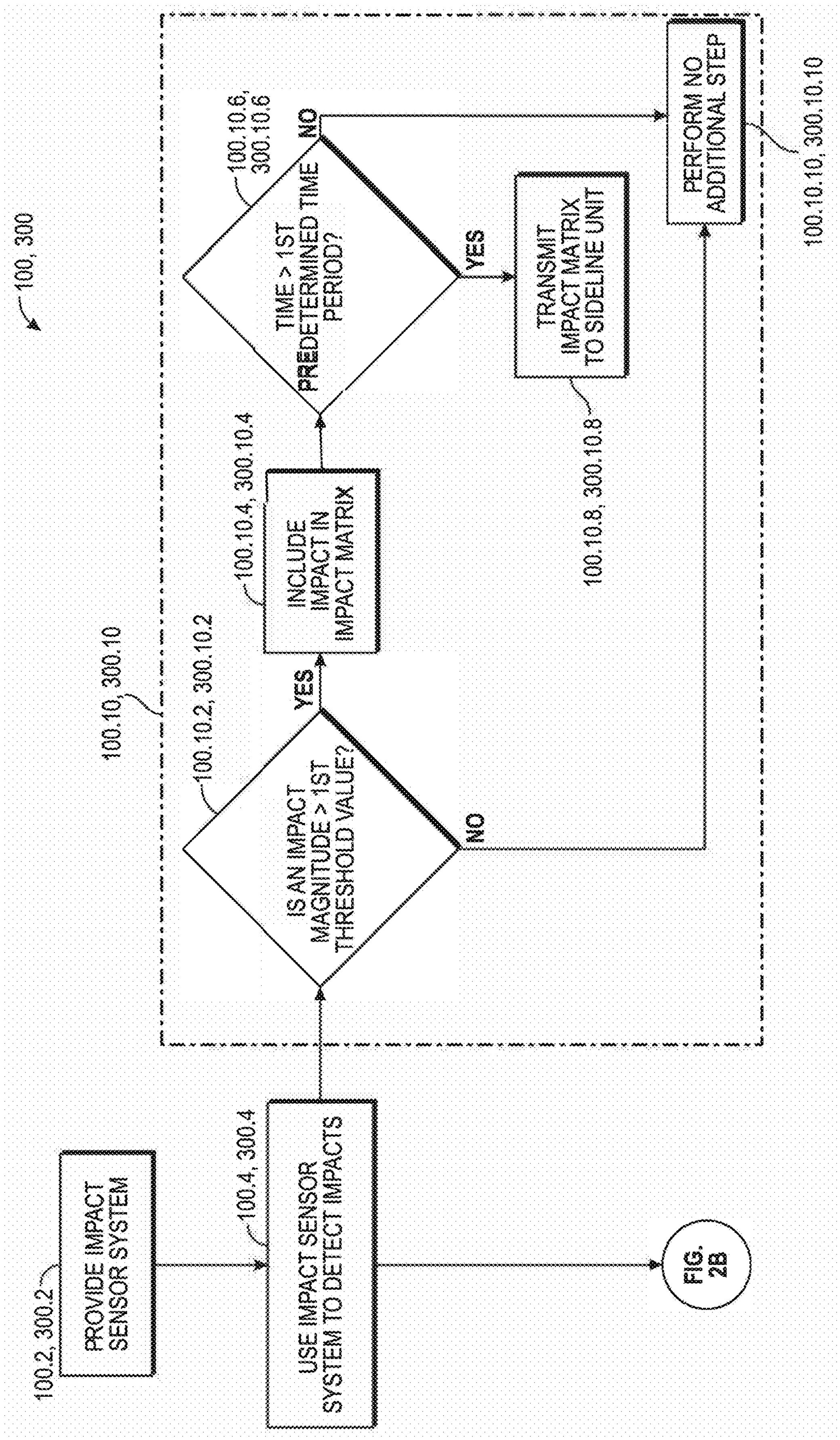
FIGS. 2A-B are flow charts showing a process for collecting player impact information.

Referring to FIG. 1, steps 100, 300 describe acquiring information about impacts the players experience while participating in an activity (e.g., playing a football game). One example of a method of collecting this impact information is described within FIGS. 2*a*-2*b*. In step 100.2, 200.2, an impact sensor system is utilized to carry out the steps in the method shown in FIGS. 2*a*-2*b*. FIG. 3 illustrates an exemplary system 100.2, 300.2 that includes: (i) helmets 1000 that each have an in-helmet unit (IHU) 100.2.4, 300.2.4, (ii) a receiving device 100.2.6, 300.2.6, which in this embodiment may be an alerting unit 100.2.6.2, 300.2.6.2, (iii) a remote terminal 100.2.8, 300.2.8, (iv) a team database 100.2.10, 300.2.10, and (iv) a national database 100.2.12, 300.2.12. The IHU 100.2.4, 300.2.4 may be specifically designed and programmed to: (i) measure and record impact information, (ii) analyze the recorded information using the algorithm shown in FIGS. 2*a*-2*b*, and (iii) depending on the outcome of the algorithm shown in FIGS. 2*a*-2*b*, transmit the recorded information to a receiving device 100.2.6, 300.2.6 that is remote from the IHU 100.2.4, 300.2.4.

Figure 4:
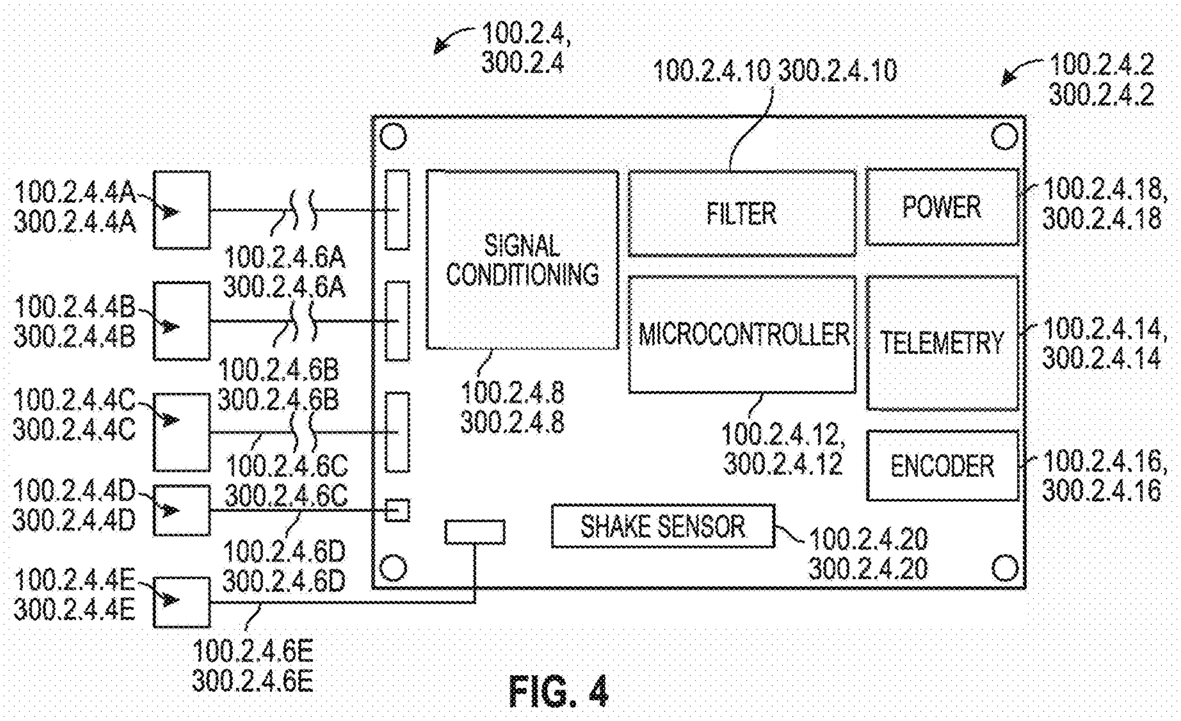
FIG. 4 is schematic view of an exemplary impact sensing device that is configured to be placed within a helmet shown in FIG. 3.

FIG. 4 illustrates an exemplary schematic of the IHU 100.2.4, 300.2.4. As shown, the control module 100.2.4.2, 300.2.4.2 is connected to each sensor 100.2.4.4*a-e*, 300.2.4.4*a-e* via separate leads 100.2.4.6*a-e*, 300.2.4.6*a-e*. The five distinct sensors 100.2.4.4*a-e*, 300.2.4.4*a-e* may be placed at the following locations on a player's head: top, left, right, front, and back. The control module 100.2.4.2, 300.2.4.2 includes a signal conditioner 100.2.4.8, 300.2.4.8, a filter 100.2.4.10, 300.2.4.10, a microcontroller or microprocessor 100.2.4.12, 300.2.4.12, a telemetry element 100.2.4.14, 300.2.4.14, an encoder 100.2.4.16, 300.2.4.16, and a power source 100.2.4.18, 300.2.4.18. The control module 100.2.4.2, 300.2.4.2 includes a shake sensor 100.2.4.20, 300.2.4.20 that may be used to turn the IHU 100.2.4, 300.2.4 ON or OFF based on a specific shake pattern of the player helmet 20. Alternatively, the IHU 100.2.4, 300.2.4 may have control buttons, such as a power button and a configuration button, for example. Additional information about the positioning and configuration of the IHU 100.2.4, 300.2.4 is described within U.S. Pat. No. 10,105,076 and U.S. Provisional Application 62/364,629, both of which are fully incorporated herein by reference.

Returning to FIG. 2*a*, the IHU 100.2.4, 300.2.4 continually monitors for a value from any sensor 100.2.4.4*a-e*, 300.2.4.4*a-e* that exceeds a predetermined noise threshold, which is programmed into the IHU 100.2.4, 300.2.4. As shown in step 100.4, 300.4, once the IHU 100.2.4, 300.2.4 determines that a sensor 100.2.4.4*a-e*, 300.2.4.4*a-e* has recorded a value that is greater than the predetermined noise threshold, then an impact has been detected. The microcontroller 100.2.4.12, 300.2.4.12 wakes up to record information from all sensors 100.2.4.4*a-e*, 300.2.4.4*a-e* and perform both algorithms shown in FIG. 2*a*-2*b*. The first algorithm or head impact exposure (HIE) algorithm 100.10, 300.10 does not weight the impact magnitude value based on the location of the impact, while the second algorithm or alert algorithm 100.50, 300.50 weights the impact magnitude value based on the location of the impact. The first algorithm or HIE algorithm 100.10, 300.10 compares the impact magnitude value to a $1^{st}$ threshold or an impact matrix threshold in step 100.10.2, 300.10.2. The $1^{st}$ threshold or an impact matrix threshold is set between 1 g and 80 gs and preferably between 5 gs and 30 gs. If the impact magnitude value is less than the impact matrix threshold, than the microcontroller 100.2.4.12, 300.2.4.12 will disregard the impact magnitude value shown in step 100.10.10, 300.10.10. However, if the impact magnitude value is greater than the impact matrix threshold, than the microcontroller 100.2.4.12, 300.2.4.12 will add the impact magnitude value to the impact matrix in step 100.10.4, 300.10.4.

Figure 12:
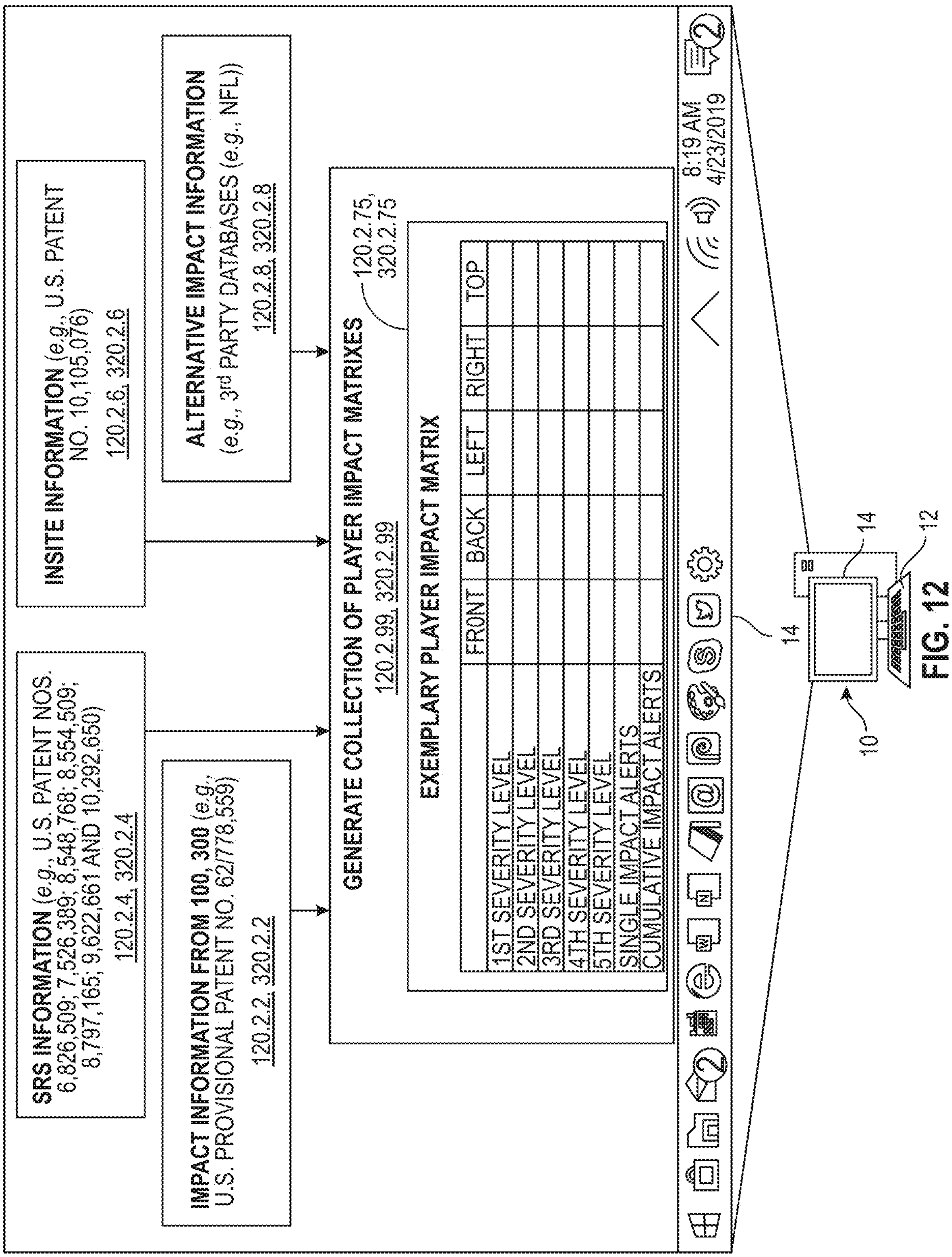
FIG. 12 shows an electronic device displaying a plurality of player impact information sources and an exemplary player impact matrix.

An exemplary player impact matrix 120.2.75, 320.2.75 is shown in FIG. 12. Specifically, the exemplary impact matrix 120.2.75, 320.2.75 is comprised of 5 columns and 7 rows, where the 5 columns correspond to the location of the impact on the player's head (e.g., front, back, left, right, and top) and the 7 rows correspond to the severity of the impact (e.g., $1^{st}$, $2^{nd}$, $3^{rd}$, $4^{th}$, $5^{th}$ severity, single impact alert, or cumulative impact alert). Each of these severity values (e.g., $1^{st}$, $2^{nd}$, $3^{rd}$, $4^{th}$ or $5^{th}$) correspond to a range of impact magnitude values. For example, the $1^{st}$ range may include impact magnitude values between the impact matrix threshold and the $50^{th}$ percentile of historical impact magnitude values for players of similar position and playing level. The $2^{nd}$ range may include impact magnitude values between the $51^{st}$ percentile and the $65^{th}$ percentile of historical impact magnitude values for players of similar position and playing level. The $3^{rd}$ range may include impact magnitude values between the $66^{th}$ percentile and the $85^{th}$ percentile of historical impact magnitude values for players of similar position and playing level. The $4^{th}$ range may include impact magnitude values between the $86^{th}$ percentile and the $95^{th}$ percentile of historical impact magnitude values for players of similar position and playing level. The $5^{th}$ range may include impact magnitude values above the $95^{th}$ percentile of historical impact magnitude values for players of similar position and playing level. The single impact alerts and the cumulative impact alerts are based upon a second algorithm or alert algorithm 100.50, 300.50. It should be understood that these percentile ranges are based on historical impact magnitude values that have been collected using the proprietary technologies owned by the assignee of the present Application and are disclosed in U.S. Pat. Nos. 10,105,076, 9,622,661, 8,797,165, and 8,548,768, each of which is fully incorporated by reference herein. It should be understood that these values may be updated in light of additional impact information that has been collected by this system or other similar systems.

Returning to FIG. 2*a*, once the microcontroller 100.2.4.12, 300.2.4.12 has added the impact magnitude value to the impact matrix in step 100.10.4, 300.10.4, the microcontroller 100.2.4.12, 300.2.4.12 determines if a $1^{st}$ predefined amount of time or an impact matrix transmit time period has passed from the time the IHU 100.2.4, 300.2.4 last transmitted the impact matrix to a receiving device 100.2.6, 300.2.6. The impact matrix transmit time period may be set to any time, preferably it is set between one second and 90 days and most preferably between 30 seconds and 1 hour. If the amount of time that has passed since the unit last transmitted the impact matrix to a receiving device 100.2.6, 300.2.6 is less than the impact matrix transmit time period, then the microcontroller 100.2.4.12, 300.2.4.12 will perform no additional steps, as shown in step 100.10.10, 300.10.10. However, if the amount of time that has passed since the unit last transmitted the impact matrix to a receiving device 100.2.6, 300.2.6 is greater than the impact matrix transmit time period, then the control module 100.2.4.2, 300.2.4.2 of the IHU 100.2.4, 300.2.4 will transmit the impact matrix from the IHU 100.2.4, 300.2.4 to a receiving device 100.2.6, 300.2.6 (e.g., an alert unit 100.2.6.2, 300.2.6.2) in step 536. Upon the completion of this decision, the IHU 100.2.4, 300.2.4 has finished performing the HIE algorithm 100.10, 300.10.

Figure 2B:
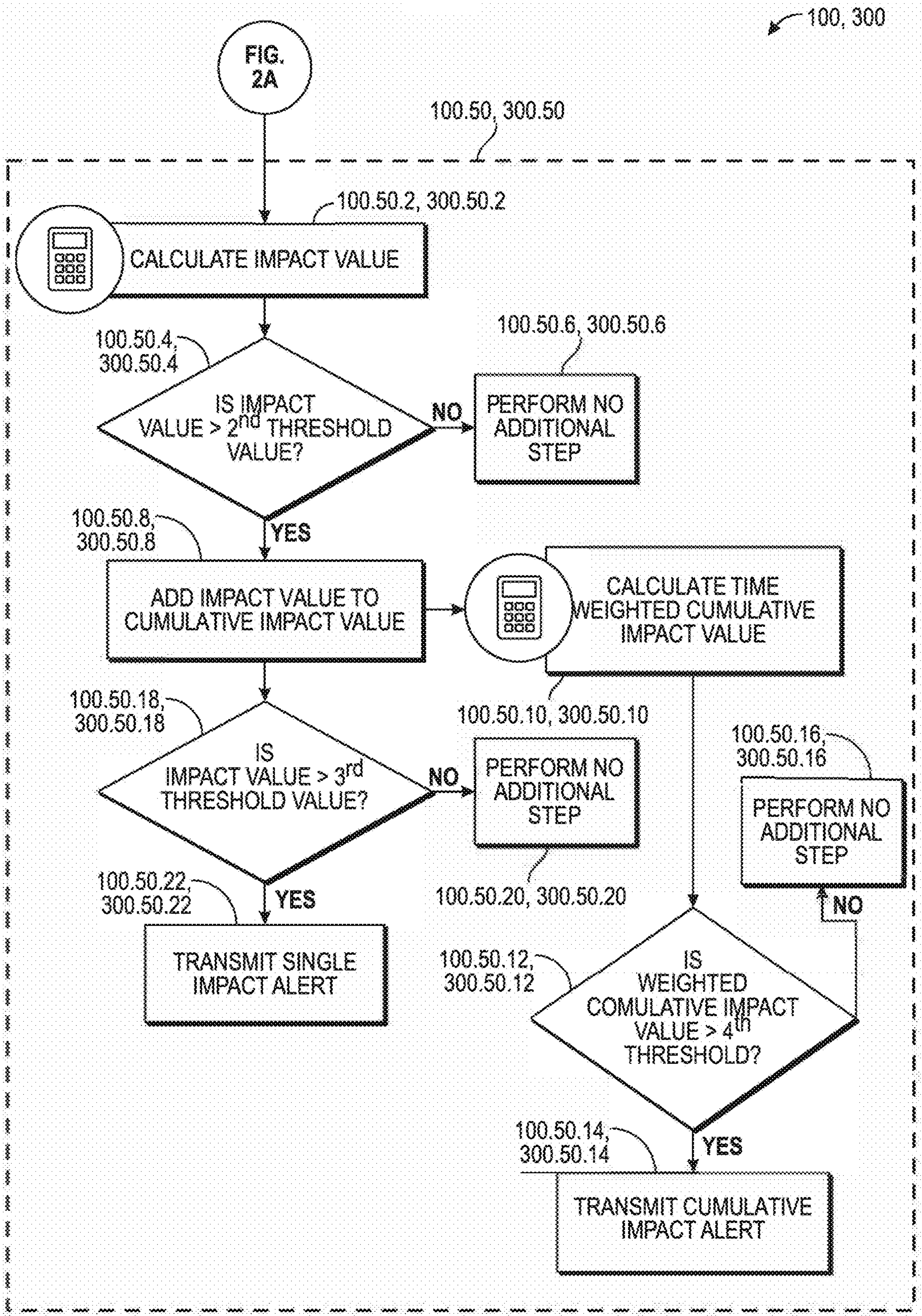
Figure 3:
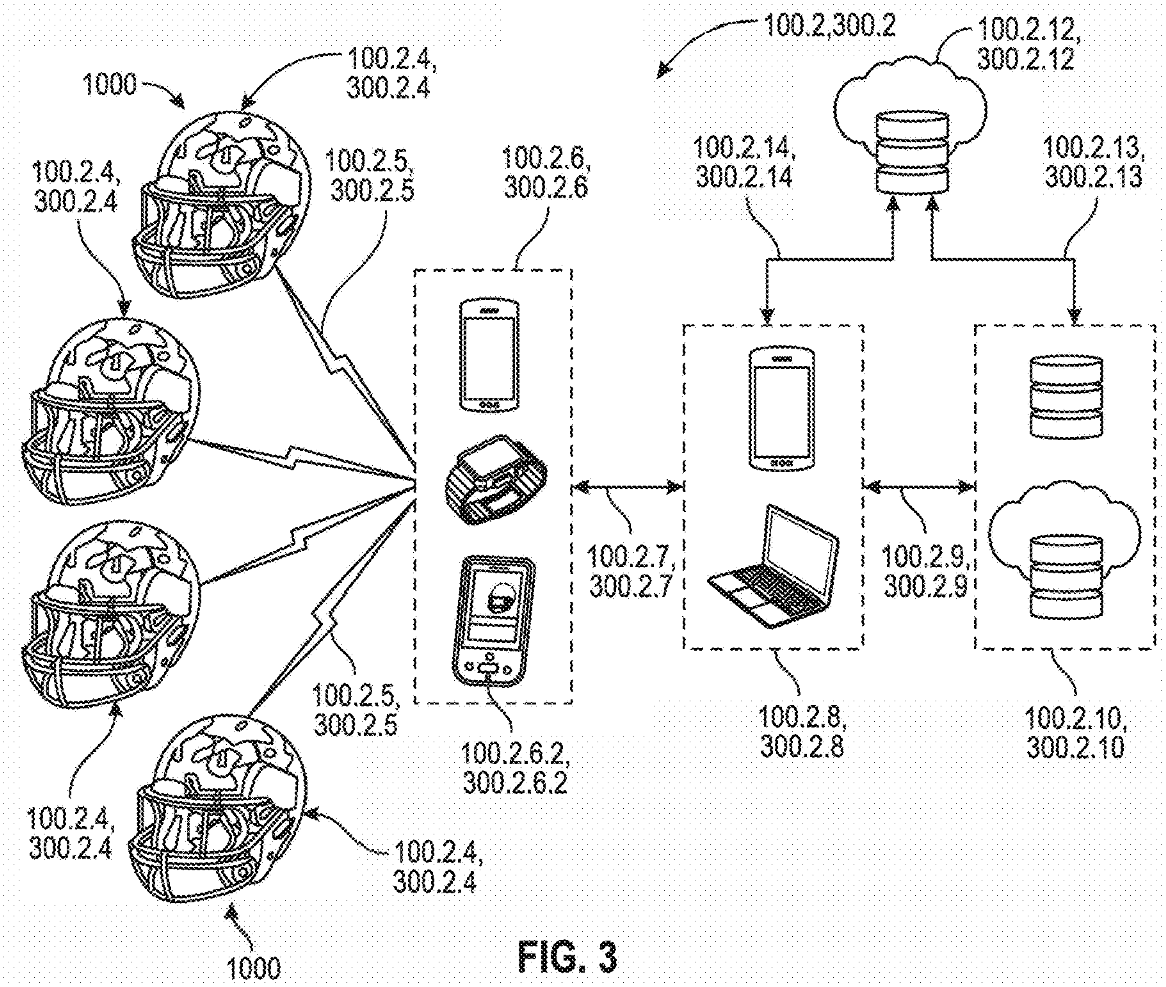
FIG. 3 is schematic view of an exemplary system that utilizes the process shown in FIGS. 2A-B to collect and store player impact information.

While the IHU 100.2.4, 300.2.4 is performing the HIE algorithm 100.10, 300.10, the IHU 100.2.4, 300.2.4 is also performing the alert algorithm 100.50, 300.50 shown in FIG. 2*b*. Referring to FIG. 2*b*, the microcontroller 100.2.4.12, 300.2.4.12 will calculate an impact value in step 100.50.2, 300.50.2. In one embodiment, this is done by first determining the linear acceleration, rotational acceleration, head injury criterion (HIC), and the Gadd severity index (GSI) for the given impact. The algorithms used to calculate these values are described in Crisco J J, et al. An Algorithm for Estimating Acceleration Magnitude and Impact Location Using Multiple Nonorthogonal Single-Axis Accelerometers. *J BioMech Eng.* 2004; 126 (1), Duma S M, et al. Analysis of Real-time Head Accelerations in Collegiate Football Players. *Clin J Sport Med.* 2005; 15(1):3-8, Brolinson, P. G., et al. Analysis of Linear Head Accelerations from Collegiate Football Impacts. *Current Sports Medicine Reports*, vol. 5, no. 1,2006, pp. 23-28, and Greenwald R M, et al. Head impact severity measures for evaluating mild traumatic brain injury risk exposure. *Neurosurgery.* 2008; 62(4):789-798, the disclosure of which is hereby incorporated by reference in its entirety for all purposes. Once the linear acceleration, rotational acceleration, head injury criterion (HIC), and the Gadd severity index (GSI) are calculated for a given impact, these scores are weighted according to the algorithm set forth in Greenwald R M, et al. Head impact severity measures for evaluating mild traumatic brain injury risk exposure. *Neurosurgery.* 2008; 62(4):789-798, the disclosure of which is hereby incorporated by reference in its entirety for all purposes. This resulting weighted value is a HITsp value for the given impact, which will be the calculated impact value in this first embodiment. While not diagnostic of injury, HITsp has been shown to be more sensitive and specific to diagnose concussions than any of the component measures alone. Specifically, HITsp has been shown to be 50% more sensitive to predict a subsequently diagnosed concussion than the usage of any individual measure by itself (e.g., linear acceleration).

In another embodiment, the calculated impact value may be equal to the linear acceleration for the given impact. In a further embodiment, the calculated impact value may be equal to the HIC score for the given impact. In another embodiment, the calculated impact value may be equal to the rotational acceleration for a given impact. In another embodiment, the impact value may be equal to the linear acceleration weighted by a combination of impact location and impact duration. In another embodiment, the impact value may be equal to the weighted combination of linear acceleration, rotational acceleration, HIC, GSI, impact location, impact duration, impact direction. In another embodiment, the impact value may be equal to a value that is determined by a learning algorithm that is taught using historical information and diagnosed injuries. In even a further embodiment, the impact value may be equal to any combination of the above.

Referring to FIG. 2*b*, once the impact value is calculated in step 100.50.2, 300.50.2 by the microcontroller 100.2.4.12, 300.2.4.12, the impact value is compared against a $2^{nd}$ threshold or high magnitude impact threshold in step 100.50.4, 300.50.4. This high magnitude impact threshold may be set to the $95^{th}$ percentile for impacts recorded by players of similar playing level (e.g., youth, high school, college and professional players) and similar position (e.g., offensive line, running backs, quarterback, wide receivers, defensive linemen, linebackers, defensive backs and special teams). If the impact value is less than the high magnitude impact threshold, than the microcontroller 100.2.4.12, 300.2.4.12 will not perform any additional operations, as shown in step 100.50.6, 300.50.6. However, if the impact value is greater than the high magnitude impact threshold, than the impact value will be added to the cumulative impact value in step 100.50.6, 300.50.6 and compared against a $3^{rd}$ threshold or single impact alert threshold in step 100.50.18, 300.50.18. This single impact alert threshold may be set to the $99^{th}$ percentile for impacts recorded by players of similar playing level and position. It should be understood that all percentiles (e.g., $95^{th}$ and $99^{th}$) contained in this application are based on historical impact magnitude values that have been collected using the proprietary technologies owned by the assignee of the present Application and are disclosed in U.S. Pat. Nos. 10,105,076, 9,622,661, 8,797,165, and 8,548,768, each of which is fully incorporated by reference herein. However, it should be understood that these percentiles may be updated in light of additional impact information that has been collected by this system or other systems.

Referring to FIG. 2*b*, if the impact value is greater than the single impact alert threshold, the control module 100.2.4.2, 300.2.4.2 transmits alert information that is associated with the single impact alert to the receiving device 100.2.6, 300.2.6 (e.g., an alert unit 100.2.6.2, 300.2.6.2) in step 100.50.22, 300.50.22. The alert information may include, but is not limited to: (i) the impact value (e.g., graphical or non-graphical display of the magnitude of the impact), (ii) impact location (e.g., graphical or non-graphical), (iii) impact time, (iv) impact direction, (v) player's unique identifier, (vi) alert type, (vii) player's heart rate, (viii) player's temperature and (ix) other relevant information. If the impact value is less than the single impact alert threshold, the microcontroller 100.2.4.12, 300.2.4.12 will not perform any additional steps 100.50.20, 300.50.20 along this path of the algorithm 100.50, 300.50.

While the microcontroller 100.2.4.12, 300.2.4.12 is determining whether the impact value is greater than the single impact alert threshold in step 100.50.18, 300.50.18, the microcontroller 100.2.4.12, 300.2.4.12 also calculates a weighted cumulative impact value that includes this new impact value, in step 100.50.10, 300.50.10 shown in FIG. 2*b*. Specifically, the weighted cumulative impact value is calculated based on a weighted average of every relevant impact value that is over a $2^{nd}$ threshold or high magnitude impact threshold. To determine this weighted average, every impact value that is over a $2^{nd}$ threshold is weighted by a decaying factor. For example, an impact that was recorded 4 days ago maybe multiplied by 0.4 decaying factor, thereby reducing the magnitude level of this impact. After the weighted impact values are determined, these values are summed together to generate the weighted cumulative impact value. It should be understood that the microcontroller 100.2.4.12, 300.2.4.12 will exclude irrelevant impact values that are old enough to cause their weighted impact value to be zero due to the decaying factor. For example, if the decaying factor for an impact that is over 7 days old is 0; then regardless of the impact value, this impact is irrelevant to this calculation and will not be included within this calculation. One skilled in the art recognizes that weighting variables (e.g., time window, decay function, input threshold) are adjustable.

Once the weighted cumulative impact value has been calculated in step 100.50.10, 300.50.10 in FIG. 2*b*, this value is compared against a $4^{th}$ threshold or a cumulative impact alert threshold in step 100.50.12, 300.50.12. This cumulative impact alert threshold may be set to the $95^{th}$ percentile for weighted cumulative impact values recorded by players of similar playing level and position. If the weighted cumulative impact value is less than the cumulative impact alert threshold, than the microcontroller 100.2.4.12, 300.2.4.12 will not perform any additional steps 100.50.16, 300.50.16. However, if the weighted cumulative impact value is greater than the cumulative impact value threshold, the control module 100.2.4.2, 300.2.4.2 of the IHU 100.2.4, 300.2.4 transmits alert information that is associated with a cumulative impact alert to the receiving device 100.2.6, 300.2.6 (e.g., an alert unit 100.2.6.2, 300.2.6.2) in step 100.50.14, 300.50.14. As discussed above, the alert information may include, but is not limited to: (i) the impact value (e.g., graphical or non-graphical display of the magnitude of the impact), (ii) impact location (e.g., graphical or non-graphical), (iii) impact time, (iv) impact direction, (v) player's unique identifier, (vi) alert type, (vii) player's heart rate, (viii) player's temperature and (ix) other relevant information. Upon the completion of this decision, the IHU 100.2.4, 300.2.4 has finished performing the alert algorithm 100.50, 300.50.

Referring to FIG. 3, once the HIE algorithm 100.10, 300.10 and the alert algorithm 100.50, 300.50 are performed, the IHU 100.2.4 uses the telemetry module 100.2.4.14, 300.2.4.14 to wirelessly transmit impact information to the receiving unit 100.2.6, 300.2.6 via communication links 100.2.5, 300.2.5. Specifically, the communication link 100.2.5, 300.2.5 may be based on any type of wireless communication technologies. These wireless communication technologies may operate in an unlicensed band (e.g., 433.05 MHz-434.79 MHz, 902 MHz-928 MHz, 2.4 GHz-2.5 GHz, 5.725 GHz-5.875 GHz) or in a licensed band. A few examples of wireless communication technologies that that may be used, including but not limited to, Bluetooth, ZigBee, Wi-Fi (e.g., 802.11a, b, g, n), Wi-Fi Max (e.g., 802.16e), Digital Enhanced Cordless Telecommunications (DECT), cellular communication technologies (e.g., CDMA-1×, UMTS/HSDPA, GSM/GPRS, TDMA/EDGE, EV/DO, or LTE), near field communication (NFC), or a custom designed wireless communication technology. In other embodiments that are not shown, the telemetry module 100.2.4.14, 300.2.4.14 may include both wired and wireless communication technologies. A few examples of wired communication technologies that may be used, include but are not limited to, any USB based communications link, Ethernet (e.g., 802.3), FireWire, or any other type of packet based wired communication technology.

As shown in FIG. 3, the receiving device 100.2.6, 300.2.6 includes a telemetry module (not shown) that is configured to communicate with the telemetry module 100.2.4.14, 300.2.4.14 to enable the impact information that is generated by the HIE algorithm 100.10, 300.10 and the alert algorithm 100.50, 300.50 to be transferred to the receiving device 100.2.6, 300.2.6. To enable this communication, the telemetry module contained within the receiving device 100.2.6, 300.2.6 may utilize any of the above technologies that are described in connection with the telemetry module 100.2.4.14, 300.2.4.14. Once the impact information is received by the receiving device 100.2.6, 300.2.6, it can process this information to display relevant data to sideline personnel (e.g., trainer). This relevant data may include: (i) the impact value (e.g., graphical or non-graphical display of the magnitude of the impact), (ii) impact location (e.g., graphical or non-graphical), (iii) impact time, (iv) impact direction (e.g., graphical or non-graphical), (v) player's unique identifier (e.g., name or jersey number), (vi) alert type, (vii) player's heart rate, (viii) player's temperature, (ix) impact magnitude from the impact matrix, and/or (x) other relevant information. It should be understood that the receiving device 100.2.6, 300.2.6 may be a portable hand-held unit that is typically carried by a person that is: (i) positioned proximate (e.g., within 50 yards) to the field or location that the physical activity is taking place and (ii) is not engaged in the physical activity (e.g., sideline personnel, which may be a trainer). Non-limiting examples of receiving devices 100.2.6, 300.2.6 include: PDAs, cellular phones, watches, tablets, or custom designed alert units 100.2.6.2, 300.2.6.2.

Referring to FIG. 3, once the impact information has been received by the receiving device 100.2.6, 300.2.6, the impact information may be communicated via link 100.2.7, 300.2.7 to the remote terminal 100.2.8, 300.2.8 for additional analysis. This communication link 100.2.7, 300.2.7 between the receiving device 100.2.6, 300.2.6 and remote terminal 100.2.8, 300.2.8 may be wireless or wired and may utilize any of the above described technologies. The remote terminal 100.2.6, 300.2.6 is typically not proximate to the field, nor is it carried by a trainer during the activity. Instead, the remote terminal 100.2.6, 300.2.6 is typically left in a secured location that is accessible shortly after the activity has been completed. Once the impact information is transferred from the receiving device 100.2.6, 300.2.6 to the remote terminal 100.2.8, 300.2.8, the remote terminal 100.2.8, 100.2.8 can upload the information to the team database 100.2.10, 300.2.10 via communications link 100.2.9, 300.2.9 or national database 100.2.12, 300.2.12 via communications link 100.2.14, 300.2.14. The team database 100.2.10, 300.2.10 is utilized to store information that is relevant to the team. In addition to the impact information, this relevant information may include: (i) practice calendars/schedules, (ii) equipment assignments and profiles (e.g., relevant sizes, type of shoes, type of helmet, type of energy attenuation assembly, type of chin strap, type of faceguard, and etc.), (iii) medical data for each player (e.g., medical histories, injuries, height, weight, emergency information, and etc.), (iv) statistics for each player (e.g., weight lifting records, 40 yard dash times, and etc.), (v) workout regiments for each player, (vi) information about the shape of the players body parts (e.g., head), and (vii) other player data (e.g., contact information).

The national database 100.2.12, 300.2.12 stores all the information or a subset of the data that is stored in each of the team databases 100.2.10, 300.2.10 around the nation or world. Specifically, the team databases 100.2.10, 300.2.10 upload a copy of the information to the national database 100.2.12, 300.2.12 via communications link 100.2.13, 300.2.13 after a predefined amount of time has passed since the team database 100.2.10, 300.2.10 was last uploaded to the national database 100.2.12, 300.2.12. Additionally, after the new data from the team database 32 is uploaded to the national database 100.2.12, 300.2.12, the team database 100.2.10, 300.2.10 may download new thresholds from the national database 38 via communications link 100.2.14, 300.2.14. The data that may be contained within the national database 100.2.12, 300.2.12 may include, but is not limited to: (i) single and cumulative alerts for each player across the nation/world, (ii) impact matrix for each player across the nation/world, (iii) other data related to the recorded physiological parameters for each player across the nation/world, (iv) equipment assignments and profiles of each player across the nation/world (e.g., relevant sizes, type of shoes, type of helmet, type of energy attenuation assembly, type of chin strap, type of faceguard, and etc.), (v) medical data for each player across the nation/world (e.g., medical histories, injuries, height, weight, emergency information, and etc.), (vi) statistics for each player across the nation/world (e.g., weight lifting records, 40 yard dash times, and etc.), (vii) workout regiments for each player across the nation/world, (viii) information about the shape of the players body parts (e.g., head), and (ix) other player data across the nation/world (e.g., contact information). It should also be understood that the national database 100.2.12, 300.2.12 contains data that has been collected over many years and it includes at least the data collected using the proprietary technologies owned by the assignee of the present application, which is disclosed in U.S. Pat. Nos. 10,105,076, 9,622,661, 8,797,165, and 8,548,768, each of which is fully incorporated by reference herein. For example, this national database 100.2.12, 300.2.12 currently includes data related to nearly six million impacts. While FIG. 3 shows that the remote terminal 100.2.8, 100.2.8 is separate from: (i) receiving device 100.2.6, 300.2.6, team database 100.2.10, 300.2.10, and a national database 100.2.12, 300.2.12, it should be understood that in an alternative embodiment these may all be combined together or partially combined together.

2. Collect Shape Information

Figure 8:
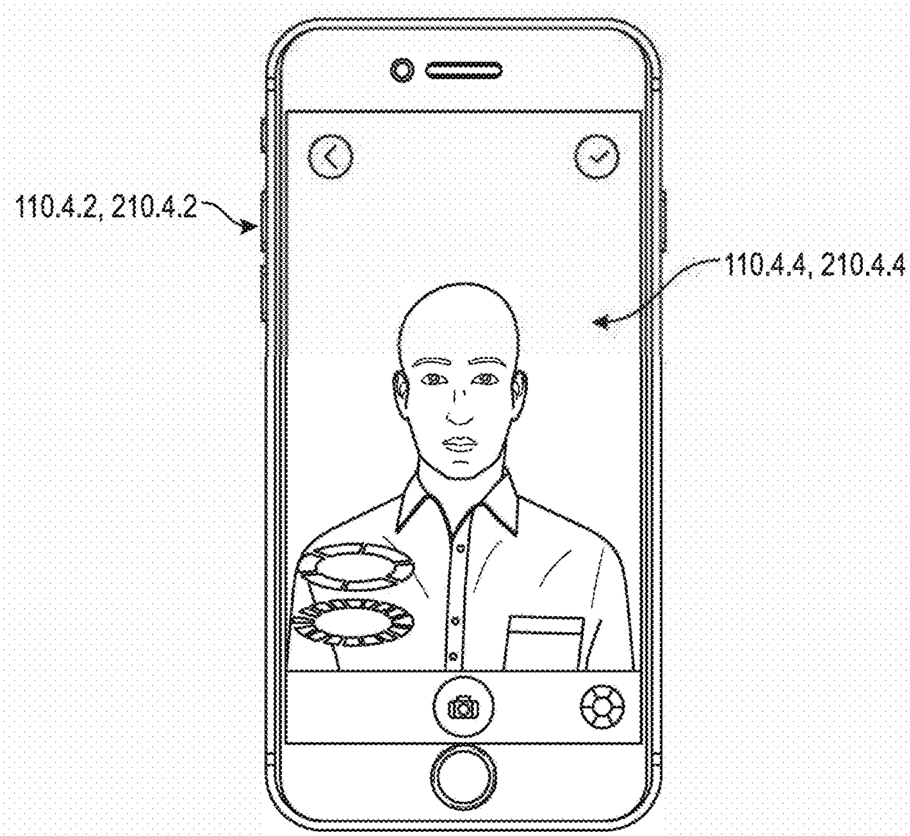
FIG. 8 is a second exemplary scanning apparatus that is configured to collect player shape information with an exemplary software application is displayed on said system.

In addition to impact information, it may be desirable to collect information about the shape of player's heads to aid in designing the protective sports helmet 1000. Referring to FIG. 1, steps 110, 210 describe the acquisition of information about the shape of a player's body part (e.g., head). An exemplary method of collecting this shape information is described within FIGS. 5*a*-5*b*. This method commences in step 110.2, 210.2 by opening a software application 110.4.4, 210.4.4 (exemplary embodiment shown in FIG. 8) in step 110.4, 210.4 on, or in communication with, a scanning apparatus 110.4.2, 210.4.2 (exemplary embodiment shown in FIGS. 6, 8 and 10). Referring back to FIG. 5*a*, upon opening the software application 110.4.4, 210.4.4, the operator is prompted in step 110.6, 210.6 to select a player from a list of players or enter information about the player (e.g., name, age, playing level, position, etc.).

Figure 6:
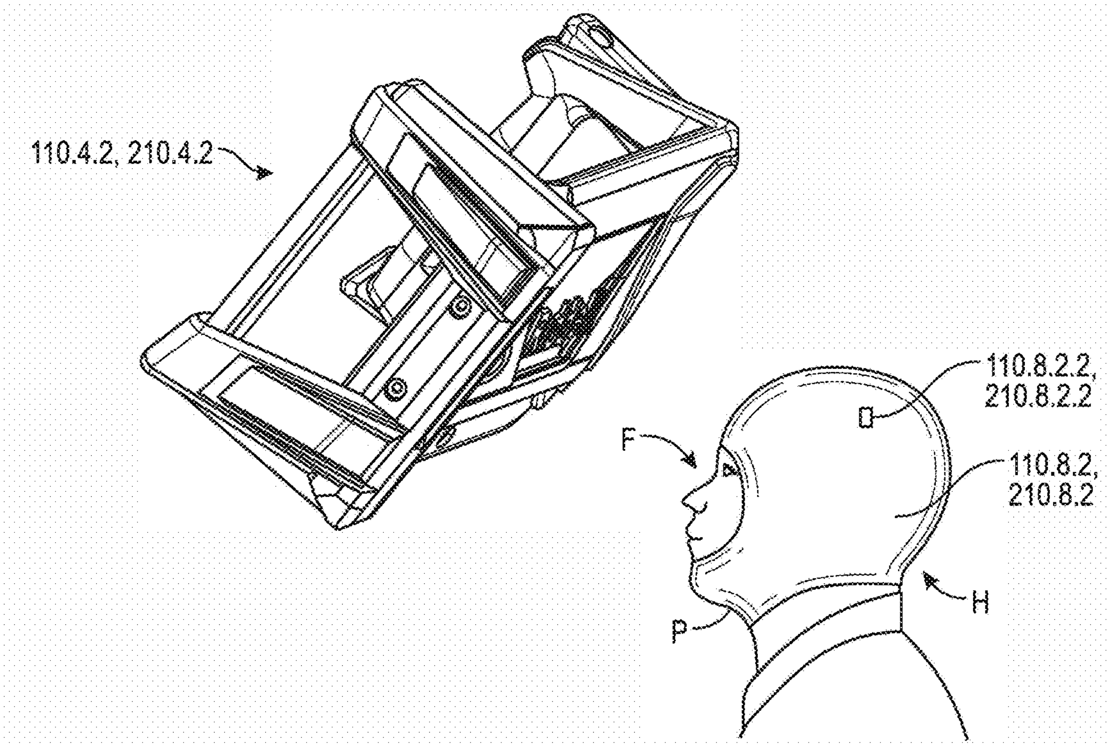
FIG. 6 shows a first exemplary scanning apparatus that is configured to collect player shape information, wherein said system is shown collecting shape information from a player's head that is partially covered with a hood.

After the player information is entered in step 110.6, 210.6, the software application 110.4.4, 210.4.4 prompts the operator to instruct and then check that the player P has properly placed the scanning hood 110.8.2, 210.8.2 (exemplary embodiment shown in FIG. 6) on, or over, the head H of the player P in step 110.8, 210.8. The scanning hood 110.8.2, 210.8.2 may be a flexible apparatus sized to fit over the player's head H and achieve a tight or snug fit around the player's head H due to elastic properties and dimensions of the scanning hood 110.8.2, 210.8.2, as can be seen in FIG. 6. The scanning hood 110.8.2, 210.8.2 provides for increased accuracy when performing the information acquisition process by conforming to the anatomical features of the player's head H and facial region F, namely the topography and contours of the head H and facial region F while reducing effects of hair. The scanning hood 110.8.2, 210.8.2 may be made from neoprene, lycra or any other suitable elastic material known to those skilled in the art. It should be understood that the term scanning hood 110.8.2, 210.8.2 does not just refer to a hood that is placed over the head H of the player P; instead, it refers to a snug fitting item (e.g., shirt, armband, leg band, or etc.) that has minimal thickness and is placed in direct contact with the player's body part in order to aid in the collection of shape information.

Figure 7:
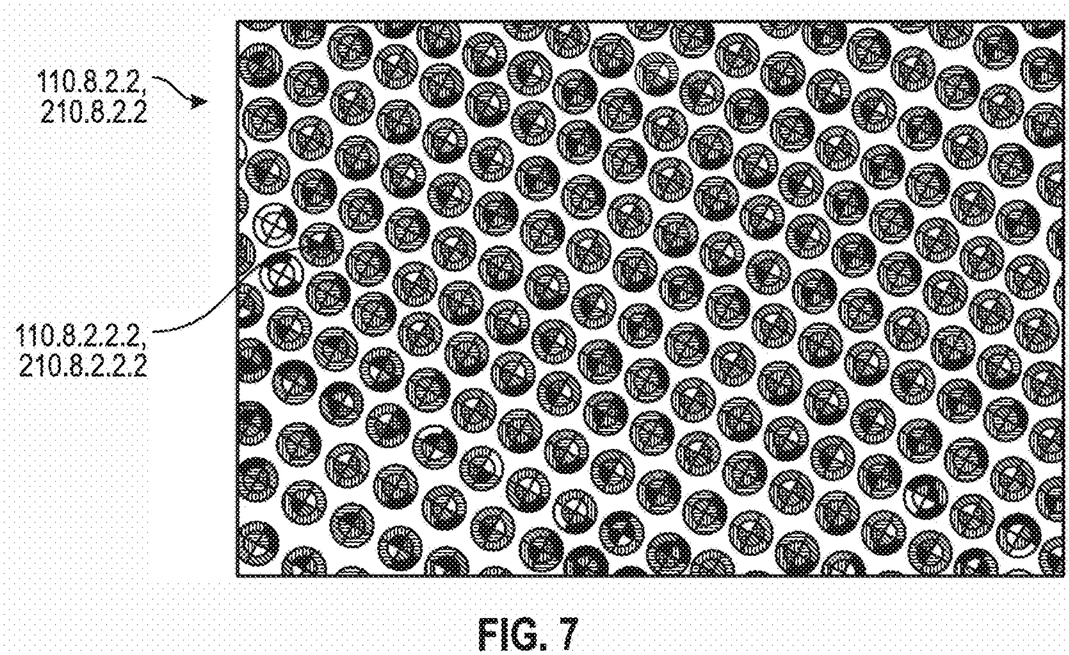
FIG. 7 is an example of a pattern that may be placed on the hood shown in FIG. 6.

As shown in FIGS. 6-7, one or more reference markers 110.8.2.2.2, 210.8.2.2.2 may be placed on the scanning hood 110.8.2, 210.8.2. The reference markers 110.8.2.2.2, 210.8.2.2.2 may be used to aid in the orientation and positioning of the images or video of the scanning hood 110.8.2, 210.8.2, as will be described below. The reference markers 110.8.2.2.2, 210.8.2.2.2 may be: (i) colored, (ii) offset (e.g., raised or depressed) from other portions of the scanning hood 110.8.2, 210.8.2, (iii) include patterns or textures, (iv) or include electronic properties or features that aid in collection the of shape information by the scanning apparatus 110.4.2, 210.4.2. These reference markers 110.8.2.2.2, 210.8.2.2.2 may be printed on the scanning hood 110.8.2, 210.8.2 or maybe a separate item that is attached to the scanning hood 110.8.2, 210.8.2 using adhesives or using any other mechanical or chemical attachment means. The number of reference markers 110.8.2.2.2, 210.8.2.2.2 that are used should balance the need for an accurate collection of shape information on one hand with processing times on the other hand. In one exemplary embodiment, twelve reference markers 110.8.2.2.2, 210.8.2.2.2 per square inch may be used. A person skilled in the art recognizes that more or fewer reference markers 110.8.2.2.2, 210.8.2.2.2 may be used to alter the processing times and the accuracy of the shape information. In a further embodiment, it should be understood that the scanning hood 110.8.2, 210.8.2 may not have any reference markers 110.8.2.2.2, 210.8.2.2.2.

In alternative embodiments, a scanning hood 110.8.2, 210.8.2 may not be used when collecting shape information in certain situations. For example, scanning hood 110.8.2, 210.8.2 may not be needed to reduce the effects of hair when capturing shape information about a player's foot, arm, or torso. In embodiments where a scanning hood 110.8.2, 210.8.2 is not used, then one or more reference markers 110.8.2.2.2, 210.8.2.2.2 may be directly placed on the player's body part. For example, the one or more reference markers 110.8.2.2.2, 210.8.2.2.2 may have a removable coupling means (e.g., adhesive) that allows them to be removably coupled to the player's body part to aid in the collection of the shape information.

Figure 5A:
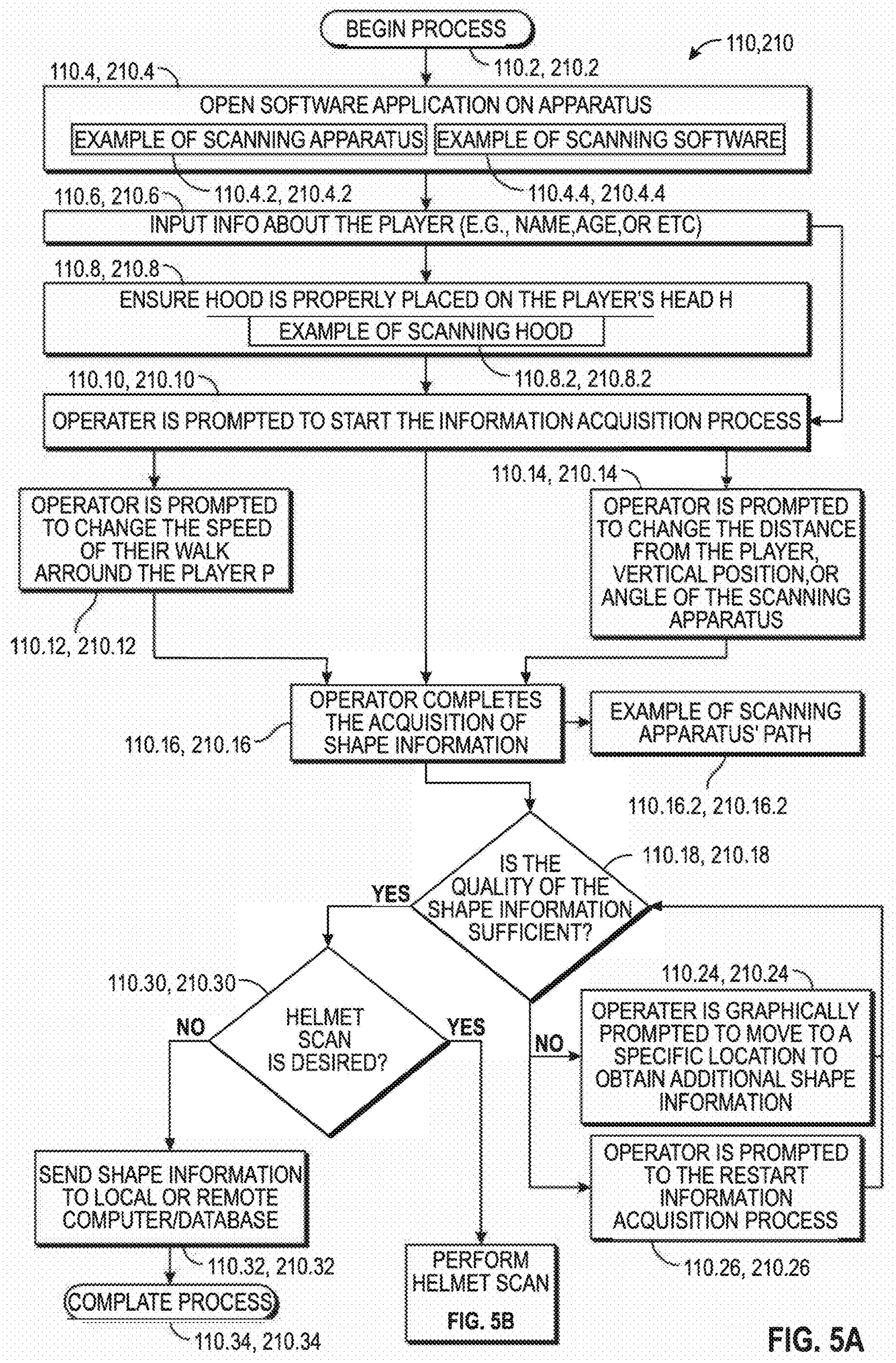
FIG. 5A is a flow chart showing the process for collecting player shape information.

Referring to FIG. 5*a*, after the player P and/or the operator determines that the scanning hood 502 is properly positioned on the player's head H in step 110.8, 210.8, the operator is prompted to start the information acquisition process in step 110.10, 201,10. The information acquisition process may require different steps depending on the configuration of the scanning apparatus 110.4.2, 210.4.2 and the technology that is utilized by the scanning apparatus 110.4.2, 210.4.2. In one exemplary embodiment, the scanning apparatus 110.4.2, 210.4.2 may be a hand-held unit (e.g., personal computer, tablet or cellphone) that is a non-contact camera based scanner. In this embodiment, the operator will walk around the player with the scanning apparatus 110.4.2, 210.4.2 to collect images or video frames of the player. The scanning apparatus 110.4.2, 210.4.2 or a separate device will be used to process the acquired shape information using photogrammetry techniques and/or algorithms. It should be understood that the shape information may be stored, manipulated, altered, and displayed in multiple formats, including numerical values contained within a table, points arranged in 3D space, or partial surfaces.

In an alternative embodiment, the scanning apparatus 110.4.2, 210.4.2 may be a hand-held unit (e.g., personal computer, tablet or cellphone) that utilizes a non-contact LiDAR or time-of-flight sensor that is external to the hand-held unit. In this embodiment, the operator will walk around the player with the non-contact LiDAR or time-of-flight sensor. In particular, the LiDAR or time-of-flight sensor sends and receives light pulses in order to create a point cloud that contains shape information. In an alternative embodiment that is not shown, the scanning apparatus 110.4.2, 210.4.2 may be a stationary unit that contains a non-contact light or sound based scanner (e.g., camera, LiDAR, etc.). In this embodiment, the light/sound sensors can capture the shape information in a single instant (e.g., multiple cameras positioned around the person that can all operate at the same time) or light/sound sensors may capture the shape information over a predefined period of time by the stationary unit's ability to move its sensors around the player P. In an even further embodiment that is not shown, the scanning apparatus may be a contact based scanner. In this embodiment, once the contact sensors are placed in contact with the player's body part, they can capture the shape information in a single instant (e.g., multiple pressure sensors may be positioned in contact with the player's body part to enable the collection of the shape information at one time) or at least one pressure sensor may capture the shape information over a predefined period of time by the stationary unit's ability to move its sensors over the player's body part. In other embodiments, shape information may be collected using: (i) computed tomography or magnetic resonance imaging, (ii) structured-light scanner, (iii) triangulation based scanner, (iv) conoscopic based scanner, (v) modulated-light scanner, or (vi) any combination of the above techniques and/or technologies. For example, the hand-held scanner may utilize both a camera and a time-of-flight sensor to collect the shape information.

Figure 9:
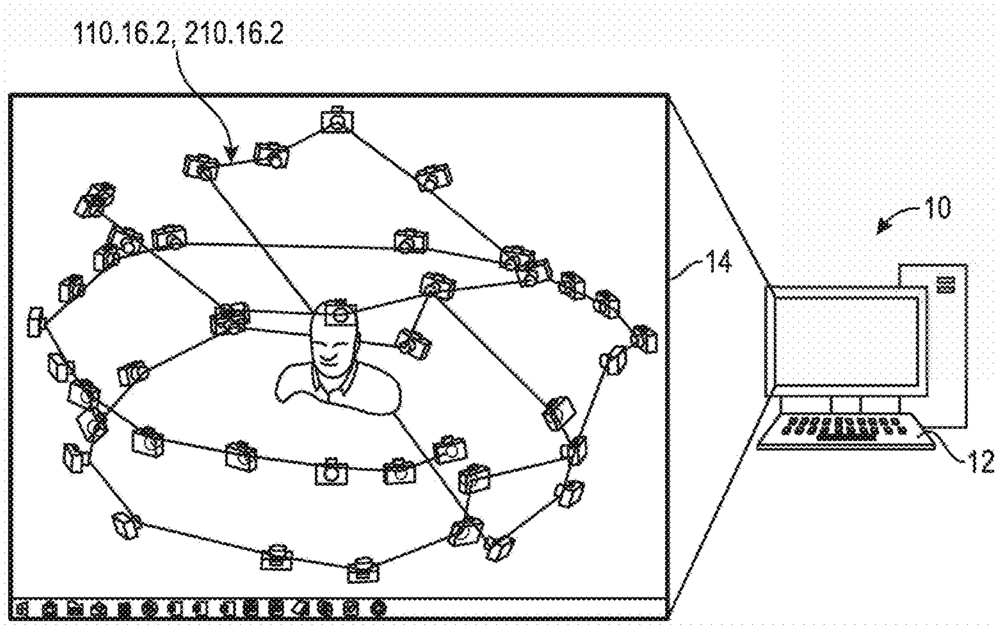
FIG. 9 is a graphical representation of the path that the first or second exemplary scanning apparatuses may take during the process of obtaining player shape information.

FIG. 9 shows an electronic device 10, which is displaying an exemplary path that the scanning apparatus 110.4.2, 210.4.2 may follow during the acquisition of shape information. The electronic device 10 is a computerized device that has an input device 12 and a display device 14. The electronic device 10 may be a generic computer or may be a specialized computer that is specifically designed to perform the computations necessary to carry out the processes that are disclosed herein. It should be understood that the electronic device 10 may not be contained within a single location or position and instead may be located at a plurality of locations. For example, the computing extent of the electronic device may be in a cloud server, while the display 14 and input device 12 are located in the office of the designer.

Referring back to FIG. 9, the hand-held scanning apparatus 110.4.2, 210.4.2 is shown in approximately 40 different locations around a player's head H. These approximately 40 different positions are at different angles and elevations when compared to one another. Placing the scanning apparatus 110.4.2, 210.4.2 in these different locations during the acquisition of shape information helps ensure that the information that will later be made from this acquisition process does not have gaps or holes contained therein. It should be understood that the discrete locations are shown in FIG. 9 are exemplary and are simply included herein to illustrate the path that the scanning apparatus 110.4.2, 210.4.2 may follow during the acquisition of shape information. There is no requirement that the scanning apparatus 110.4.2, 210.4.2 pass through these points or pause to gather shape information at these points during the acquisition process.

Referring back to FIG. 5*a*, during the acquisition of shape information, the software application 110.4.4, 210.4.4 may instruct the operator to: (i) change the speed at which they are moving around the player (e.g., slow down the pace) to ensure that the proper level of detail is captured in step 110.12, 210.12, (ii) change the vertical position and/or angle of the scanning apparatus 110.4.2, 210.4.2 in step 110.14, 210.14, and/or (iii) change the operators position in relation to the player P (e.g., move forward or back up from the player) in step 110.14, 210.14. Once the acquisition of shape information is completed, the software application 110.4.4, 210.4.4 analyzes the information to determine if the quality is sufficient to meet the quality requirements that are preprogrammed within the software application 110.4.4, 210.4.4. If the quality of the shape information is determined to be sufficient in step 110.18, the software application 110.4.4, 210.4.4 asks the operator if a helmet scan is desired. An example of where a helmet scan may be useful is when the player P desires a unique helmet configuration, such if the player decides to have the helmet 1000 positioned lower on their head then a wearer traditionally placed the helmet 1000. If it is determined that a helmet scan is desired in step 110.30, 210.30, then the operator will start the next stage of the acquiring shape information. The process of acquiring the helmet scan is described in connection with FIG. 5*b*. If it is determined that a helmet scan is not desired in step 110.18, 210.18, then the software application 110.4.4, 210.4.4 will send, via a wire or wirelessly, to a local or remote computer/database (e.g., team database 100.2.10, 300.2.10), the shape information in step 110.32, 210.32. This local or remote computer/database may then be locally or remotely accessed by technicians who perform the next steps in designing and manufacturing the helmet 1000.

Alternatively, if the software application 110.4.4, 210.4.4 determines that the quality of the shape information lack sufficient quality to meet the quality requirements that are preprogrammed within the software application 110.4.4, 210.4.4, then the software application 110.4.4, 210.4.4 may prompt the operator to obtain additional information in steps 110.24, 210.24, 110.26, 210.26. Specifically, in step 110.24, 210.24 the software application 110.4.4, 210.4.4 may graphically show the operator: (i) the location to stand, (ii) what elevation to place the scanning apparatus 110.4.2, 210.4.2, and/or (iii) what angle to place the scanning apparatus 110.4.2, 210.4.2. Once the operator obtains the additional information at that specific location, the software application 110.4.4, 210.4.4 then analyzes the original collection of information along with this additional information to determine if the quality of the combined collection of information is sufficient to meet the quality requirements that are preprogrammed within the software application 110.4.4, 210.4.4. This process is then repeated until the quality of the information is sufficient. Alternatively, the software application 110.4.4, 210.4.4 may request that the operator restart the information acquisition process. The software application 110.4.4, 210.4.4 then analyzes the first collection of information along with the second collection of information to see if the combination of information is sufficient to meet the quality requirements that are preprogrammed within the software application 110.4.4, 210.4.4. This process is then repeated until the quality of the information is sufficient. After the information is determined to be sufficient, the software application 110.4.4, 210.4.4 performs the step 110.30, 210.30 of prompting the operator to determine if a helmet scan is desired.

Figure 5B:
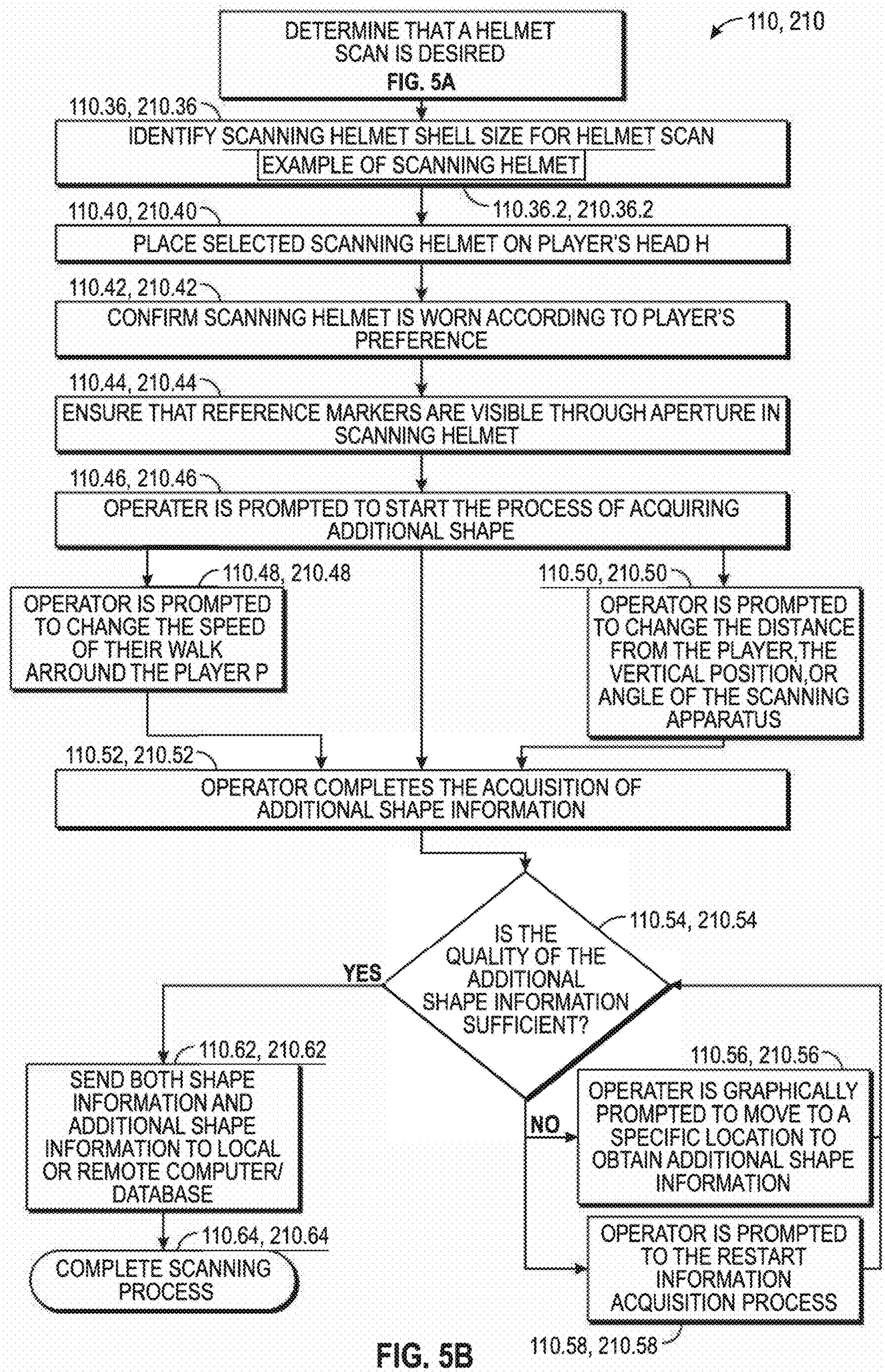
FIG. 5B is a flow chart showing the optional process for collecting additional player shape information using a scanning helmet.

FIG. 5*b* describes the acquisition of additional shape information using a scanning helmet 110.36.2, 210.36.2. The first step in this process is 110.36, 210.36, which is accomplished by identifying the proper scanning helmet 110.36.2, 210.36.2. As an example for an adult player P, the scanning helmet 110.36.2, 210.36.2 shell sizes may include medium, large and extra-large, although additional or intermediate sizes are certainly within the scope of this disclosure. The selection of the scanning helmet 110.36.2, 210.36.2 shell size may be by determined by the position the player plays, previous player experiences, or by estimations or measurements taken during or before the acquisition of the shape information. It should be understood that the term scanning helmet 110.36.2, 210.36.2 does not just refer to a helmet that is placed over the player's head; instead, it refers to a modified version of the end product that is being designed and manufactured according to the methods disclosed herein, which aids in the collection of additional shape information.

Once the size of the scanning helmet 110.36.2, 210.36.2 is selected in step 110.36, 210.36, the scanning helmet 110.36.2, 210.36.2 is placed over the player's head H while the player P is wearing the scanning hood 110.8.2, 210.8.2 in step 110.40, 210.40. After the scanning helmet 110.36.2, 210.36.2 is placed on the player's head H in step 110.40, 210.40, the player adjusts the scanning helmet 110.36.2, 210.36.2 to a preferred wearing position or configuration, which includes adjusting the chin strap assembly by tightening or loosening it. It is not uncommon for a player P to repeatedly adjust the scanning helmet 110.36.2, 210.36.2 to attain his or her preferred wearing position because this position is a matter of personal preference. For example, some players prefer to wear their helmet lower on their head H with respect to their brow line, while other players prefer to wear their helmet higher on their head H with respect to their brow line.

Figure 10:
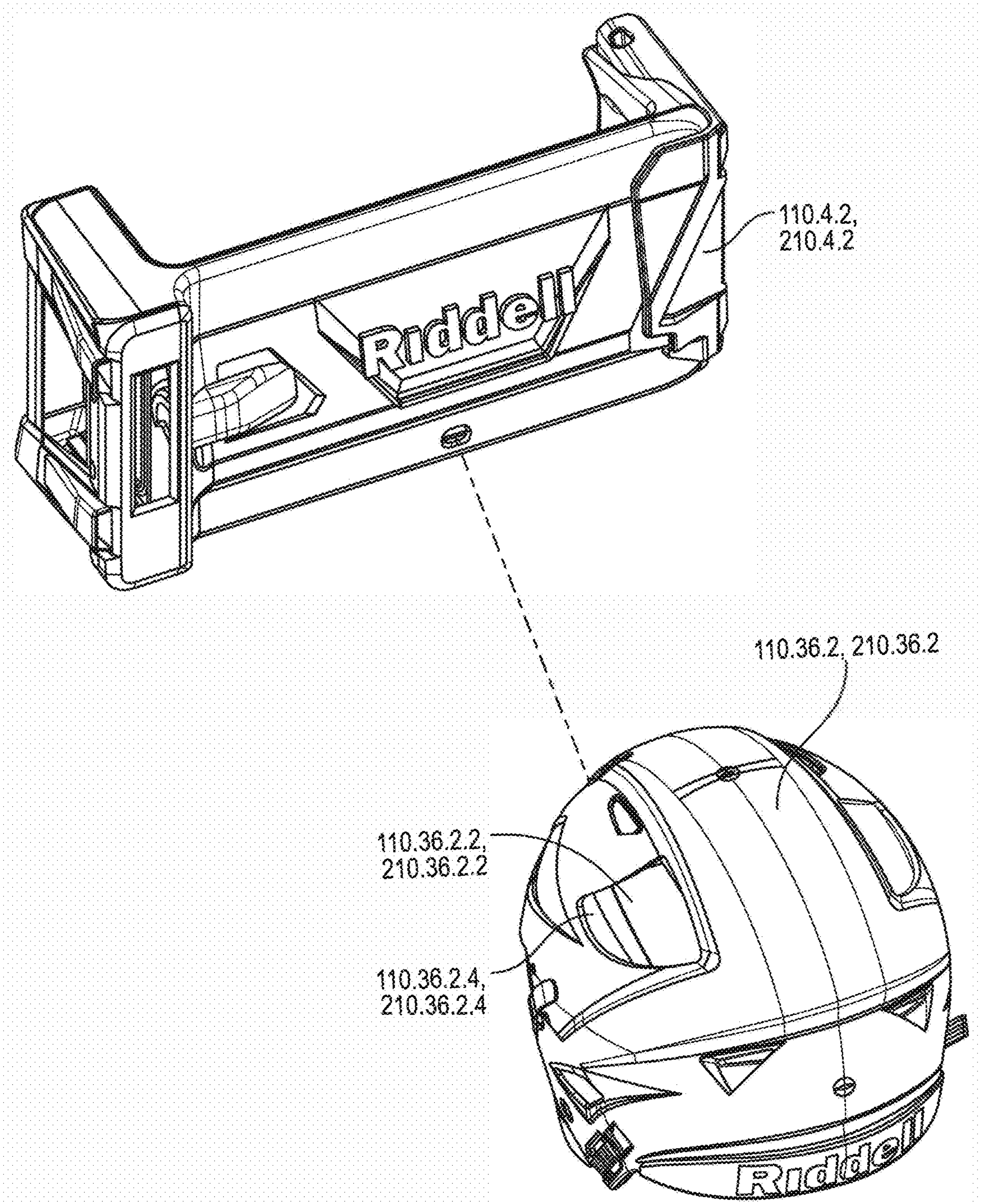
FIG. 10 shows the first exemplary scanning apparatus, which is collecting additional shape information by scanning a helmet worn on a player's head.

As shown in FIG. 10, the scanning helmet 110.36.2, 210.36.2 includes the chin strap 110.36.2.1, 210.36.1, one or more apertures 110.36.2.2, 210.36.2 formed in a shell 110.36.2.3, 210.36.3 of the helmet 110.36.2, 210.36.2 and an internal scanning energy attenuation assembly 110.36.2.4, 210.36.4. The position, number, and shape of the apertures 110.36.2.2, 210.36.2 in the scanning helmet 110.36.2, 210.36.2 are not limited by this disclosure. These apertures 110.36.2.2, 210.36.2 allow certain portions of the scanning hood 110.8.2, 210.8.2 to be seen when the scanning helmet 110.36.2, 210.36.2 is worn over the scanning hood 110.8.2, 210.8.2 on the player's head H. As mentioned above, the scanning helmet 110.36.2, 210.36.2 includes the faceguard that is removably attached to a forward portion of the scanning helmet 110.36.2, 210.36.2. The faceguard may be used by the player, when wearing the scanning helmet 110.36.2, 210.36.2, to assist the player in determining a preferred helmet wearing position. Once the player positions the scanning helmet 110.36.2, 210.36.2 such that a preferred helmet wearing position is achieved, the faceguard is removed to increase the accuracy of the helmet scan by allowing a scanning apparatus 110.4.2, 210.4.2 to capture a greater, and less obscured, a portion of the player's face. Although the faceguard is removed, the chin strap assembly remains secured around the player's chin and jaw thereby securing the scanning helmet 110.36.2, 210.36.2 in the preferred helmet wearing position.

Referring back to FIG. 5*b*, after the scanning helmet 110.36.2, 210.36.2 is properly positioned on the player's head in steps 110.42, 210.42, 110.44, 210.42, the operator is prompted by the software application 110.4.4, 210.4.4 to start the information acquisition process. Similar to the above process, the software application 110.4.4, 210.4.4 may instruct the operator to: (i) change the speed at which they are moving around the player (e.g., slow down the pace) to ensure that the proper level of detail is captured in step 110.48, 210.48, (ii) change the vertical position and/or angle of the scanning apparatus 110.4.2, 210.4.2 in step 110.50, 210.50, and/or (iii) change the operators position in relation to the player P (e.g., move forward or back up from the player) in step 110.50, 210.50. Once the operator completes the acquisition of additional shape information in step 110.52, 210.52, the software application 110.4.4, 210.4.4 analyzes the information to determine if the quality of the information is sufficient to meet the quality requirements that are preprogrammed within the software application 110.4.4, 210.4.4 in step 110.54, 210.54. If the software application 110.4.4, 210.4.4 determines that the quality of the information is sufficient 110.54, 210.54, then the scanning apparatus 110.4.2, 210.4.2 will send, via a wire or wirelessly, to a local or remote computer/database (e.g., team database 100.2.10, 300.2.10), the shape information. This local or remote computer/database may then be locally or remotely accessed by technicians who perform the next steps in designing and manufacturing the helmet 1000.

Alternatively, if the software application 110.4.4, 210.4.4 determines that the quality of the shape information lack sufficient quality to meet the quality requirements that are preprogrammed within the software application 110.4.4, 210.4.4, then the software application 110.4.4, 210.4.4 may prompt the operator to obtain additional information in steps 110.56, 210.56, 110.58, 210.58. Specifically, in step 110.56, 210.56 the software application 110.4.4, 210.4.4 may graphically show the operator: (i) the location to stand, (ii) what elevation to place the scanning apparatus 504, and/or (iii) what angle to place the scanning apparatus 110.4.2, 210.4.2. Once the operator obtains the additional information at that specific location, the software application 110.4.4, 210.4.4 will then analyze the original collection of information along with this additional information to determine if the quality of the combined collection of information is sufficient to meet the quality requirements that are preprogrammed within the software application 110.4.4, 210.4.4. This process is then repeated until the quality of the information is sufficient. Alternatively, the software application 110.4.4, 210.4.4 may request that the operator restart the information acquisition process in step 110.58, 210.58. The software application 110.4.4, 210.4.4 then analyzes the first collection of information along with the second collection of information to see if the combination of information is sufficient to meet the quality requirements that are pre-programmed within the software application 110.4.4, 210.4.4. This process is then repeated until the quality of the information is sufficient. After the information is determined to be sufficient, the software application 110.4.4, 210.4.4 performs step 110.62, 210.62. It should be understood that some of the steps in the process of acquiring shape information may be performed in a different order. For example, the acquisition of information in connection with the scanning hood 110.8.2, 210.8.2 may be performed after the acquisition of information in connection with the scanning helmet 110.36.2, 210.36.2.

D. Create Player Population Information

The next step in the method of designing and manufacturing pre-manufactured or stock helmet components is preparing the player population information in step 120, 220, 330, which is described in greater detail in connection with FIG. 11. To prepare a collection of impact matrixes 120.99, 320.99 for the population of players, databases that contain impact information are identified in step 120.1, 320.1. Once the databases are identified in step 120.1, 320.1, a player impact matrix 120.2.99, 320.2.99 is generated in step 120.2, 320.2 for each player contained within the population of players. Referring to FIG. 12, the individual player impact matrix 120.2.99, 320.2.99 may be created from information that was generated and stored in connection with: (i) 120.2.2, 320.2.2, which is the system described above in connection with FIGS. 2*a*-2*b*, (ii) 120.2.4, 320.2.4, which is the Sideline Response System (SRS) that is disclosed in connection with U.S. Pat. Nos. 6,826,509; 7,526,389; 8,548,768; 8,554,509; 8,797,165; 9,622,661 and 10,292,650, all of which are fully incorporated herein by reference, (iii) 120.2.6, 320.2.6, which is the InSite Response System that is disclosed in connection with U.S. Pat. No. 10,105,076, which is fully incorporated herein by reference, (iv) 120.2.8, 320.2.8, which are alternative systems (e.g., NFL's impact database). It should be understood that each player impact matrix 120.2.99, 320.2.99 is unique to a single player. One exemplary impact matrix 120.2.75, 320.2.75 is shown in FIG. 12.

Referring back to FIG. 11, once the player impact matrix 120.2.99, 320.2.99 is generated in step 120.2, 320.2 for each player within the population of players, each player impact matrix 120.2.99, 320.2.99 is analyzed to ensure the quality of the information is sufficient for use within this process. In step 120.4, 320.4, the player impact matrix is removed from further analysis, if it is incomplete (e.g., a player has not experienced enough impacts to provide a reliable baseline). Next, in step 120.6, 320.6, the player impact matrix is removed from further analysis, if other information about the player (e.g., player's position or level is missing). Finally, in step 120.8, 320.8, the player impact matrix is removed from further analysis, if it contains outlier data. For example, if the player impact matrix contains information that is outside of the $99.5^{th}$ percentile for the player's age and skill level, then this player impact matrix will be removed from further analysis. As described above, this percentile is based on historical impact magnitude values that have been collected by the current assignee of this application. However, it should be understood that this percentile may be updated in light of additional impact information that has been collected by this system or other systems. Upon the completion of step 120.8, 320.8, each of these individual player impact matrixes 120.2.99, 320.2.99 are then added to a database, local or remote, to create a collection of player impact matrixes for the population of players 120.10, 320.10. This database is can be accessed by technicians who perform the next steps in designing and manufacturing the helmet 1000.

Figure 13:
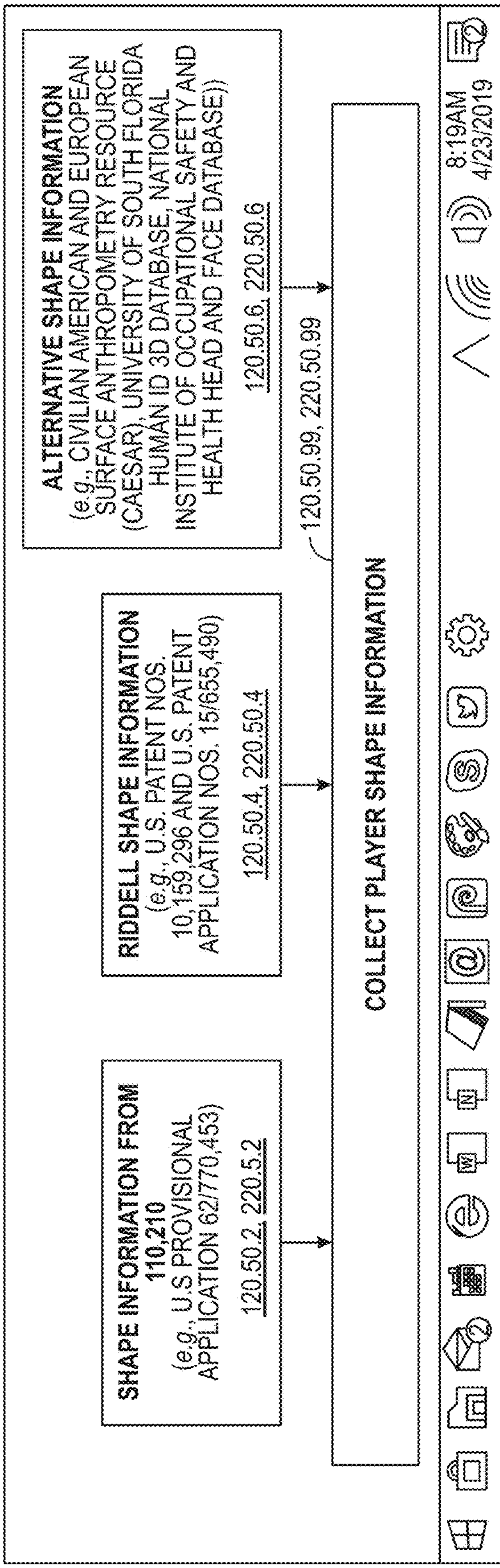
FIG. 13 shows the electronic device displaying a plurality of player shape information sources.

To create a collection of player body part models for the population of players, databases that contain shape information are identified in step 120.48, 320.48, which are shown in connection with FIG. 11. Once the databases are identified in step 120.48, 320.48, a collection of player shape information 120.50.99, 220.50.99 is generated in step 120.50, 320.50. It should be understood that each collection of player shape information 120.50.99, 220.50.99 is unique to a single player. Referring to FIG. 13, the collection of player shape information 120.50.99, 220.50.99 may be created from information that was generated and stored in connection with: (i) 120.50.2, 320.20.2, which is described above in connection with FIGS. 5*a*-5*b*, (ii) 120.50.4, 220.50.4, which are systems that are described within U.S. Pat. No. 10,159,296 and U.S. patent application Ser. No. 15/655,490 that are owned or licensed to the assignee of this application, and (iii) 120.50.6, 220.50.6, which are alternative systems (e.g., Civilian American and European Surface Anthropometry Resource (CAESAR), University of South Florida Human ID 3D Database, National Institute of Occupational Safety and Health head and face database).

Once a collection of player shape information 120.50.99, 220.50.99 is created 120.50, 220.50 for each player in the population of players, each individual collection of player shape information 120.50.99, 220.50.99 is reviewed for its accuracy and completeness. First, the collection of player shape information is removed from further analysis, if it is incomplete (e.g., contains large holes) in step 120.52, 220.52. Next, in step 120.54, 220.54, the collection of player shape information is removed from further analysis, if other information about the player (e.g., player's position or level is missing) is missing. Finally, in step 120.56, 220.56, the collection of player shape information is removed from further analysis, if it contains outlier data. For example, if the collection of shape information contains information that is outside of the $99.5^{th}$ percentile for the player's age and skill level, then this information will be removed from further analysis. This percentile is based on historical shape information that has been collected by the current assignee of this application. However, it should be understood that this percentile may be updated in light of additional shape information that has been collected by this system or other systems.

Next, individual body part models 120.99, 220.99 are created for each collection of player shape information 120.50.99, 220.50.99 in step 120.58, 220.58. One method of creating a body part model 120.99, 220.99 is based on images from a still camera or frames from a video camera may be based on a photogrammetry method. In particular, a photogrammetry method electronically combines the images or frames. The electronic combination of these images or frames may be accomplished a number of different ways. For example, Sobel edge detection or Canny edge detection may be used to roughly find the edges of the object of interest (e.g., the scanning hood 110.8.2, 210.8.2 or scanning helmet 110.36.2, 210.36.2). The computerized modeling system may then remove parts of each image or frame that are known not to contain the object of interest. This reduces the amount of data that will need to be processed by the computerized modeling system in the following steps. Additionally, removing parts of the images or frames, which are known not to contain the objects of interest reduces the chance of errors in the following steps, such as the correlating or matches of a reference point contained within the object of interest with the background of the image.

While still in step 120.58, 220.58, the computerized modeling system processes each image or frame of video to refine the detection of the edges or detect reference markers 110.8.2.2.2, 210.8.2.2.2. After refining the detection of the edges or detecting reference markers 110.8.2.2.2, 210.8.2.2.2, the computerized modeling system correlates or aligns the edges or reference markers 110.8.2.2.2, 210.8.2.2.2 in each image to other edges or reference markers 110.8.2.2.2, 210.8.2.2.2 in other images or frames. The computerized modeling system may use any one of the following techniques to align the images or frames with one another: (i) expectation-maximization, (ii) iterative closest point analysis, (iii) iterative closest point variant, (iv) Procrustes alignment, (v) manifold alignment, (vi) alignment techniques discussed in Allen B, Curless B, Popovic Z. The space of human body shapes: reconstruction and parameterization from range scans. In: Proceedings of ACM SIGGRAPH 2003 or (v) other known alignment techniques. This alignment informs the computerized modeling system of the position of each image or frame of video, which is utilized to reconstruct a body part model based on the acquired shape information.

A body part model 120.99, 220.99 may also be created by the computerized modeling system using the shape information that is obtained by the non-contact LiDAR or time-of-flight based scanner. In this example, the computerized modeling system will apply a smoothing algorithm to the points contained within the point cloud that was generated by the scanner. This smoothing algorithm will create a complete surface from the point cloud, which in turn will be the body part model 120.99, 220.99. Further, the body part model 120.99, 220.99 may be created by the computerized modeling system using the collection of pressure measurements that were taken by the contact scanner. Specifically, each of the measurements will allow for the creation of points within space. These points can then be connected in a manner that is similar to how points of the point cloud were connected (e.g., using a smoothing algorithm). Like above, the computerized modeling system's application of the smoothing algorithm will create a complete surface, which in turn will be the body part model 120.99, 220.99. Also, as discussed above, a combination of these technologies/methods may be utilized to generate the body part model 120.99, 220.99. For example, the body part model 120.99, 220.99 may be created using a photogrammetry method and additional information may be added to the model 120.99, 220.99 based on a contact scanning method. In a further example, the body part model 120.99, 220.99 may be created by the computerized modeling system based on the point cloud that is generated by the LiDAR sensor and additional information may be added to the body part model 120.99, 220.99 using a photogrammetry technique. It should be understood that the body part model 120.99, 220.99 may be analyzed, displayed, manipulated, or altered in any format, including a non-graphical format (e.g., spreadsheet) or a graphical format (e.g., 3D rendering of the model in a CAD program). Typically, the 3D rendering of the body part model 120.99, 220.99 is shown by a thin shell that has an outer surface, in a wire-frame form (e.g., model in which adjacent points on a surface are connected by line segments), or as a solid object.

Once the body part model 120.99, 220.99 is created, the computerized modeling system determines a scaling factor. This is possible because the size of the reference markers 110.8.2.2.2, 210.8.2.2.2 or other objects within the images or frames are known and fixed. Thus, the computerized modeling system determines the scaling factor of the model by comparing the known size of the reference markers 110.8.2.2.2, 210.8.2.2.2 to the size of the reference markers in the model 120.99, 220.99. Once this scaling factor is determined, the outermost surface of the body part model 120.99, 220.99 closely represents the outermost surface of the player's body part along with the outermost surface of the scanning hood 110.8.2, 210.8.2. It should be understood that the thickness of the scanning hood 110.8.2, 210.8.2 is typically minimal; thus, the body part model 120.99, 220.99 closely represents the outermost surface of the player's body part without subtracting the thickness of the scanning hood 110.8.2, 210.8.2. Nevertheless, in some embodiments, it may be desirable to subtract from the thickness of the scanning hood 110.8.2, 210.8.2 from the body part model 120.99, 220.99 after the model is properly scaled.

Once the body part model 120.99, 220.99 is created and scaled in step 120.58, 220.58, the computerized modeling system may apply a smoothing algorithm to the body part model 120.99, 220.99 in step 120.60, 220.60. Specifically, the body part model 120.99, 220.99 may have noise that was introduced by movement of the player's head H while the shape information was obtained or a low resolution scanner was utilized. Exemplary smoothing algorithms that may be applied include: (i) interpolation function, (ii) the smoothing function described within Allen B, Curless B, Popovic Z. The space of human body shapes: reconstruction and parameterization from range scans. In: Proceedings of ACM SIGGRAPH 2003, or (iii) other smoothing algorithms that are known to one of skill in the art (e.g., the other methods described within the other papers are attached to or incorporated by reference in U.S. Provisional Patent Application No. 62/364,629, each of which is incorporated herein by reference).

Alternatively, if the body part model 120.99, 220.99 is too incomplete to utilize a smoothing algorithm, the body part model 120.99, 220.99 may be overlaid on a generic model in step 120.62, 220.62. For example, utilizing this generic model fitting in comparison to attempting to use a smoothing algorithm is desirable when the body part model 120.99, 220.99 is missing a large part of the crown region of the player's head. To accomplish this generic model fitting, anthropometric landmarks are placed on known areas of the body part model 120.99, 220.99 by the computerized modeling system. It should be understood that a body part model 120.99, 220.99 may be a model of any body part of the player/helmet wearer, including a head, foot, elbow, torso, neck, and knee. The following disclosure focuses on the design and manufacture of a protective sports helmet 1000 that is designed to receive and protect a player's head. Thus, the body part model 120.99, 220.99 discussed below in the next stages of the method is a model of the player's head or a "head model." Nevertheless, it should be understood that the following discussion involving the head model in the multi-step method 1 is only an exemplary embodiment of the method 1 for the design and manufacture a protective helmet for a selected group of helmet wearers from amongst a larger population of helmet wearers, and this embodiment shall not be construed as limiting.

Figure 14:
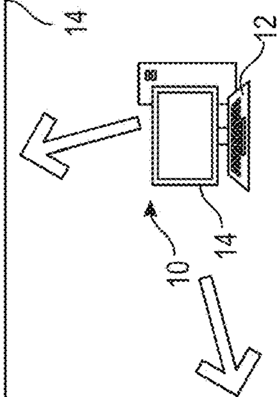
FIG. 14 shows the electronic device displaying multiple views of a three-dimensional (3D) body part model, namely of the player's head region, created from the player shape information, which has a number of anthropometric points positioned thereon.
Figure 14:
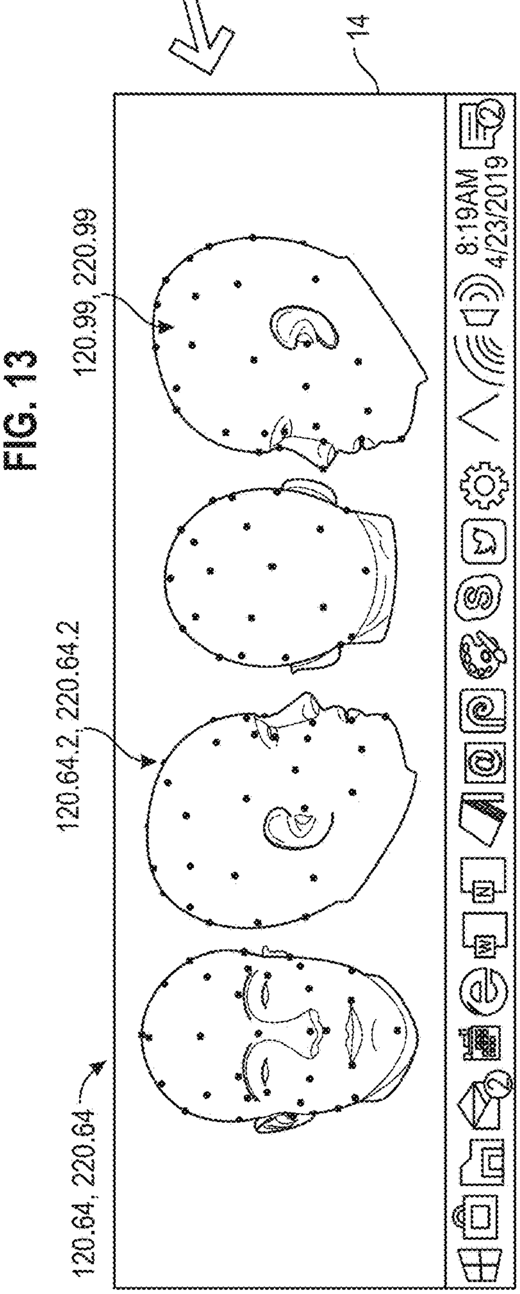

FIG. 14 shows multiple views of a three-dimensional (3D) rendering of the body part model 120.99, 220.99, namely a head model, having a number of anthropometric points 120.64.2, 220.64.2 positioned thereon. As shown in FIG. 14, the points 120.64.2, 220.64.2 are positioned on the tip of the nose, edges of the eyes, between the eyes, the forwardmost edge of the chin, edges of the lips, and other locations. The anthropometric landmarks that are placed on the head model 120.99, 220.99 are then aligned with the anthropometric landmarks of the generic model using any of the alignment methods that are disclosed above (e.g., expectation-maximization, iterative closest point analysis, iterative closest point variant, Procrustes alignment, manifold alignment, and etc.) or methods that are known in the art. After the head model 120.99, 220.99 and the generic model are aligned, the computerized modeling system creates gap fillers that are based upon the generic model. Similar gap filling technique is discussed within P. Xi, C. Shu, Consistent parameterization and statistical analysis of human head scans. The Visual Computer, 25 (9) (2009), pp. 863-871, which is incorporated herein by reference. It should be understood that a smoothing algorithm from step 120.60, 220.60 may be utilized after gaps in the head model 120.99, 220.99 are filled in step 120.62, 220.62. Additionally, it should be understood that the head model 120.99, 220.99 may not require smoothing or filling; thus, steps 120.60, 220.60, 120.62, 220.62 are skipped.

Referring back to FIG. 11, a preset number of anthropometric points 120.64.2, 220.64.2 are positioned on the head model 120.99, 220.99 in step 120.64, 220.64. These anthropometric points are placed at locations that can be identified across all head models 120.99, 220.99. FIG. 14 shows multiple views of a three-dimensional (3D) rendering of the head model having a number of anthropometric points 120.64.2, 220.64.2 positioned thereon. As shown in FIG. 14, the points 120.64.2, 220.64.2 are positioned on the tip of the nose, edges of the eyes, between the eyes, the forwardmost edge of the chin, edges of the lips, and other locations. The accurate placing of these points is necessary, as they will be used to align or register all of the head models 120.99, 220.99 for further comparison. It should be understood that step 120.64, 220.64 may be skipped depending on how the head model 120.99, 220.99 is manipulated in the following steps.

The computerized modeling system then registered or aligned the head model 120.99, 220.99 in a specific location. This is done to ensure that the head models 120.99, 220.99 are positioned in the same space to one another to enable the comparison between the models 120.99, 220.99. Specifically, this registration or alignment removes head rotations, alignment shifts, and sizing issues between the models 120.99, 220.99. This can be done a number of ways, a few of which are discussed below. For example, one method of aligning the head models 120.99, 220.99 may utilize rotational method based on the placement of the anthropometric points 120.64.2, 220.64.2. This method is performed by first moving the entire head model to a new location, wherein in this new location one of the anthropometric points 120.64.2, 220.64.2 positioned at a zero. Next, two rotations are performed along Z and Y axes so that the left and right tragions lie along the X axis. Finally, the last rotation is carried out along the X axis so that left infraorbitale lie on the XY-plane. This method will be repeated for each head model to ensure that all head models 120.99, 220.99 are aligned in the same space.

An alternative method of aligning the head models 120.99, 220.99 may include aligning anthropometric points 120.64.2, 220.64.2 that are positioned on the head models 120.99, 220.99 with anthropometric points that are positioned on a generic head model. The alignment of the anthropometric points may be accomplished using any of the methods that are disclosed above (e.g., expectation-maximization, iterative closest point analysis, iterative closest point variant, Procrustes alignment, manifold alignment, and etc.) or methods that are known in the art. Another method of aligning the head models 120.99, 220.99 with each other may include determining the center of the head model 120.99, 220.99 and placing the center at 0, 0, 0. It should be understood that one or a combination of the above methods may be utilized to align or register the head models 120.99, 220.99 with one another. Further, it should be understood that other alignment techniques that are known to one of skill in the art may also be used in aligning the head models 120.99, 220.99 with one another. Such techniques include the techniques disclosed in all of the papers that are attached to U.S. Provisional Application No. 62/364,629 are incorporated into the application by reference.

Figures 15A, 15B, 15C:
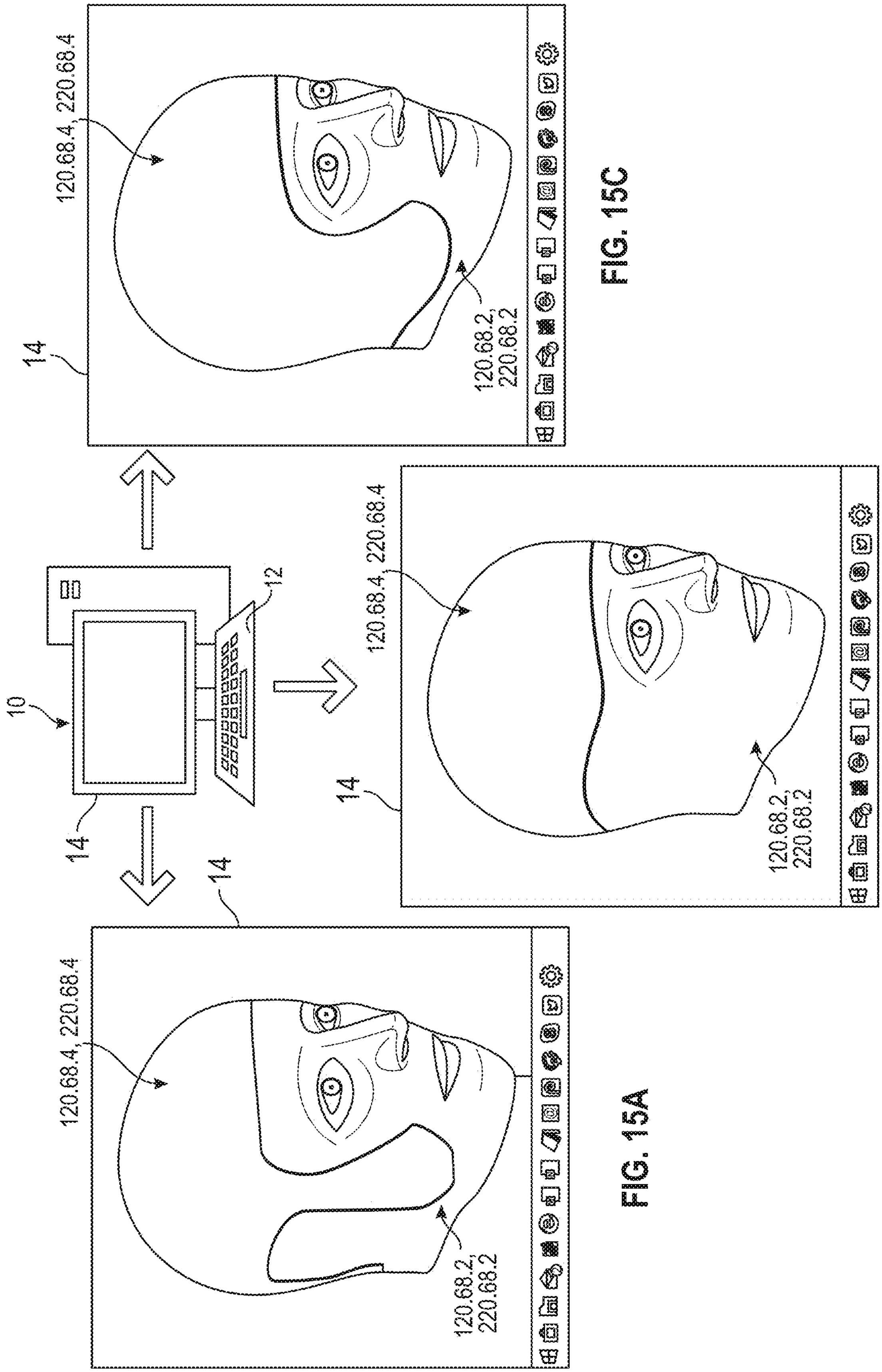
FIGS. 15A-C shows the electronic device displaying a 3D head model created from the shape information, which has a fitting surface.

After the head models 120.99, 220.99 are aligned or registered in step 120.66, 220.66, surface data that is not relevant to the fitting of the helmet or non-fitting surface 120.68.2, 220.68.2 is removed from the head model 120.99, 220.99 in step 120.68, 220.68. This step of removing the non-fitting surface area 120.68.2, 220.68.2 may be accomplished a number of different ways. For example, an algorithm can be utilized to estimate the fitting surface 120.68.4, 220.68.4 because determining the surface of the head model that will be in contact with the helmet. Once this fitting surface 120.68.4, 220.68.4 is determined, then all non-fitting surfaces 120.68.2, 220.68.2 of the head model 120.99, 220.99 may be removed. The identification of the relevant surfaces 120.68.4, 220.68.4 and irrelevant surfaces 120.68.2, 220.68.2 may be based on: (i) commercial helmet coverage standards, such as the standards set forth by National Operating Committee on Standards for Athletic Equipment, (ii) the surface area that is covered by the scanning hood 110.8.2, 210.8.2, (iii) historical knowledge or (iv) other similar methods. FIGS. 15*a*-15*c* show exemplary embodiments shown a fitting surface 120.68.4, 220.68.4, which correlates to surface area of the players head that will be in contact with the helmet.

Alternatively, the irrelevant surfaces 120.68.2, 220.68.2 is removed from the head model 120.99, 220.99 using the helmet scan. This may be accomplished by aligning the helmet scan with the head model 120.99, 220.99 using any of the methods that are disclosed above (e.g., expectation-maximization, iterative closest point analysis, iterative closest point variant, Procrustes alignment, manifold alignment, and etc.) or other methods that are known in the art. For example, the helmet scan's reference markers 110.8.2.2.2, 210.8.2.2.2 that are detected through the one or more apertures 110.36.2.2, 210.36.2 formed in a shell 110.36.2.3, 210.36.3 of the scanning helmet 110.36.2, 210.36.2 may be aligned with the same reference markers 110.8.2.2.2, 210.8.2.2.2 contained on the head model 120.99, 220.99. Alternatively, a player's anthropometric features (e.g., brow region, upper lip region, nose bridge or nose tip) that are contained within both the helmet scan and the head model 120.99, 220.99 may be aligned. Once these alignment methods are utilized, a visual and/or manual inspection of the alignment across multiple axes can be performed by a human or the computer software. Once the alignment of the helmet scan and the head model are confirmed, then the non-fitting surface 120.68.2, 220.68.2 of the head model 120.99, 220.99 can be removed from the head model in step 120.68, 220.68. Upon the completion of step 120.68, 220.68, the head models 120.99, 220.99 are then added to a database, local or remote, to create a collection of head models 120.99, 220.99. Also, each player head model 120.99, 220.99 contained within the collection of player head models 120.70, 220.70 for the population of players may be matched with its associated player impact matrix from the collection of player impact matrixes 120.10, 320.10 of the population of players to create a collection of head models+impact matrixes 120.80 for the population of players. These collections 120.10, 120.70, 120.80, 220.70, 320.10 are uploaded to a database that can be accessed by technicians who perform the next steps in designing and manufacturing the helmet 1000.

It should be understood that the steps described within the method of preparing the information 120, 220, 320 may be performed in a different order. For example, the removal of outlier data in steps 120.8, 320.8, 120.56, 220.56 may be omitted or performed at any time after steps 120.2, 320.2, 120.50, 220.50. Additionally, the removal of information that is incomplete in steps 120.4, 320.4, 120.52, 220.52 and removal of information that is missing other relevant info 120.6, 320.6, 120.54, 220.54 may be performed at any time after steps 120.2, 320.2, 120.50, 220.50, respectfully. Further, it should be understood that the impact information may not be analyzed if the process of designing and manufacturing the helmet 1000 is focused on using only shape information. Likewise, it should be understood that the shape information may not be analyzed if the process of designing and manufacturing the helmet 1000 is focused on using only impact information.

E. Creating Optimized Helmet Prototype Models and Digital Headform Prototypes After the collection of body part models 120.99, 220.99, namely head models, for the population of players 120.70, the collection of impact matrixes for the population of players 120.10, 320.10, and the collection of body part models+impact matrixes for the population of players 120.80 are created, these collections are utilized in the generation of optimized helmet prototype models and digital headform prototypes in steps 130, 230, 330.

1. Body Part Model+Impact Matrix

Figure 16:
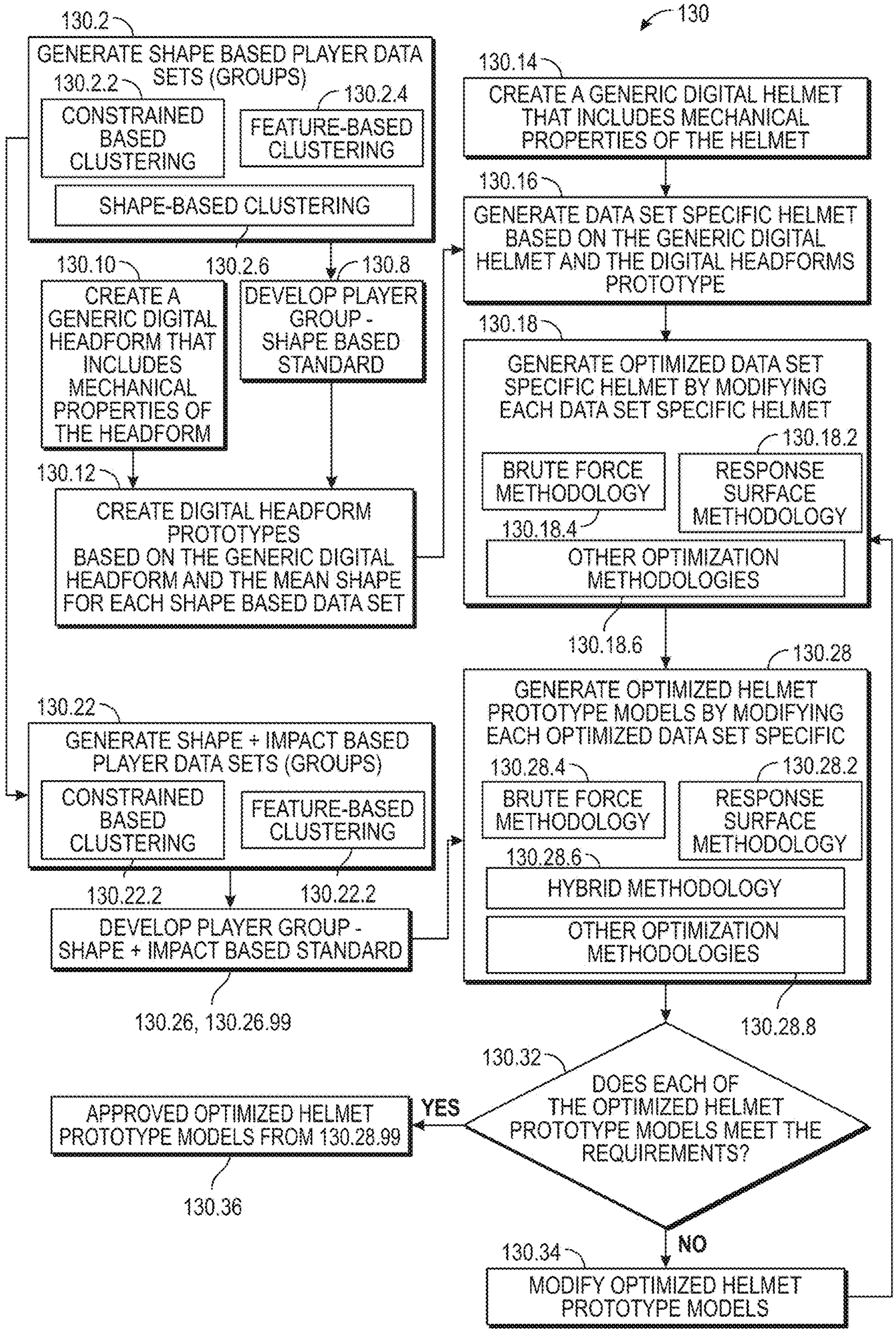
FIG. 16 is a flow chart showing process of creating an optimized helmet prototype model based on analyzing collections of player head models and player impact matrixes.

FIG. 16 describes a method of creating an optimized helmet prototype model 130.28.99 based on collections of body models+impact matrixes 120.80 for a population of players. At a high level, the method of creating a digital headform prototype 130.12.99, 230.12.99 in connection with FIG. 16 includes modifying the shape of a generic digital headform 130.10.99, 230.12.99 based on information associated within head models 120.99, 220.99, wherein each head model is associated with a specific group of the selected population. For example, a digital headform prototype 130.12.99, 230.12.99 may be created for a varsity quarterback or a youth linebacker. Also, at a high level, the method of creating an optimized helmet prototype model 130.28.99, 230.12.99 in connection with FIG. 16 includes utilizing the digital headform prototype 130.12.99, 230.12.99 to modify a generic digital helmet 130.14.99, 230.14.99 in order to create a data set specific helmet 130.16.99, 230.18.99 which is has been optimized in light of digital testing results. Overall, it should be understood that the following steps are performed within the electronic device 10.

i. Generate Shape Based Player Data Sets

The first step in FIG. 16 is the generation of the shape based player data sets 130.2.2.99*a-d*, 230.2.2.99*a-d*, 130.2.4.99*a-d*, 230.2.4.99*a-d* in step 130.2. The shape based player data sets 130.2.2.99*a-d*, 230.2.2.99*a-d*, 130.2.4.99*a-d*, 230.2.4.99*a-d* are created by analyzing the collection of body part models, namely head models 120.99, 220.99 of population of players. Similar to the above discussion, the shape based player data sets 130.2.2.99*a-d*, 230.2.2.99*a-d*, 130.2.4.99*a-d*, 230.2.4.99*a-d* discussed below in the next stages of the method 1 are derived from head models and thus are considered "head shape based player data sets," "HSBP" data set, or "HSBP data set." Accordingly, the following disclosure utilizes the term "shape based player data sets" and "head shape based player data sets" interchangeably. These shape based player data sets 130.2.2.99*a-d*, 230.2.2.99*a-d*, 130.2.4.99*a-d*, 230.2.4.99*a-d* may be created using: (i) a constraint based clustering method 130.2.2, (ii) feature-based clustering method 130.2.4, or (iii) a shape based clustering method 120.2.6. A benefit of using clustering methods to aid in the generation of the shape based player data sets 130.2.2.99*a-d*, 230.2.2.99*a-d*, 130.2.4.99*a-d*, 230.2.4.99*a-d* by optimally dividing up the selected population into the number of desired products. For example, if a designer wants to have four different products (e.g., small, medium, large, and extra-large) then the designer will select four clusters and the clustering algorithms will determine the best way to divide up the population between these sizes.

The feature-based clustering method 130.2.4 is the simplest of these clustering methods and is based on analyzing one selected feature of the head models 120.99, 220.99. Examples of features that may be selected include the circumference of the head model 120.99, 220.99, the volume of the head model 120.99, 220.99, or the surface area of the head model 120.99, 220.99. The specifics of this feature-based clustering method 130.2.4 are described within FIGS. 17*a*-17*d*. Referring now to FIGS. 17*a*-17*d*, the feature-based clustering method 130.2.4 starts by providing access to the collection of head models 120.70, 220.70. Next, the designer selects the desired feature to be the basis of the clustering (e.g., circumference, volume, surface area) in step 130.2.4.1, 230.2.4.1 (shown in FIG. 17*a*). Next, the designer splits the population of players into categories based on how the designer wants to analyze the head models 120.99, 220.99. For example, the designer can select to: (i) analyze all head models 120.99, 220.99 at once in step 130.2.4.2, 230.2.4.2 (shown in FIG. 17*a*), (ii) analyze the head models 120.99, 220.99 based on the players' positions in step 130.2.4.4, 230.2.4.4 (shown in FIG. 17*b*), (iii) analyze the head models 120.99, 220.99 based on players' levels in step 130.2.4.6, 230.2.4.6 (shown in FIG. 17*c*), or (iv) analyze the head models 120.99, 220.99 based on a combination of players' positions and players' levels in step 130.2.4.8, 230.2.4.8 (shown in FIG. 17*d*).

Figure 17A:
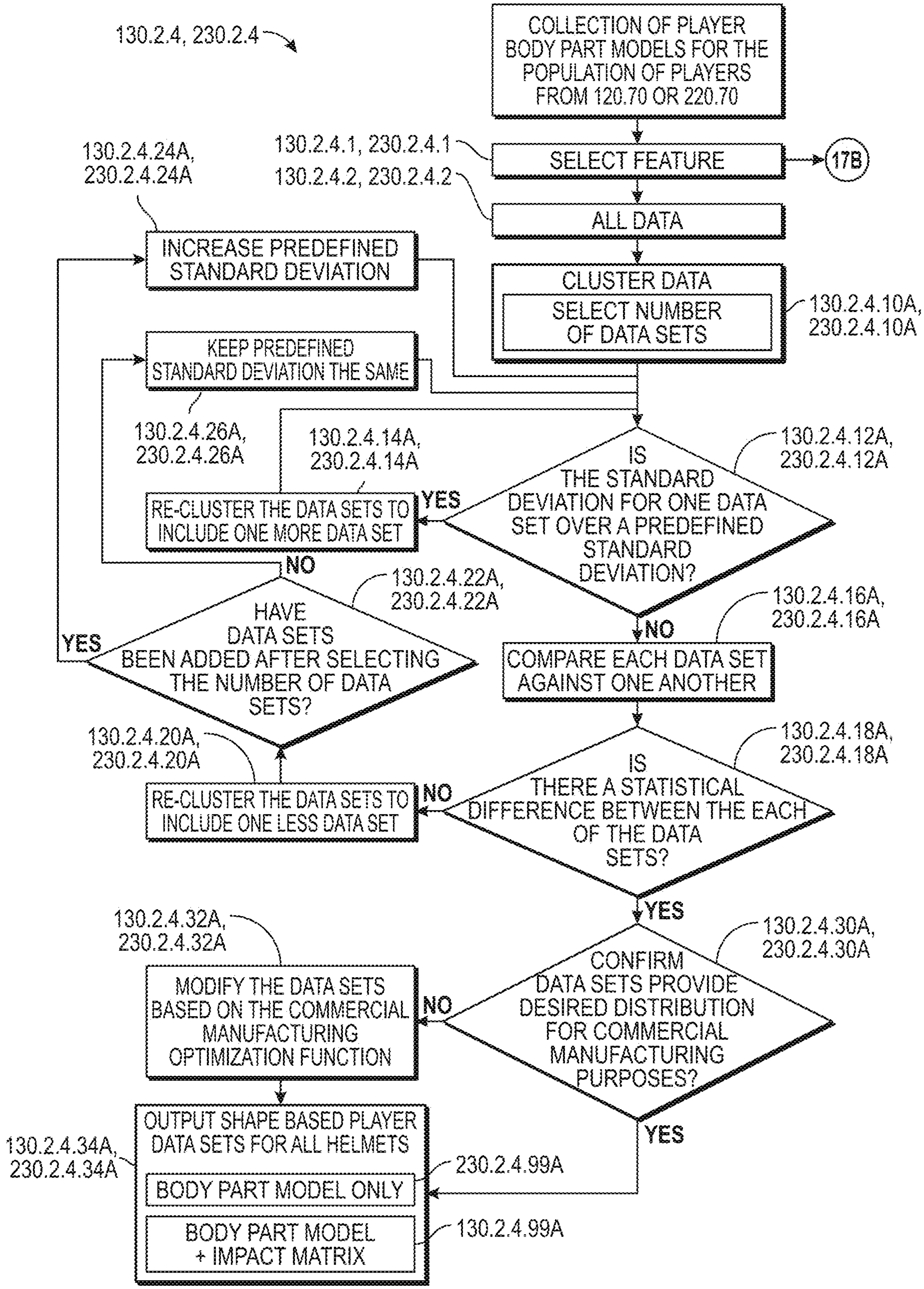
FIGS. 17A-D are flow charts showing a process for creating shape based player data sets using a feature-based clustering method.
Figure 17B:
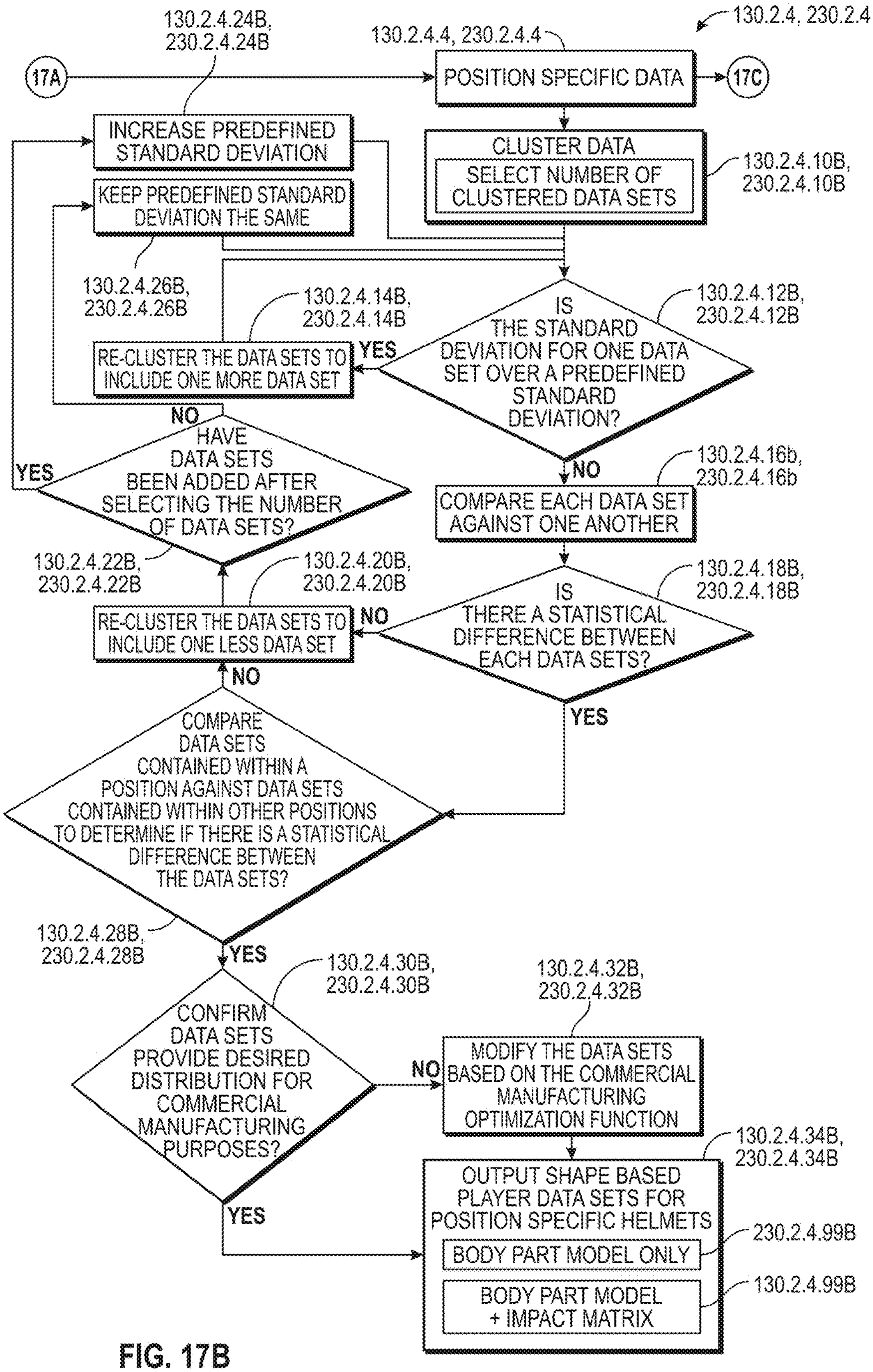
Figures 20A, 20B, 20C:
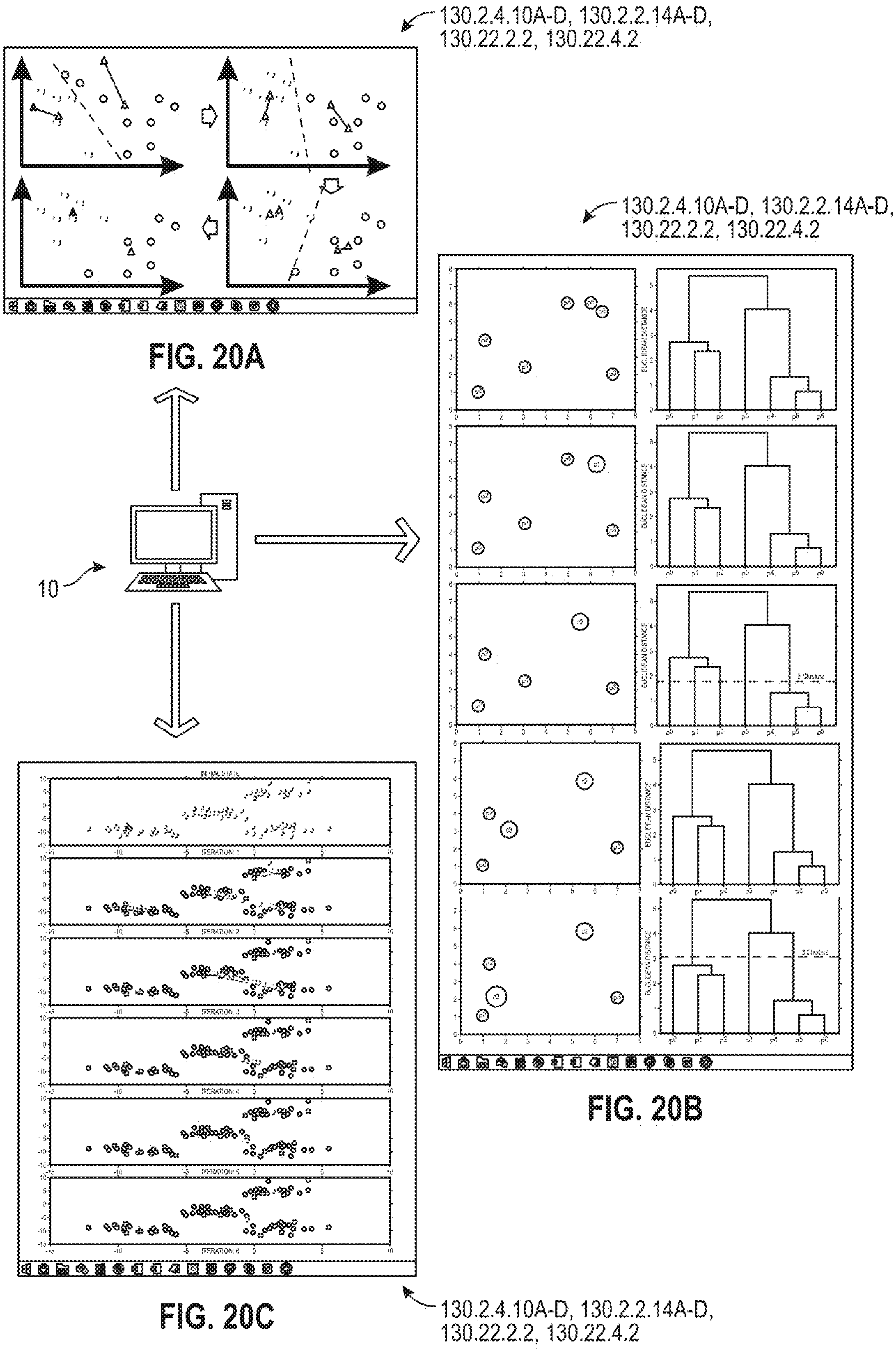
FIGS. 20A-C show the electronic device displaying how three different clustering algorithms function.

If the designer selects to analyze all head models 120.99, 220.99 at once in step 130.2.4.2, 230.2.4.2, as shown in FIG. 17*a*, the designer then selects the desired number of clusters and applies an unsupervised clustering algorithm in step 130.2.4.10*a*, 230.2.4.10*a*. Clustering algorithms that may be utilized include, but are not limited to, (i) K-mean, (ii) mean-shift, (iii) density based, (iv) agglomerative hierarchical, (v) Gaussian mixture models, (vi) K-medoids, or (vii) any other clustering method that is known in the art. FIGS. 20*a*-20*c* show the electronic device 10 displaying how three different clustering algorithms function on a small exemplary data set. Specifically, FIG. 20*a* shows an example where the designer selected two clusters and a K-means clustering algorithm. First, as shown in the upper left image in FIG. 20*a*, the algorithm randomly places the two points (shown via the triangular shapes) amongst the values contained within the data set (shown via the circular shapes). Next, the K-clustering algorithm proceeds to move the randomly placed point (triangular shapes) to different locations in order to minimize the distance between the randomly placed point (triangular shapes) and the values contained within the data set (circular shapes) that are assigned to the randomly placed point (triangular shapes). This process is finished when the distances are minimized, which occurs in the lower left image contained within FIG. 20*a*.

Alternatively, FIG. 20*b* shows an example where the designer selected three clusters and an agglomerative hierarchical clustering algorithm. Specifically, FIG. 20*b* shows that each value contained within the data set is treated as a single cluster. Next, the distance between each cluster is measured and the nearest two values are combined to create an average value. These steps are repeated until the total number of average values that remain is equal to the selected number of clusters. The example in FIG. 20*b* starts off with six clusters and then combines the values until there are only three clusters. Finally, FIG. 20*c* shows an example where the designer selected three clusters and a mean-shift clustering algorithm. In this example, experimental data points are placed on top of each value contained within the data set. The mean-shift algorithm then combines the closest experimental data points to one other until the number of experimental data points is equal to the desired number of clusters.

Referring back to FIG. 17*a*, once the values associated with the selected feature are divided up into the selected number of clusters in step 130.2.4.10*a*, 230.2.4.10*a*, then the standard deviation of each data set is analyzed to determine if it is over a predefined value in step 130.2.4.12*a*, 230.2.4.12*a*. If the standard deviation for one of the data sets is over the predetermined value, then the number of clusters is increased by one and the data is re-clustered in step 130.2.4.14*a*, 230.2.4.14*a*. For example, if the selected number of clusters in step 130.2.4.10*a*, 230.2.4.10*a* was three and the standard deviation for one of the clusters was determined to be over the predefined standard deviation in step 130.2.4.12*a*, 230.2.4.12*a*, then the number of clusters would be increased to four and the data would be split into these four clusters using the selected algorithm in step 130.2.4.14*a*, 230.2.4.14*a*.

If the standard deviation for each one of the data sets is below the predefined standard deviation in step 130.2.4.12*a*, 230.2.4.12*a*, then each data set is compared against one another in step 130.2.4.16*a*, 230.2.4.16*a*. This comparison may be accomplished by any known means, including a t-test. After comparing each data set against one another in step 130.2.4.16*a*, 230.2.4.16*a* using a t-test and determining that there is no statistical difference between two data sets in step 130.2.4.18*a*, 230.2.4.18*a*, then the number of clusters is decreased by one and the data is re-clustered in step 130.2.4.20*a*, 230.2.4.20*a*. Once the data sets have been re-clustered in step 130.2.4.20*a*, 230.2.4.20*a*, the method determines if additional data sets have been included after selecting the number of data sets in step 130.2.4.10*a*, 230.2.4.10*a*. This is done to ensure that the predefined standard deviation is set to the proper amount. For example, if the preset standard deviation is set too low, then additional data sets will be added by steps 130.2.4.12*a*, 230.2.4.12*a*, 130.2.4.14*a*, 230.2.4.14*a*. With these additional data sets, at least one of the data sets may not be statistically different than another data set in step 130.2.4.18*a*, 230.2.4.18*a*. Thus, checking the value of the predefined standard deviation will help ensure that this method does not get stuck within this circular look. Returning to the discussion of the method, the data sets have not been added by steps 130.2.4.12*a*, 230.2.4.12*a*, 130.2.4.14*a*, 230.2.4.14*a*; thus, the predefined deviation is kept the same in step 130.2.4.26*a*, 230.2.4.26*a*. Once steps 130.2.4.24*a*, 230.2.4.24*a* or 130.2.4.26*a*, 230.2.4.26*a* are performed, then the method starts over again at step 130.2.4.12*a*, 230.2.4.12*a*.

If there is a statistical difference between each one of the data sets in step 130.2.4.18*a*, 230.2.4.18*a*, then the data sets are analyzed to ensure that they contain a desirable distribution for manufacturing, marketing, and selling of the product in step 130.2.4.30*a*, 230.2.4.30*a*. Step 130.2.4.30*a*, 230.2.4.30*a* helps ensure that the clustering of the data does not provide results that may be optimized but are not desirable for marketing or sales. For example, it may be desirable to increase the number of people that would fit into the two middle data sets (e.g., medium and large) while reducing the number of people that fit into the other two data sets (e.g., small and extra-large) due to the desire to keep certain products stocked within retail stores. In particular, the method of step 130.2.4.30*a*, 230.2.4.30*a* is disclosed in greater detail within FIG. 22.

Figure 22:
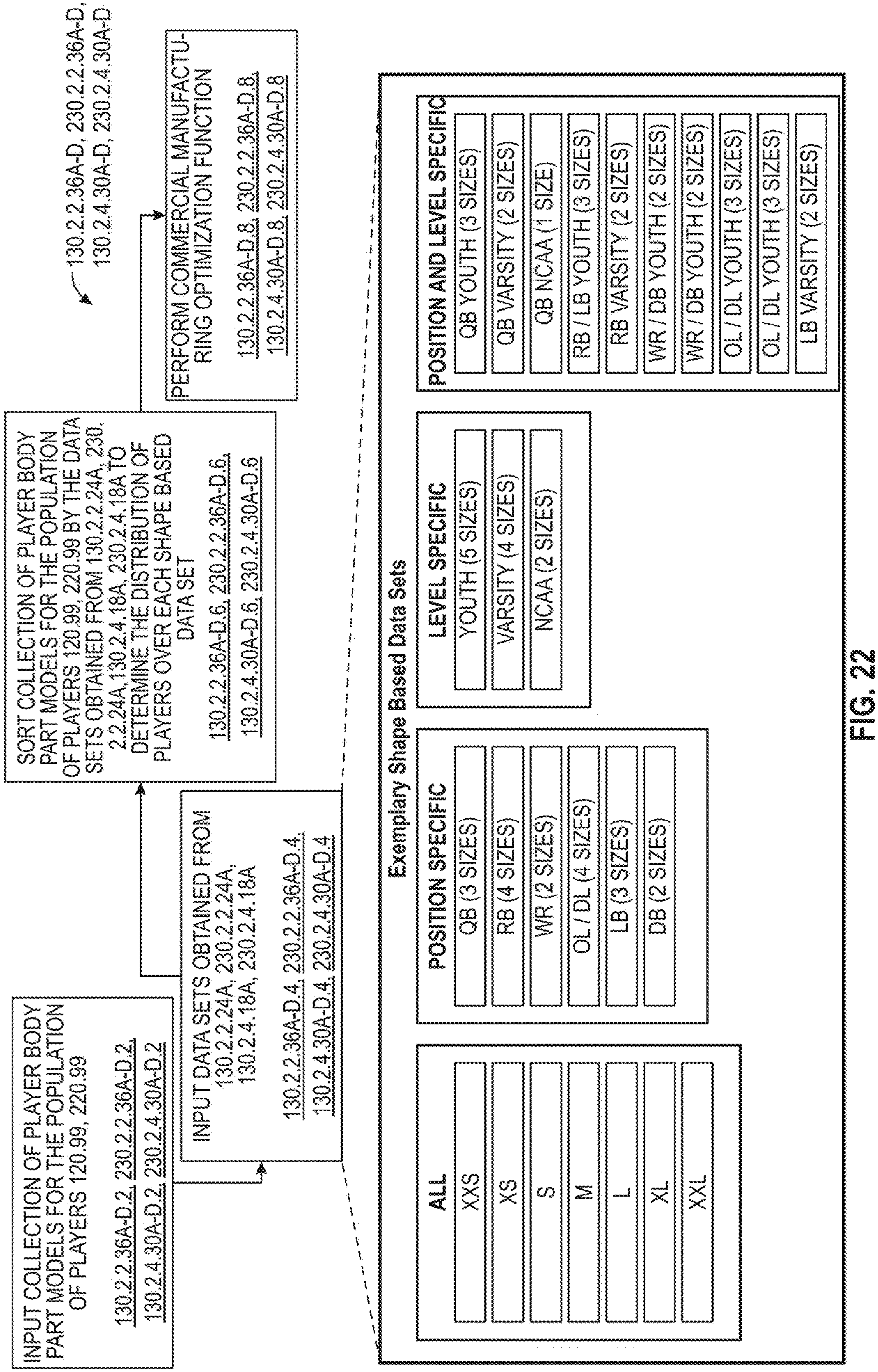
FIG. 22 shows an exemplary breakdown of the shape based player data sets and a process for confirming that the data distribution between the shape based player data sets is desirable for commercial manufacturing purposes.

Referring to FIG. 22, in step 130.2.2.36*a*-*d*.2, 230.2.2.36*a*-*d*.2, 130.2.4.30*a*-*d*.2, 230.2.4.30*a*-*d*.2 the collection of head models 120.99, 220.99 is inputted along with the data sets from 130.2.2.24*a*, 230.2.2.24*a*, 130.2.4.18*a*, 230.2.4.18*a* in step 130.2.2.36*a*-*d*.4, 230.2.2.36*a*-*d*.4, 130.2.4.30*a*-*d*.4, 230.2.4.30*a*-*d*.4. Next, the head models 120.99, 220.99 contained within the database are sorted into the data sets in step 130.2.2.36*a*-*d*.6, 230.2.2.36*a*-*d*.6, 130.2.4.30*a*-*d*.6, 230.2.4.30*a*-*d*.6 to determine the distribution of the collection of head models 120.99, 220.99 over the shape based player data sets. This distribution is then analyzed in step 130.2.2.36*a*-*d*.8, 230.2.2.36*a*-*d*.8, 130.2.4.30*a*-*d*.8, 230.2.4.30*a*-*d*.8 to ensure that the distribution is desirable from commercial manufacturing standpoints. Exemplary commercial manufacturing optimization function may require that 60% of all players fall within the S, M, L helmets, while the other 40% of the players fall within the XXS, XS, XL, and XXL. In another exemplary commercial manufacturing optimization function may require that at least 40% of all players fall within one of the sizes for the position specific helmets, while the remaining percentage falls within the other sizes.

Referring back to FIG. 17*a*, once it is confirmed that the shape based player data sets meet the commercial manufacturing optimization function's requirements in step 130.2.4.30*a*, 230.2.4.30*a*, then the shape based player data sets 130.2.4.99*a*, 230.2.4.99*a* for all helmets are outputted. Alternatively, if the shape based player data sets 130.2.4.99*a*, 230.2.4.99*a* do not meet the commercial manufacturing optimization function's requirements in step 130.2.4.30*a*, 230.2.4.30*a*, then the data sets are modified based on the commercial manufacturing optimization function that is described within FIG. 22 in step 130.2.4.32*a*, 230.2.4.32*a*. Once step 130.2.4.32*a*, 230.2.4.32*a* has been performed, then the shape based player data sets 130.2.4.99*a*, 230.2.4.99*a* for all helmets are outputted. It should be understood that these steps may be performed in a different order. For example, the comparison of the data sets to one another to determine if there is a statistical difference in step 130.2.4.16*a*, 230.2.4.16*a* may be performed prior to analyzing the standard deviation for each of the data sets in step 130.2.4.12*a*, 230.2.4.12*a*. In a further alternative, the manufacturing, marketing, and sales optimization function may be used prior to the start of step 130.2.4.10*a*, 230.2.4.10*a* to influence the selected number of clusters and the predetermined standard deviation value.

Instead of selecting all helmets for the analysis, the designer may analyze the collection of head models 120.99, 220.99 based on the players' positions in step 130.2.4.4, 230.2.4.4. This analysis creates data sets that are based on a player's position, which can be used to create position specific helmets. For example, this analysis may create player data sets that will be used to develop helmets tailored for: quarterbacks, running backs, wide receivers, lineman, linebackers, or defensive backs. In step 130.2.4.4, 230.2.4.4 the collection of head models 120.99, 220.99 are split into groups based upon the position they primarily play. The groups of player positions should include most, if not all, of the individual player positions without grouping them together. For example, offensive lineman should be separate from defensive lineman.

Once the collection of head models 120.99, 220.99 are split into these player position groups, then each and every step that was described above in connection with FIG. 17*a* is performed on each player position group. The only difference is after it is confirmed that there is a statistical difference between each data set contained within each player group in step 130.2.4.18*b*, 230.2.4.18*b*, then each data set within the position groups is compared to other data sets within other position groups to determine if there is a statistical difference between the groups in step 130.2.4.28*b*, 230.2.4.28*b*. For example, this step compares the data contained within one of the offensive lineman data sets to the corresponding data contained within one of the defensive lineman data sets. If there is no statistical difference between the data sets, then these data sets will be combined and the re-clustered in step 130.2.4.20*b*, 230.2.4.20*b*. Once this analysis has been performed for each and every group contained within the collection of head models 120.99, 220.99, then, like step 130.2.4.30*a*, 230.2.4.30*a*, the shape based player data sets are analyzed to ensure that the data sets allow for the desired distribution for commercial manufacturing. Once it is confirmed that the shape based player data sets meet the desired distribution, then the shape based player data sets for position specific helmets 130.2.4.99*b*, 230.2.4.99*b* are outputted. Alternatively, if the shape based player data sets 130.2.4.99*b*, 230.2.4.99*b* do not meet the desired distribution for commercial manufacturing in step 130.4.30*b*, 230.2.4.30*b*, then the data sets are modified based on the commercial manufacturing optimization function that is described within FIG. 22 in step 130.2.4.32*b*, 230.2.4.32*b*. Once step 130.2.4.32*b*, 230.2.4.32*b* has been performed, then the shape based player data sets 130.2.4.99*b*, 230.2.4.99*b* for position specific helmets are outputted.

Instead of selecting all helmets or player positions for the analysis, the designer may analyze the head models 120.99, 220.99, based on players' levels in step 130.2.4.6, 230.2.4.6. This analysis creates player data sets that are based on a player's level, which can be used to create level specific helmets. For example, this analysis may create data sets that will be used to develop helmets tailored for: youth players, varsity players, or NCCA players. In step 130.2.4.4, 230.2.4.4 the collection of head models 120.99, 220.99 are split into categories based upon the levels they play. The groups of player levels should include most, if not all, of the individual player levels without grouping them together. Once the head models 120.99, 220.99 are split into the player level groups, then each and every step that was described above in connection with FIG. 17*b* is performed on each player level group. The only difference is that instead of comparing the data sets that are based upon player position, the data sets are based upon player level.

Figure 17C:
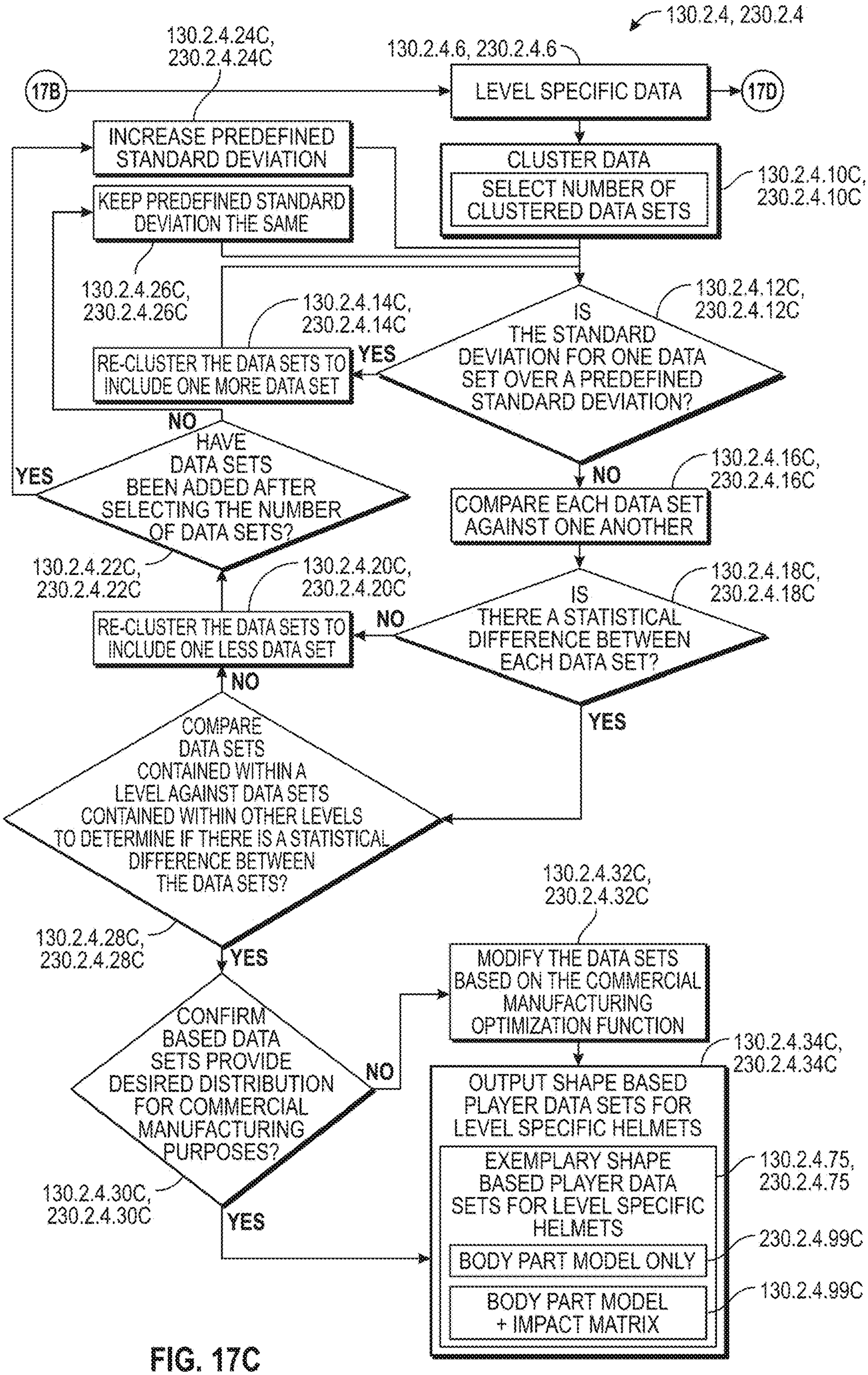
Figure 17D:
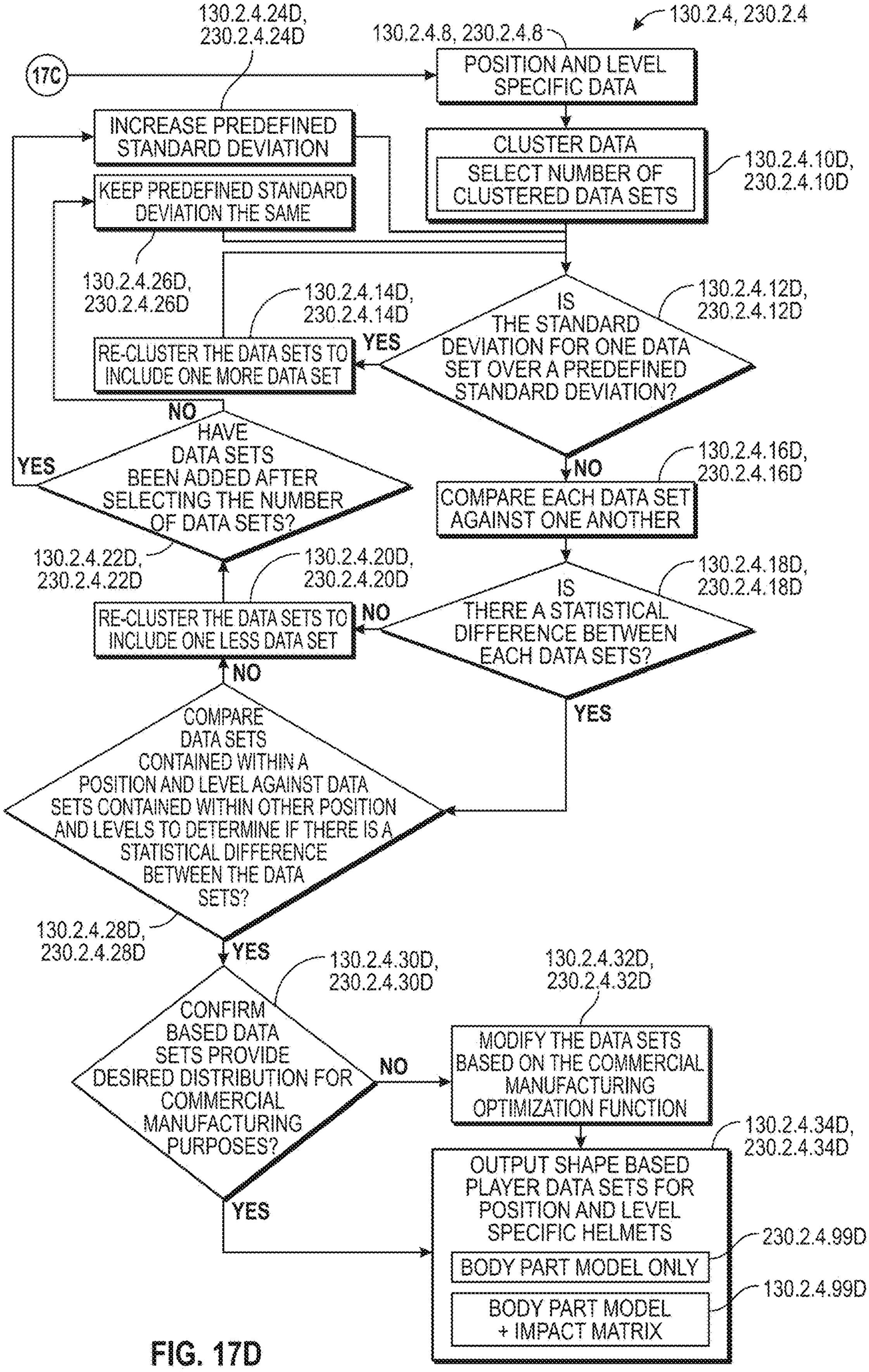
Figure 18:
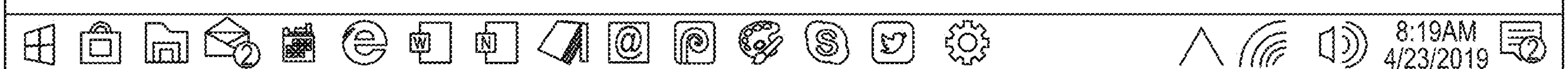
FIG. 18 is an exemplary spreadsheet showing data distribution contained within shape based player data sets that were created using the process disclosed in FIG. 17*c;*
Figure 18:
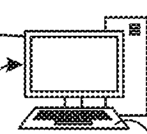

FIG. 18 shows the application of the method described in FIG. 17*c* to an exemplary data set in step 130.2.4.75, 230.2.4.75. In this exemplary data set the feature that is selected in step 130.2.4.1, 230.2.4.1 is the head circumference. Specifically, this exemplary data set contains 21 head circumferences, which range from 19.2 to 24.4 (shown in the first column of the chart). The other columns can be broken down into: (i) columns two-four are related to clustering the head circumferences into four clusters, (ii) columns five-seven are related to clustering the head circumferences into three clusters, and (iii) columns eight-ten are related to clustering the head circumferences into five clusters. First, a predefined standard deviation of 0.5 is programmed into the method described in 17*c*. Next, the designer selects 3 clusters, and the clustering algorithm clusters the data according to the gray and white boxes shown in column 5 based on step 130.2.4.10*c*, 230.2.4.10*c*. Next, the standard deviation for each data set is analyzed to determine if it is under the predefined standard deviation of 0.5. Unfortunately, the standard deviation of the second data set is determined to be over this predefined value in step 130.2.4.10*c*, 230.2.4.10*c*. Thus, the data is re-clustered to include four data sets in step 130.2.4.14*c*, 230.2.4.14*c*. The clustering of these data sets is shown by the gray and white boxes shown in column 2. Next, the standard deviation for each data set is analyzed to determine if it is under the predefined standard deviation of 0.5. Here, all standard deviations are below 0.5, so the next step 130.2.4.16*c*, 230.2.4.16*c* is performed by comparing each data set against one another. Here, a t-test is used to compare the data sets to determine if there is a statistical difference between the data sets. Because each value from the t-test is below the 0.05, and are in fact below 0.005, the data sets are statistically different. Next, the following steps of the method shown in FIG. 17*c* are performed and the data sets are outputted in step 130.2.4.99*c*, 230.2.4.99*c*.

The following describes what happens if the designer picks 5 clusters, instead of 3 clusters. Here, the clustering algorithm clusters the data according to the gray and white boxes shown in column 8 based on step 130.2.4.10*c*, 230.2.4.10*c*. Next, the standard deviation for each data set is analyzed to determine if it is under the predefined standard deviation of 0.5. Unlike three clusters, the standard deviation for all data sets is below the predefined value in step 130.2.4.10*c*, 230.2.4.10*c*. Thus, the next step 130.2.4.16*c*, 230.2.4.16*c* is performed by comparing each data set against one another. Like above, a t-test is used to compare the data sets to determine if there is a statistical difference between the data sets. However, several values from the t-test are above the 0.05 level, which indicates that the data sets are not statistically different. Thus, the data sets are re-clustered to include only four data sets in step 130.2.4.20*c*, 230.2.4.20*c*. The clustering of these data sets is shown by the gray and white boxes shown in column 2. Next, the predefined standard deviation is not altered in step 130.2.4.26*c*, 230.2.4.26*c* because in step 130.2.4.22*c*, 230.2.4.22*c* it was determined that data sets were not added after step 130.2.4.10*c*, 230.2.4.10*c*. Specifically, the originally selected number of data sets was five and now there are four data sets; thus, one a data set has been subtracted and no data sets have been added. Next, the standard deviation for each data set is analyzed to determine if it is under the predefined standard deviation of 0.5. Here, all standard deviations are below 0.5, so the next step 130.2.4.16*c*, 230.2.4.16*c* is performed by comparing each data set against one another. Again, a t-test is used to compare the data sets to determine if there is a statistical difference between the data sets.

Because each value from the t-test is below the 0.05, the data sets are statistically different. Next, the following steps of the method shown in FIG. 17*c* are performed and the data sets are outputted in step 130.2.4.99*c*, 230.2.4.99*c*.

Referring to FIGS. 17*a*-17*d*, and specifically 17*d*, instead of selecting all helmets, player positions, or player levels for the analysis, the designer may analyze the head models 120.99, 220.99 based on a combination of players' positions and players' levels in step 130.2.4.8, 230.2.4.8. This analysis creates player data sets that are based on a combination of players' positions and players' levels and is the first step in the process of designing and manufacturing a helmet that is specifically tailored to a specific player position and level. For example, this analysis may create data sets that will be used to develop helmets tailored for: a youth lineman, a varsity running back or an NCCA quarterback. In step 130.2.4.4, 230.2.4.4 the collection of head models 120.99, 220.99 are split into groups based upon the levels and positions they play. The groups of player position and levels should include most, if not all, of the individual player positions and levels without grouping them together. Once the collection of head models 120.99, 220.99 are split into this player position and level groups, then each and every step that was described above in connection with FIG. 17*b* is performed on each player level group. The primary difference is that instead of comparing the data sets that are based upon player position or player level, the data sets are based upon a combination of player position and level.

The constraint based clustering 130.2.2, which is described in FIG. 19*a*-19*d*, is very similar to the feature-based clustering 130.2.4 that was discussed in connection with FIG. 17*a*-17*d*. The primary difference between these two methods relates to the fact that the constraint based clustering 130.2.2 does not require the designer to select a feature of the head models 120.99, 220.99. Instead, an algorithm is utilized to make this determination in step 130.2.2.10*a*, 230.2.2.10*a*. An exemplary algorithm that may be used is based on principal component analysis (PCA). At a high level, PCA is a variable reducing technique that aims to decrease a large number of variables (e.g., points on the surface of a head model) into a smaller set of variables called principal components (PC). By measuring the statistical dispersion of the PCs, the designer can gain a reasonable understanding of the shape variability within the data set. Like above, the designer selects how they want to analyze head models 120.99, 220.99. For example, the designer can select to: (i) analyze all of the head models 120.99, 220.99 at once in step 130.2.2.2, 230.2.2.2 (shown in FIG. 19*a*), (ii) analyze the head models 120.99, 220.99 based on the players' positions in step 130.2.2.4, 230.2.2.4 (shown in FIG. 19*b*), (iii) analyze the head models 120.99, 220.99 based on players' levels in step 130.2.2.6, 230.2.2.6 (shown in FIG. 19*c*), or (iv) analyze the head models 120.99, 220.99 based on a combination of players' positions and players' levels in step 130.2.2.8, 230.2.2.8 (shown in FIG. 19*d*).

Figure 19A:
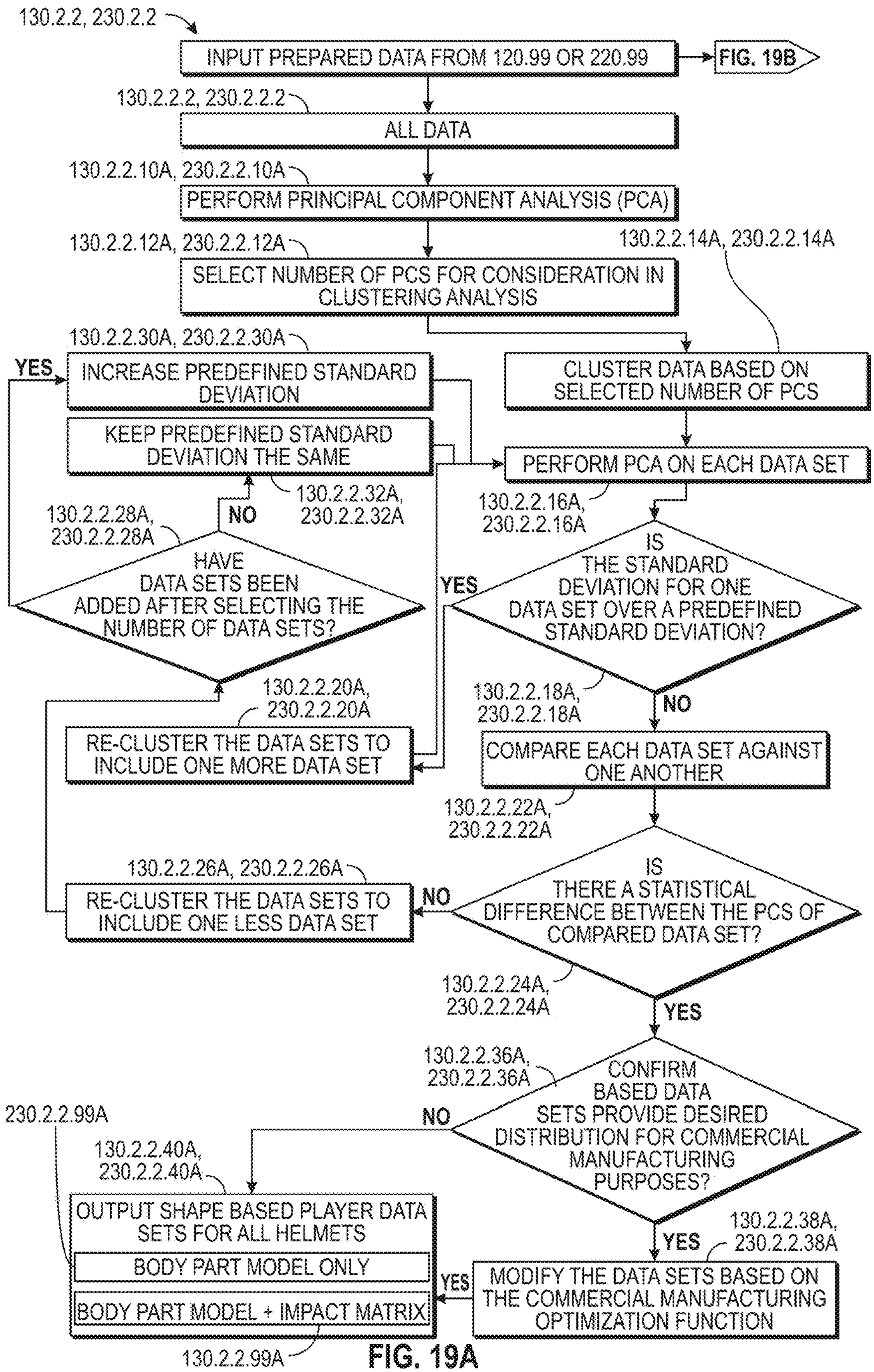
FIGS. 19A-D are flow charts showing a process for creating shape based player data sets using a constraint based clustering method.
Figure 19B:
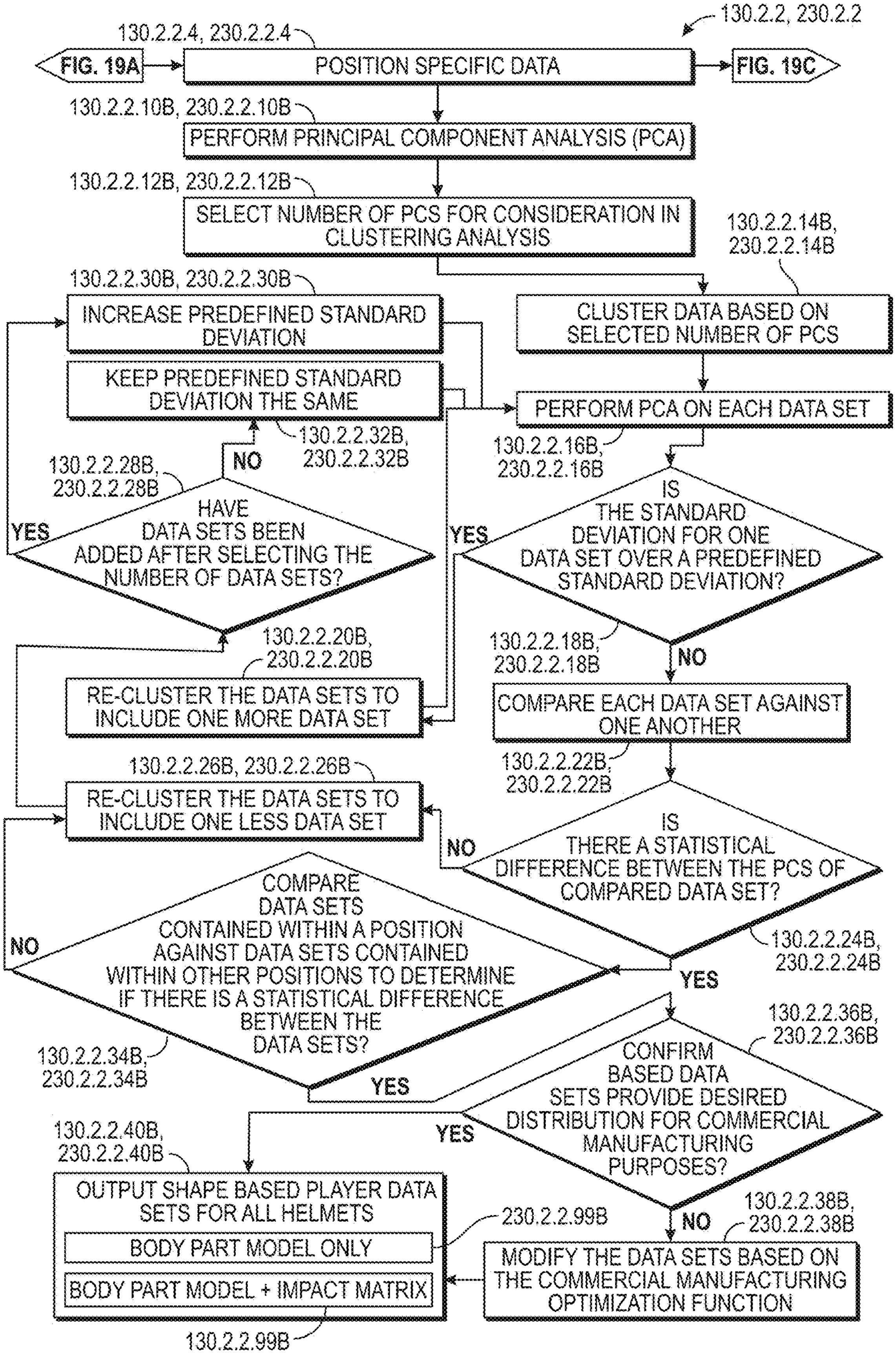
Figure 19C:
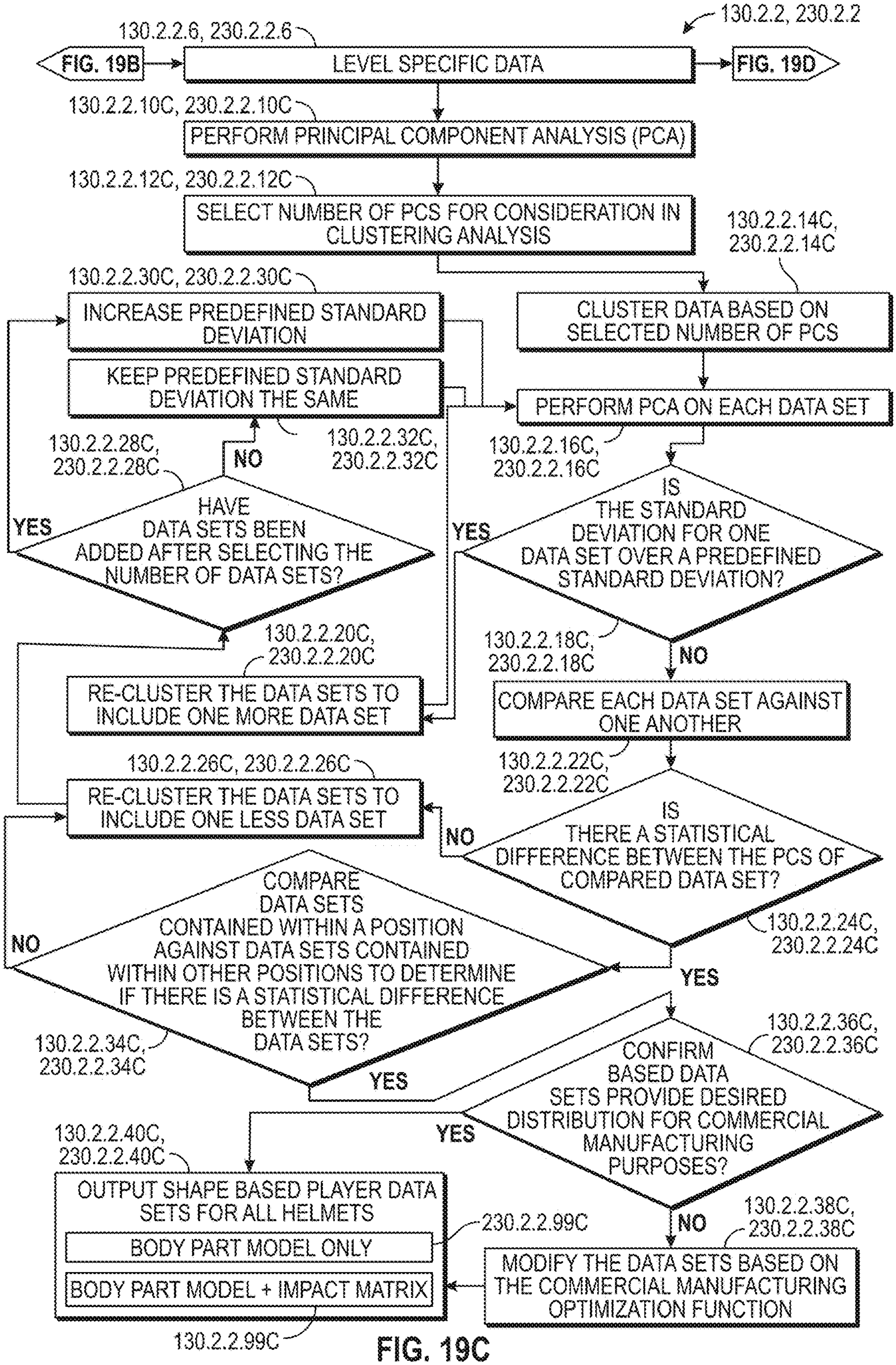
Figure 19D:
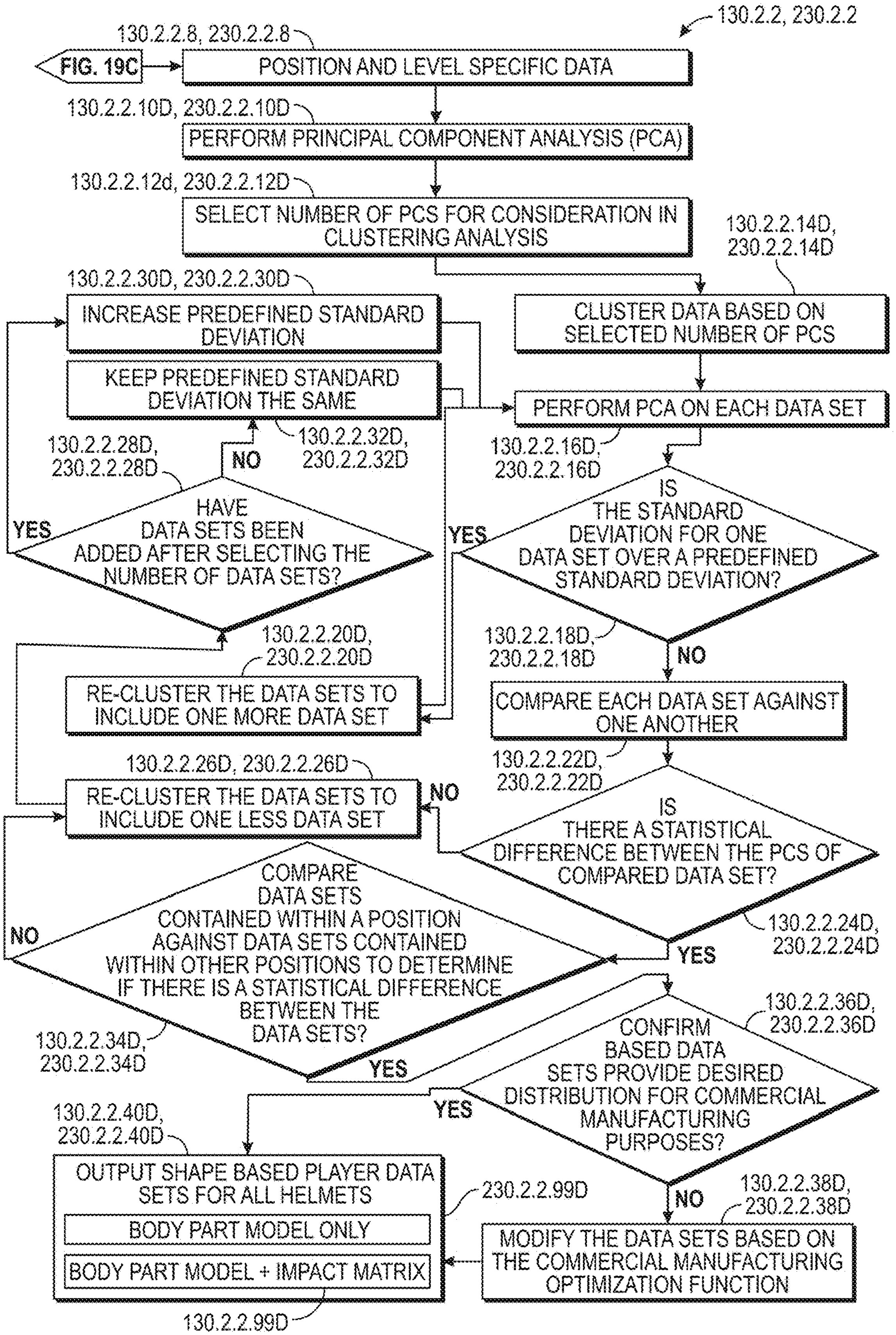
Figure 21:
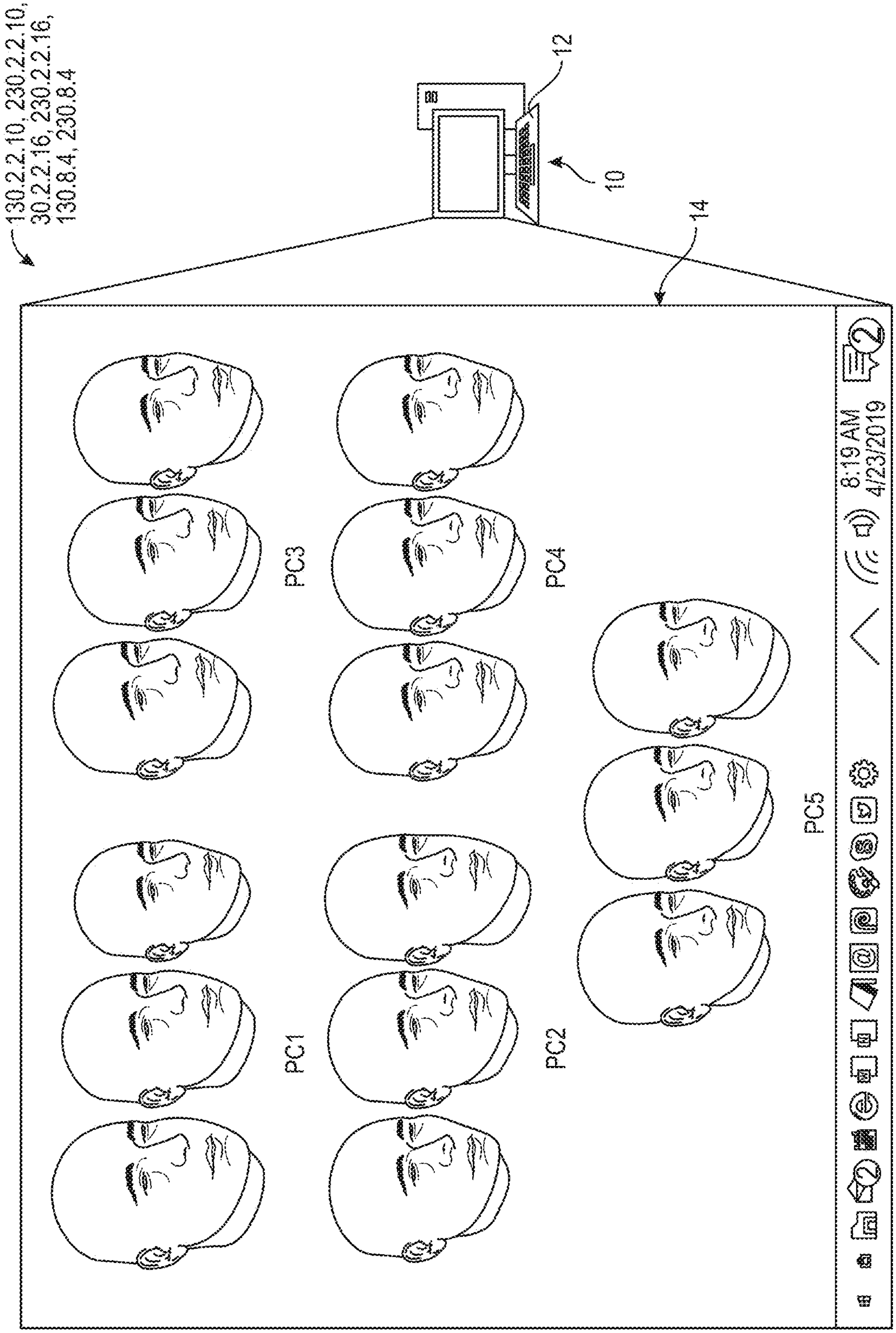
FIG. 21 shows the electronic device displaying exemplary 3D head models derived from applying principal component analysis on the selected set of head models.

If the designer selects to analyze all head models 120.99, 220.99 at once in step 130.2.2.2, 230.2.2.2, as shown in FIG. 19*a*, then the next step in this method is to perform PCA in step 130.2.2.10*a*, 230.2.2.10*a*. An exemplary result from performing this analysis is shown in FIG. 21. In particular, FIG. 21 shows the electronic device 10 displaying exemplary 3D head models 120.99, 220.99 that were derived from applying PCA on the selected set of head models 120.99, 220.99. Here, five PCs are displayed (i.e., PC1, PC2, PC3, PC4, PC5). For each PC1, the center 3D head model is equal to the center PC, while the left 3D head model is equal to −3 standard deviations from the center PC and the right 3D head model is equal to +3 standard deviations from the center PC. Overall, the PCs here can be roughly described as: (i) PC1 roughly describes the approximate overall size or volume of the head, (ii) PC2 roughly describes the overall height of the head, (iii) PC3 relates to the height of the cranium, (iv) PC4 relates to the depth of the head from front to back, (v) PC5 is related to jaw area and shape of the cranium. The designer can then utilize this data in order to inform their selection of the number of PC in step 130.2.2.12*a*, 230.2.2.12*a*. After the selection of the number of PCs, the data is clustered in step 130.2.2.14*a*, 230.2.2.14*a*. Just like above, the clustering of the data done using an unsupervised clustering algorithm, such as (i) K-mean, (ii) mean-shift, (iii) density based, (iv) agglomerative hierarchical, (v) Gaussian mixture models, (vi) K-medoids, or (vii) any other clustering method that is known in the art. Once the data is clustered in 130.2.2.14*a*, 230.2.2.14*a*, PCA is performed on each data set to allow for the comparison of the data sets to one another in step 130.2.2.16*a*, 230.2.2.16*a*. The comparisons of the data sets are the same as described above in connection with FIGS. 17*a*-17*d* and for the sake of brevity they will not be repeated here.

It should be understood that other methods of generating shape based player data sets in step 130.2 are contemplated by this disclosure. For example, PCA may be only applied once to a selected grouping of data (e.g., positions) and this information may be used to split up the head models 120.99, 220.99 into the shaped based data sets. In this example, a clustering algorithm is not used; instead, the head models 120.99, 220.99 are compared to the selected PC that was derived from the PCA by the designer. In a further embodiment, the designer may have a set of desired head shapes (e.g., small, medium, large, and extra-large). The selected groupings of data (e.g., level) may then be sorted based upon the head model's 120.99, 220.99 proximity to one of the desired head shapes. It should further be understood that performing the above described methods in a different order, combinations of the above described methods, or other methods of generating shape based player data sets is within this disclosure.

ii. Develop Player Group—Shape Based Standard

Figure 23:
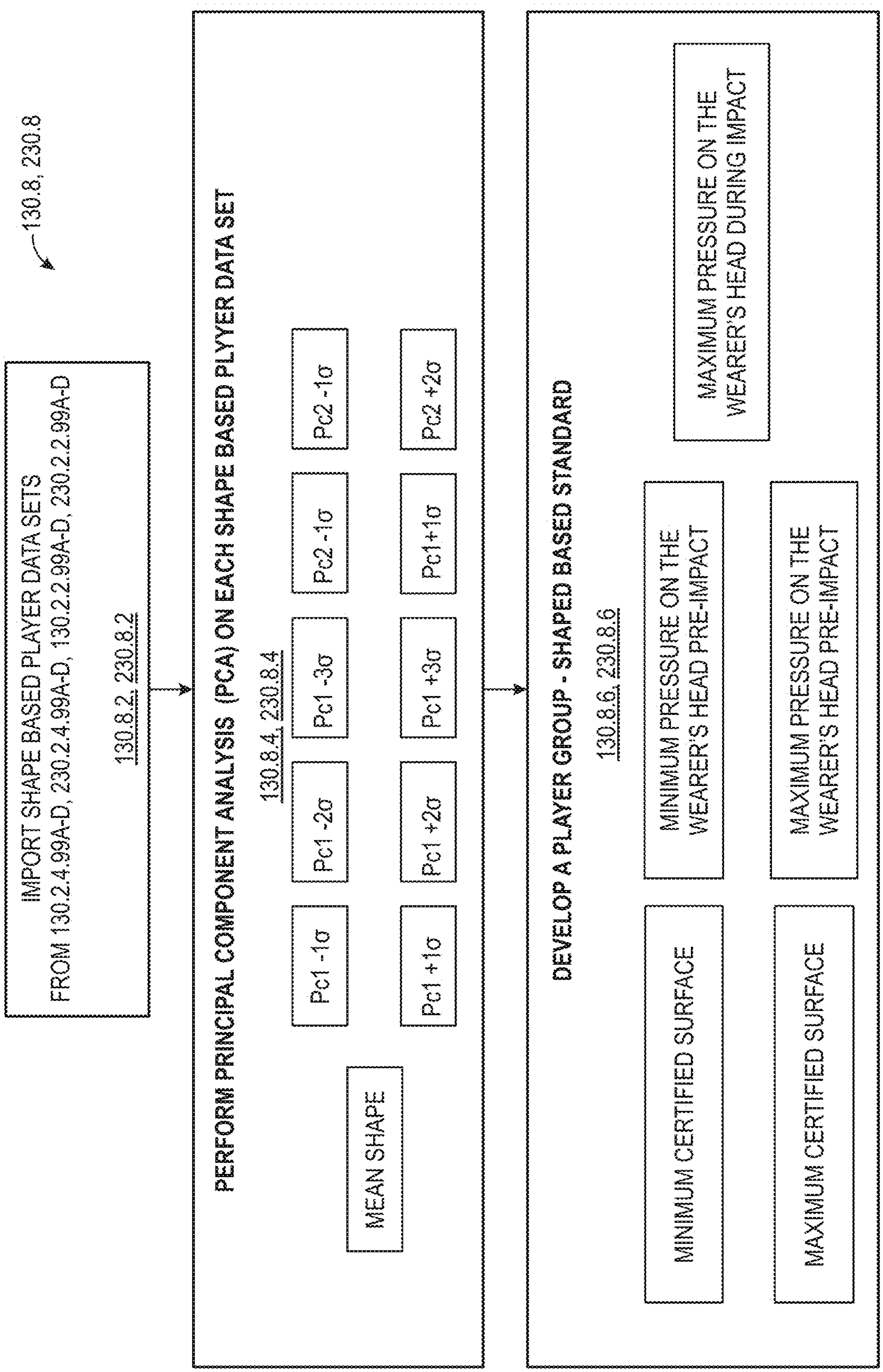
FIG. 23 is a flow chart showing a process for developing a player-group shape based standard.

Referring back to FIG. 16, once the shape based player data sets 130.2.2.99*a-d*, 230.2.2.99*a-d*, 130.2.4.99*a-d*, 230.2.4.99*a-d* are generated in step 130.2, a player group-shape based standard 130.8.99, 230.8.99 is created in step 130.8. Additional details about the development of this standard are disclosed within FIG. 23. Now referring to FIG. 23, the creation of a player group-shape based standard 130.8.99, 230.8.99 starts with the importation of the shape based player data sets 130.2.2.99*a-d*, 230.2.2.99*a-d*, 130.2.4.99*a-d*, 230.2.4.99*a-d* in step 130.8.2, 230.8.2. Next, PCA is performed on each data set in step 130.8.4, 230.8.4. Examples of the categories of information that may be determined from this analysis are shown in FIG. 23. From the PCA analysis, a player group-shape based standard 130.8.99, 230.8.99 is created. Exemplary aspects of this standard are shown on the electronic device 10 in FIG. 25. For example, the player group-shape based standard 130.8.99, 230.8.99 may include a mean surface 130.8.99.2, 230.8.99.2, a minimum surface 130.8.99.4, 230.8.99.4, a maximum surface 130.8.99.6, 230.8.99.6, a minimum pressure on the player's head (e.g., 1 psi) 130.8.99.8, 230.8.99.8, and maximum pressure on the player's head (e.g., 10 psi) 130.8.99.10, 230.8.99.10. It should be understood that the player group-shaped based standard 130.8.99, 230.8.99 may include other aspects that are not shown in FIGS. 23-24.

It should also be understood that there will be multiple player group-shape based standards 130.8.99, 230.8.99 because one is created for each shape based data set 130.2.2.99*a-d*, 230.2.2.99*a-d*, 130.2.4.99*a-d*, 230.2.4.99*a-d*. Based on the exemplary embodiment of the shape based player data sets 130.2.2.99*a-d*, 230.2.2.99*a-d*, 130.2.4.99*a-d*, 230.2.4.99*a-d* shown in FIG. 22, there would be: (i) for all helmet there, will be seven player group-shape based standards 130.8.99, 230.8.99, (ii) for the position specific helmets there, will be 18 player group-shape based standards 130.8.99, 230.8.99, (iii) for the level specific helmets, there will be 11 player group-shape based standards 130.8.99, 230.8.99, and (iv) for the position and level specific helmets, there will be 24 player group-shape based standards 130.8.99, 230.8.99. A specific example of a player group-shape based standard 130.8.99, 230.8.99 is for a first size (e.g., small) varsity lineman. These player group-shape based standards 130.8.99, 230.8.99 will later be used to ensure that the proper helmets are selected for each player. For example, if an outer surface of the head model of a player does not extend through the minimum surface, then that player will be moved to a smaller player group-shape based standard. Likewise, if an outer surface of the head model of a player extends through the maximum surface, then that player will be moved to a smaller player group-shape based standard.

iii. Create Generic Digital Headform

Referring back to FIG. 16, while the player group-shape based standard 130.8.99, 230.8.99 is developed in step 130.8, a generic digital headform 130.10.99, 230.10.99, 330.10.99 that includes mechanical properties of the headform is created in step 130.10. Additional details about the development of this generic digital headform 130.10.99, 230.10.99, 330.10.99 are disclosed within FIG. 25. Now referring to FIG. 25, the generic digital headform 130.10.99, 230.10.99, 330.10.99 may be created based upon any information or combination of information contained within the following data sources: (i) physical testing of the hybrid III headform (e.g., tensile test, compression test, elongation test, stress-strain curves, ASTM D3574, ISO 3386, ISO 2439, ISO 1798, ISO 8067, ASTM D638, ISO 37, ASTM D395, and other similar test) 130.10.2, 230.10.2, 330.10.2, (ii) physical testing of cadavers 130.10.4, 230.10.4, 330.10.4, (iii) finite element model for hybrid III headform 130.10.6, 230.10.6, 330.10.6, (iv) finite element model of a human head 130.10.8, 230.10.8, 330.10.8, (v) alternative physical property data (3rd party databases (e.g., NFL, NCAA, NOCSAE, or etc.)) 130.10.10, 230.10.10, 330.10.10, or (vi) any other known data source. It should be understood that the generic digital headform 130.10.99, 230.10.99, 330.10.99 may be created in the form of a finite element model or any other digital model that contains mechanical properties and shape information that can be used later in the digital testing of digital helmet models.

iv. Create Digital Headform Prototypes

Figure 26A:
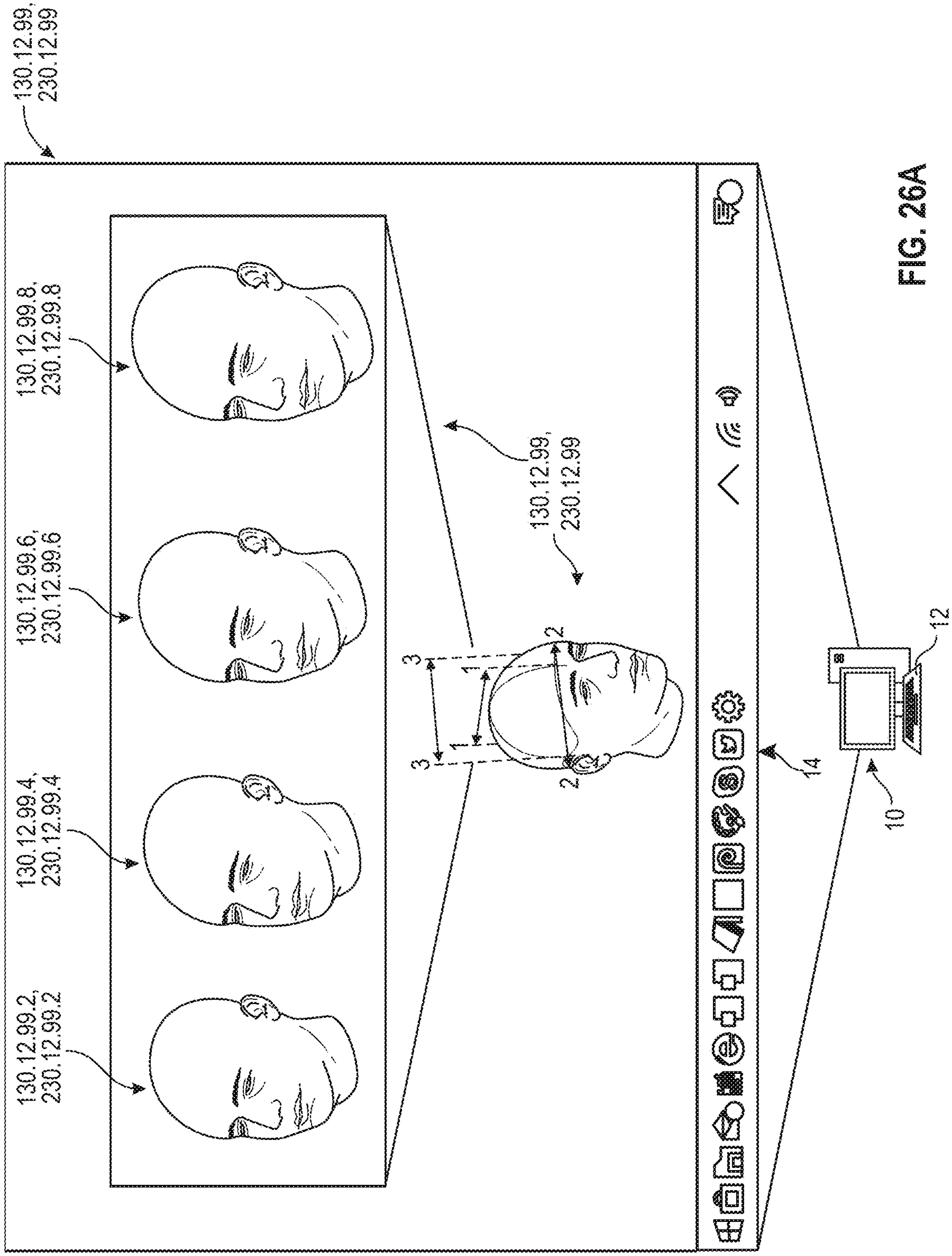
FIG. 26 shows the electronic device displaying four exemplary 3D digital headform prototypes along with cross-sections of these prototypes taken along the 1-1, 2-2, and 3-3 lines shown in FIG. 26.
Figure 26B:
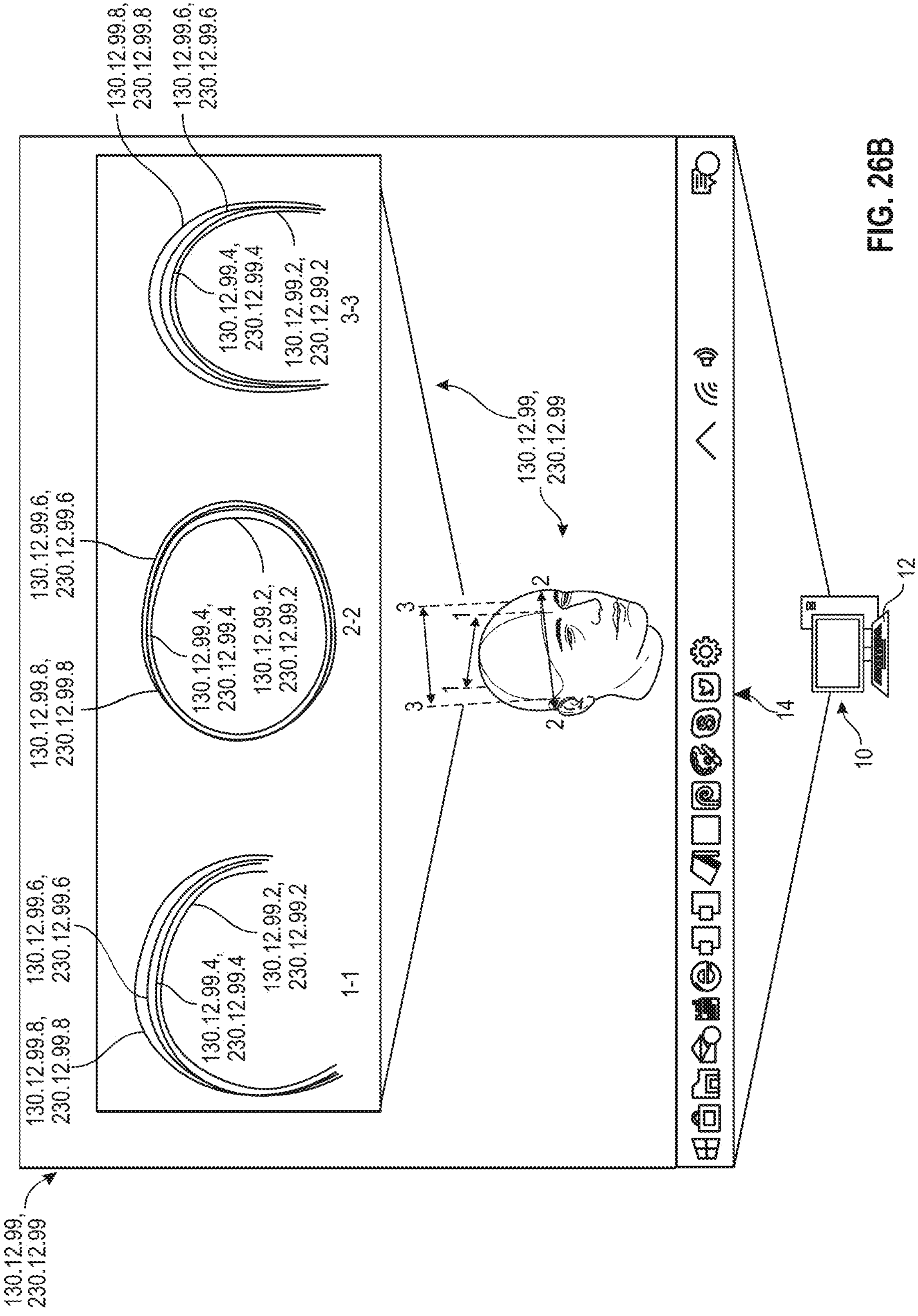

Referring back to FIG. 16, a digital headform prototype 130.12.99, 230.12.99 is created in step 130.12 based upon the generic digital headform 130.10.99, 230.10.99, 330.10.99 was created in step 130.10 and the player group-shape based standard 130.8.99, 230.8.99 was developed in step 130.8. To create this digital headform prototype 130.12.99, 230.12.99, the outer shape of the generic digital headform 130.10.99, 230.10.99, 330.10.99 is modified to match the mean shape of the player group-shape based standard 130.8.99, 230.8.99. The mechanical properties of the digital headform prototype 130.12.99, 230.12.99 may be modified based on this shape change. Typically, the changes to the mechanical properties based on the shape change are minimal and may not be done. FIG. 26 shows four 3D exemplary digital headform prototype 130.12.99, 230.12.99 that were derived from the mean head shapes 130.8.99.2, 230.8.99.2 of the four shape based player data sets 130.2.2.99*a-d*, 230.2.2.99*a-d*, 130.2.4.99*a-d*, 230.2.4.99*a-d*. Specifically, the four exemplary digital headform prototype 130.12.99, 230.12.99 include a small 130.12.99.2, 230.12.99.2, a medium 130.12.99.4, 230.12.99.4, large 130.12.99.6, 230.12.99.6, and extra-large 130.12.99.8, 230.12.99.8. In addition, cross-sections of each digital headform prototype 130.12.99, 230.12.99, which are taken along the 1-1, 2-2, and 3-3 are shown in FIG. 26. The small 130.12.99.2, 230.12.99.2 is shown in purple, the medium 130.12.99.4, 230.12.99.4 is shown in blue, the large 130.12.99.6, 230.12.99.6 is shown in green, and the extra-large 130.12.99.8, 230.12.99.8 is shown in yellow-orange. Overall, from these cross-sections, it can be seen that the overall circumference shown in 2-2 does not change as much as the elevation in the crown of the head shown in 1-1 and 3-3. Thus, the use of these digital headform prototype 130.12.99, 230.12.99 creates a more accurate representation of the distribution of the head shapes across the selected population of players.

It should be understood that the creation of the digital headform prototype 130.12.99, 230.12.99 using a different method is contemplated by this disclosure. For example, the digital headform prototype 130.12.99, 230.12.99 may be created by modifying the outer shape of the generic digital headform 130.10.99, 230.10.99, 330.10.99 to match the median shape of the player group-shape based standard 130.8.99, 230.8.99, or the shape of one of the PCs that was used to create the group-shape based standard 130.8.99, 230.8.99. It should also be understood that the digital headform prototype 130.12.99, 230.12.99 may be created in the form of a finite element model or any other digital model that contains mechanical properties and shape information that can be used later in the digital testing of digital helmet models. It should also be understood that there will be multiple digital headform prototypes 130.12.99, 230.12.99 because one is created for each shape based data set 130.2.2.99*a-d*, 230.2.2.99*a-d*, 130.2.4.99*a-d*, 230.2.4.99*a-d*. Based on the exemplary embodiment of the shape based player data sets shown in FIG. 22, there would be: (i) for all helmets, there will be 7 digital headform prototypes 130.12.99, 230.12.99, (ii) for the position specific helmets, there will be 18 digital headform prototypes 130.12.99, 230.12.99, (iii) for the level specific helmets, there will be 11 digital headform prototypes 130.12.99, 230.12.99, and (iv) for the position and level specific helmets, there will be 24 digital headform prototypes 130.12.99, 230.12.99.

v. Create Generic Digital Helmet

Referring back to FIG. 16, a generic digital helmet 130.14.99, 230.14.99, 330.14.99 that includes mechanical properties of the helmet is created in step 130.14. Additional details about the development of this generic digital helmet 130.14.99, 230.14.99, 330.14.99 are disclosed within FIG. 27. Now referring to FIG. 27, a generic digital helmet 130.14.99, 230.14.99, 330.14.99 may be created based upon any information or combination of information that is contained within the following data sources: (i) physical testing of the individual helmet components (e.g., tensile test, compression test, elongation test, stress-strain curves, ASTM D3574, ISO 3386, ISO 2439, ISO 1798, ISO 8067, ASTM D638, ISO 37, ASTM D395, and other similar test) 130.14.2, 230.14.2, 330.14.2, (ii) physical testing of a combination of helmet components (e.g., linear impactor, drop tester, pendulum tester) 130.14.4, 230.14.4, 330.14.4, (iii) finite element model for individual helmet components 130.14.6, 230.14.6, 330.14.6, (iv) finite element model for a combination of helmet components 130.14.8, 230.14.8, 330.14.8, (v) alternative physical property data (3rd party databases (e.g., NFL, NCAA, NOCSAE, or etc.)) 130.14.10, 230.14.10, 330.14.10, or (vi) any other known data sources. It should be understood that the generic digital helmet 130.14.99, 230.14.99, 330.14.99 may be created in the form of a finite element model or any other digital model that contains mechanical properties and shape information that can be used later in the digital testing.

Figure 27:
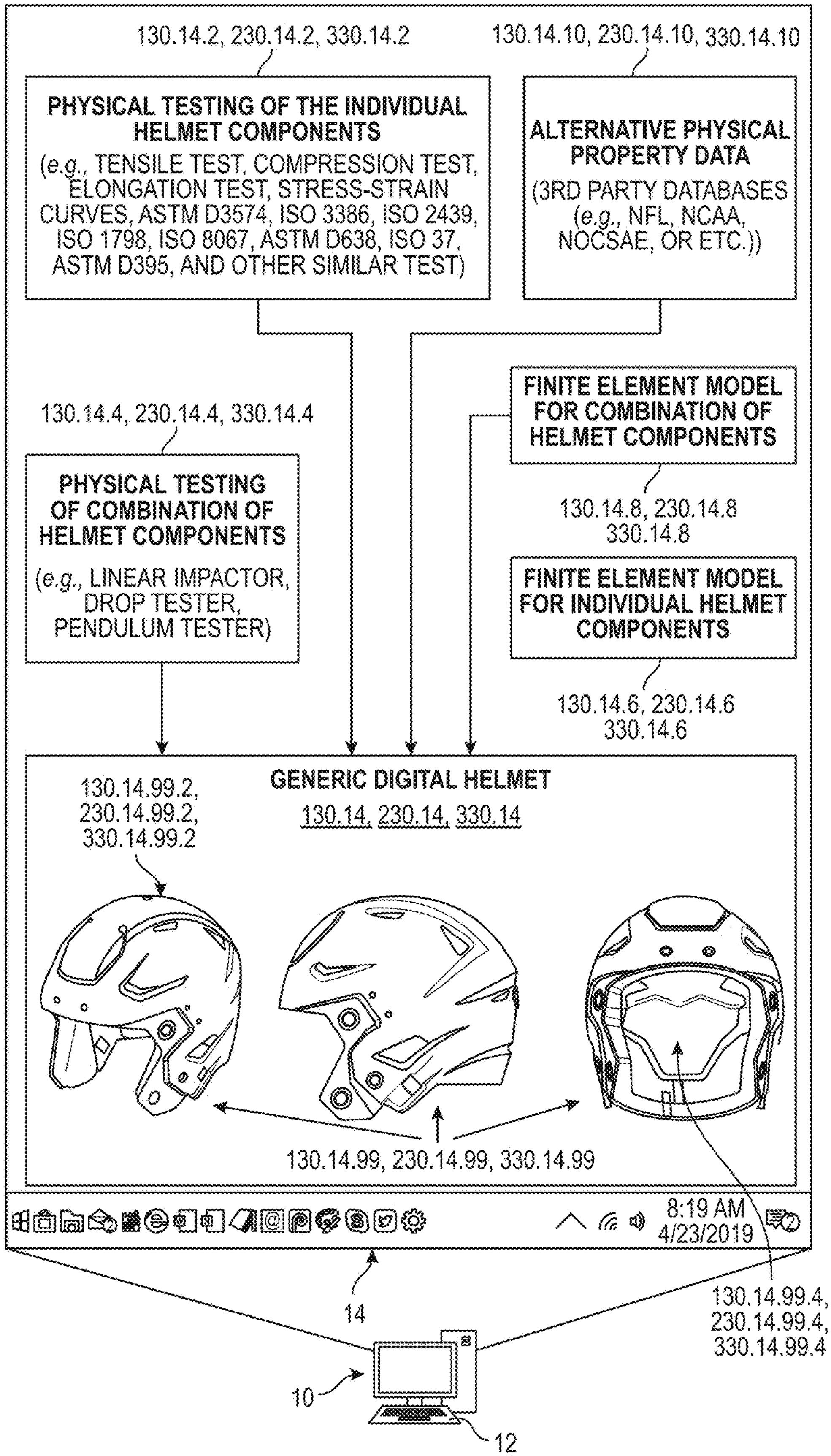
FIG. 27 shows the electronic device displaying a plurality of inputs for the creation of a generic digital helmet and multiple views of a 3D rendering of said helmet.

While only the outer shell 130.14.99.2, 230.14.99.2, 330.14.99.2 and the energy attenuation assembly 130.14.99.4, 230.14.99.4, 330.14.99.4 are displayed in the exemplary generic digital helmet 130.14.99, 230.14.99, 330.14.99 contained within FIG. 27, it should be understood that the generic digital helmets 130.14.99, 230.14.99, 330.14.99 may include other components, such as a facemask and/or chin strap. Also, it should be understood that the starting point for determining the mechanical properties of the helmet, including the mechanical properties of the shell, are set forth by this generic digital helmet 130.14.99, 230.14.99, 330.14.99. Thus, the designer should take this into consideration when selecting and/or creating the generic digital helmet 130.14.99, 230.14.99, 330.14.99. For example, the designer may select an outer shell 130.14.99.2, 230.14.99.2, 330.14.99.2 that: (i) is rigid (e.g., an exemplary disclosure of this helmet is contained within U.S. Pat. No. 9,289,024 and is commercially embodied by Riddell's 360® helmet), (ii) is rigid and contains one or multiple impact attenuation system (e.g., an exemplary disclosure of this is contained within U.S. Pat. No. 9,314,063 and is commercially embodied by Riddell's SpeedFlex® helmet), (iii) is rigid and contains energy absorbing panels on the exterior of the helmet, (iv) is flexible (e.g., 2016 Vicis Zerol® helmet may be an exemplary commercial embodiment), (v) has regions or zones of varying flexibility or rigidity, or (vi) is semi-flexible (e.g., a shell that has mechanical properties that are between Riddell's 360® helmet and the 2016 Vicis Zerol® helmet).

Also, while a protective football helmet is shown and discussed here, it should be understood that other types of generic helmets (e.g., helmets for baseball, cyclist, motorcycle riders, skaters, skiers, or etc.) that contain different features may be used instead of the protective football helmet. The use of a different type of generic helmet at this stage will allow for the manufacturing of a different type of helmet in the later stages of this process. In particular, a generic helmet for a cyclist may include a decorative outer shell or may not include an outer shell at all. In another example, a baseball helmet may not include a chin strap.

vi. Generate Data Set Specific Helmet

Figure 28A:
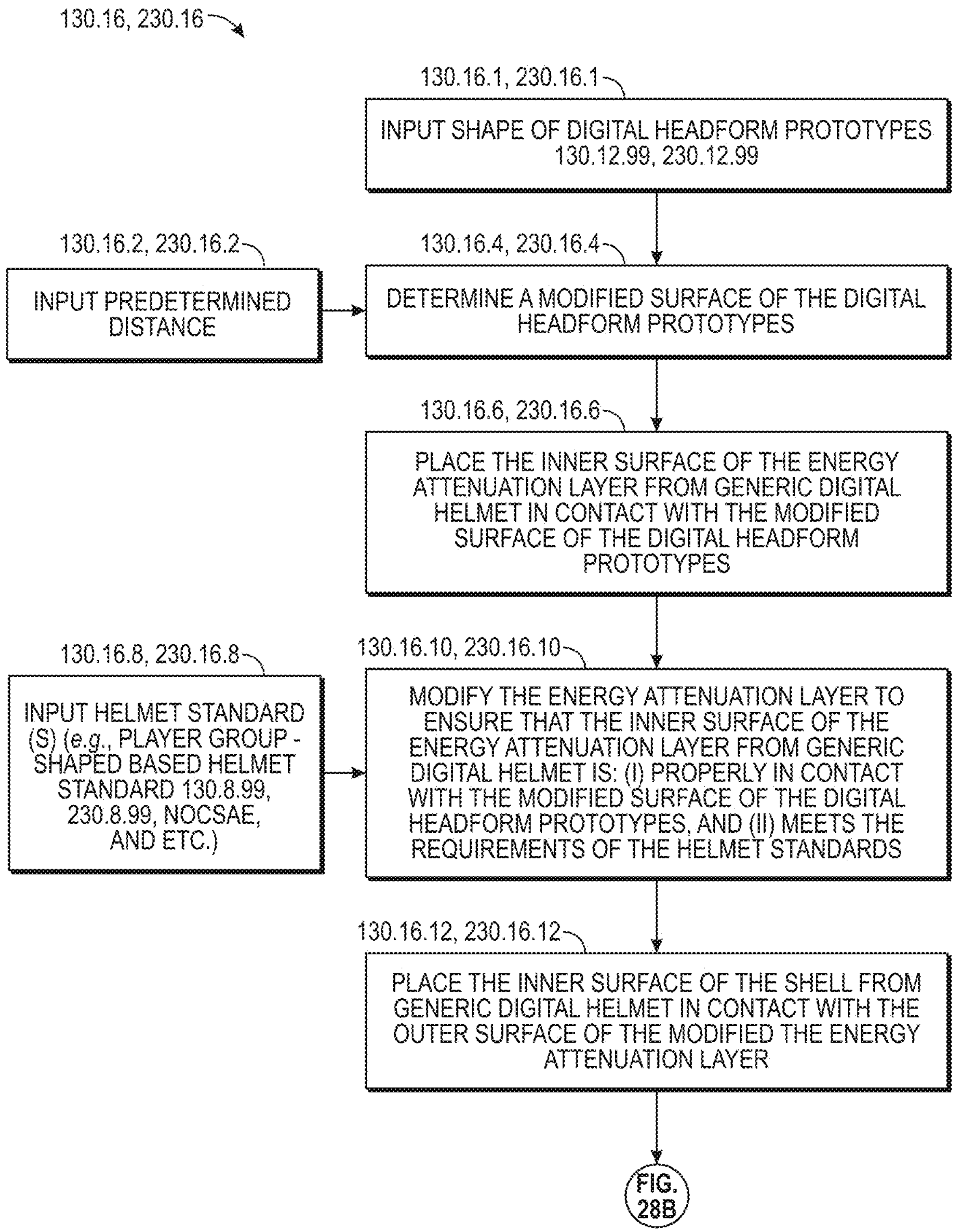
FIGS. 28A-B are flow charts showing a process for creating player data set specific helmets based on the digital headform prototypes from FIG. 23 and generic digital helmet from FIG. 27.
Figure 28B:
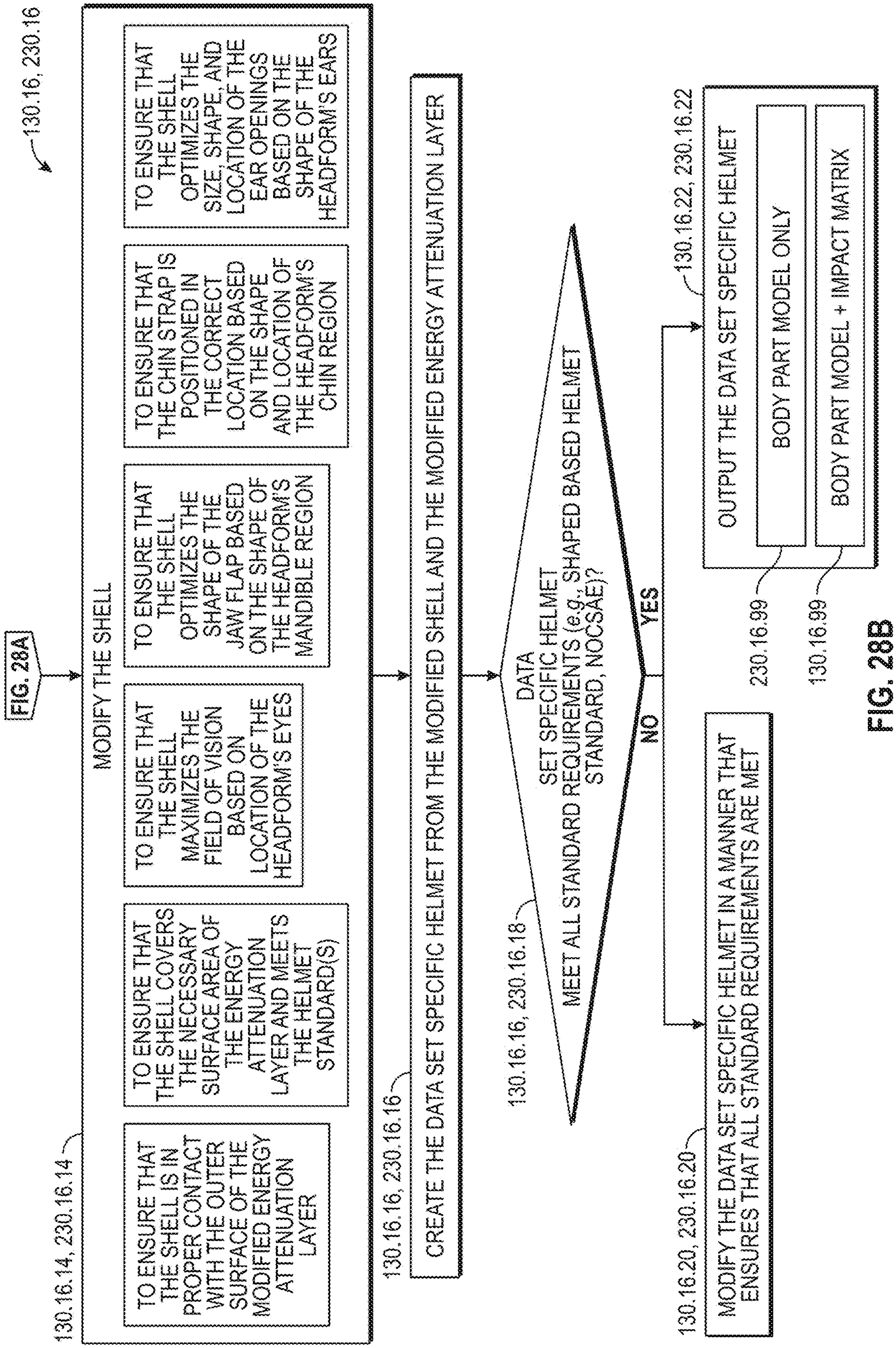
Figure 29:
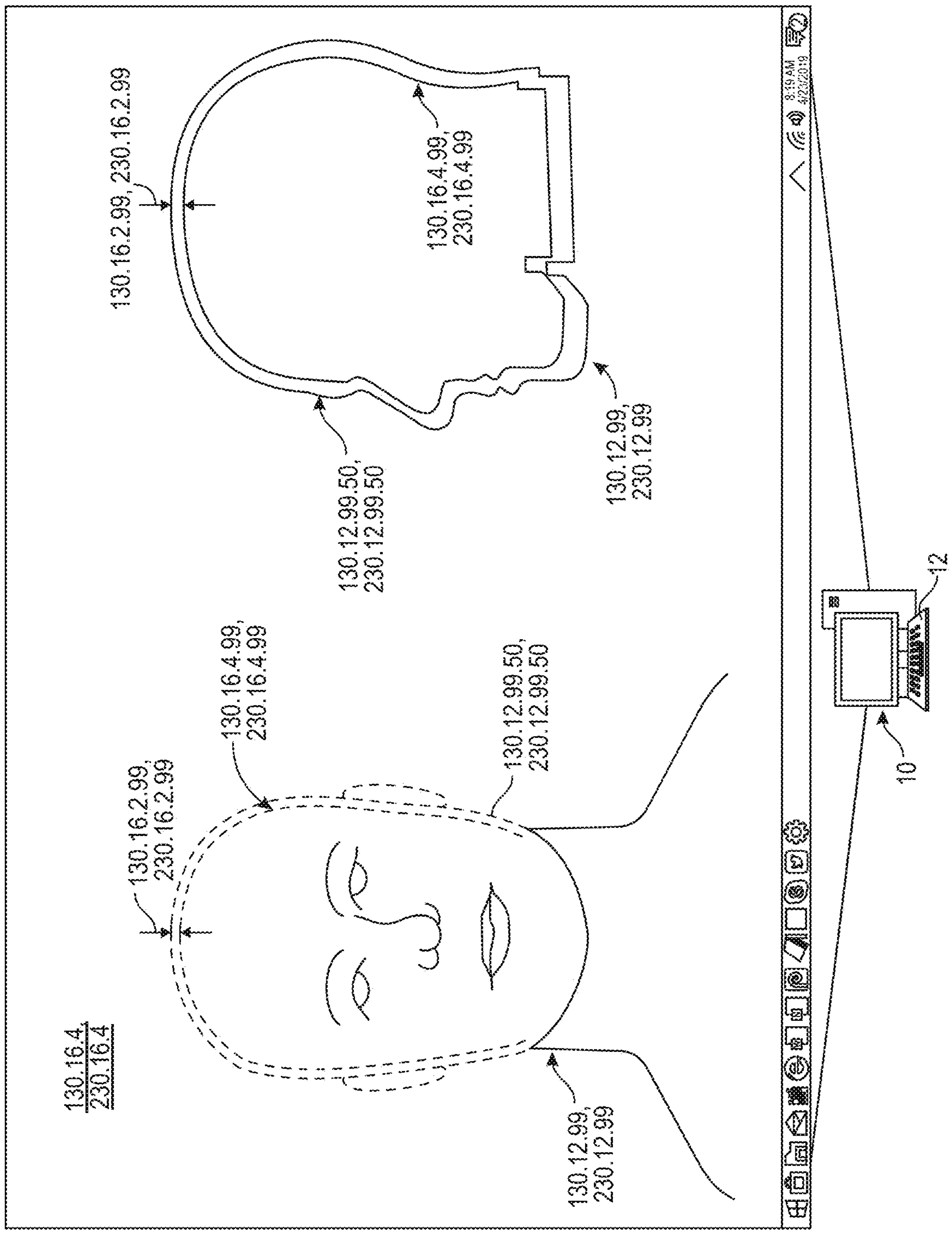
FIG. 29 shows the electronic device displaying a headform having a modified surface.

Referring back to FIG. 16, a data set specific helmets 130.16.99, 230.16.99 are generated in step 130.16 based upon the digital headform prototypes 130.12.99, 230.12.99 that were created in step 130.12 and the generic digital helmets 130.14.99, 230.14.99, 330.14.99 that were created in step 130.14. Additional details about the development of these data set specific helmets 130.16.99, 230.16.99 are disclosed within FIGS. 28a-28b. Now referring to FIG. 28a, the generation of the data set specific helmets 130.16.99, 230.16.99 starts with the importation of the digital headform prototypes 130.12.99, 230.12.99 in step 130.16.1, 230.16.1. Next, the designer inputs a predetermined distance 130.16.2, 230.16.2 in step 130.16.2, 230.16.2, which is utilized to modify the outer surface 130.12.99.50, 230.12.99.50 of the digital headform prototypes 130.12.99, 230.12.99. A graphical example of this modification is shown in FIG. 29, where the designer moved the outer surface 130.12.99.50, 230.12.99.50 of the digital headform prototypes 130.12.99, 230.12.99 inward a predetermined distance 130.16.2.99, 230.16.2.99 to inset the modified surface 130.16.4.99, 230.16.4.99. In other words, the designer created the modified surface 130.16.4.99, 230.16.4.99 by "insetting" or moving inward the outer surface 130.12.99.50, 230.12.99.50 a predetermined distance 130.16.2.99, 230.16.2.99, where this inset provides appreciable benefits, including creating an interference fit between at least the minimum surface 130.8.99.4, 230.8.99.4 and inner surface 130.16.10.99a, 230.16.10.99a of the modified energy attenuation layer 130.16.10.99, as discussed below. It should be understood that the predetermined distance 130.16.2.99, 230.16.2.99 may be: (i) a positive value, which insets the outer surface, (ii) zero, which does not alter the outer surface, or (iii) a negative value, which expands the outer surface.

Figure 30:
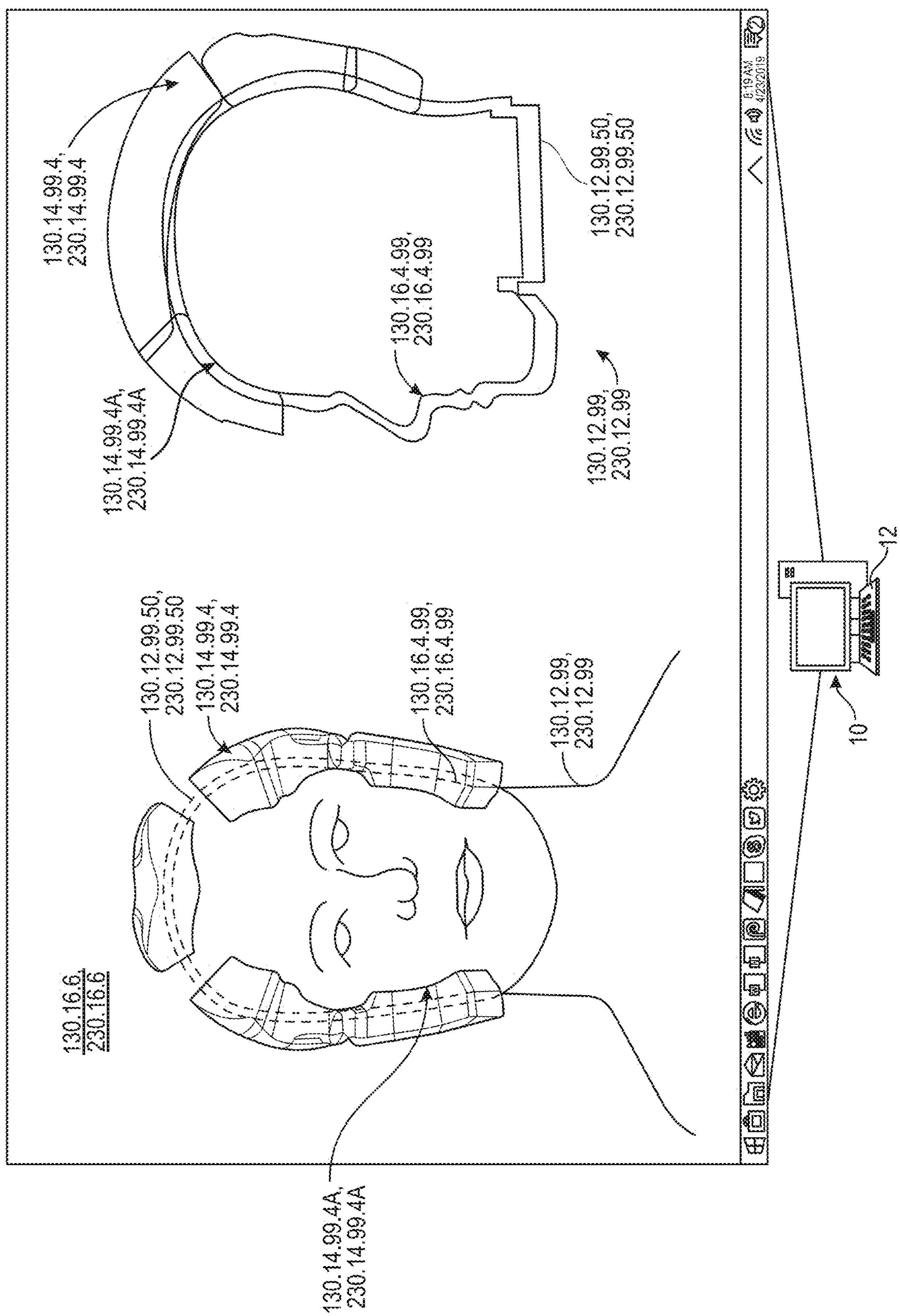
FIG. 30 shows the electronic device displaying the headform from FIG. 29 along with a plurality of energy attenuation members that are placed on the headform from FIG. 30.
Figure 31:
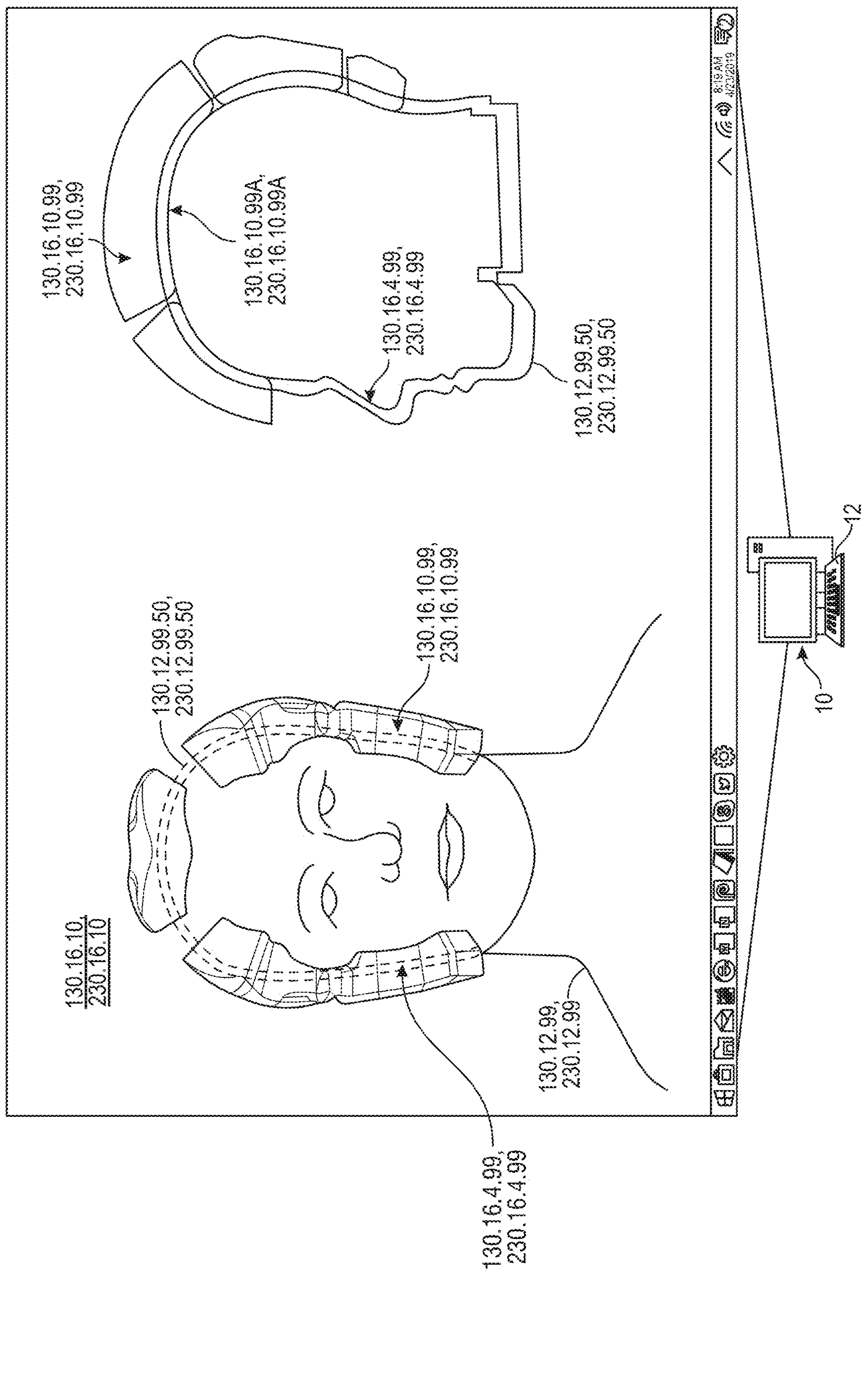
FIG. 31 shows the electronic device displaying the headform from FIG. 30 along with a plurality of modified energy attenuation members that are placed on the headform from FIG. 30.

Referring back to FIG. 28a, after the modified surface 130.16.4.99, 230.16.4.99 is created in step 130.16.4, 230.16.4, an inner surface 130.14.99.4a, 230.14.99.4a of the energy attenuation layer 130.14.99.4, 230.14.99.4 from the generic digital helmet 130.14.99, 230.14.99 is placed in contact with the modified surface 130.16.4.99, 230.16.4.99 of the digital headform prototype 130.12.99, 230.12.99. As shown by the graphical example in FIG. 30, simply placing inner surface 130.14.99.4a, 230.14.99.4a of the energy attenuation layer 130.14.99.4, 230.14.99.4 in contact with the modified surface 130.16.4.99, 230.16.4.99 forces energy attenuation members of the energy attenuation layer 130.14.99.4, 230.14.99.4 to overlap with one another. Thus, the energy attenuation layer 130.14.99.4, 230.14.99.4 needs to be modified to remove these issues, ensure that it is in proper contact with the modified surface 130.16.4.99, 230.16.4.99, and meets the requirements of the helmet standard(s) (e.g., player group-shaped based helmet standard 130.8.99, 230.8.99, NOCSAE, and etc.). This modification occurs in step 130.16.10, 230.16.10 and utilizes the helmet standard(s) that are inputted in step 130.16.8, 230.16.8 to create the modified energy attenuation layer 130.16.10.99, 230.16.10.99. A graphical example of this is shown in FIG. 31.

Figure 32:
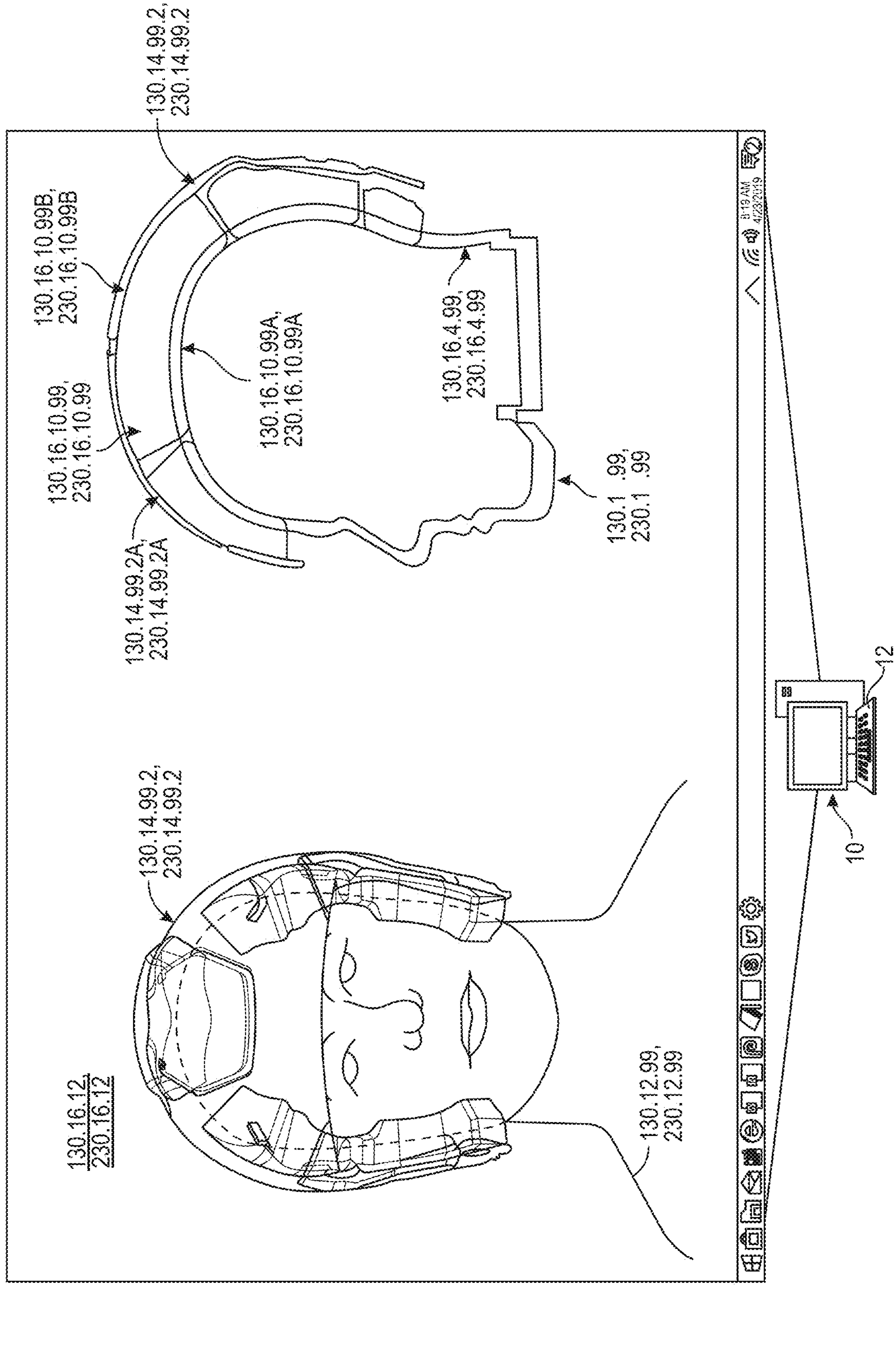
FIG. 32 shows the electronic device displaying a shell that is positioned adjacent to modified energy attenuation members from FIG. 31.

Referring back to FIG. 28a, after the modified energy attenuation layer 130.16.10.99, 230.16.10.99 is created in step 130.16.10, 230.16.10, an inner surface 130.14.99.2a, 230.14.99.2a of the outer shell 130.14.99.2, 230.14.99.2 of the generic digital helmet 130.14.99, 230.14.99 is placed in contact with an outer surface 130.16.10.99b, 230.16.10.99b of the modified energy attenuation layer 130.16.10.99, 230.16.10.99 in step 130.16.12, 230.16.12. As shown by the graphical example in FIG. 32, simply placing inner surface 130.14.99.2a, 230.14.99.2a of the outer shell 130.14.99.2, 230.14.99.2 in contact with the outer surface 130.16.10.99b, 230.16.10.99b of the modified energy attenuation layer 130.16.10.99, 230.16.10.99 does not work because there are gaps between the energy attenuation layer 130.16.10.99,

230.16.10.99 and outer shell 130.14.99.2, 230.14.99.2. Thus, the outer shell 130.14.99.2, 230.14.99.2 needs to be modified to remove these and other issues. This modification occurs in step 130.16.14, 230.16.14.

Figure 33:
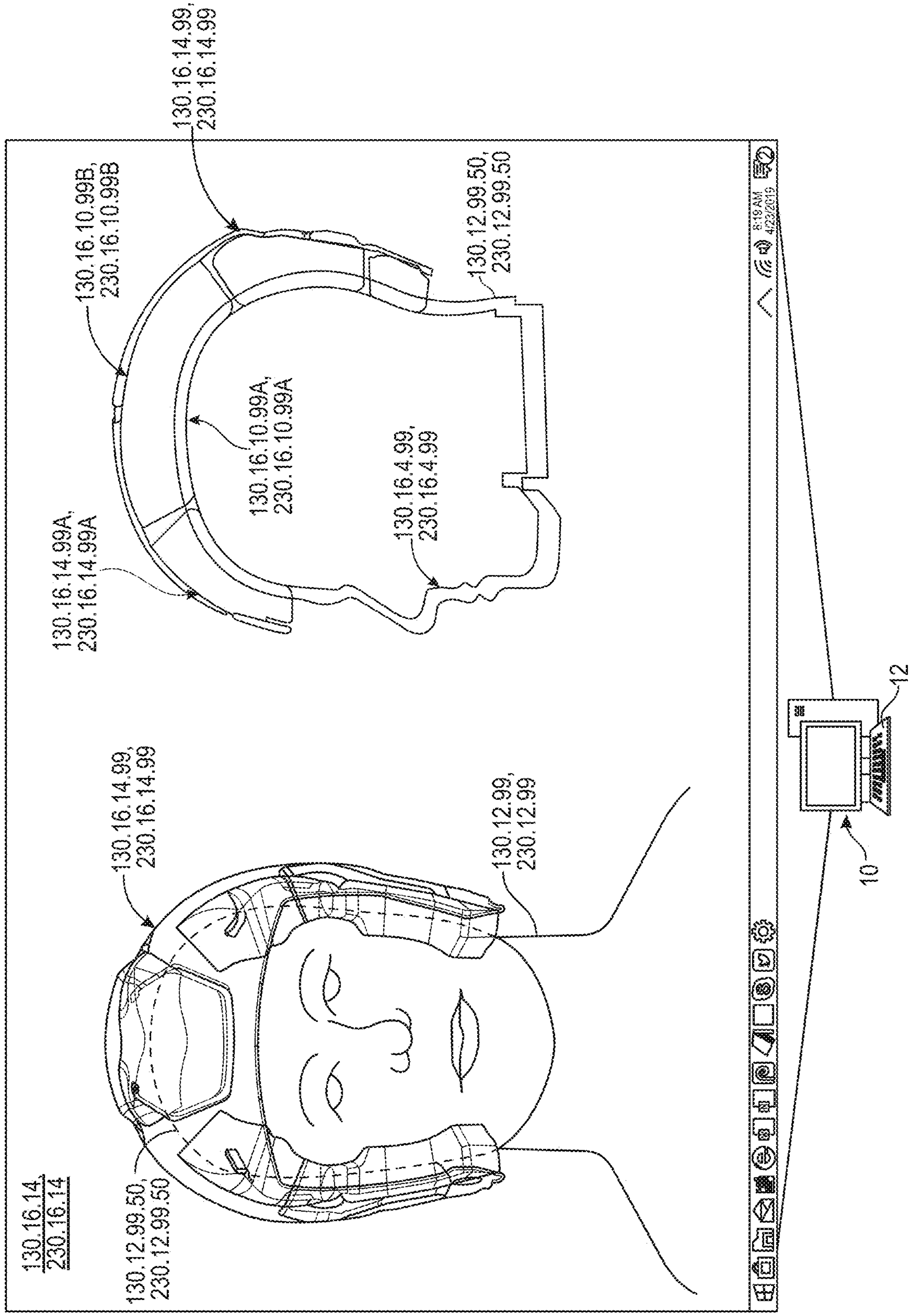
FIG. 33 shows the electronic device displaying a modified shell that is positioned adjacent to the modified energy attenuation members from FIG. 31.

Referring back to FIG. 28*b*, the modification of the outer shell 130.14.99.2, 230.14.99.2 may include modifying it to: (i) to ensure that the outer shell 130.14.99.2, 230.14.99.2 is in proper contact with the outer surface 130.16.10.99*b*, 230.16.10.99*b* of the modified energy attenuation layer 130.16.10.99, 230.16.10.99, (ii) to ensure that the outer shell 130.14.99.2, 230.14.99.2 covers the necessary surface area of the modified energy attenuation layer 130.16.10.99, 230.16.10.99 and meets the helmet standard(s) (e.g., player group-shaped based helmet standard 130.8.99, 230.8.99, NOCSAE, and etc.), (iii) to ensure that the outer shell 130.14.99.2, 230.14.99.2 maximizes the field of vision based on location of the digital headform prototype's eyes, (iv) to ensure that the outer shell 130.14.99.2, 230.14.99.2 optimizes the shape of the jaw flap based on the shape of the digital headform prototype's mandible region, (v) to ensure that the chin strap is positioned in the correct location based on the shape and location of the digital headform prototype's chin region, or (vi) to ensure that the outer shell 130.14.99.2, 230.14.99.2 optimizes the size, shape, and location of the ear openings based on the shape of the digital headform prototype's ears. A graphical example of the modified outer shell 130.16.14.99, 230.16.14.99 is shown in FIG. 33, where an inner surface 130.16.14.99*a*, 230.16.14.99*a* of the modified outer shell 130.16.14.99, 230.16.14.99 is shown in proper contact with the outer surface 130.16.10.99*b*, 230.16.10.99*b* of the modified energy attenuation layer 130.16.10.99, 230.16.10.99. In comparing the graphical example of the outer shell 130.14.99.2, 230.14.99.2 shown in FIG. 32 to the graphical example of the modified outer shell 130.16.14.99, 230.16.14.99 shown in FIG. 33, one noticeable difference is that the lowermost edge of the shell was raised to maximize the field of vision.

Figure 34A:
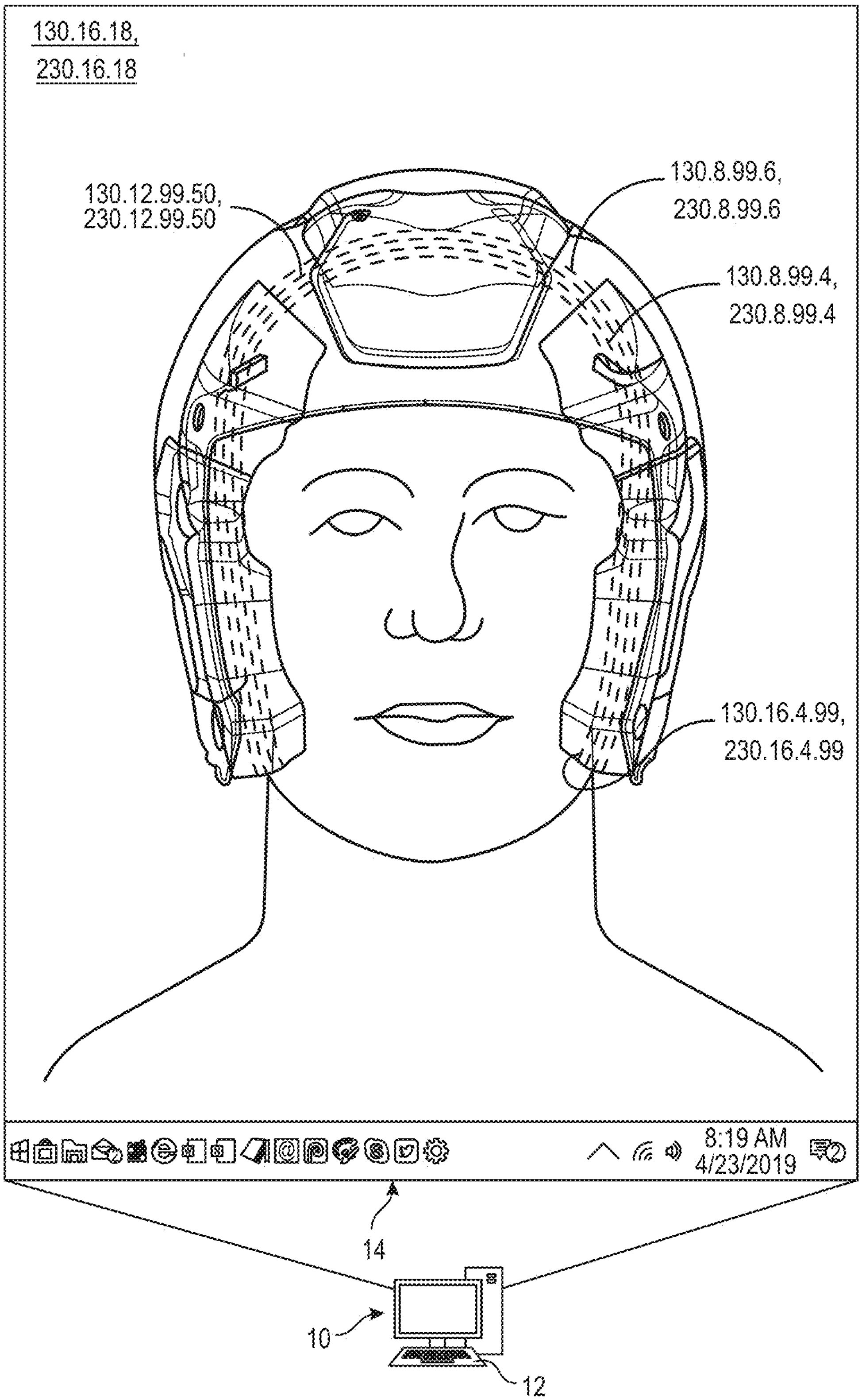
FIG. 34 shows the electronic device displaying a portion of the player-group shape based standard, modified shell positioned adjacent the headform, and the plurality of modified energy attenuation members.
Figure 34B:
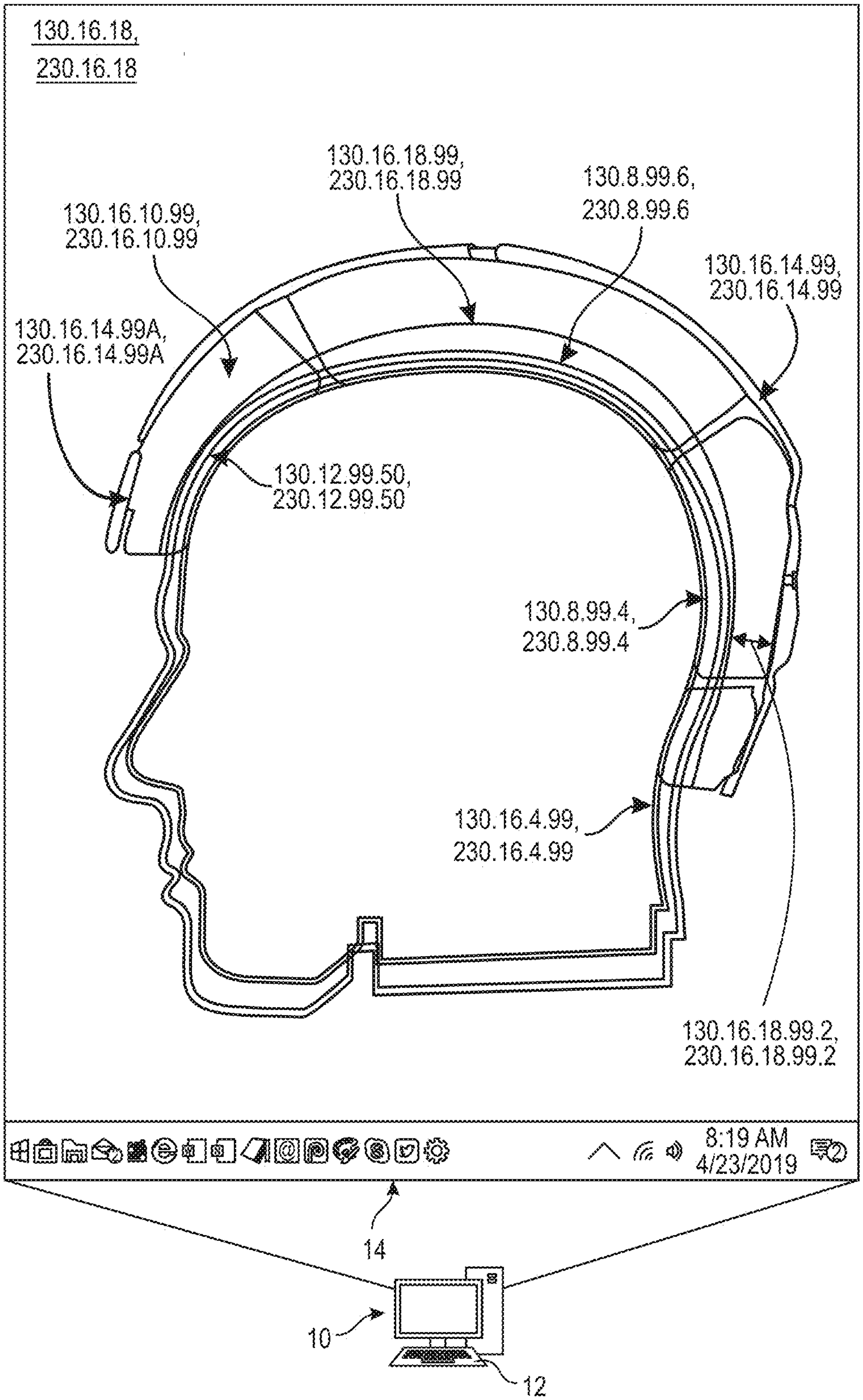

Referring back to FIG. 28*b*, the data set specific helmet 130.16.99, 230.16.99 is created from the modified outer shell 130.16.14.99, 230.16.14.99 and the modified energy attenuation layer 130.16.10.99, 230.16.10.99 in step 130.16.16, 230.16.16. It should be understood that the modification of the outer shell and the energy attenuation layer may require the modification of other helmet components, such as the facemask 130.14.99.6, 230.14.99.6, 330.14.99.6 and/or chin strap 130.14.99.8, 230.14.99.8, 330.14.99.8. If such modification is required, then these modifications will occur within this step. Next, in step 130.16.18, 230.16.18, the data set specific helmet is analyzed to ensure that it meets all of the helmet standard(s) (e.g., player group-shaped based helmet standard 130.8.99, 230.8.99, NOCSAE, and etc.). A graphical example of this is shown in FIG. 34.

In particular, the data set specific helmet 130.16.99, 230.16.99 is first compared against the minimum surface 130.8.99.4, 230.8.99.4 of the player group-shaped based helmet standard 130.8.99, 230.8.99 to ensure that the pressure exerted by the modified energy attenuation layer 130.16.10.99, 230.16.10.99 on this minimum surface 130.8.99.4, 230.8.99.4 is greater than the minimum pressure requirement in a pre-impact state 130.8.99.8, 230.8.99.8. If this pressure is too low, then an interference fit between the minimum surface 130.8.99.4, 230.8.99.4 and inner surface 130.16.10.99*a*, 230.16.10.99*a* of the modified energy attenuation layer 130.16.10.99, 230.16.10.99 will not be created and the data set specific helmet 130.16.99, 230.16.99 will fail this part of the standard. In other words, if a player has a head shape equal to the minimum surface and he/she tries to wear a helmet that fails this part of the standard, then there will not be sufficient compression of the modified energy attenuation layer 130.16.10.99, 230.16.10.99; the helmet would not properly fit the player because it would be too loose. Nevertheless, the graphical example shown in FIG. 34 meets this part of the player group-shaped based helmet standard 130.8.99, 230.8.99 because the modified energy attenuation layer 130.16.10.99, 230.16.10.99 will be pre-compressed a certain extent. This pre-compression results from the inset and creates an outwardly directed force (i.e., directed outward from the player's head towards the energy attenuation assembly and the helmet shell) that exceeds the minimum pressure requirement for this stage of the helmet 1000 formation. Specifically, this pre-compression can be seen in FIG. 34 by the fact that the minimum surface 130.8.99.4, 230.8.99.4 extends through the inner surface 130.16.10.99*a*, 230.16.10.99*a* of the modified energy attenuation layer 130.16.10.99, 230.16.10.99.

Next, the data set specific helmet 130.16.99, 230.16.99 is compared against the maximum surface 130.8.99.6, 230.8.99.6 of the player group-shaped based helmet standard 130.8.99, 230.8.99 to ensure that the pressure exerted by the modified energy attenuation layer 130.16.10.99, 230.16.10.99 on this maximum surface 130.8.99.6, 230.8.99.6 is less than the maximum pressure requirement in a pre-impact state 130.8.99.10, 230.8.99.10. If this pressure is too high, then the impact absorption of the modified energy attenuation layer 130.16.10.99, 230.16.10.99 will be compromised and the data set specific helmet 130.16.99, 230.16.99 will fail this part of the standard. In other words, if a player had a head shape equal to the maximum surface and they try to wear a helmet that fails this part of the standard; the helmet would not properly fit the player because it would be too tight. Nevertheless, the graphical example shown in FIG. 34 meets this part of the player group-shaped based helmet standard 130.8.99, 230.8.99 because the maximum surface 130.8.99.6, 230.8.99.6 does not extend past or through a minimum certified surface (MCS) 130.16.18.99, 230.16.18.99. In particular, the MCS 130.16.18.99, 230.16.18.99 is a reference surface defined by a collection of minimum distance values 130.16.18.99.2, 230.16.18.99.2 that extend inward from the inner surface 130.16.14.99*a*, 230.16.14.99*a* of the modified outer shell 130.16.14.99, 230.16.14.99. In other words, the MCS 130.16.18.99, 230.16.18.99 is satisfied when distances between the inner surface 130.16.14.99*a*, 230.16.14.99*a* of the modified outer shell 130.16.14.99, 230.16.14.99 and the maximum surface 130.8.99.6, 230.8.99.6 is equal to or greater than the minimum distance values 130.16.18.99.2, 230.16.18.99.2 for a particular shell size.

Referring back to FIG. 28*b*, if the data set specific helmet 130.16.99, 230.16.99 does not meet all of the standard requirements in step 130.16.18, 230.18.18, then the data set specific helmet is modified in step 130.16.20, 230.16.20 to ensure that it meets all of these standards. Once it is determined that the data set specific helmet 130.16.99, 230.16.99 meets all of these standards, then the data set specific helmet 130.16.99, 230.16.99 is outputted for use in the next steps in designing and manufacturing the helmet 1000. It should be understood that the data set specific helmet 130.16.99, 230.16.99 may take the form of a finite element model or any other digital model that contains mechanical properties and shape information that can be used later in the digital testing.

vii. Generate Optimized Data Set Specific Helmet

Figure 35A:
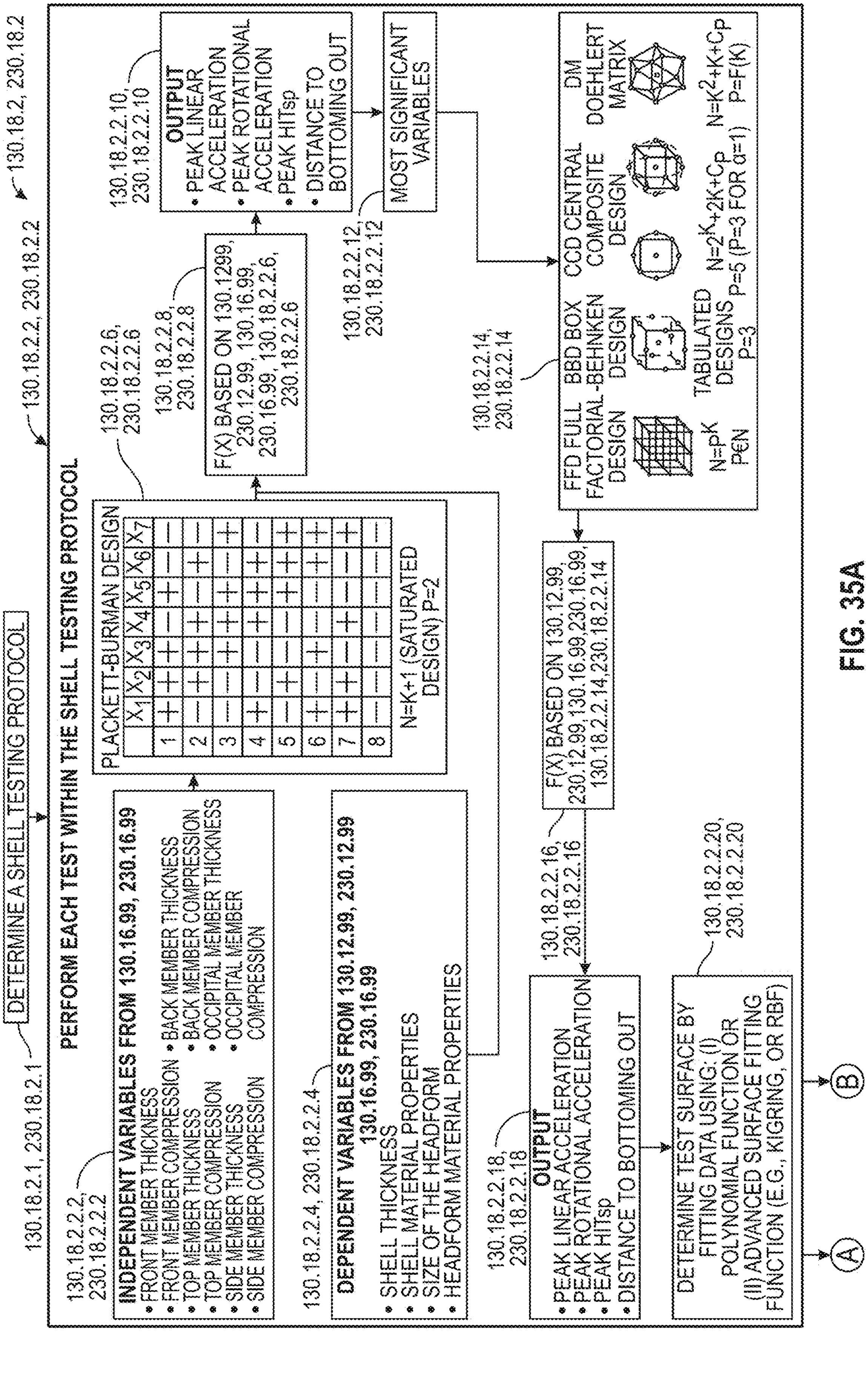
FIGS. 35A-B are flow charts showing a process of optimizing the player data set specific helmet using a response surface methodology.
Figure 35B:
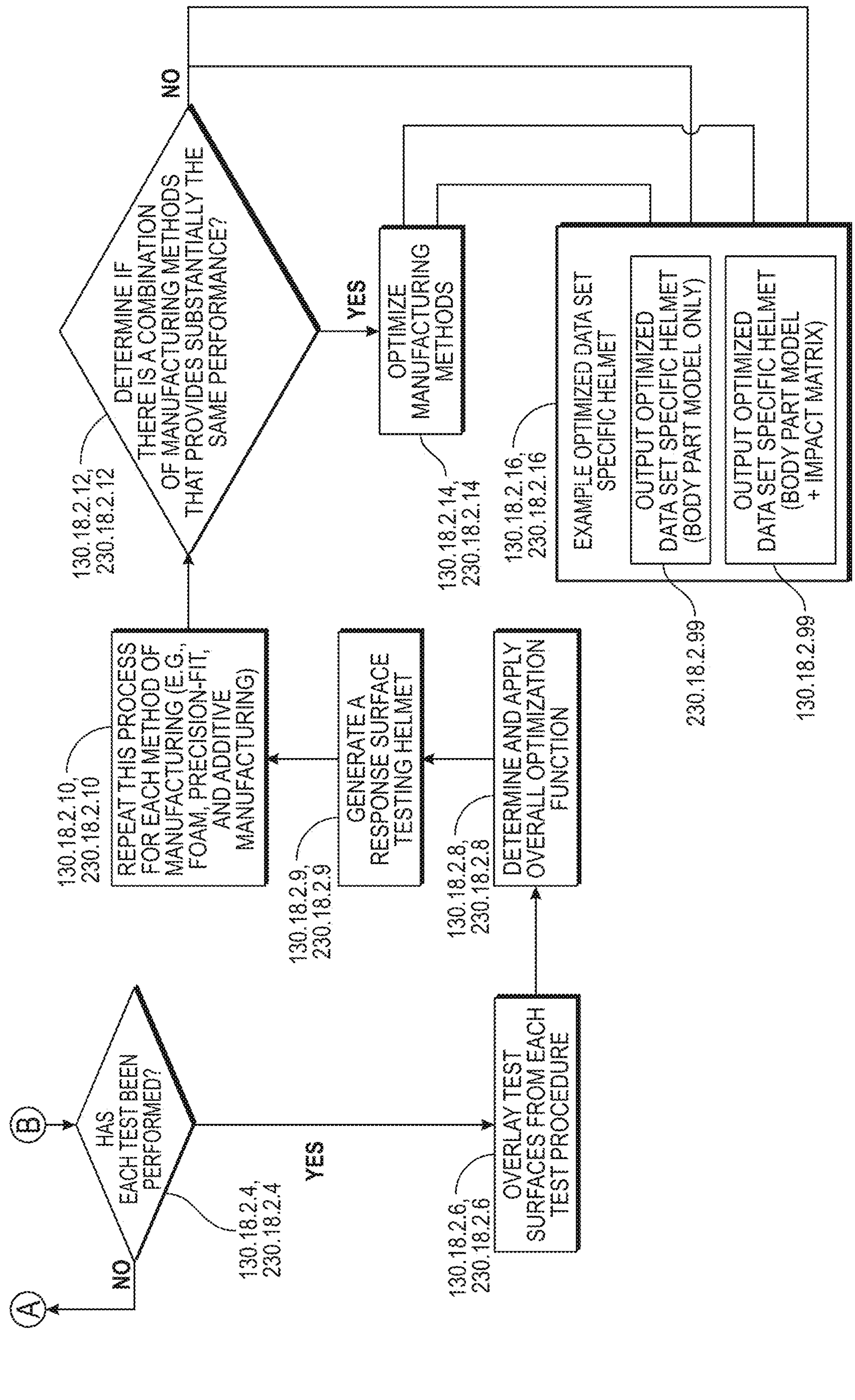

Referring back to FIG. 16, an optimized data set specific helmets 130.18.99, 230.18.99 is generated in step 130.18 based upon digital testing the data set specific helmets 130.16.99, 230.16.99 that were created in step 130.16. These optimized data set specific helmets 130.18.99, 230.18.99 may be created by using: (i) a response surface methodology 130.18.2, (ii) a brute force methodology 130.18.4, or (iii) another type of optimization methodology 130.18.6. Additional details about the generation of these optimized data set specific helmets 130.18.99, 230.18.99 using a response surface methodology 130.18.2, 230.18.2 are disclosed within FIGS. 35A-B. Now referring to FIGS. 35A-B, the first step in creating these optimized data set specific helmets 130.18.99, 230.18.99 uses response surface methodology 130.18.2, 230.18.2 is to determine a shell testing protocol in step 130.8.2.1. The shell testing protocol 130.8.2.1.99, 230.8.2.1.99 may be based upon: (i) the NFL Linear Impactor Helmet Test Protocol, which was authored by James Funk, Jeff Crandall, Michael Wonnacott, and Chris Withnall and published on Feb. 1, 2017, which is incorporated herein by reference, (ii) the Adult Football STAR Methodology, which was authored by Abigail Tyson and Steven Rowson and published on Mar. 30, 2018, which is incorporated herein by reference, (iii) historical knowledge, or (iv) a combination of each of these test protocols.

Figure 37:
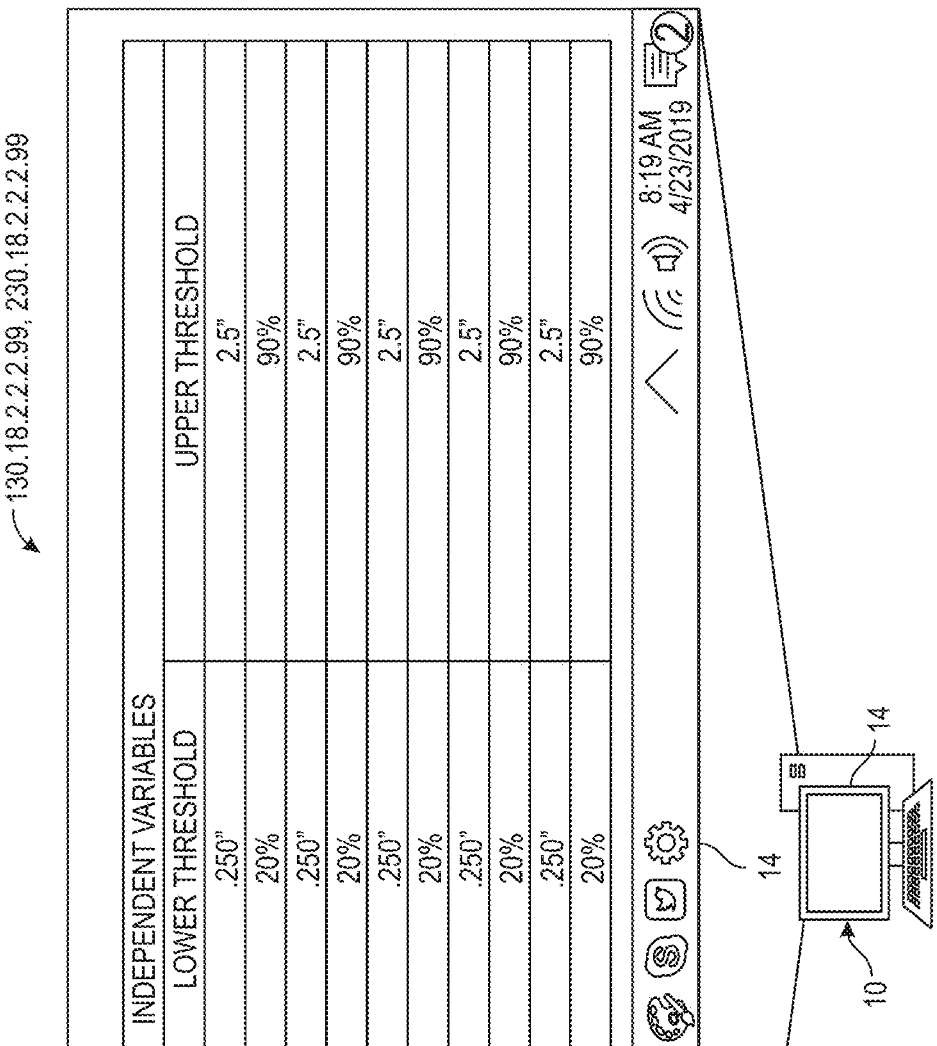
FIG. 37 shows the electronic device displaying a chart of the independent variables of the optimization process.

The next steps are designed to test the data set specific helmets 130.16.99, 230.16.99 with their current configuration along with variations of the data set specific helmets 130.18.99, 230.18.99. The outcomes from these tests will be compared against one another in order to optimize the data set specific helmets 130.16.99, 230.16.99. The first step in this test is to extract the dependent variables in step 130.18.2.2.4, 230.18.2.2.4 from the data set specific helmets 130.16.99, 230.16.99 and the digital headform prototypes 130.12.99, 230.12.99 and determine a range for the independent variables 130.18.2.2.2.99, 230.18.2.2.2.99 (see FIG. 37) based upon the data set specific helmets 130.16.99, 230.16.99 in step 130.18.2.2.2, 230.18.2.2.2. One exemplary way of determining these ranges is by adding and subtracting 25% to the values contained within the data set specific helmets 130.16.99, 230.16.99. It should be understood that other ways of determining these ranges are contemplated by this disclosure, including utilizing historical knowledge. An example of the ranges that may be used in connection with the independent variables is shown in FIG. 37.

Next, a Plackett-Burman design to select the values for the independent variables in step 130.18.2.2.6, 230.18.2.2.6. These values will be spaced across the entire range. Next, first testing helmets or rough testing helmets are created based upon: (i) digital headform prototypes 130.12.99, 230.12.99, (ii) data set specific helmets 130.16.99, 230.16.99, and (iii) the independent variables determined in step 130.18.2.2.6, 230.18.2.2.6. It should be understood that the rough testing helmets may be created in the form of a finite element model or any other digital model that contains mechanical properties and shape information. It should also be understood that when an independent variable is altered from the value that is contained within the data set specific helmets 130.16.99, 230.16.99, this change may cause a ripple effect that requires the alteration of other aspects of the rough testing helmets. For example, if the thickness of the front member is reduced, then the outer shell will need to be moved inward to ensure that the outer surface of the front member is in contact with the inner surface of the outer shell and the MCS will need to be compared with the maximum surface 130.8.99.6, 230.8.99.6 to ensure that the testing helmet meets all of the standards. In another example, if the thickness of the rear member is increased, then the outer shell will need to be moved outward to ensure that the outer surface of the rear member is in contact with the inner surface of the outer shell. In a further example, if the compression ratio of the top member is changed, then the maximum pressure level 130.8.99.10, 230.8.99.10 that is contained within the player group-shape based standard 130.8.99, 230.8.99 needs to be checked against the maximum surface 130.8.99.6, 230.8.99.6. These rough testing helmets are then subjected to the shell testing protocol 130.8.2.1.99, 230.8.2.1.99, wherein the following values are recorded for each test within the shell testing protocol 130.8.2.1.99, 230.8.2.1.99: (i) peak linear acceleration, (ii) peak rotational acceleration, (iii) peak HITsp, and (iv) if the energy attenuation assembly bottomed out (e.g., could not absorb any additional force) or if the energy attenuation assembly did not bottom out, then the distance that the energy attenuation assembly before it would bottom out in step 130.18.2.2.10, 230.18.2.2.10. It should be understood that one of the testing helmets will be directly based upon the data set specific helmet 130.16.99, 230.16.99.

Next, the most significant independent variables are determined in step 130.18.2.2.12, 230.18.2.2.12 based upon applying the shell testing protocol 130.8.2.1.99, 230.8.2.1.99 in connection with each testing helmets. Once the most significant independent variables are determined, then a refined experimental design can be undertaken in step 130.18.2.2.14, 230.18.2.2.14. Examples of more refined designs include: (i) Full Factorial Design, (ii) Box-Behnken Design, (iii) Central Composite Design, or (iv) a Doehlert Matrix Design. Next, second testing helmets or refined testing helmets are created based upon: (i) digital headform prototypes 130.12.99, 230.12.99, (ii) data set specific helmets 130.16.99, 230.16.99, and (iii) the independent variables determined in step 130.18.2.2.14, 230.18.2.2.14. It should be understood that the refined testing helmets may be created in the form of a finite element model or any other digital model that contains mechanical properties and shape information. Also, like above, it should also be understood that when an independent variable is altered from the value that is contained within the data set specific helmets 130.16.99, 230.16.99, this change may cause a ripple effect that requires the alteration of other aspects of the refined testing helmets. These refined testing helmets are then subjected to the shell testing protocol 130.8.2.1.99, 230.8.2.1.99, wherein the following values are recorded for each test within the shell testing protocol 130.8.2.1.99, 230.8.2.1.99: (i) peak linear acceleration, (ii) peak rotational acceleration, (iii) peak HITsp, and (iv) if the energy attenuation assembly bottomed out (e.g., could not absorb any additional force) or if the energy attenuation assembly did not bottom out, then the distance that the energy attenuation assembly before it would bottom out in step 130.18.2.2.18, 230.18.2.2.18.

Figure 38:
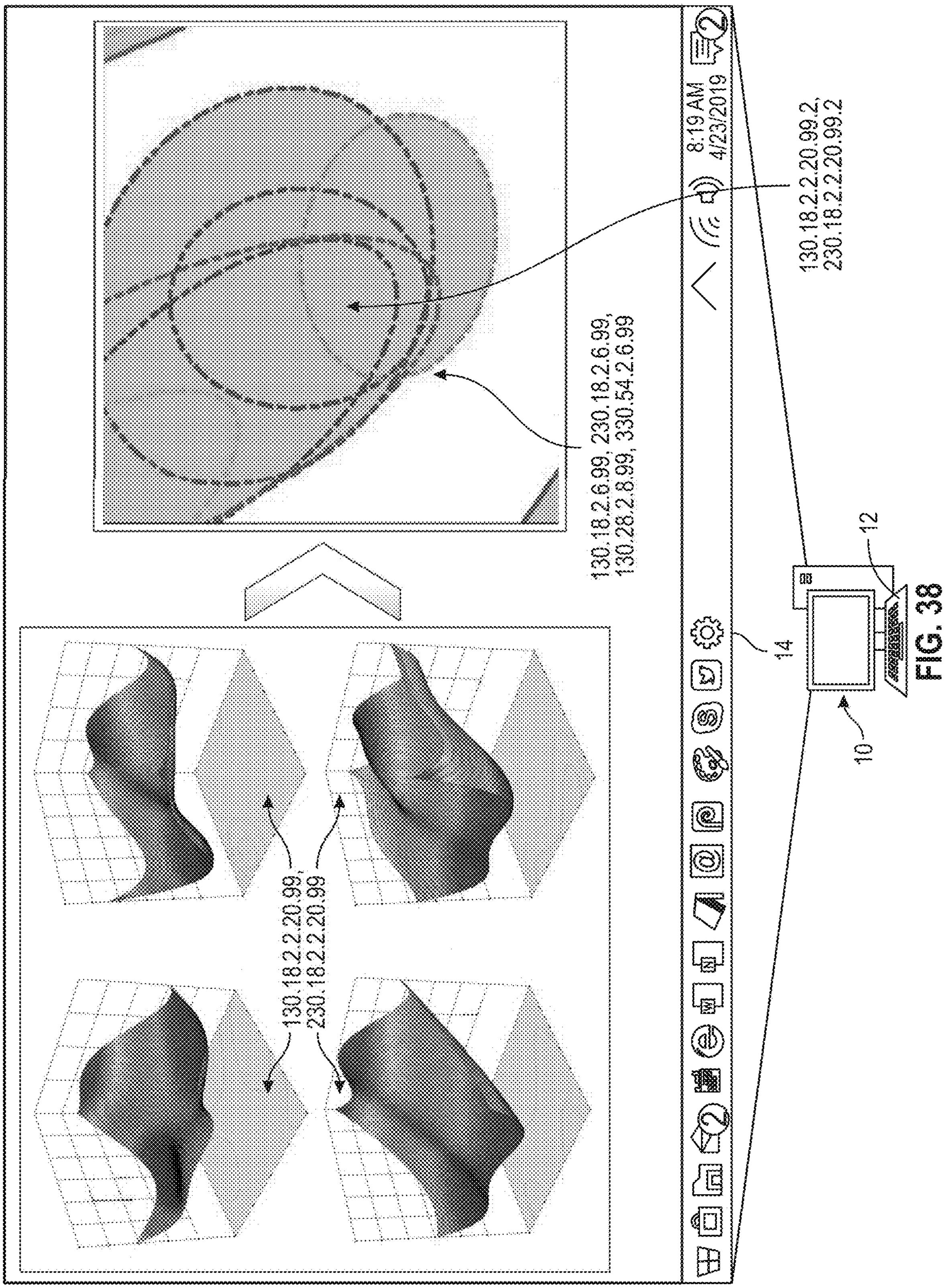
FIG. 38 shows the electronic device displaying exemplary 3D graphs created using the processes described within FIG. 36 and a graph created from overlaying each of these three-dimensional graphs on top of one another.

The data from testing the refined testing helmets is fitted using mathematical functions, such as polynomial function or an advanced surface fitting function (e.g., Kigring, or radial basis function, or a combination of advanced surface fitting functions). Exemplary fitted surfaces 130.18.2.2.20.99, 230.18.2.2.20.99 are shown in FIG. 38 fora few different refined testing helmets. After a surface is determined for each refined testing helmet in step 130.18.2.4, 230.18.2.4, over a surface 130.18.2.2.20.99, 230.18.2.2.20.99 overlaid upon one another in step 130.18.2.6, 230.18.2.6. Overlaying these surfaces 130.18.2.2.20.99, 230.18.2.2.20.99 will allow the designer to identify the optimized region 130.18.2.2.20.99.2, 230.18.2.2.20.99.2 by locating where maximum values associated with each surface overlap one another in step

Figure 39:
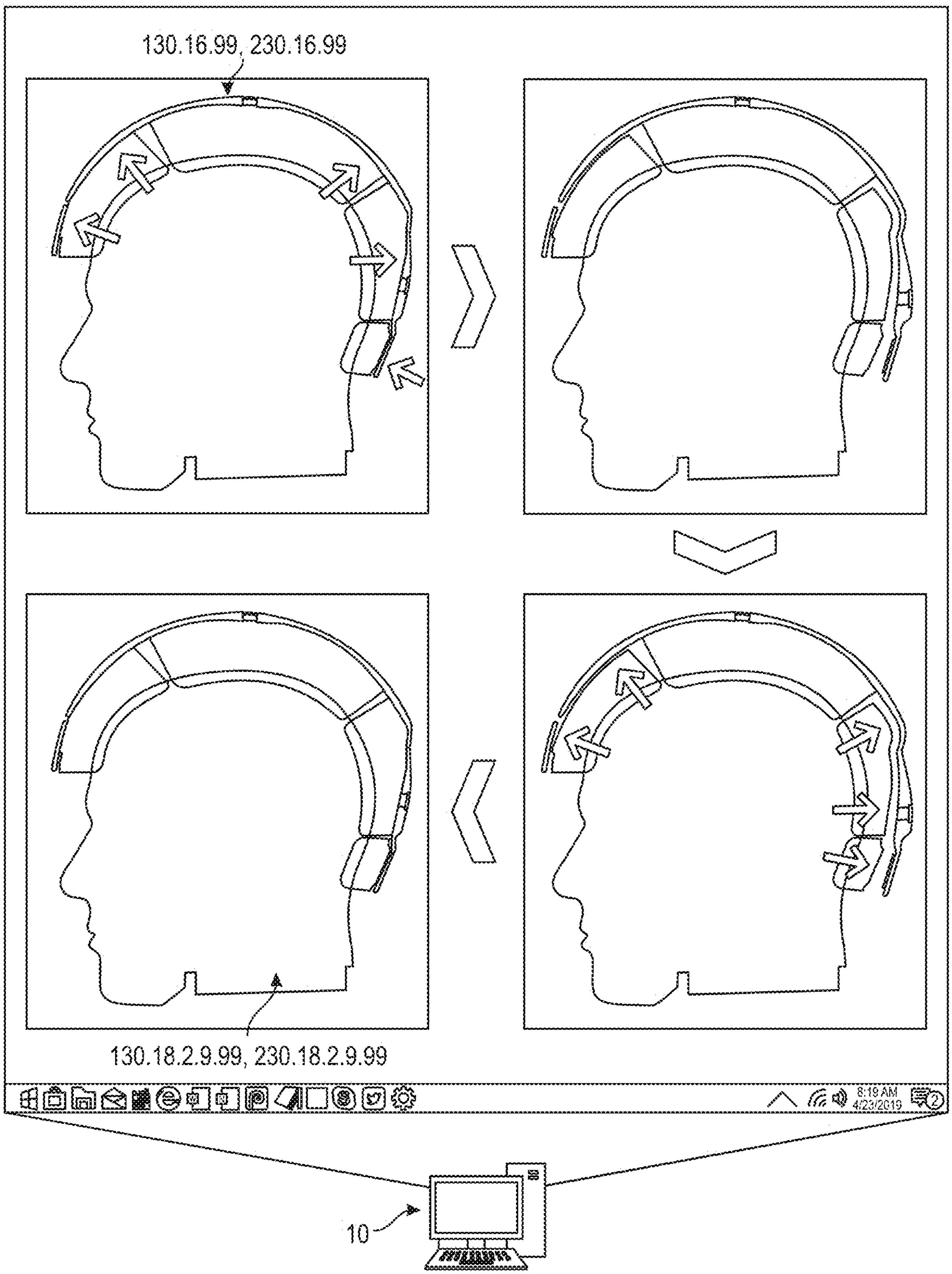
FIG. 39 shows the electronic device displaying the optimization of the player data set specific helmet based on the processes described within FIGS. 35 and 36.

130.18.2.8, 230.18.2.8. If the maximum values do not overlap one another, then the designer can determine an average between these maximum values or may use historical knowledge in combination with the maximum values to select an optimized region. Once the optimized region is selected, then the designer can determine the independent values that are associated with this region, which can be combined to create response surface testing helmets 130.18.2.9.99, 230.1.2.9.99. A graphical display showing how the data set specific helmets 130.16.99, 230.16.99 may be altered to result in the response surface testing helmet 130.18.2.9.99, 230.1.2.9.99 is shown in FIG. 39.

Once the independent values have been derived from the optimized region 130.18.2.2.20.99.2, 230.18.2.2.20.99.2, then the designer needs to verify that the response surface testing helmet 130.18.2.9.99, 230.1.2.9.99 meets all helmet standard(s) (e.g., player group-shaped based helmet standard 130.8.99, 230.8.99, NOCSAE, and etc.). Once it has been verified that the response surface testing helmet 130.18.2.9.99, 230.1.2.9.99 meets all helmet standard(s), the response surface testing helmet 130.18.2.9.99, 230.1.2.9.99 may undergo a visual inspection to ensure that it meets all manufacturing, marketing, and sales requirements. If the response surface testing helmet 130.18.2.9.99, 230.1.2.9.99 does not meet any of these requirements, then the response surface testing helmet 130.18.2.9.99, 230.1.2.9.99 may be altered to meet these requirements. Once the response surface testing helmet 130.18.2.9.99, 230.1.2.9.99 meets these requirements, then this response surface testing helmet 130.18.2.9.99, 230.1.2.9.99 is added to a collection of response surface testing helmets 130.18.2.9.99, 230.1.2.9.99, which will be compared against one another in the following steps.

Each of the above steps may optionally then repeated for each method of manufacturing (e.g., foam, Precision-Fit, and Additive Manufacturing) in step 130.18.2.10, 230.18.2.10. These methods must be performed individually because each manufacturing method has inherent limitations that need to be accounted for when selecting the ranges of the independent variables 130.18.2.2.2.99, 230.18.2.2.2.99. Once response surface testing helmets 130.18.2.9.99, 230.1.2.9.99 are created for each type of manufacturing process in step 130.18.2.10, 230.18.2.10, the response surface testing helmets 130.18.2.9.99, 230.1.2.9.99 may be compared against one another to determine if their performance, in connection with the shell testing protocol 130.8.2.1.99, 230.8.2.1.99, is substantially similar in step 130.18.2.12, 230.18.2.12. If the response surface testing helmets 130.18.2.9.99, 230.1.2.9.99 performances are substantially similar, then the designer can optimize the manufacturing methods in step 130.18.2.14, 230.18.2.14 by combining these manufacturing methods. For example, the designer may determine the side members of the energy attenuation assembly that are manufactured using a foam process perform substantially similar side members of the energy attenuation assembly that are manufactured using an additive process. Additionally, the designer may determine the front members of the energy attenuation assembly that are manufactured using a foam process perform completely different than front members of the energy attenuation assembly that are manufactured using an additive process. Based on these examples, the designer may combine these manufacturing methods in the creation of the optimized data set specific helmets 130.18.2.99, 230.18.2.99. Alternatively, the designer may determine that the members made using the additive manufacturing process perform substantially better than members manufactured with other methods. In this example, the designer will create the optimized data set specific helmet 130.18.2.99, 230.18.2.99 using only the additive manufactured members. Once the designer has optimized manufacturing in step 130.18.2.14, 230.18.2.14, the optimized data set specific helmet 130.18.2.99, 230.18.2.99 is outputted for use in the next steps in designing and manufacturing the helmet 1000. It should be understood that optimized data set specific helmet 130.18.2.99, 230.18.2.99 may take the form of a finite element model or any other digital model that contains mechanical properties and shape information that can be used later in the digital testing.

Figure 36A:
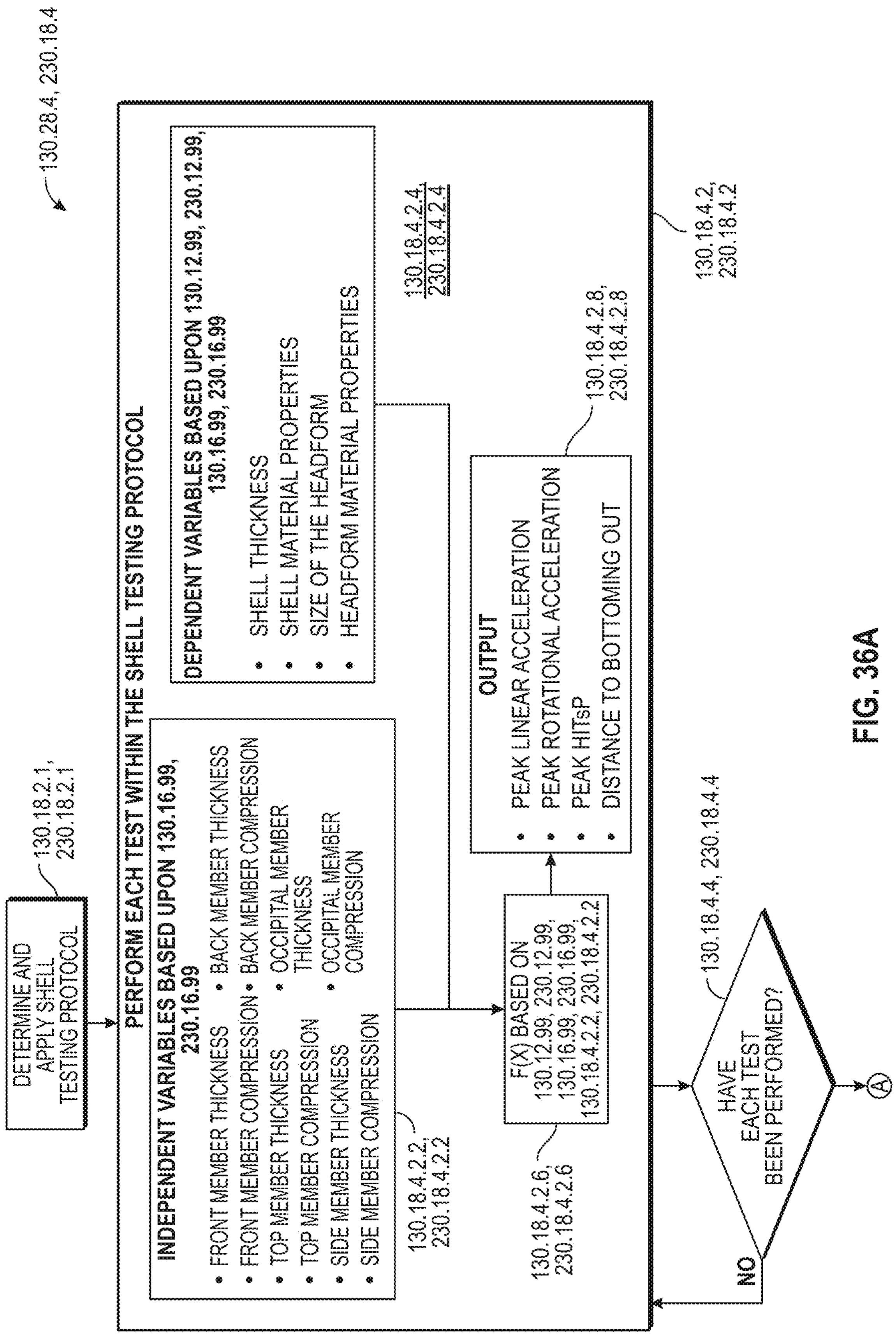
FIGS. 36A-B are flow charts showing a process of optimizing the player data set specific helmet using a brute force methodology.
Figure 36B:
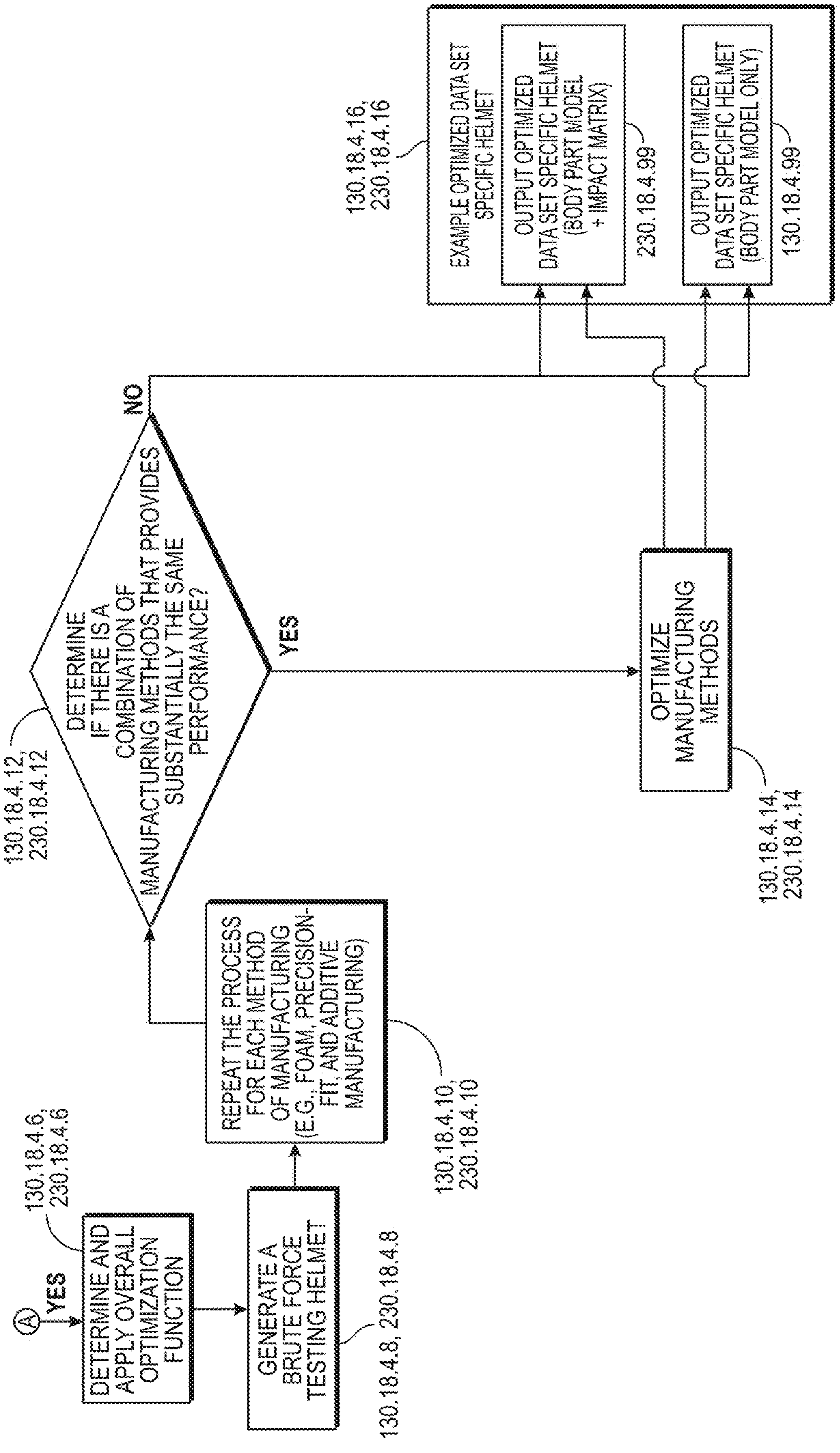

Referring back to FIG. 16, an optimized data set specific helmet 130.18.99, 230.18.99 is generated in step 130.18 based upon digital testing the data set specific helmets 130.16.99, 230.16.99 that were created in step 130.16. Additional details about the generation of these optimized data set specific helmets 130.18.99, 230.18.99 using a brute force methodology 130.18.4, 230.18.4 are disclosed within FIG. 36. Now referring to FIG. 36, the first step in creating these optimized data set specific helmets 130.18.99, 230.18.99 using brute force methodology 130.18.4, 230.18.4 is to determine a shell testing protocol in step 130.8.2.1. This is done in the same manner as described above in connection with FIG. 35. The next steps are designed to test the data set specific helmets 130.16.99, 230.16.99 with their current configuration along with variations of the data set specific helmets 130.18.99, 230.18.99. The outcomes from these tests will be compared against one another in order to optimize the data set specific helmets 130.16.99, 230.16.99. The first step in these tests is to extract the dependent variables in step 130.18.4.2.4, 230.18.4.2.4 from the data set specific helmets 130.16.99, 230.16.99 and the digital headform prototypes 130.12.99, 230.12.99 and extract the independent variables 130.18.4.2.2.99, 230.18.4.2.2.99 based upon the data set specific helmets 130.16.99, 230.16.99 in step 130.18.4.2.2, 230.18.4.2.2.

Next, the designer will select a number of combinations of independent variables. These combinations may be based on: (i) historical knowledge, (ii) a repetitive brute force process of picking a set of variables, testing the set of variables, selecting a new set of variables based on the outcome of the test, (iii) a combination of the above methods. Regardless of how the independent variables are selected, they will be used to create a first testing helmets or rough testing helmets are created based upon: (i) digital headform prototypes 130.12.99, 230.12.99, (ii) data set specific helmets 130.16.99, 230.16.99, and (iii) the independent variables determined in step 130.18.4.2.6, 230.18.4.2.6. These rough testing helmets are then subjected to the shell testing protocol 130.8.2.1.99, 230.8.2.1.99, wherein the following values are recorded for each test within the shell testing protocol 130.8.2.1.99, 230.8.2.1.99: (i) peak linear acceleration, (ii) peak rotational acceleration, (iii) peak HITsp, and (iv) if the energy attenuation assembly bottomed out (e.g., could not absorb any additional force) or if the energy attenuation assembly did not bottom out, then the distance that the energy attenuation assembly before it would bottom out in step 130.18.4.2.8, 230.18.4.2.8. It should be understood that one of the testing helmets will be directly based upon the data set specific helmet 130.16.99, 230.16.99.

Next, the designer selects the best performing rough testing helmets in step 130.18.4.6, 230.18.4.6 to create a brute force testing helmet 130.18.4.8.99, 230.18.4.8.99 in step 130.18.4.8.99, 230.18.4.8.99. Next, the designer needs to verify that the brute force testing helmet 130.18.4.8.99, 230.18.4.8.99 meets all helmet standard(s) (e.g., player group-shaped based helmet standard 130.8.99, 230.8.99, NOCSAE, and etc.). Once it has been verified that the brute force testing helmet 130.18.4.8.99, 230.18.4.8.99 meets all helmet standard(s), the brute force testing helmet 130.18.4.8.99, 230.18.4.8.99 may undergo a visual inspection to ensure that it meets all manufacturing, marketing, and sales requirements. If the brute force testing helmet 130.18.4.8.99, 230.18.4.8.99 does not meet any of these requirements, then the brute force testing helmet 130.18.4.8.99, 230.18.4.8.99 may be altered to meet these requirements. Once the brute force testing helmet 130.18.4.8.99, 230.18.4.8.99 meets these requirements, then the brute force testing helmet 130.18.4.8.99, 230.18.4.8.99 is added to the collection of brute force testing helmets 130.18.4.8.99, 230.18.4.8.99, which will be compared against one another in the following steps.

Each of the above steps may optionally then be repeated for each method of manufacturing (e.g., foam, Precision-Fit, and Additive Manufacturing) in step 130.18.4.10, 230.18.4.10. These methods must be performed individually because each manufacturing method has inherent limitations that need to be accounted for when selecting the ranges of the independent variables 130.18.4.2.2.99, 230.18.4.2.2.99. Once brute force testing helmets 130.18.4.8.99, 230.18.4.8.99 are created for each type of manufacturing process in step 130.18.4.10, 230.18.4.10, the brute force testing helmet 130.18.4.8.99, 230.18.4.8.99 may be compared against one another to determine if their performance, in connection with the shell testing protocol 130.8.2.1.99, 230.8.2.1.99, is substantially similar in step 130.18.2.12, 230.18.2.12. If the brute force testing helmet 130.18.4.8.99, 230.18.4.8.99 performances are substantially similar, then the designer can optimize the manufacturing methods in step 130.18.4.14, 230.18.4.14 by combining these manufacturing methods. Once the designer has optimized manufacturing in step 130.18.4.14, 230.18.4.14, the optimized data set specific helmets 130.18.4.99, 230.18.4.99 are outputted for use in the next steps in designing and manufacturing the helmet 1000. It should be understood that optimized data set specific helmets 130.18.4.99, 230.18.4.99 may take the form of a finite element model or any other digital model that contains mechanical properties and shape information that can be used later in the digital testing.

viii. Generate Shape+Impact Based Data Set

Figure 40:
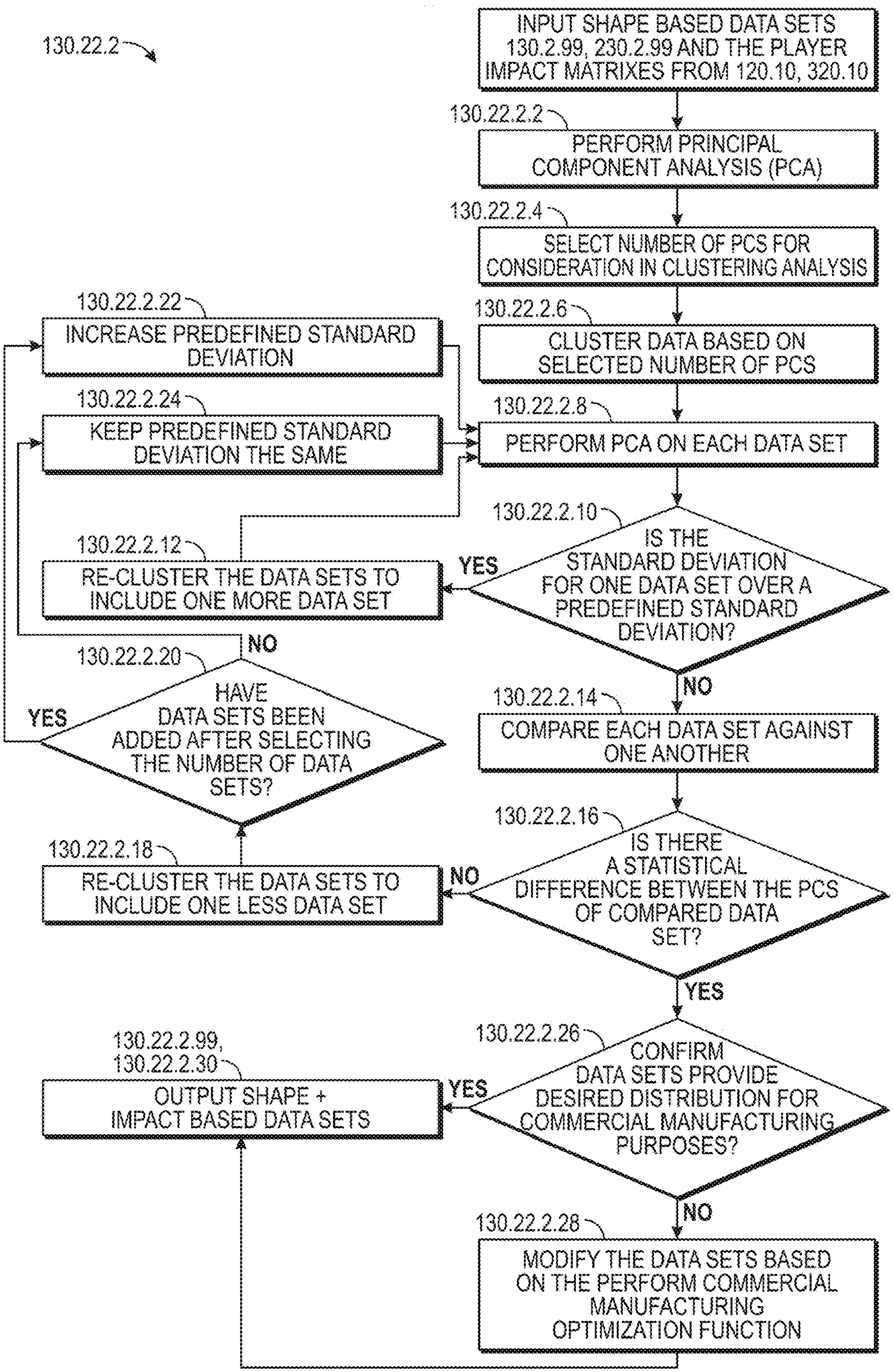
FIG. 40 is a flow chart showing a process of creating shape+impact based player data sets using a constraint based clustering method.

Referring back to FIG. 16, shape+impact based player or "HS+IBP" data sets are generated in step 130.22 based on the shape based player data sets that were generated in step 130.2. Similar to the creation of the shape based player data sets, the shape+impact based player data sets 130.22.99 may be created using: (i) constraint based clustering 130.22.2, (ii) feature-based clustering 130.22.4, or (iii) another clustering method. Additional details about the generation of the shape+impact based player data sets 130.22.99 using constraint based clustering 130.22.2 are disclosed within FIG. 40. Now referring to FIG. 40, the first step in creating shape+impact based player data sets inputting: (i) the shaped based player data sets from 130.2.99, 230.2.99 and (ii) collection of player impact matrixes from 120.10, 320.10. The player impact matrixes 120.2.99, 320.2.99 are then sorted into or re-associated with the head models 120.99, 220.99 that are contained within the shape based player data sets 130.2.99, 230.2.99. Next, a similar methodology that is described above in connection with constraint based clustering 130.2.2 of the shape based player data sets 130.2.99 is applied to the impact data contained within each shape based player data sets 130.2.99. For the sake of brevity, the description of this methodology is not repeated here. The only difference between this methodology described in FIG. 40 and the methodology that is described in connection with FIGS. 17*a*-17*d* is the fact that the designer does select how they want to divide up the data (e.g., all, position, level, or position and level). This is because these divisions have already been made in the prior steps and now only the impact data contained within each of these data sets need to be clustered.

At a high level, the creation of these shape+impact data sets 130.22.99 creates sub-groups within each of the shape based player data sets 130.2.99, 230.2.99, wherein each sub-group experiences statistically different impacts than another sub-group. For example, looking at a position specific helmet for a quarterback, there are three sizes that were determined by the creation of the shape based player data sets. The information that is now associated with these three sizes can be sorted into six different groups, where the first size only has one group, the second size has two groups, and the third size has three groups. In other words, the players whose head models 120.99, 220.99 were contained within size 1 did not receive impacts that were statistically different from one another and thus, only one group was created. Meanwhile, the players whose head models 120.99, 220.99 were contained within size 3 did receive impacts that were statistically different from one another and in fact the impacts that were received by these players could be split into three different groupings.

Figure 42:
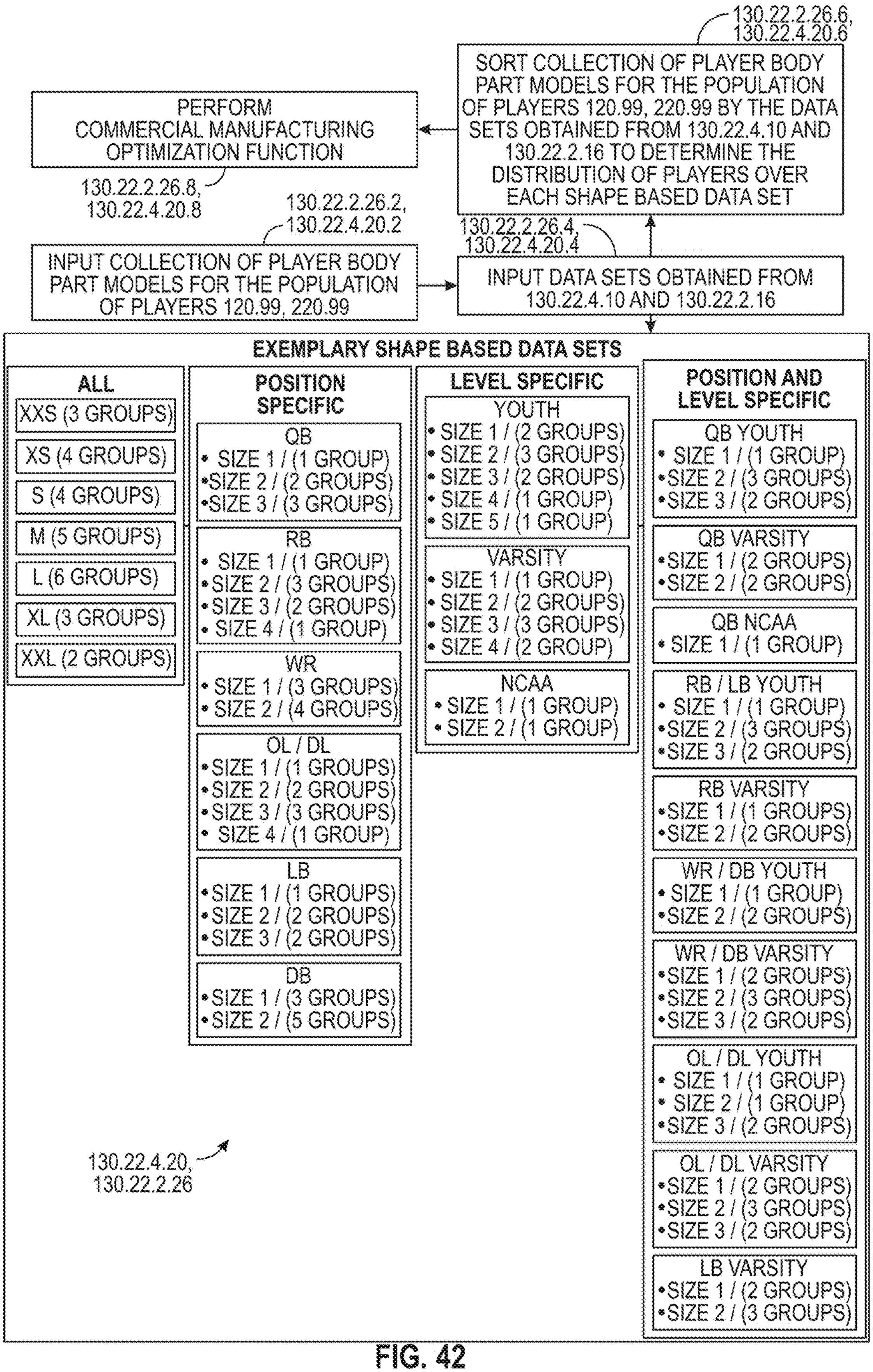
FIG. 42 shows an exemplary breakdown of the shape+impact based player data sets and a process for confirming that the data distribution between the shape+impact based player data sets is desirable for commercial manufacturing purposes.

A similar method of confirming the distribution is desirable for manufacturing, marketing, and sales in step 130.2.2.36*a-d*, 230.2.2.36*a-d* in connection with FIGS. 19*a*-19*d* is applied to the shape+impact based player data sets in step 130.22.2.26, 130.22.4.20. Additional details about this method are disclosed within FIG. 42. Referring now to FIG. 42, in step 130.22.2.26.2, 130.22.4.20.2 the collection of head models 120.99, 220.99 along with their impact matrixes is inputted along with the shape+impact based player data sets from 130.22.4.10 and 130.22.2.16 in step 130.22.2.26.4, 130.22.4.20.4. Next, the collection of head models 120.99, 220.99 along with their impact matrixes are sorted into the shape+impact based player data sets in step 130.22.2.26.6, 130.22.4.20.6 to determine the distribution of the collection of head models 120.99, 220.99 and associated impact matrixes over the shape+impact based player data sets. This distribution is then analyzed in step 130.22.2.26.8, 130.22.4.20.8 to ensure that the distribution is desirable from manufacturing, marketing, and sales standpoints. Exemplary manufacturing, marketing, and sales optimization function may require that 50% of all players that play running back or linebacker at a youth level fall within the middle impact group. Other exemplary shape+impact data sets are shown in FIG. 42.

Referring back to FIG. 41, once it is confirmed that the shape+impact based player data sets meet the desired distribution for manufacturing, marketing, and sales in step 130.22.4.20, then the shape+impact base data sets 130.22.4.99 are outputted. Alternatively, if the shape+impact based player data sets do not meet the desired distribution for manufacturing, marketing, and sales in step 130.22.4.20, then the data sets are modified based on the manufacturing, marketing, and sales optimization function that is described within FIG. 41 in step 130.22.4.22. Once step 130.22.4.22 is performed then the shape+impact base data sets 130.22.4.99 are outputted. It should be understood that these steps may be performed in a different order. For example, the comparison of the data sets to one another to determine if there is a statistical difference in step 130.22.4.10 may be performed prior to analyzing the standard deviation for each of the data sets in step 130.22.4.4. In a further alternative, the manufacturing, marketing, and sales optimization function may be used prior to the start of step 130.22.4.2 to influence the selected number of clusters and the predetermined standard deviation value.

Figure 41:
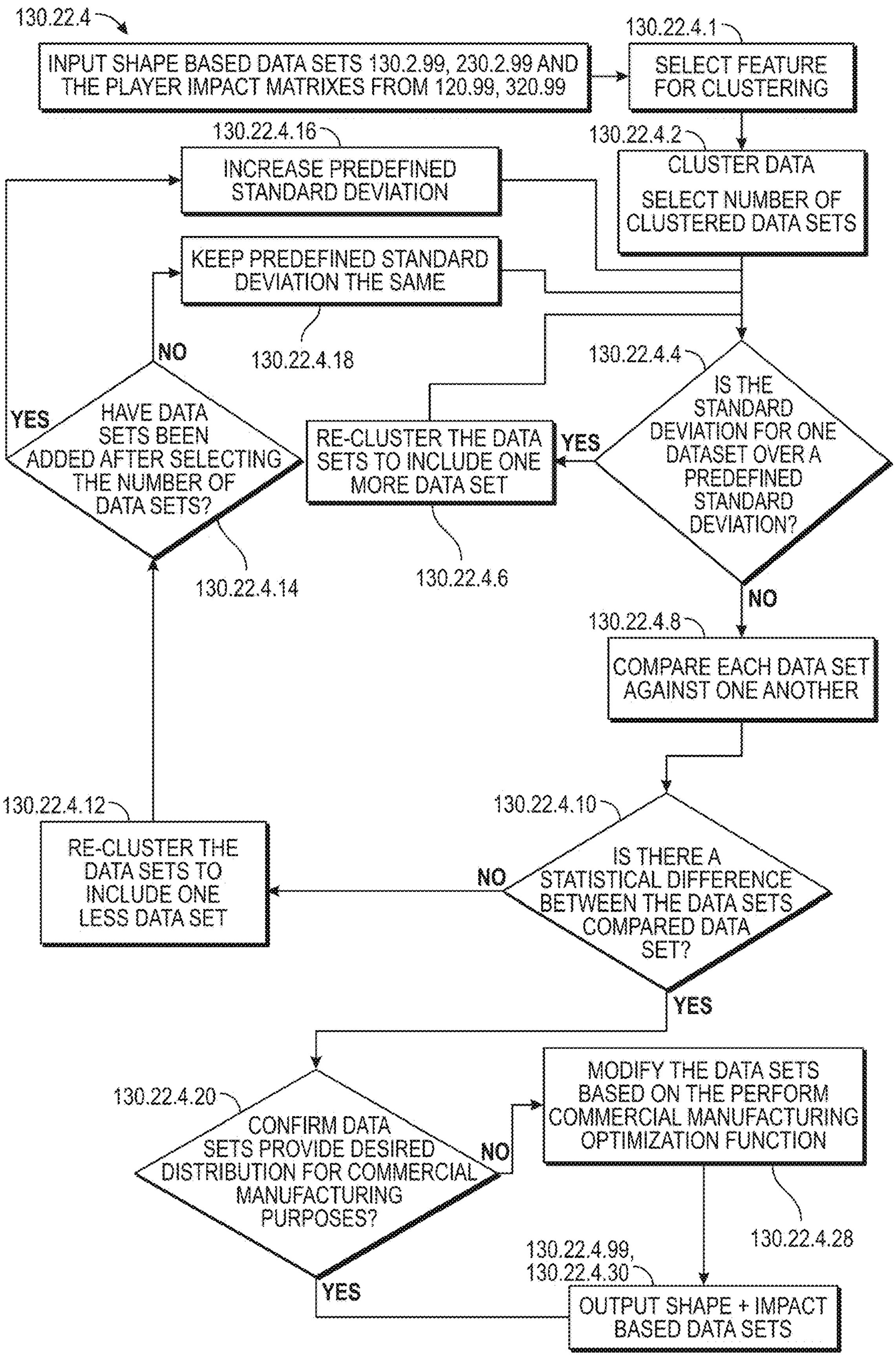
FIG. 41 is a flow chart showing a process of creating shape+impact based player data sets using a feature-based clustering method.

The feature-based clustering 130.22.4 that is described in greater detail in FIG. 41 is similar to the feature-based clustering 130.2.4 that was discussed in connection with FIG. 17*a*-17*d*. The primary difference between these two methods relates to the fact that in the feature-based clustering 130.2.4 the designer picked a shape based feature (e.g., circumference, volume, surface area), wherein feature-based clustering 130.22.4 the designer will pick an impact based feature (e.g., average impact magnitude, average impact location, or etc.) Due to the similarities between these methods, the description of this methodology is not repeated here. It should be that other methods of generating shape+impact based player data sets in step 130.22 are contemplated by this disclosure. For example, PCA may be only applied once to each selected groupings of data (e.g., positions) and this information may be used to split up the head models 120.99, 220.99 and their associated impact matrixes into the shaped+impact based data sets. In this example, a clustering algorithm is not used; instead, the head models 120.99, 220.99 with their associated impact matrixes are just compared to the selected PC that was derived from the PCA. In a further embodiment, the designer may have a set of average impact matrixes. The data contained within the shape based player data sets can then be sorted into groupings based on their proximity to one of the average impact matrixes. The above described methods, performing the above described methods in a different order, combinations of the above described methods, or other methods of generating shape+impact based player data sets is within this disclosure.

ix. Develop Player Group—Shape+Impact Based Standard

Referring back to FIG. 16, after the shape+impact based player data sets 130.22.99 have been created in step 130.22, a player group-shape+impact based standard 130.26.99 is developed in step 130.26. The first step in developing this player group-shape+impact based standard 130.26.99 is to collect all of the individual player impacts that are contained within each shape+impact based player data sets 130.22.99 and to combine these individual impact matrixes into a single shape+impact based impact matrix. For example, for a level specific helmet that is designed for a varsity player that has a head shape that falls within the size 3 group, there may be three individual single shape+impact based impact matrixes. It should be understood that the player impact matrixes 120.2.99, 320.2.99 may be combined to create the single shape+impact based impact matrix by any mathematical method, including adding the player impact matrixes together. Once the player impact matrixes 120.2.99, 320.2.99 are added together, the result is normalized to allow for comparison against other data sets. This normalization may be based on overall averaging, averaging over a season, or any other known method of normalization. Once this normalization operation is performed, the shape+impact based impact matrixes are created and are ready for use in the next step in designing the player group-shape+impact based standard 130.26.99.

The shape+impact based impact matrixes are then compared against an industry accepted testing standard to determine if whether a player that falls within this group experiences impacts that are different than the impacts that are assumed by the industry accepted testing standard. In other words, the shape+impact based impact matrix is different than the impact matrix that is associated with the industry accepted testing standard. For example, Virginia Tech assumes that a player will experience 83 impacts that are at 3.0 m/s condition, 18 impacts that are at 4.6 m/s, and 4 impacts that are at 6.1 m/s during a season. The number of impacts are then evenly weighted (e.g., 25%) based on the impact location (e.g., front, front boss, side, back). Unlike these assumed impacts, an exemplary shape+impact based impact matrix for the above described QB, size 3, may state that the players within this group experience: (i) 53 impacts that are at 3.0 m/s condition, 35 impacts that are at 4.6 m/s, and 17 impacts that are at 6.1 m/s during a season and (ii) the number of impacts should not be evenly weighted, but instead should be weighted with 32% for the back, 23% for the side, 26% for the front, and 19% for the front boss. Because the shape+impact based impact matrix is different than the impact matrix that is associated with the industry accepted testing standard, the designer will then modify the industry accepted testing standard based on the shape+impact based impact matrix. The player group-shape+impact based standard 130.26.9 is then created based on this modification and is prepared for use in the next steps in designing and manufacturing the helmet 1000.

x. Generate Optimized Helmet Prototype Model

Referring back to FIG. 16, optimized helmet prototype models 130.28.99 are created in step 130.28 based upon the optimized data set specific helmets 130.18.99 created in step 130.18 and the player group-shape+impact based standard 130.26.99 created in step 130.26. Similar to the generation of the optimized data set specific helmets in step 130.18, the optimized helmet prototype models 130.28.99 may be generated using: (i) a response surface methodology 130.28.2, (ii) a brute force methodology 130.28.4, or (iii) another type of methodology 130.28.8. Each of these methodologies contains similar steps as the steps described above in connection with step 130.18. At a high level, the primary differences between the steps performed in connection with 130.18 and the steps performed in connection with 130.28 are: (i) instead of using an industry based testing standard to create the shell testing protocol 130.18.2.1.99 in step 130.18.2.1, the player group shape+impact standard 130.26.99 will be used to create the energy attenuation assembly testing protocol 130.28.2.1.99 in step 130.28.2.1, (ii) the size of the shell is changed from independent variable to dependent variable, and (iii) the output of the steps creates optimized helmet prototype models 130.28.99 instead of optimized data set specific helmets 130.18.99. These differences do not drastically alter the steps that are described above and thus for the sake of brevity, a detailed explanation of how these steps are performed will not be repeated here.

While the size of the shell is a dependent variable in these optimization methodologies, meaning that it will not be altered in this optimization process, it should be understood that the location of the player's head within the helmet is an independent variable, meaning that various locations of the player's head within the helmet will be utilized during these optimization processes. This being said, the locations of the player's head within the helmet are constraint by the MCS 130.16.18.99, 230.16.18.99. In other words, the offset of the players head in the forward or backward directions should not be such that it places the outer surface of the maximum surface 130.8.99.6, 230.8.99.6 passed or through the MCS 130.16.18.99, 230.16.18.99. Nevertheless, if the optimization methodologies determine that there is a significant benefit in offsetting the head to a location where it passes through the MCS 130.16.18.99, 230.16.18.99, then the designer should consider whether the size of the shell in a manner that creates a new MCS that the maximum surface 130.8.99.6, 230.8.99.6 does not pass or extend through.

Referring back to FIG. 16, the optimized helmet prototype models 130.28.99 may be created using a hybrid methodology 130.28.6 that is not disclosed in connection with step 130.18. This hybrid methodology 130.28.6 is described in greater detail in connection with FIG. 45. At a high level, this optimization methodology allows the designer to utilize dynamic testing methods or brute force methods to partition the energy attenuation members into various segments, which in turn allows the designer to alter the mechanical properties of each segment.

Figure 45:
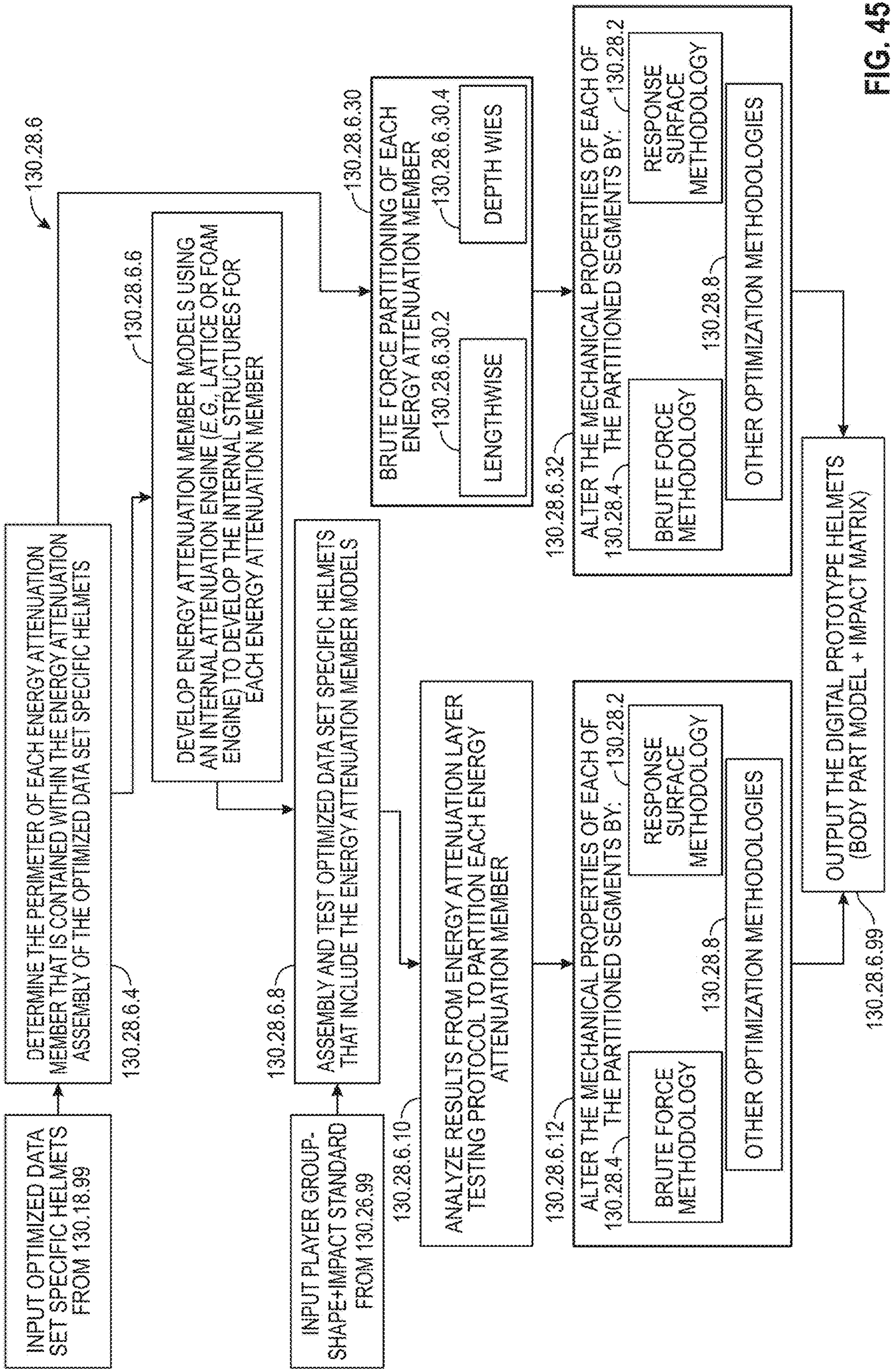
FIG. 45 is a flow chart showing a process of generating optimized helmet prototype models using a hybrid methodology.

Referring now to FIG. 45, the hybrid methodology 130.28.6 starts by inputting the optimized data set specific helmets 130.18.99. The perimeter of each energy attenuation member that is contained within the energy attenuation assembly of the optimized data set specific helmets 130.18.99 is determined in step 130.28.6.4. Next, energy attenuation member models 130.28.6.6.99 are created using an energy attenuation engine to develop the internal structures for each energy attenuation member in step 130.28.6.6. Additional details about the creation of these energy attenuation member models 130.28.6.6.99 are described in connection with FIG. 46. Referring to FIG. 46, this specific method starts with inputting the optimized data set specific helmets 130.18.99 along with the perimeter of each energy attenuation member. The energy attenuation engine utilizes this information to extract the mechanical properties that are associated with each energy attenuation member. Based on this extracted information, the energy attenuation engine determines the number and location of product or component regions, wherein two volumes are split by a border due to the fact that the volumes have different mechanical properties. Next, the energy attenuation engine processes these regions to determine the lattice region variables (e.g., cell type, density, and angle) for each product or component region.

The energy attenuation engine selects these lattice region variables based upon the information contained within its database or information that can be derived from information that is contained within its database. Information that may be contained within the energy attenuation engine database includes: (i) mechanical properties, (ii) thermal properties, (iii) manufacturing properties, and (iv) other relevant properties for combinations of the lattice region variables. These properties may be determined based upon: (i) actual data collected from physical measurements or (ii) theoretical data generated by predictive algorithms or learning algorithms. Examples of tests that may be utilized to generate actual data include, but are not limited to: (i) ASTM D3574 testing protocols, including but not limited to, Tests B1, C, E, F, X6, 13, M, (ii) ISO 3386 testing protocol, (iii) ISO 2439 testing protocol, (iv) ISO 1798 testing protocol, (v) ISO 8067 testing protocol, (vi) ASTM D638 testing protocol, (vii) ISO 37 testing protocol, (viii) ASTM D395 testing protocol, (ix) other types of compression analysis, (x) other types of elongation analysis, (xi) tensile strength analysis, or (xii) other similar techniques.

Referring to the lattice region variables, exemplary lattice cell types are shown in FIG. 46, lattice angle may vary between 0 degrees and 180 degrees, and lattice densities may vary between 75 kg/m$^3$ and 8,000 kg/m$^3$. Additionally, the chemical compositions may include, but are not limited to: polycarbonate, acrylonitrile butadiene styrene (ABS), nylon, polylactic acid (PLA), acrylonitrile styrene acrylate (ASA), polyoxymethylene (POM), rigid polyurethane, elastomeric polyurethane, flexible polyurethane, silicone, thermoplastic polyurethane (TPU), Agilus® 30, Tango®, other similar thermoplastics, other light sensitive plastics or polymers (e.g., plastics that cure upon the exposure to certain wavelengths of light, such as UV light), any combination of the above materials with one another, where the materials are not blended together prior to the forming of the product, any combination of the above materials with one another, where the materials are blended together prior to the forming of the product, one or more of the above materials and a strength adding material (e.g, Kevlar or carbon fiber), where the materials are not blended together prior to the forming of the product, one or more of the above materials and a strength adding material (e.g, Kevlar or carbon fiber), where the materials are blended together prior to the forming of the product, hybrid of any of the disclosed material, or any other material that is specifically designed to absorb impact forces within a helmet.

Figure 47:
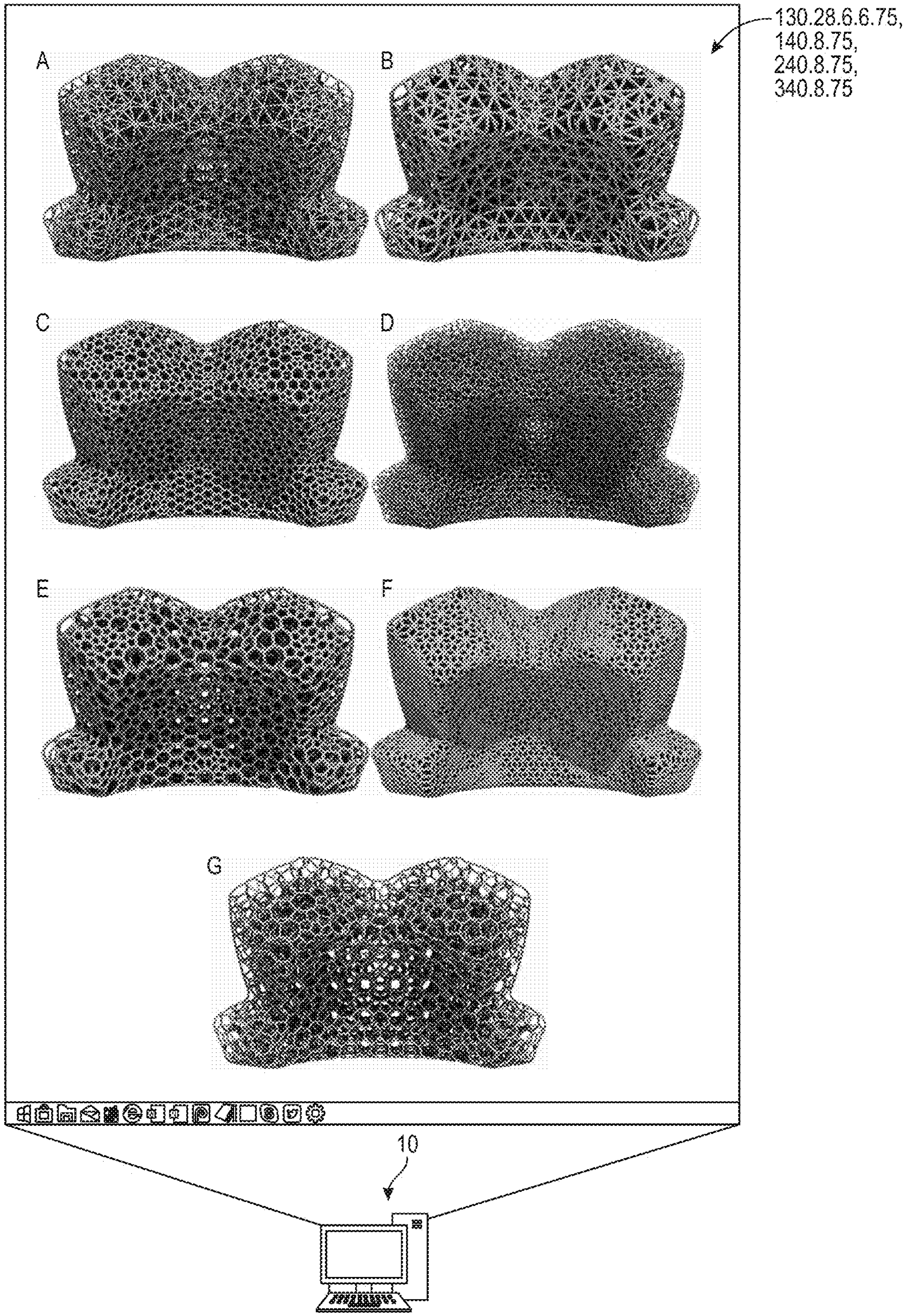
FIG. 47 shows the electronic device displaying seven exemplary energy attenuation member models.

Once lattice region variables are selected, then the energy attenuation member model 130.28.6.6.99 is created based upon these selected variables. Exemplary energy attenuation member models 130.28.6.6.75 are shown in FIG. 47. In these examples, the energy attenuation engine created a single lattice region for the front member of the energy attenuation assembly. The energy attenuation engine then analyzes various combinations of lattice region variables, some of these combinations are graphically shown in FIG. 47, in order to find a combination of lattice region variables that created an energy attenuation member model 130.28.6.6.99 that has mechanical properties that are similar to the mechanical properties of the energy attenuation member from the optimized data set specific helmets 130.18.99. This process is then repeated for each energy attenuation member contained within the energy attenuation assembly.

It should be understood that the energy attenuation member models 130.28.6.6.99 may be created in the form of a finite element model or any other digital model that contains mechanical properties and shape information that can be used later in the digital testing. It should also be understood that the selection of the lattice regions and their associated lattice region variables are not limited to structures that can only be manufactured using additive manufacturing techniques. Instead, the energy attenuation engine may consider and utilize any one of the following materials: expanded polystyrene (EPS), expanded polypropylene (EPP), plastic, foam, expanded polyethylene (PET), vinyl nitrile (VN), urethane, polyurethane (PU), ethylene-vinyl acetate (EVA), cork, rubber, orbathane, EPP/EPS hybrid (Zorbium), brock foam, or other suitable material or blended combination or hybrid of materials. In using one of these materials, the lattice regions may be slightly altered to better represent the structures and properties of the select material.

Figure 48:
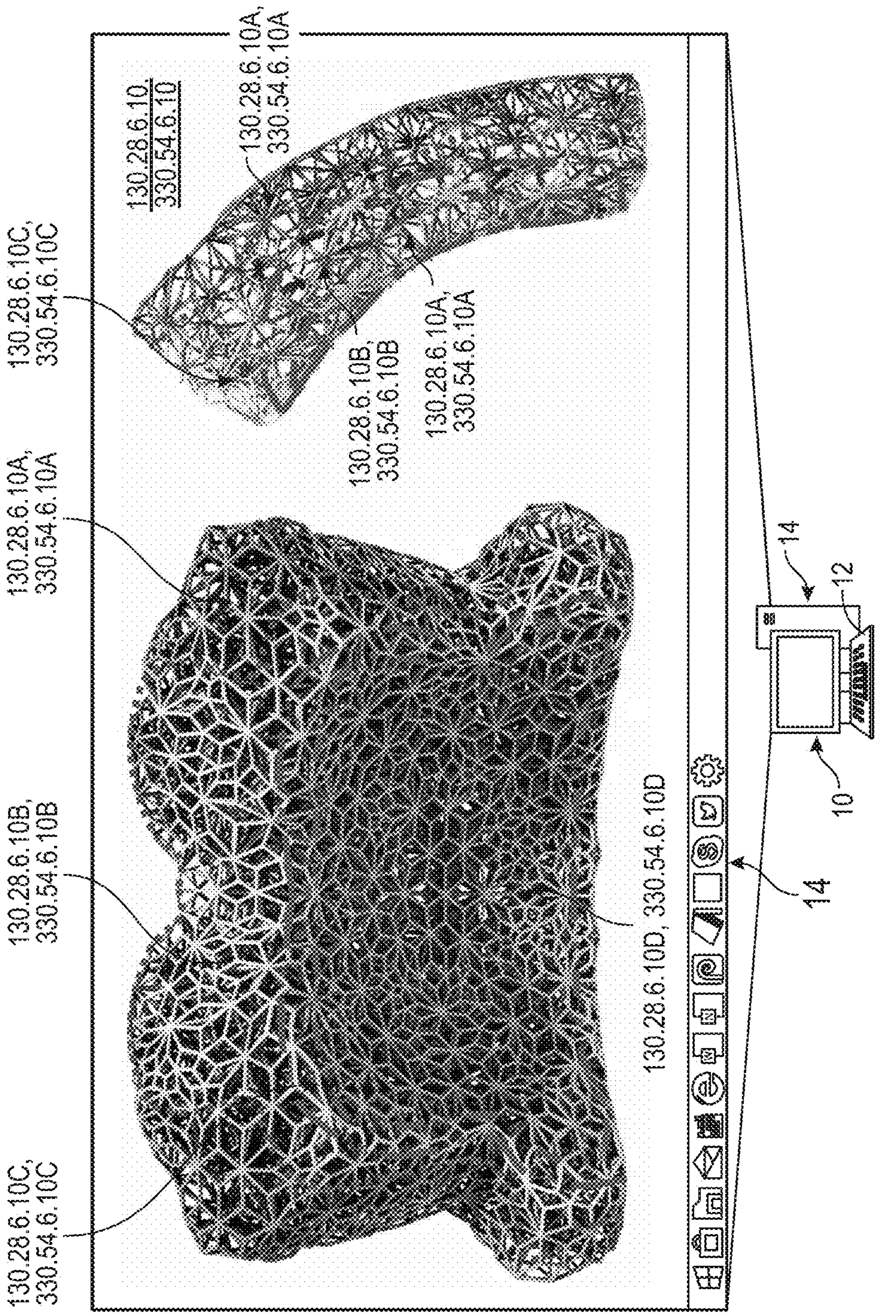
FIG. 48 shows the electronic device displaying exemplary digital testing of an energy attenuation member model using a player+group-shape+impact standard, wherein the energy attenuation member model has been partitioned into various segments based on digital testing.

Referring back to FIG. 45, the energy attenuation assembly of the optimized data set specific helmets 130.18.99 is replaced with an energy attenuation assembly created from the energy attenuation member models 130.28.6.6.99. This combination is then tested using the player group-shape+impact standard 130.26.99 in step 130.28.6.8. The outcome of these test is analyzed in step 130.28.6.10 to partition each energy attenuation member. FIG. 48 shows an example of how the energy attenuation member model 130.28.6.6.99 may be dynamically tested and how this dynamic testing can be utilized to partition the energy attenuation member. In particular, this dynamic test suggested that the energy attenuation member be partitioned into four different segments. Where the first segment is shown in gray 130.28.6.10*a*, the second segment is shown in gray to light yellow 130.28.6.10*b*, the third segment is shown in yellow 130.28.6.10*c*, and the fourth segment is shown in green 130.28.6.10*d*. It should be understood that this is just an example of embodiment and the dynamic testing of other energy attenuation member in connection with other optimized data set specific helmets 130.18.99 may create different numbers and locations of lattice regions.

Referring back to FIG. 45, once the energy attenuation members are partitioned in step 130.28.6.10, then the mechanical properties of each partitioned segment is optimized using one of the optimization methods described above, including response surface methodology 130.28.2, brute force methodology 130.28.4, or another optimization methodology 130.28.8 in step 130.2.6.12. After step 130.28.6.12 is performed, the digital prototype helmets 130.28.6.99 are generated and prepared for the next steps in designing and manufacturing the helmet 1000. It should be understood that the digital prototype helmets 130.28.6.99 may take the form of a finite element model or any other digital model that contains mechanical properties and shape information that can be used later in the digital testing.

Instead of performing steps 130.28.6.6-130.28.6.10, a designer may elect to utilize a brute force partitioning approach in step 130.28.6.30. This method allows the designer to select the number and location of the lattice regions. This selection may be based on historical knowledge or may be based on physical testing of helmets or physical testing of helmet components. For example, the designer may independently collect data from one of, or a combination of, the following: (i) placing sensors in a headform and testing the helmet using: (a) a linear impactor, (b) a drop tester, (c) a pendulum tester, or (d) other similar types of helmet testing apparatuses, (ii) placing sensors between the headform and the padding assembly and testing the helmet using the above apparatuses, (iii) placing sensors between the padding assembly and the helmet shell and testing the helmet using the above apparatuses, (iv) placing sensors on the external surface of the shell and testing the helmet using the above apparatuses, (v) using a linear impactor, a tensile strength machine, or another similar apparatus to test individual helmet components, (vi) using ASTM D3574 testing protocols, including but not limited to, Tests B1, C, E, F, X6, 13, M, (vii) using ISO 3386 testing protocol, (viii) using ISO 2439 testing protocol, (ix) data collected using ISO 1798 testing protocol, (x) using ISO 8067 testing protocol, (xi) using ASTM D638 testing protocol, (xii) using ISO 37 testing protocol, (xiii) using ASTM D395 testing protocol, or (xiv) other similar techniques.

Figure 49:
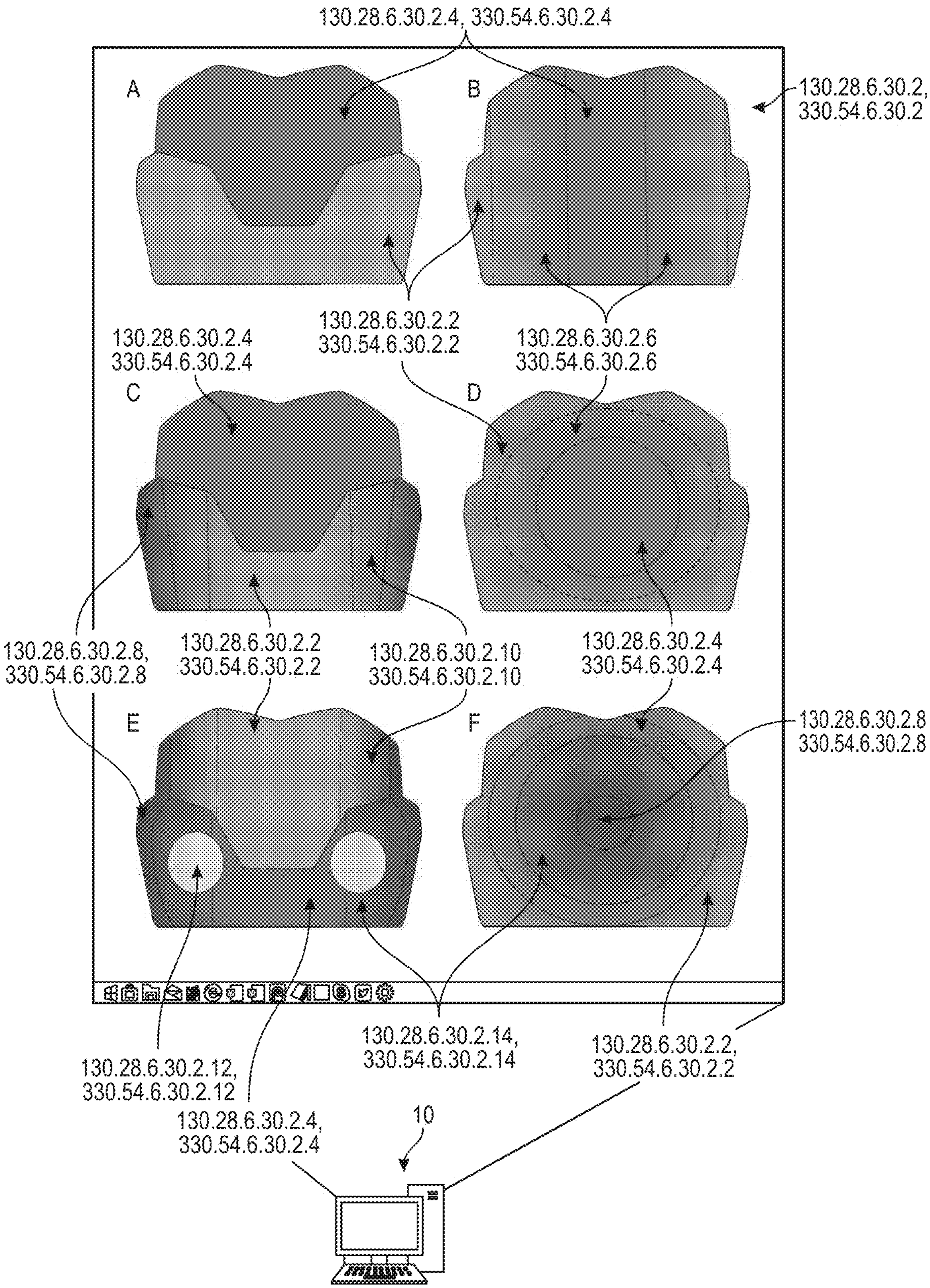
FIG. 49 shows the electronic device displaying six exemplary energy attenuation member models, which show partitioned segments that extend across the energy attenuation member.
Figure 50:
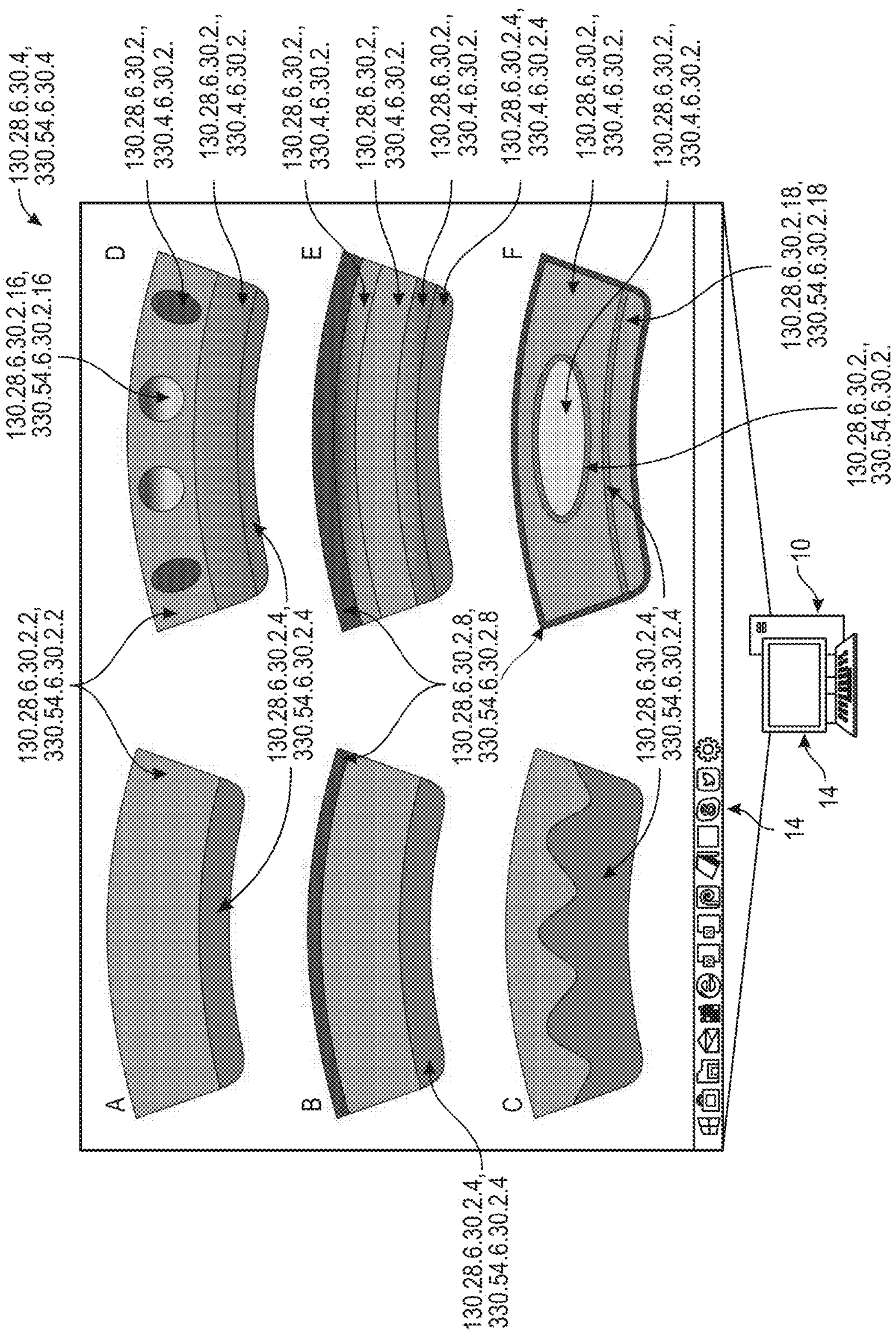
FIG. 50 shows the electronic device displaying six exemplary energy attenuation member models, which show the partitioned segments that extend through the energy attenuation member.

FIGS. 49-50 show exemplary component regions that were created using a brute force method. Specifically, FIG. 49 shows six different embodiments of the rear combination member, which is split into partitions lengthwise using the brute force method. The first exemplary embodiment contained within FIG. 49, which is labeled A and is in the upper right, contains two component regions. A first region is shown in green 130.28.6.30.2.2, 330.54.6.30.2.2, while the second region is shown in blue 130.28.6.30.2.4, 330.54.6.30.2.4. The second and fourth exemplary embodiment that are labeled B and D contain three component regions, wherein one is green 130.28.6.30.2.2, 330.54.6.30.2.2, one is blue 130.28.6.30.2.4, 330.54.6.30.2.4, and one is in between green and blue 130.28.6.30.2.6, 330.54.6.30.2.6. The third exemplary embodiment is labeled C and contains four component regions, wherein one is green 130.28.6.30.2.2, 330.54.6.30.2.2, one is blue 130.28.6.30.2.4, 330.54.6.30.2.4, and one is red 130.28.6.30.2.8, 330.54.6.30.2.8, and one is between green and red 130.28.6.30.2.10, 330.54.6.30.2.10. The fifth exemplary embodiment is labeled E and contains seven component regions, wherein one is green 130.28.6.30.2.2, 330.54.6.30.2.2, one is blue 130.28.6.30.2.4, 330.54.6.30.2.4, one is red 130.28.6.30.2.8, 330.54.6.30.2.8, one is between green and red 130.28.6.30.2.10, 330.54.6.30.2.10, between green and blue 130.28.6.30.2.6, 330.54.6.30.2.6, and one is yellow 130.28.6.30.2.12, 330.54.6.30.2.12. Lastly, the sixth exemplary embodiment is labeled F and contains four component regions, wherein one is green 130.28.6.30.2.2, 330.54.6.30.2.2, one is blue 130.28.6.30.2.4, 330.54.6.30.2.4, one is red 130.28.6.30.2.8, 330.54.6.30.2.8, and between green and blue 130.28.6.30.2.6, 330.54.6.30.2.6.

FIG. 50 shows six different embodiments of the energy attenuation member, which is split into partitions lengthwise using the brute force method. The first and third exemplary embodiment contained within FIG. 50, which are labeled A and C contain two component regions. A first region is shown in green 130.28.6.30.2.2, 330.54.6.30.2.2, while the second region is shown in blue 130.28.6.30.2.4, 330.54.6.30.2.4. In this example, the first region may have mechanical properties that are designed to increase the comfort of the fit, while the second region may have mechanical properties that are designed to absorb impacts. The second exemplary embodiment that is labeled B contains three component regions, wherein one is green 130.28.6.30.2.2, 330.54.6.30.2.2, one is blue 130.28.6.30.2.4, 330.54.6.30.2.4, and one is red 130.28.6.30.2.8, 330.54.6.30.2.8. The fourth exemplary embodiment is labeled D and contains five component regions, wherein one is green 130.28.6.30.2.2, 330.54.6.30.2.2, one is blue 130.28.6.30.2.4, 330.54.6.30.2.4, one is red 130.28.6.30.2.8, 330.54.6.30.2.8, one is between green and green 130.28.6.30.2.6, 330.54.6.30.2.6, and one is blue to yellow 130.28.6.30.2.16, 330.54.6.30.2.16. The fifth exemplary embodiment is labeled F contains five component regions, wherein one is green 130.28.6.30.2.2, 330.54.6.30.2.2, one is blue 130.28.6.30.2.4, 330.54.6.30.2.4, one is red 130.28.6.30.2.8, 330.54.6.30.2.8, one is between blue and green 130.28.6.30.2.6, 330.54.6.30.2.6, and one is between red and green 130.28.6.30.2.10, 330.54.6.30.2.10. The final exemplary embodiment is labeled E contains six component regions, wherein one is green 130.28.6.30.2.2, 330.54.6.30.2.2, one is blue 130.28.6.30.2.4, 330.54.6.30.2.4, one is red 130.28.6.30.2.8, 330.54.6.30.2.8, one is yellow 130.28.6.30.2.12, 330.54.6.30.2.12, one is orange 130.28.6.2.18, 330.54.6.30.2.18, and one is brown 130.28.6.30.2.20, 330.54.6.30.2.20.

Referring back to FIG. 45, once the energy attenuation members are partitioned in step 130.28.6.30, then the mechanical properties of each partitioned segment is optimized using one of the optimization methods described above, including response surface methodology 130.28.2, brute force methodology 130.28.4, or another optimization methodology 130.28.8 in step 130.2.6.12. After step 130.28.6.30 is performed, the digital prototype helmets 130.28.6.99 are generated and prepared for the next steps in designing and manufacturing the helmet 1000.

xi. Confirm Optimized Helmet Prototype Model Meets Specifications

Referring back to FIG. 45, after the optimized helmet prototype models 130.28.99 are created in step 130.28, they are testing to ensure that they meet all helmet requirements. For example, they are digitally tested to ensure that they pass NOCSAE using: (i) a NOCSAE headform, (ii) a headform with an exterior surface that matches the maximum surface that is associated with the player group-shape based standard, (iii) each of their associated digital headform prototypes 130.12.99. The helmets are also checked to make sure that they meet the shape based helmet standard 130.8.99. For example, does the maximum surface 130.8.99.6, 230.8.99.6 extend passed or through the MCS 130.16.18.99, 230.16.18.99. As described above, if the maximum surface 130.8.99.6, 230.8.99.6 extend passed or through the MCS 130.16.18.99, 230.16.18.99, then the optimized helmet prototype model 130.28.99 fails this standard and will be modified in step 130.34. If the optimized helmet prototype models 130.28.99 pass all helmet standards, then they are approved in step 130.36 and prepared for the next steps in designing and manufacturing the helmet 1000.

xii. Other Embodiments

One method of creating optimized helmet prototype models 130.28.99 is described above. However, it should be understood that there are other methods of creating the optimized helmet prototype models 130.28.99 that are contemplated by this disclosure. For example, step 130.28 could be combined with step 130.18. Combining these two step will require the optimization of the shell size while the mechanical properties of the energy attenuation layer are also being optimized. While it may be beneficial to perform both of these steps together because the analysis can take into account impact information while determining the shape of the shell, this added level of complexity may require longer processing times. In another embodiment, the impact data may be analyzed, the shape information may then be analyzed, and then the impact data may be analyzed a second time. In a further embodiment, the order of the steps may be changed or a combination of the above described methods may be used.

2. Body Part Model Only

Figure 71:
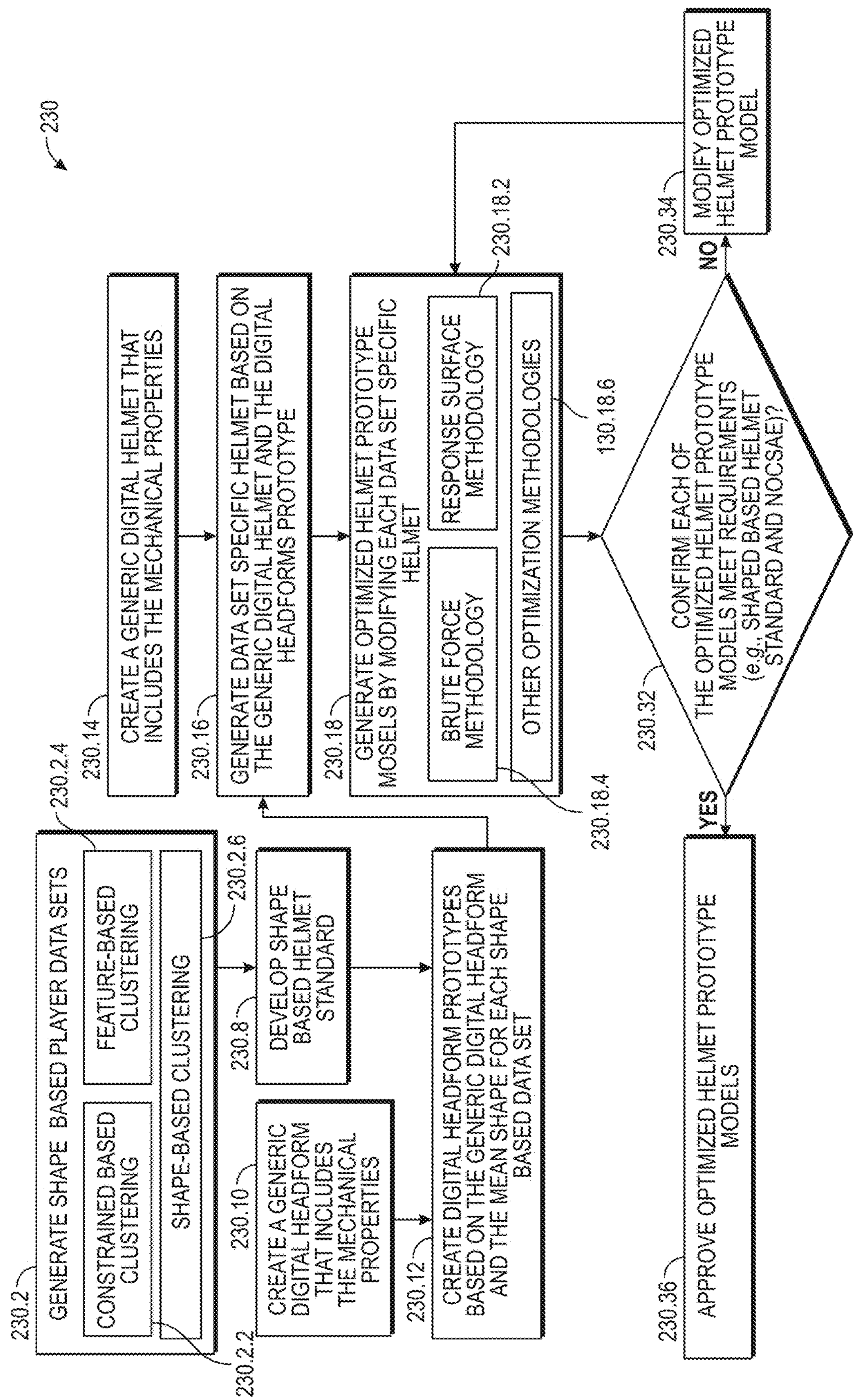
FIG. 71 is a flow chart showing a process of creating an optimized helmet prototype model based on analyzing collections of body part models.

Similar to FIG. 16, FIG. 71 describes a method of creating an optimized helmet prototype model 230.12.99 based on collections of body part models 220.99. At a high level, the method of creating a digital headform prototype 230.12.99 in connection with FIG. 71 includes modifying the shape of a generic digital headform 230.10.99 based on information contained within a collection of body part models 220.99 that are associated with a specific group of a selected population. For example, a digital headform prototype 230.12.99 may be created for a varsity quarterback or a youth linebacker. Also, at a high level, the method of creating an optimized helmet prototype model 230.28.99 in connection with FIG. 71 includes utilizing the digital headform prototype 230.12.99 to modify a generic digital helmet 230.14.99 in order to create a data set specific helmet 230.16.99, which is has been optimized in light of digital testing results. The primary difference between the method described in FIG. 16 and the method described in FIG. 71 is the fact that FIG. 71 does not analyze the impact matrixes and instead only analyzes the body part models. Thus, FIG. 16's creation of the optimized data set specific helmet 130.18.99 in step 130.18 is equal to FIG. 72's optimized helmet prototype model helmet 230.18.99. Not analyzing the impact matrixes may be desirable if the designer does not have enough data to support this analysis or is not desirable for the type of product that the designer is manufacturing.

3. Impact Matrix Only

Figure 74:
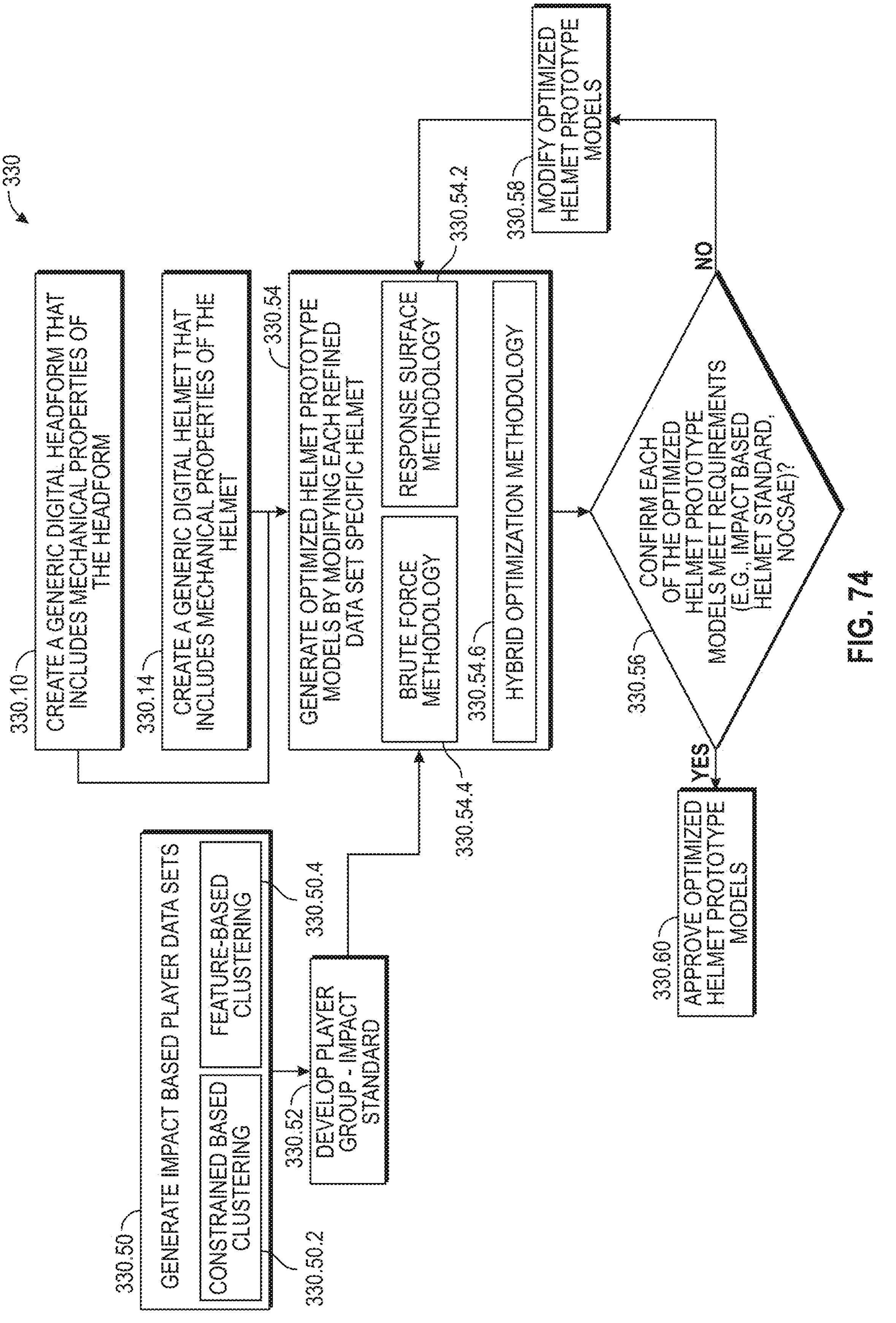
FIG. 74 is a flow chart showing a process of creating optimized helmet prototype models based on analyzing collections of player impact matrixes.

Similar to FIGS. 16 and 71, FIG. 74 describes a method of creating an optimized helmet prototype model 330.54.99 based on collections of information. However, instead of utilizing a collection of body part models 220.99 in FIGS. 16 and 71, FIG. 74 utilizes a collection of player impact matrixes 320.2.99. This method 330 generates a generic digital headform 330.10.99 and a generic digital helmet 230.14.99 in the same manner that is described above in connection with FIGS. 25 and 27. Both the generic digital headform 330.10.99 and a generic digital helmet 230.14.99 will be used to create a helmet that is optimized for the impact that a selected group of players will likely receive.

i. Generate Impact Based Player Data Sets

Figure 75A:
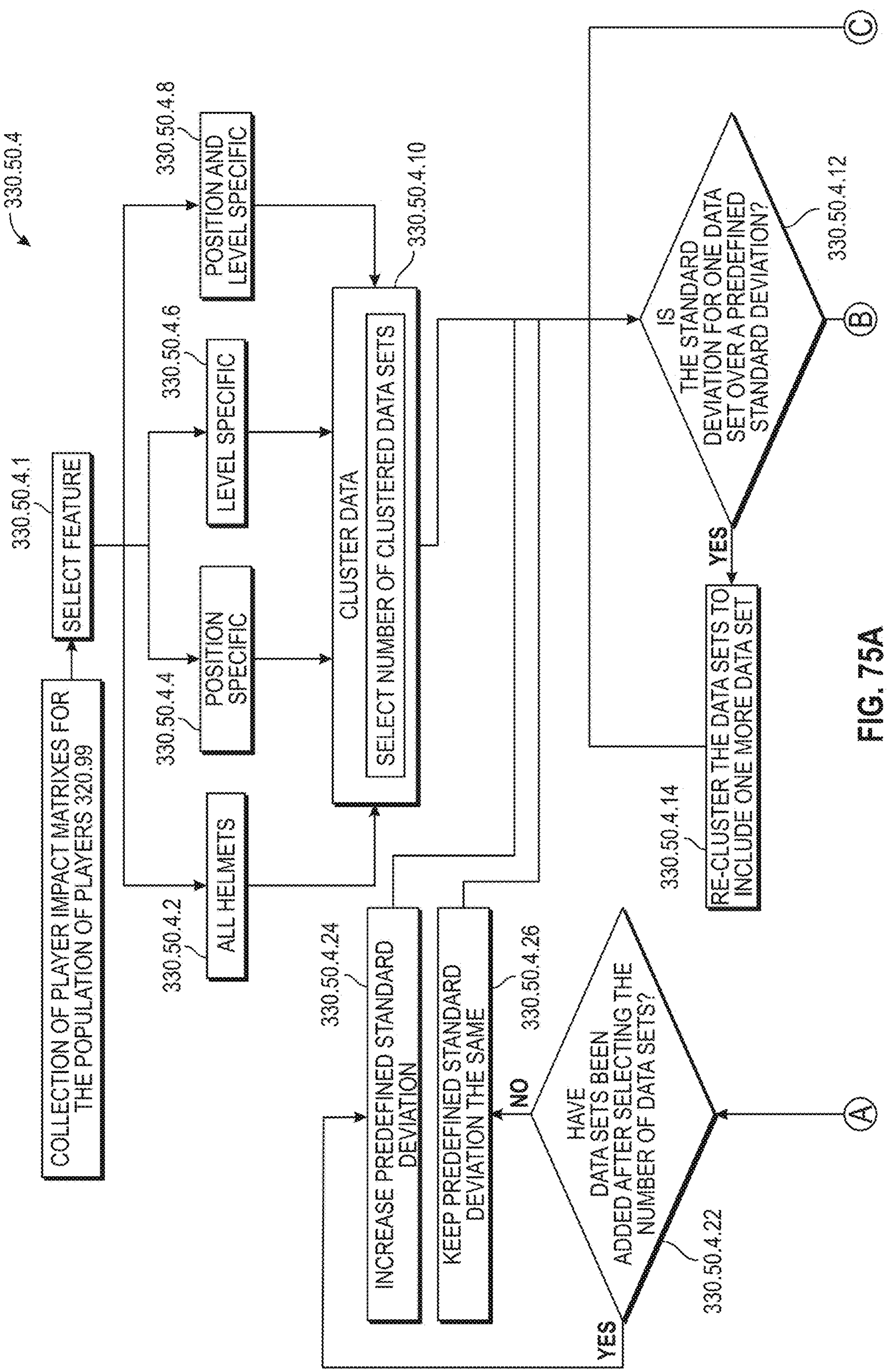
FIGS. 75A-B are flow charts showing a process for creating impact based data sets using a feature-based clustering method.
Figure 75B:
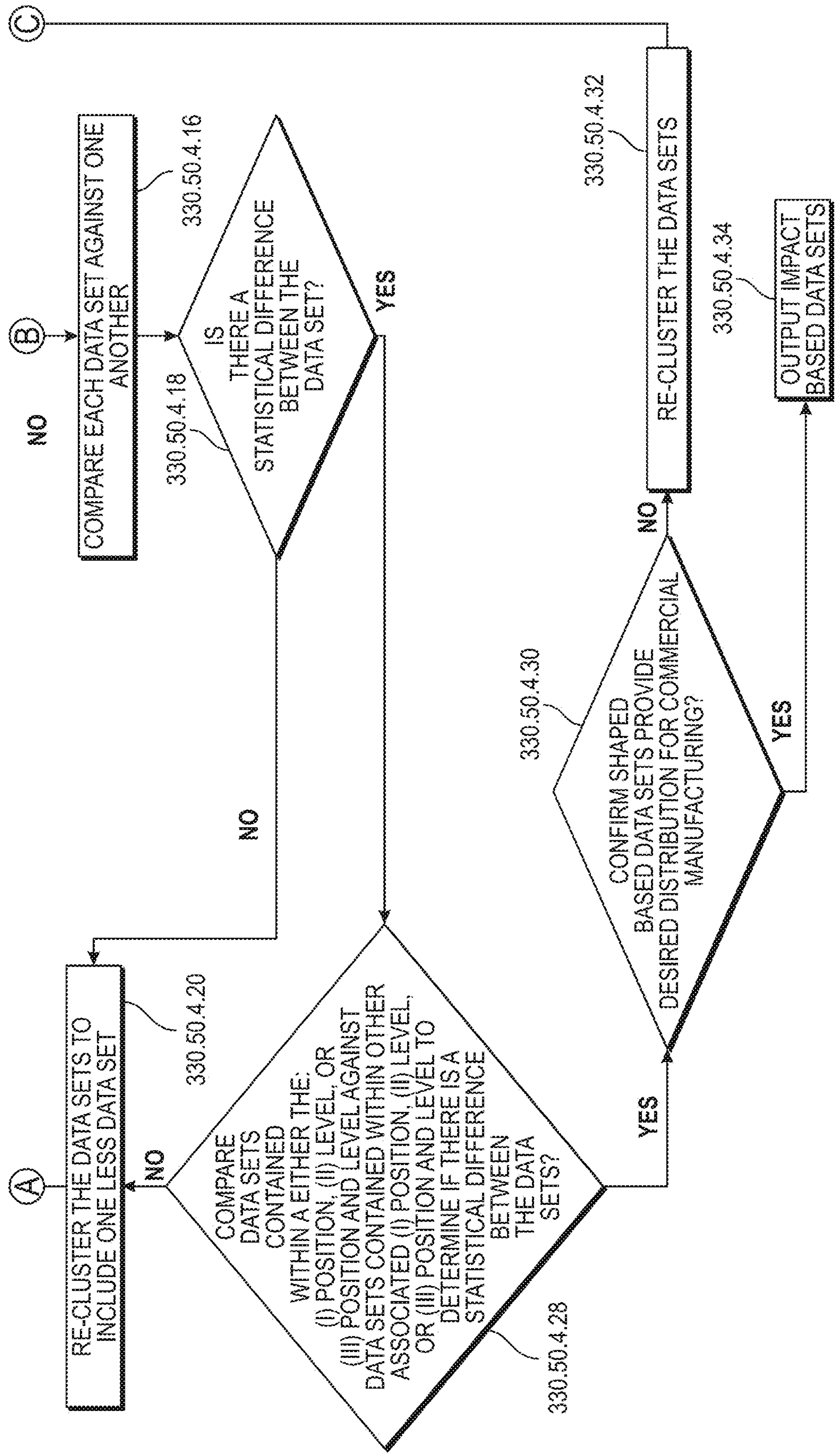
Figure 76A:
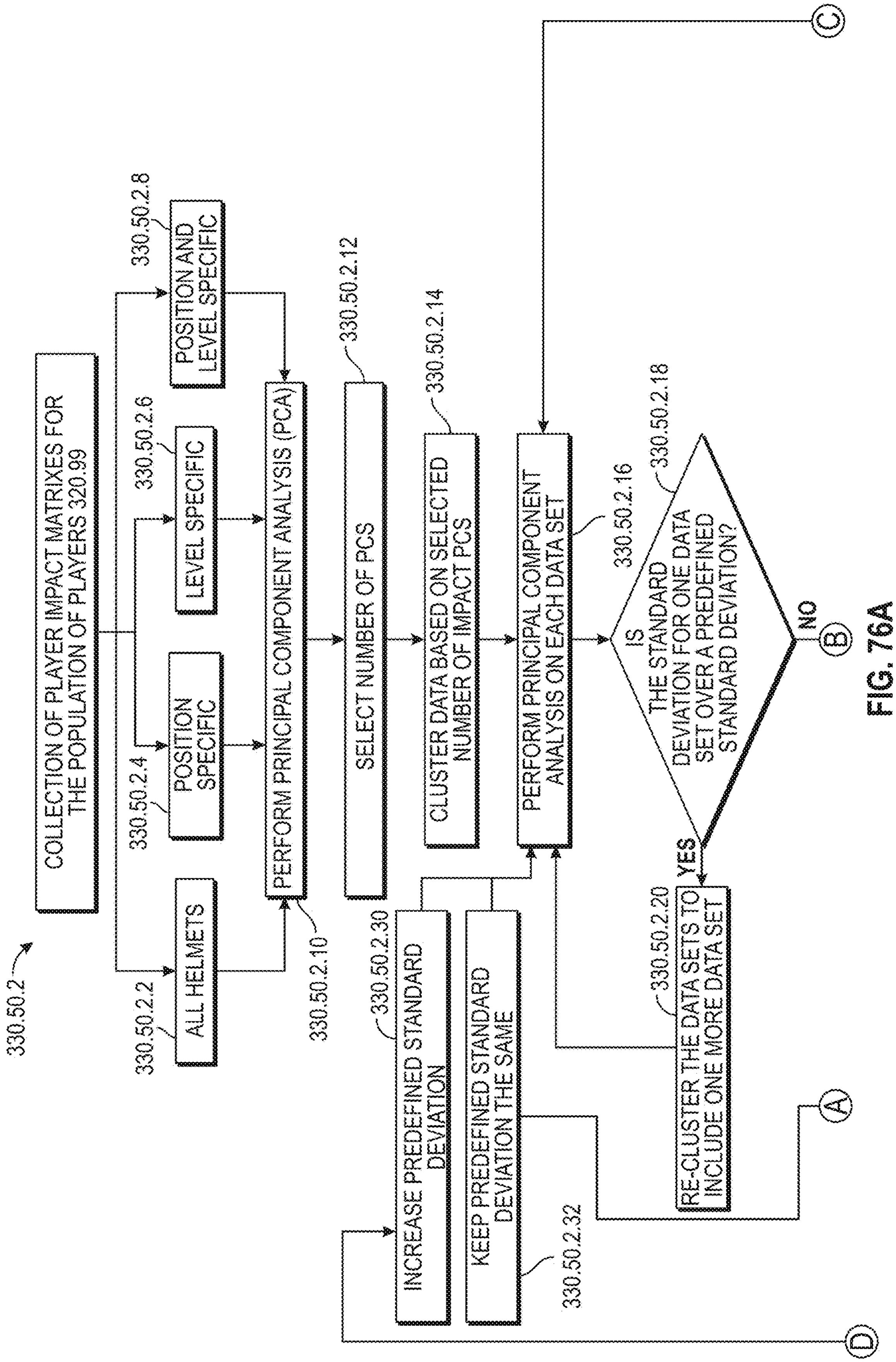
FIGS. 76A-B are flow charts showing a process for creating impact based data sets using a constraint based clustering method.
Figure 76B:
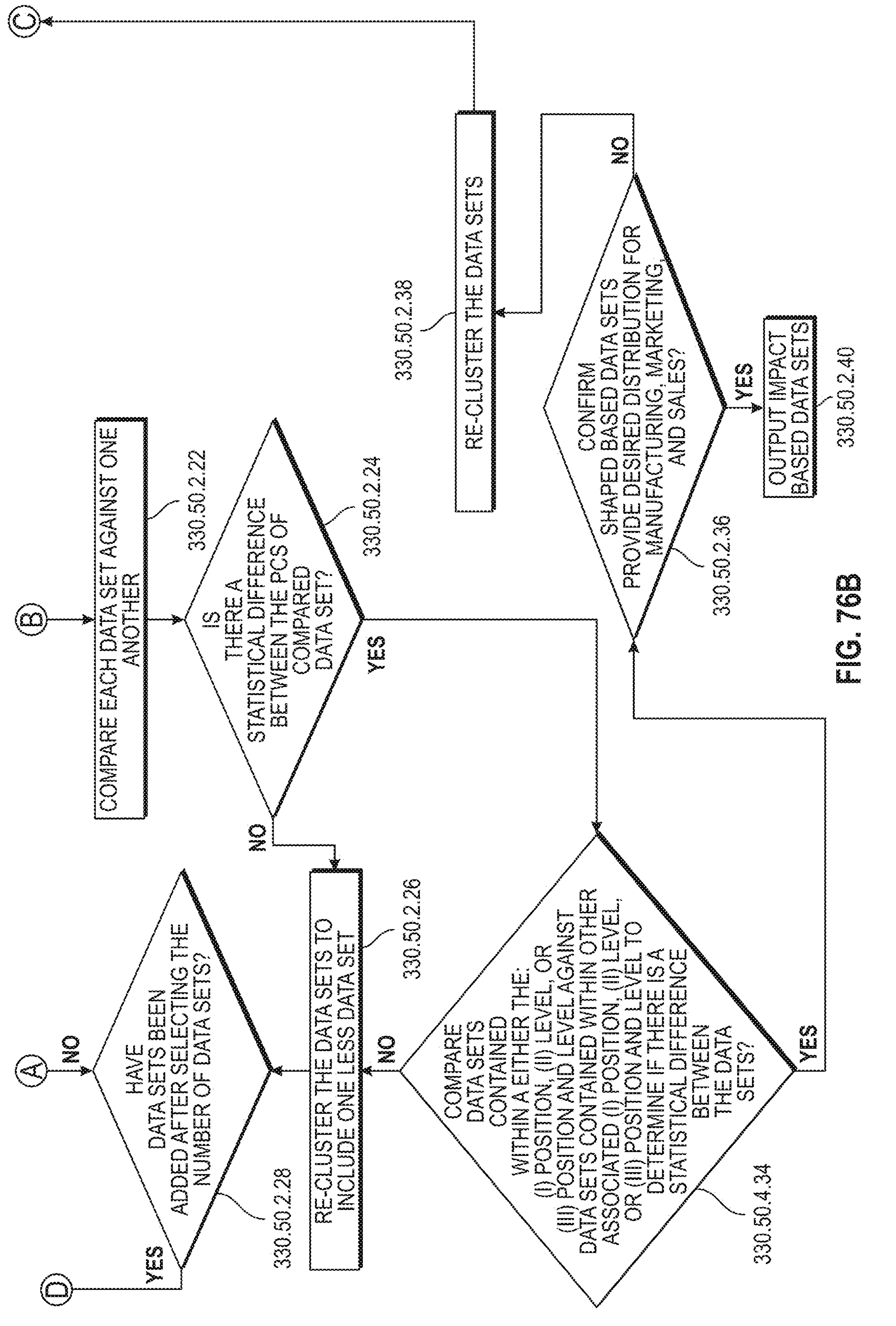

The next step in this process if the generation of the impact based player or "IBP" data sets 330.50.99 in step 330.50 based upon the impact information that is contained within the collection of impact matrixes 320.99. Specifically, the impact based data sets 350.50.99 may be created using a constraint based clustering method in step 330.50.2 (shown in FIG. 76) or a feature-based clustering method in step 330.50.4 (shown in FIG. 75). Both of these clustering algorithms were discussed about in connection with FIGS. 17*a*-17*d* and 19*a*-19*d*. The primary difference between these processes that are disclosed in connection with FIGS. 75-76 and the processes that are disclosed within FIGS. 17*a*-17*d* and 19*a*-19*d* is the fact that the process disclosed in connection with FIGS. 75-76 sorts information related to impacts instead of information related to shapes. Due to the similarity between these processes, a detailed explanation of the functionality will be omitted and one of skill in the art can understand this process from the flow charts and the description in connection with FIGS. 17*a*-17*d* and 19*a*-19*d*. Once these impacts based player data sets 330.50.99 are created, they are uploaded to a local or remote database for the designer to perform the next steps of the method.

ii. Develop Player Group—Impact Standard.

Referring back to FIG. 74, after the impacts based player data sets 330.50.99 have been created, a player group-impact based standard 330.52.99 is developed in step 330.52. The first step in developing this player group-impact based standard 330.52.99 is to collect all of the individual player impacts that are contained within each player group-impact based standard 330.52.99 and to combine these individual impact matrixes into a player group impact matrix. For example, for a level specific helmet that is designed for a varsity player, there may be six individual player group impact matrixes. It should be understood that the individual player impact matrixes 320.2.99 may be combined to create the player group impact matrix by any mathematical method, including adding the player impact matrixes 320.2.99 together. Once the player group impact matrix is created, the result is normalized to allow for comparison against other data sets. This normalization may be based on overall averaging, averaging over a season, or any other known method of normalization. Once this normalization operation is performed, the player group impact matrix is created and are ready for use in the next step in designing the player group impact based standard.

The player group impact matrixes are then compared against an industry accepted testing standard to determine if whether a player that falls within this group experiences impacts that are different from the impacts that are assumed by the industry accepted testing standard. In other words, is the player group impact matrix different than the impact matrix that is associated with the industry accepted testing standard. For example, Virginia Tech assumes that a player will experience 83 impacts that are at 3.0 m/s condition, 18 impacts that are at 4.6 m/s, and 4 impacts that are at 6.1 m/s during a season. The number of impacts are then evenly weighted (e.g., 25%) based on the impact location (e.g., front, front boss, side, back). Unlike these assumed impacts, an exemplary impact based impact matrix for the above described QB, may state that the players within this group experience: (i) 53 impacts that are at 3.0 m/s condition, 35 impacts that are at 4.6 m/s, and 17 impacts that are at 6.1 m/s during a season and (ii) the number of impacts should not be evenly weighted, but instead should be weighted with 32% for the back, 23% for the side, 26% for the front, and 19% for the front boss. Because the player group impact matrix is different than the impact matrix that is associated with the industry accepted testing standard, the designer will then modify the industry accepted testing standard based on the player group impact matrix. The player group-impact based standard 330.50.99 is then created based on this modification and is prepared for use in the next steps in designing and manufacturing the helmet 1000.

iii. Generate Optimized Helmet Prototype Models

Figure 43A:
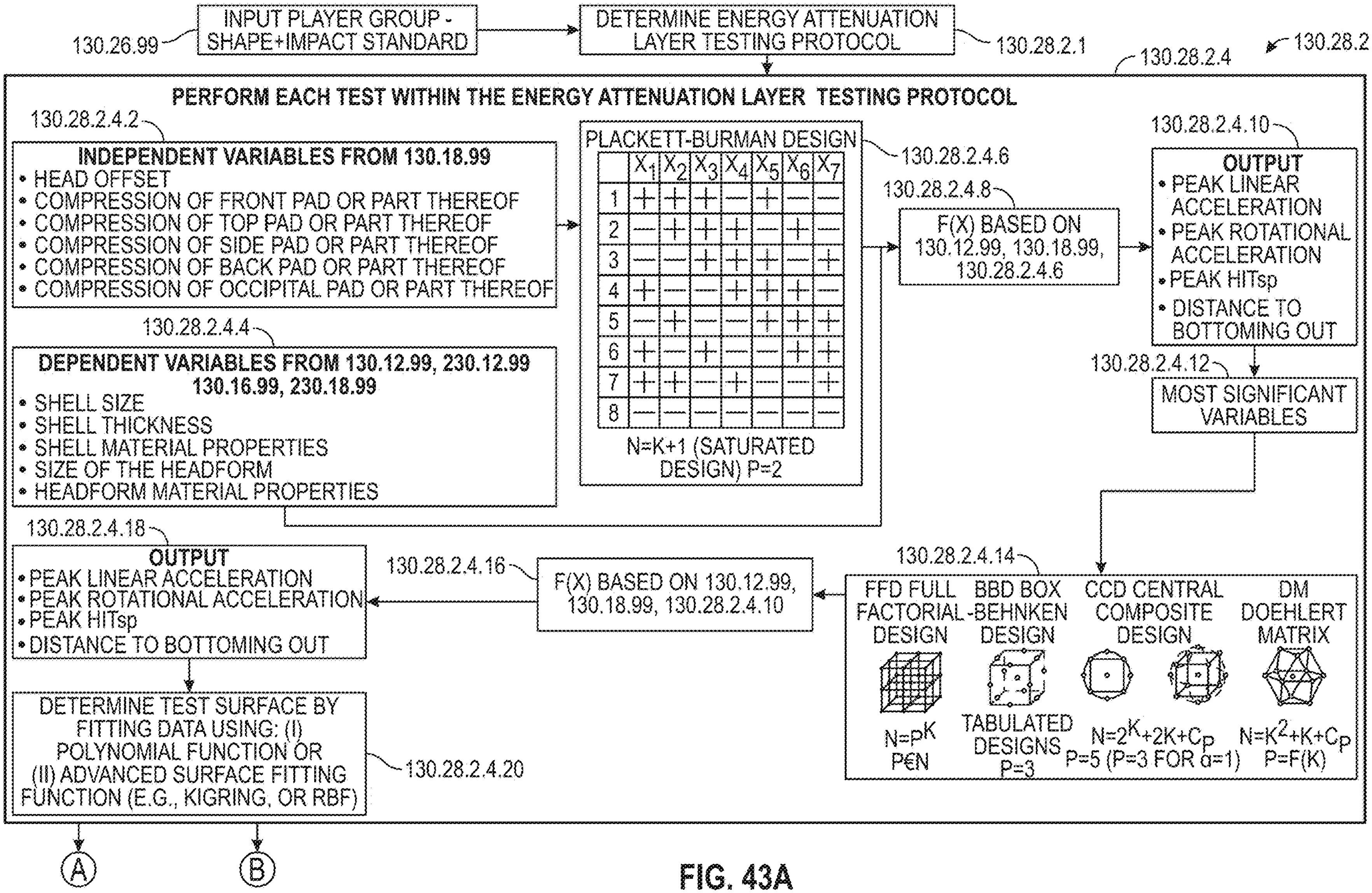
FIGS. 43A-B are flow charts showing a process of generating optimized helmet prototype models using a response surface methodology.
Figure 43B:
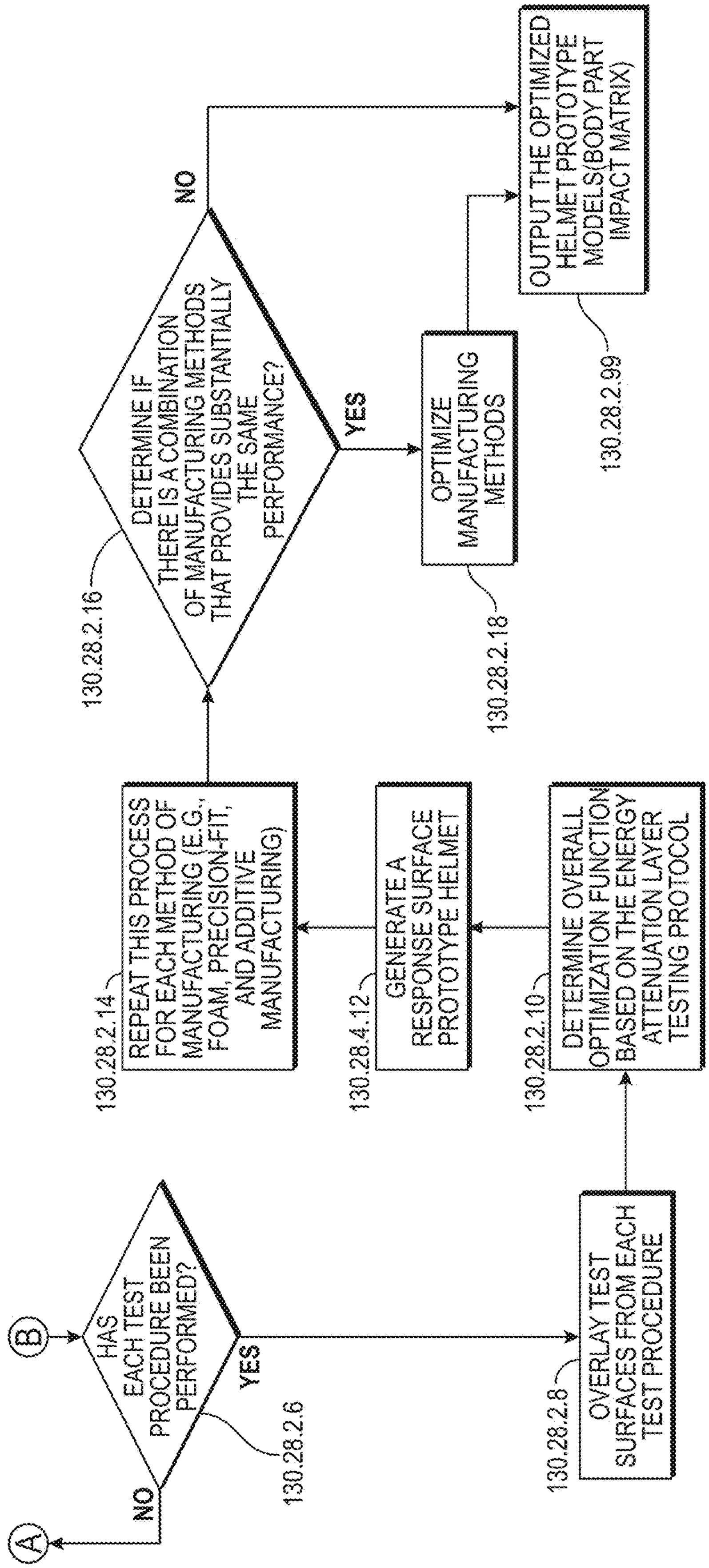
Figure 44:
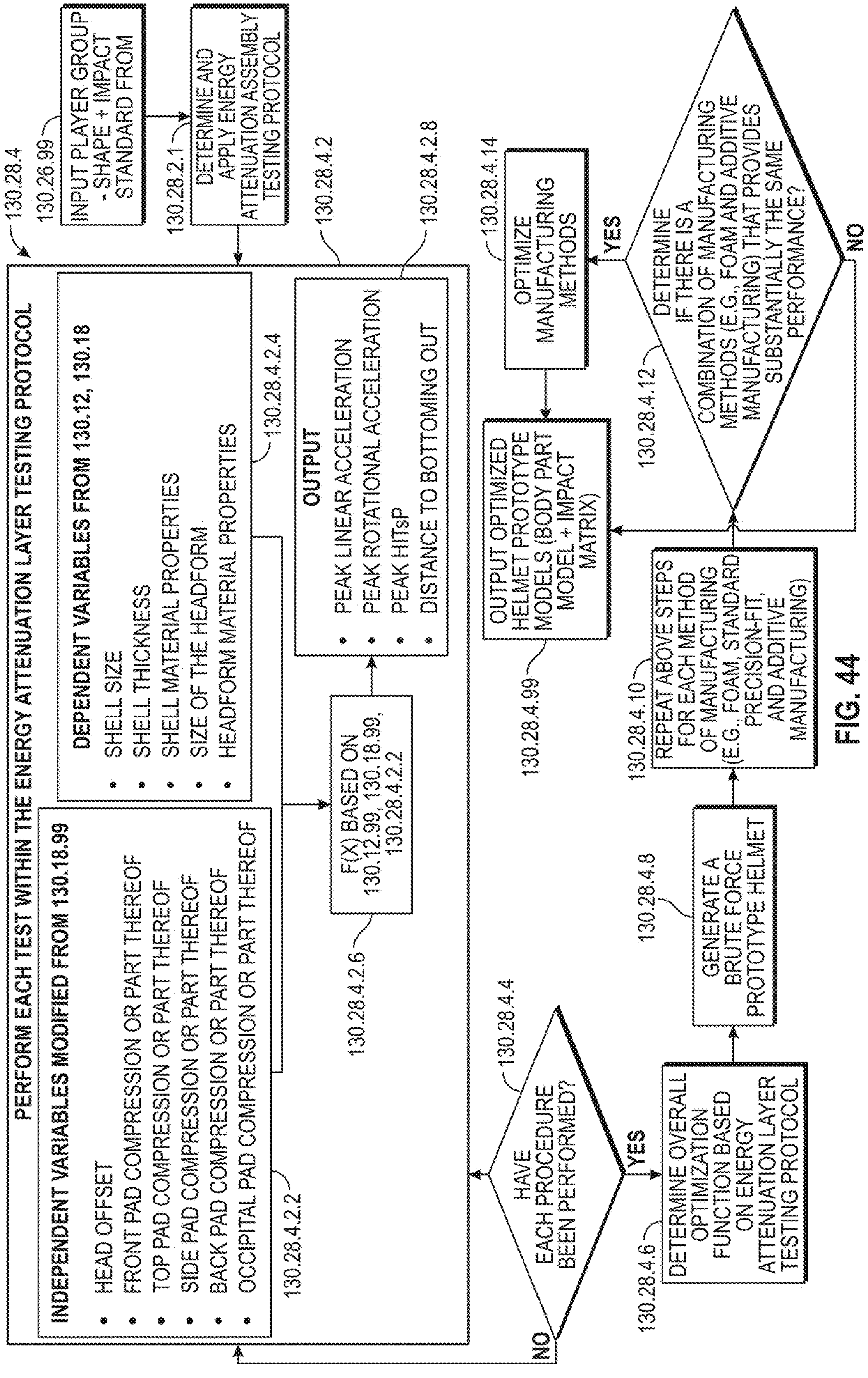
FIG. 44 is a flow chart showing a process of generating optimized helmet prototype models using a brute force methodology.
Figure 77A:
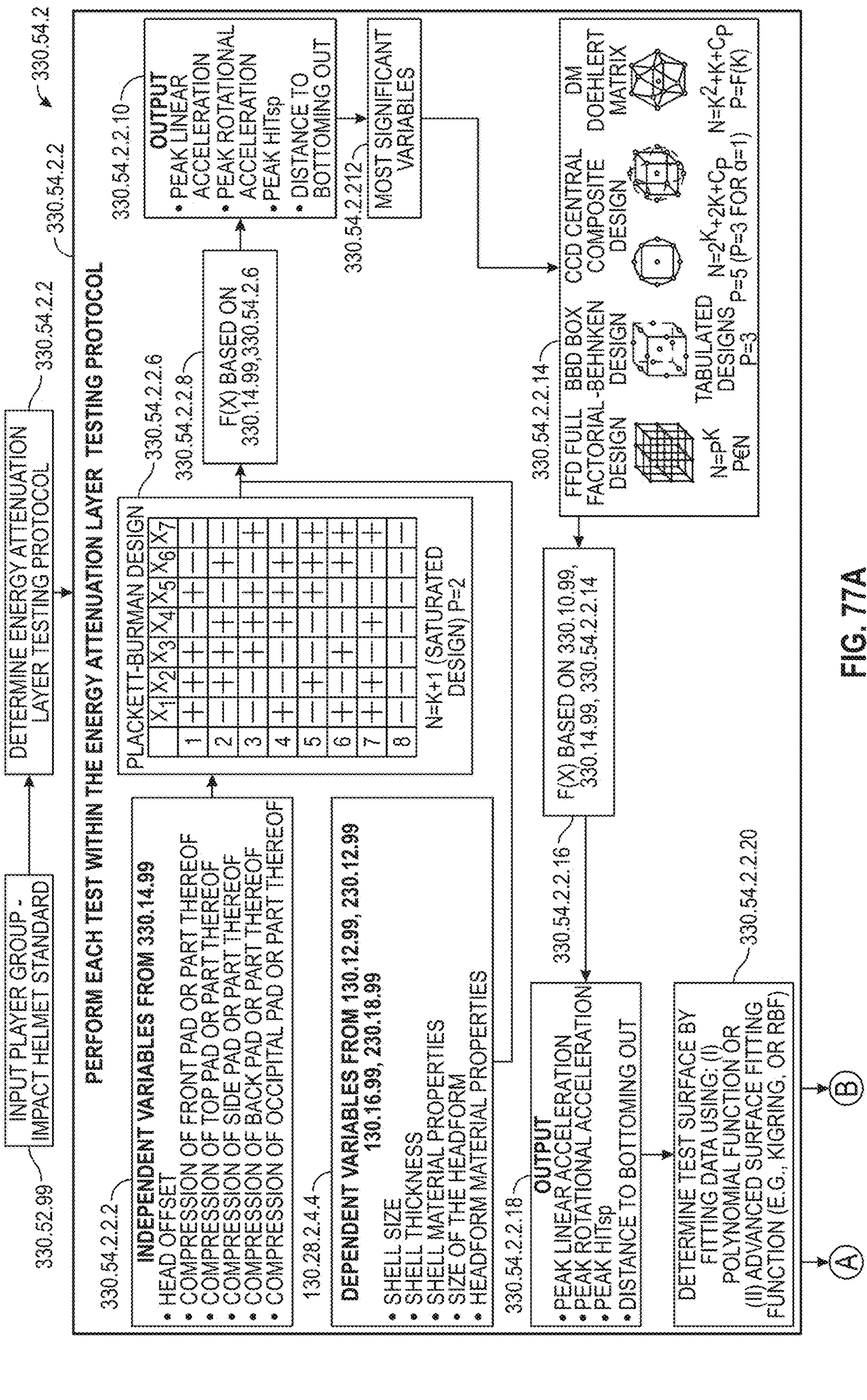
FIG. 77A-B are flow charts showing a process of generating optimized helmet prototype models using a response surface methodology.
Figure 77B:
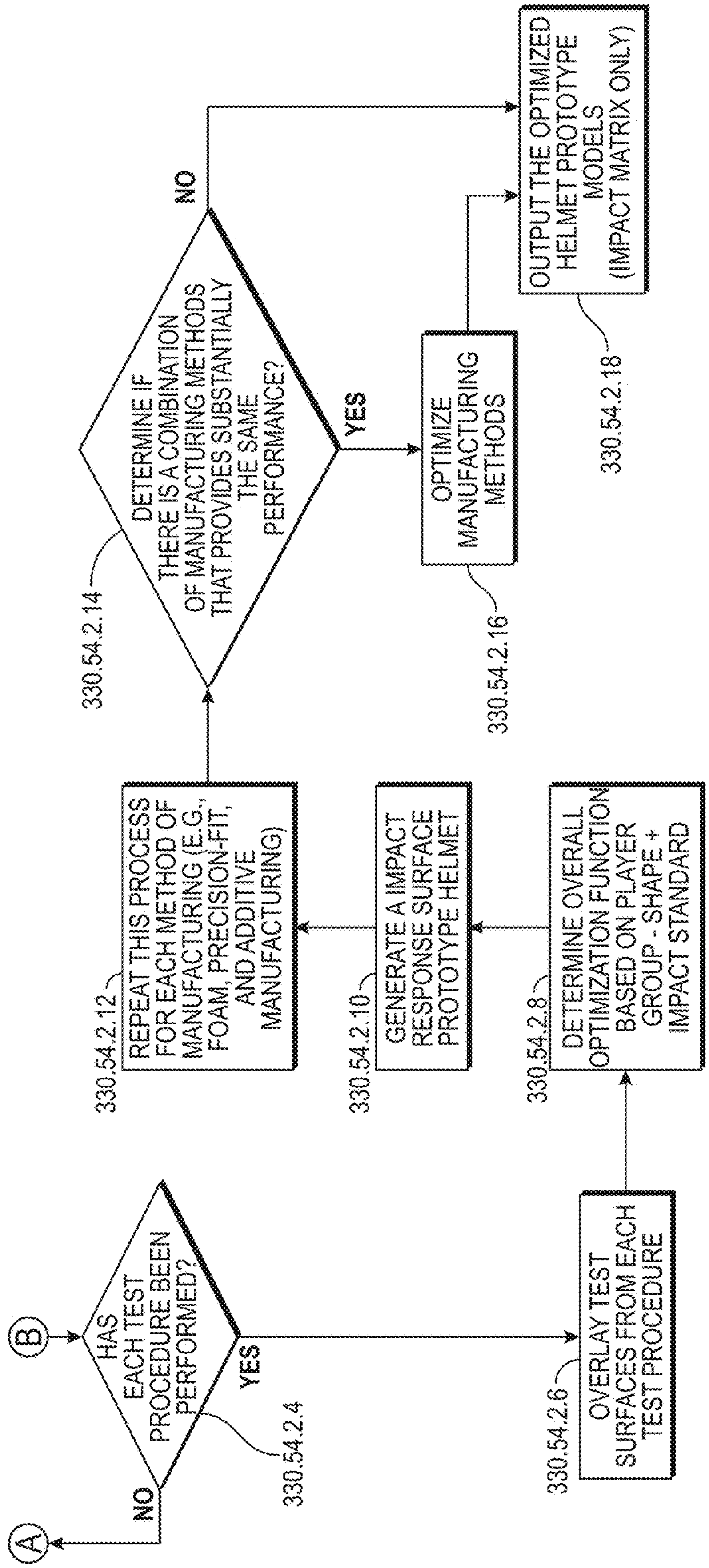
Figure 78:
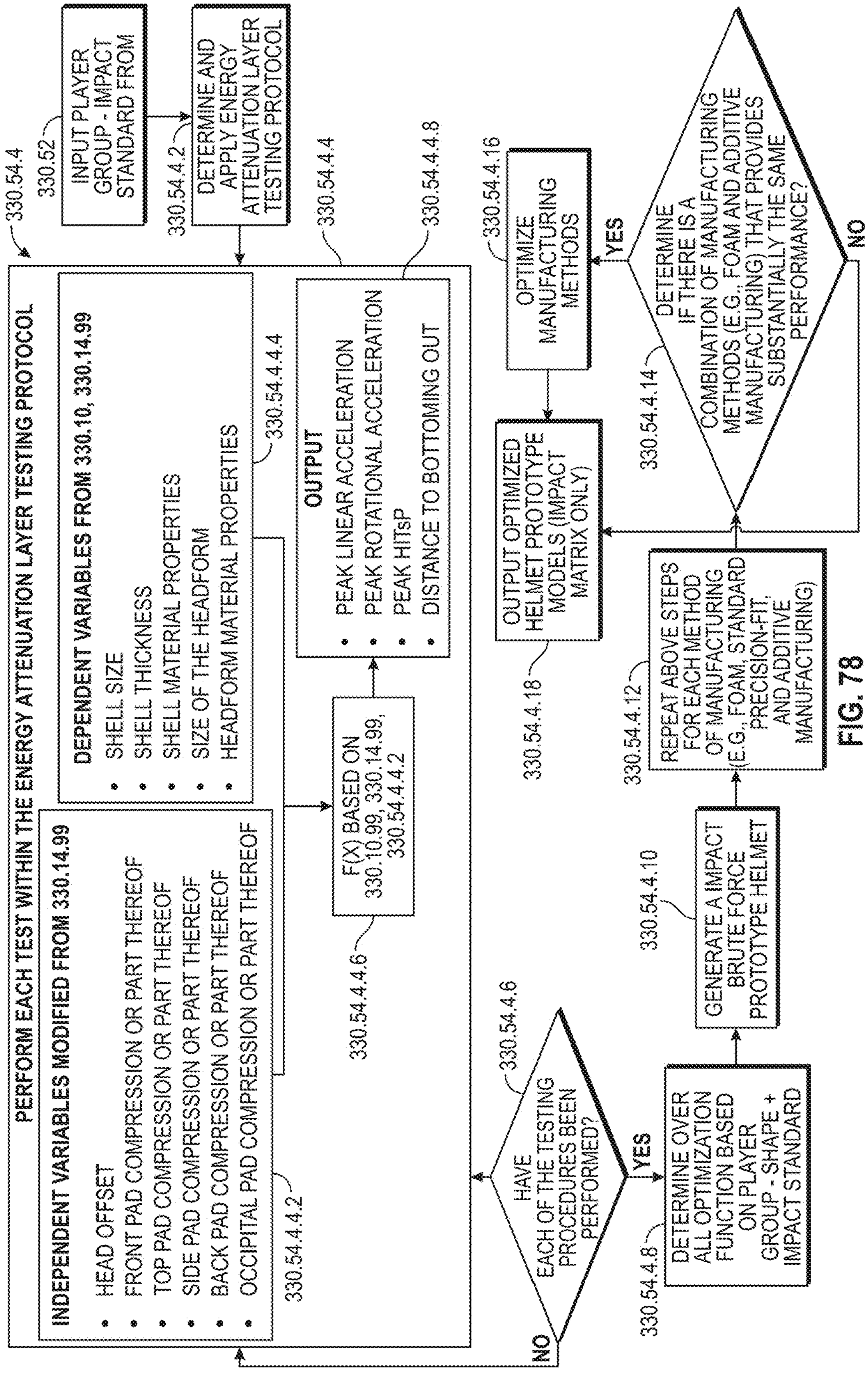
FIG. 78 is a flow chart showing a process of generating optimized helmet prototype models using a brute force methodology.
Figure 79:
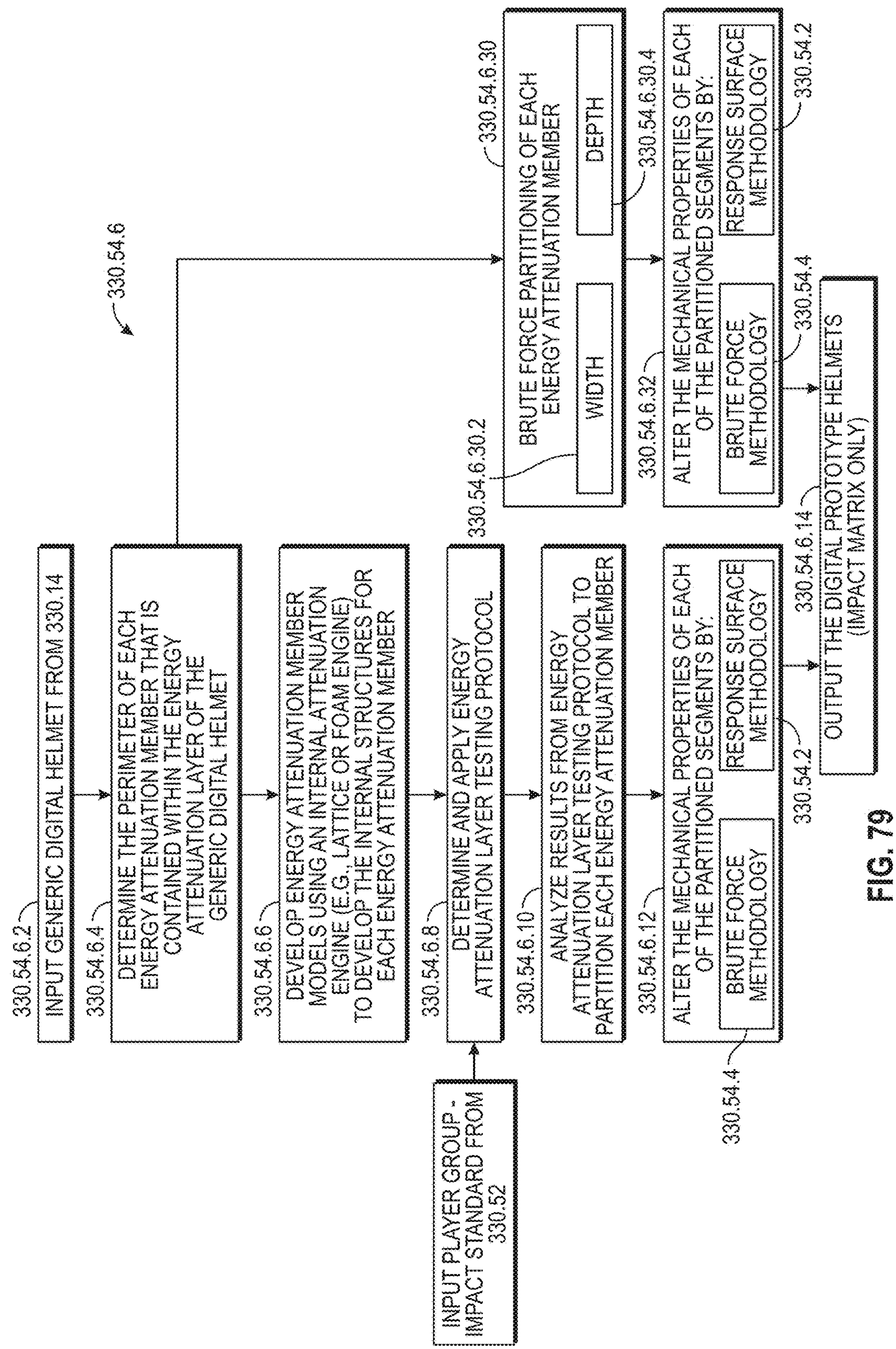
FIG. 79 is a flow chart showing a process of generating optimized helmet prototype models using a hybrid methodology.

Referring back to FIG. 74, an optimized helmet prototype model is generated in step 330.54. Like above, this process can be performed by one of the following methodologies: (i) response surface (FIG. 43), (ii) brute force (FIG. 44), or (iii) hybrid optimization approach (FIG. 45). The primary difference between the processes disclosed in connect with FIGS. 77-79 in comparison to the process disclosed within FIGS. 43-45 is the fact that the independent and dependent variables are derived from a generic helmet in FIGS. 77-79, as opposed to a optimized data set specific helmet. Due to the similarity between these processes, a detailed explanation of the functionality will be omitted and one of skill in the art can understand this process from the flow charts and the description in connection with FIGS. 43-45.

While the size of the shell is a dependent variable in these optimization methodologies, meaning that it will not be altered in this optimization process, it should be understood that the location of the player's head within the helmet is an independent variable, meaning that various locations of the player's head within the helmet will be utilized during these optimization processes. This being said, the locations of the player's head within the helmet are constraint by the MCS. In other words, the offset of the players head in the forward or backward directions should not be such that it places the outer surface of the maximum surface passed or through the MCS. Nevertheless, if the optimization methodologies determine that there is a significant benefit in offsetting the head to a location where it passes through the MCS, then the designer should consider whether the size of the shell in a manner that creates a new MCS that the maximum surface does not pass or extend through. Once these optimized helmet prototype models 330.54.99 are created, they are uploaded to a local or remote database for the designer to perform the next steps of the method.

iv. Confirm Optimized Helmet Prototype Model Meets Specifications

Referring back to FIG. 74, after the optimized helmet prototype models 330.54.99 are created in step 330.54, they are tested to ensure that they meet all helmet requirements. For example, they are digitally tested to ensure that they pass NOCSAE using a NOCSAE headform. If the optimized helmet prototype models 130.28.99 pass all helmet standards, then they are approved in step 130.36 and prepared for the next steps in designing and manufacturing the helmet 1000.

F. Generate Complete Helmet Models with Energy Attenuation Assembly

Figure 51:
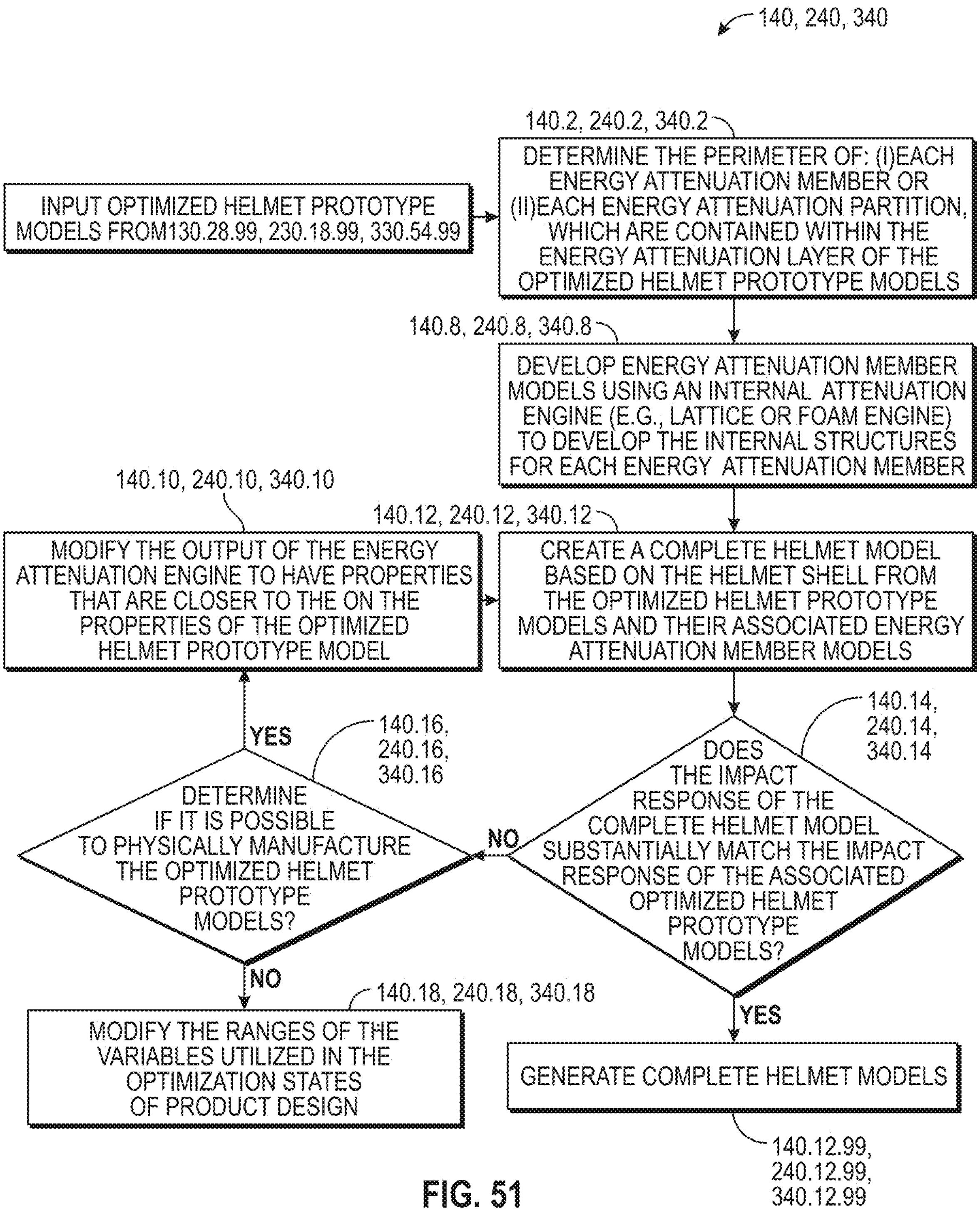
FIG. 51 is a flow chart showing a process of generating complete helmet models.

Referring to FIG. 1, the next step in this method is to create a complete helmet model 140.12.99, 240.12.99, 340.12.99 from the optimized helmet prototype models 130.28.99, 230.18.99, 330.54.99. Details about the creation of the complete helmet models 140.12.99, 240.12.99, 340.12.99 is described in greater detail in FIG. 51. Referring now to FIG. 51, the first steps in this method are inputting the optimized helmet prototype models 130.28.99, 230.18.99, 330.54.99 and determining the perimeter of: (i) each energy attenuation member or (ii) each energy attenuation segment in step 140.2, 240.2, 340.2. Next, optimized helmet prototype models 130.28.99, 230.18.99, 330.54.99 along with the perimeter of: (i) each energy attenuation member or (ii) each energy attenuation segment are entered into the energy attenuation engine to develop energy attenuation member models 140.8.99, 240.8.99, 340.8.99 in step 140.8, 240.8, 340.8. The energy attenuation member models 140.8.99, 240.8.99, 340.8.99 are created using the same steps that are described above in connection with FIG. 46 and for the sake of brevity will not be repeated here.

Below are a number of exemplary embodiments of the front energy attenuation member model that may be created in step 140.8, 240.8, 340.8. In a first exemplary embodiment, the chemical composition and the structural makeup of the front energy attenuation member 2010 may be consistent throughout the model. Specifically, the front energy attenuation member model may be comprised of: (i) a consistent composition of one type of polyurethane and a second type of polyurethane and (ii) a single lattice cell type. In a second embodiment, the chemical composition of the front energy attenuation member model may be consistent throughout the entire model, while the structural makeup may vary between lattice regions. Specifically, the model may have: (i) a consistent composition of one type of polyurethane and a second type of polyurethane, (ii) a first region, which has a first lattice cell type and a first density, and (iii) second region, which has a first lattice cell type and a second density. In this example, the second lattice density may be greater or denser than the first lattice density. Increasing the lattice density, while keeping all other variables (e.g., lattice cell type, material type, and etc.) consistent will make the model harder. In other words, it will take more force to compress the model; thus, allowing the model to absorb greater impact forces without becoming fully compressed (otherwise known as bottoming out).

In a third embodiment, the chemical composition of the front energy attenuation member model may be consistent throughout the model, while the structural makeup changes in various regions of the model. Specifically, the front energy attenuation member model may have: between (i) 1 and X different lattice cell types, where X is the number of lattice unit cells contained within the model, (ii) preferably between 1 and 20 different lattice cell types, and (iii) most preferably between 1 and 10 different lattice cell types. Additionally, the front energy attenuation member model may also have: between 1 and X different lattice densities, where X is the number of lattice unit cells contained within the model, (ii) preferably between 1 and 30 different lattice densities, and (iii) most preferably between 1 and 15 different lattice densities. Further, the front energy attenuation member may also have: between 1 and X different lattice angles, where X is the number of lattice unit cells contained within the model, (ii) preferably between 1 and 30 different lattice angles, and (iii) most preferably between 1 and 15 different lattice angles. For example this embodiment may have: (i) consistent composition of one type of polyurethane and a second type of polyurethane, (ii) a first region having a first lattice cell type and a first density, (iii) a second region having a first lattice cell type and a second density, and (iv) a third region having a second lattice cell type and a first density.

In a fourth embodiment, the chemical composition of the front energy attenuation member model may change in various regions of the model, while the structural makeup is consistent throughout the entire model. Specifically, the front energy attenuation member model may have: (i) between 1 and X different chemical compositions, where X is the number of lattice cells contained within the model, (ii) preferably between 1 and 3 different chemical compositions, and most (iii) preferably between 1 and 2 different chemical compositions. In this exemplary embodiment, front energy attenuation member model may have: (i) a first region made from a first ratio of one type of polyurethane and a second type of polyurethane, (ii) a second region made from a second ratio of one type of polyurethane and a second type of polyurethane, and (iii) a consistent structural makeup of a single lattice cell type.

In a fifth embodiment, both the structural makeup and the chemical compositions may vary within the front energy attenuation member model. In this exemplary embodiment, the model has: (i) a first region made from a first ratio of one type of polyurethane and a second type of polyurethane, (ii) a second region made from a second ratio of one type of polyurethane and a third type of polyurethane, (iii) a third region, which has a first lattice cell type and a first density, (iv) a fourth region, which has a first lattice cell type and a second density, (v) a fifth region, which has a second lattice cell type and a third density, and (vi) a sixth region, which has a third lattice cell type and a first density.

Figure 52A:
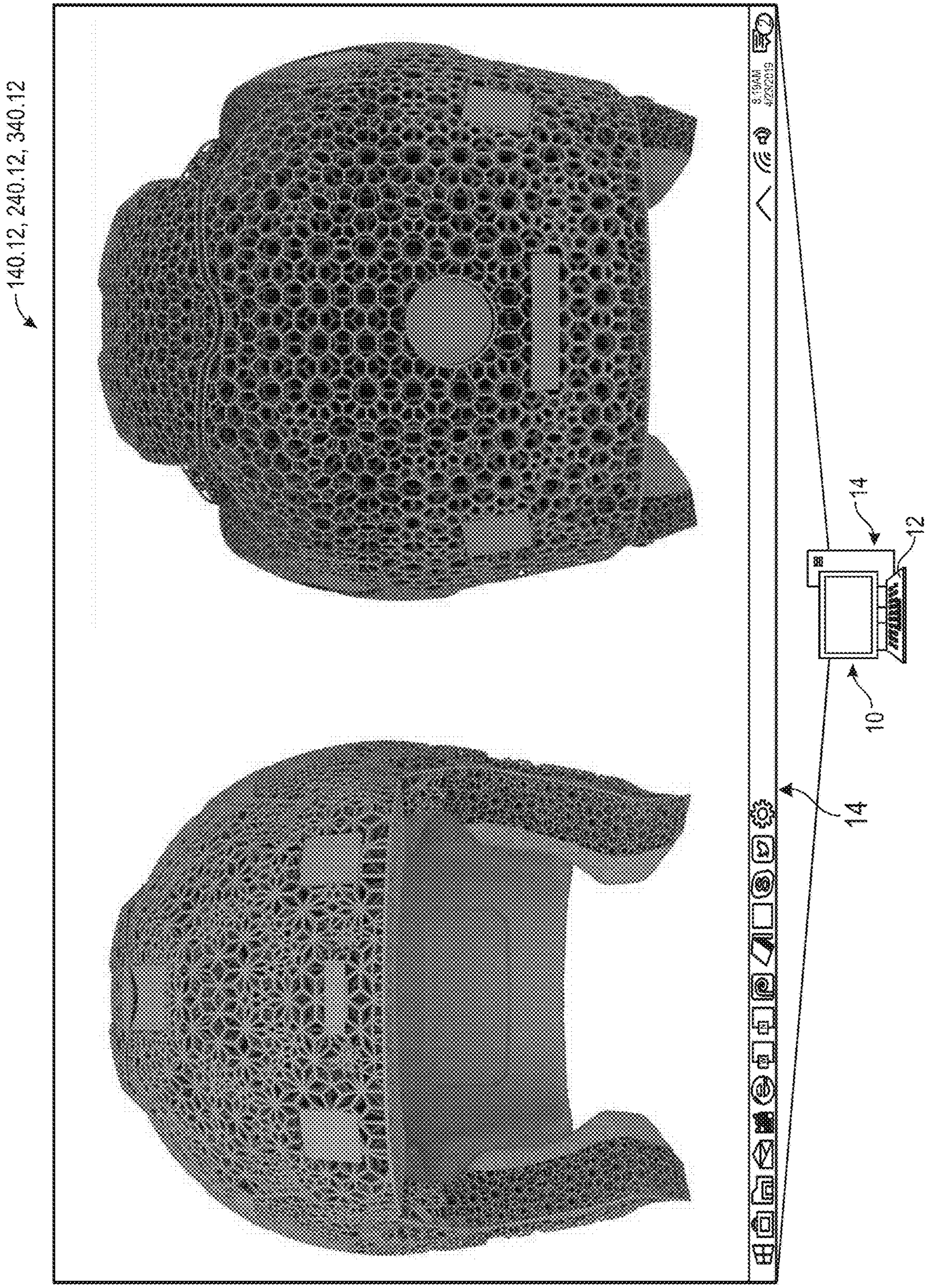
FIG. 52*a*-52*b* shows the electronic device displaying the assembled energy attenuation member models.
Figure 52B:
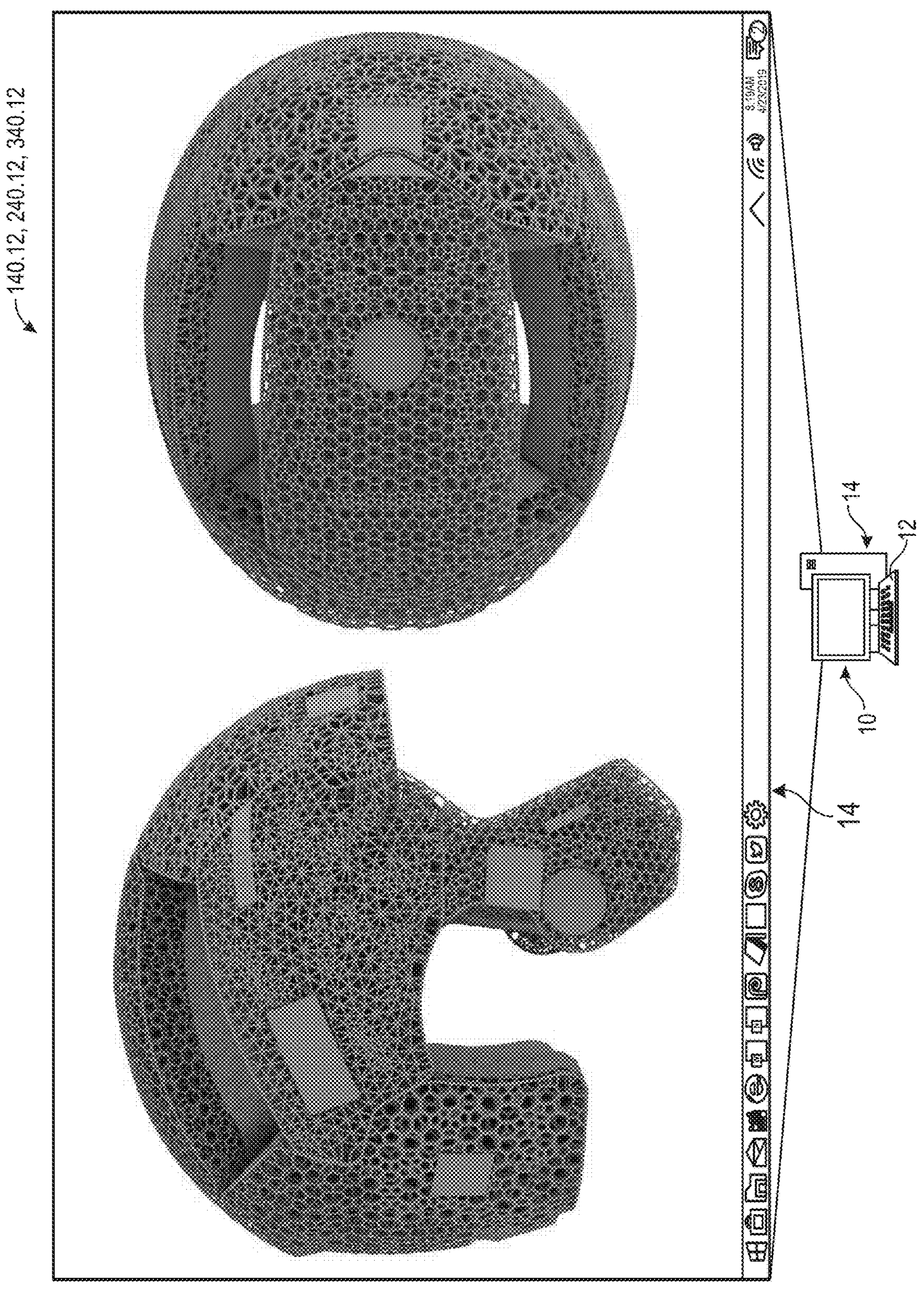

Once the energy attenuation member models are created in step 140.8, 240.8, 340.8, the complete helmet models 140.12.99, 240.12.99, 340.12.99 [[is]] are created based on the helmet shell from the optimized helmet prototype models 130.28.99, 230.18.99, 330.54.99 and its associated energy attenuation member models 140.8.99, 240.8.99, 340.8.99 in step 140.12, 240.12, 340.12. It should be understood that the complete helmet models 140.12.99, 240.12.99, 340.12.99 may take the form of a finite element model or any other digital model that contains mechanical properties and shape information that can be used later in the digital testing. FIGS. 52*a*-52*b* show assembled version of an exemplary 3D energy attenuation member models 140.8.99, 240.8.99, 340.8.99, which are contained within the complete helmet model 140.12.99, 240.12.99, 340.12.99.

Figure 53:
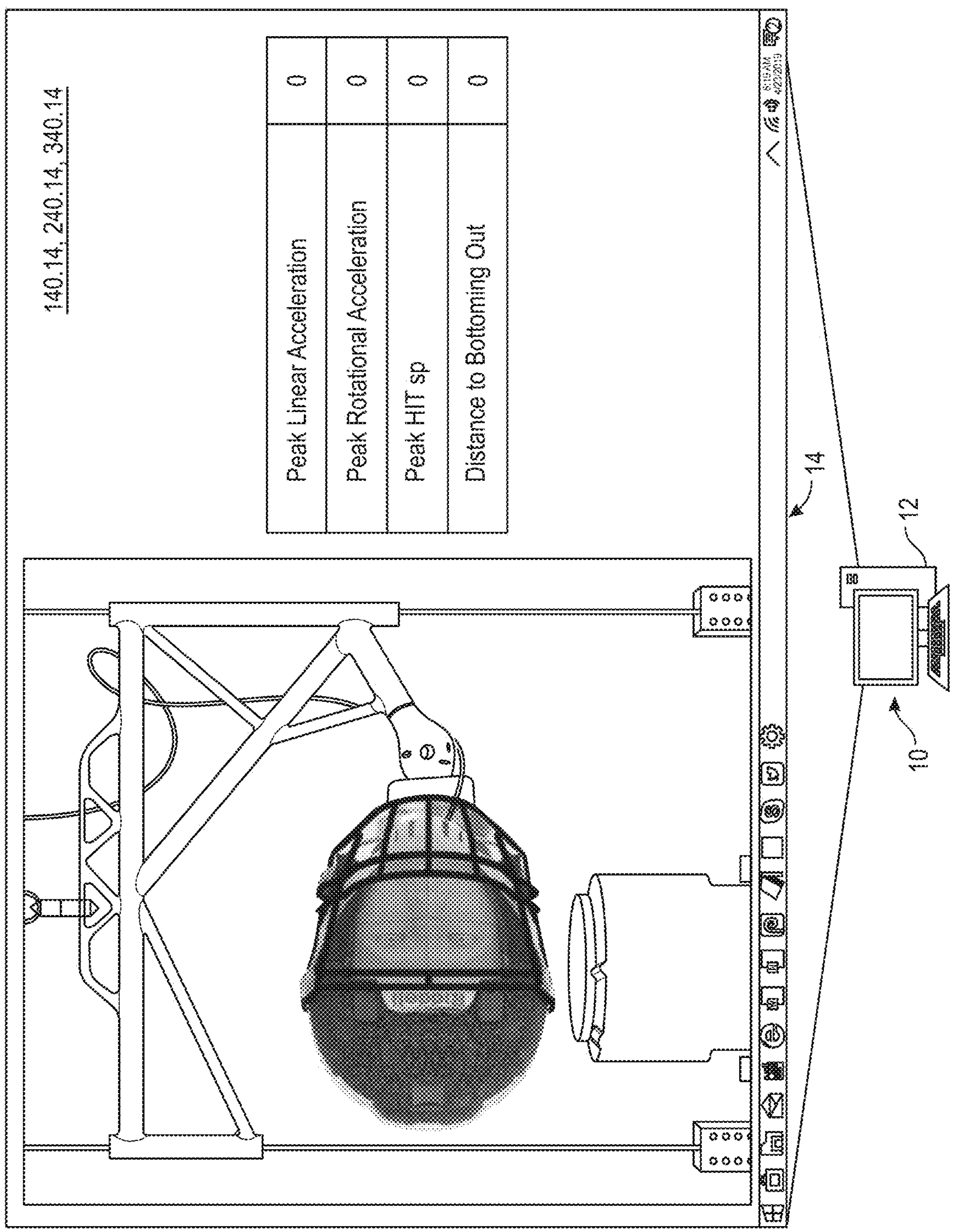
FIG. 53 shows the electronic device displaying the testing of the complete helmet models.

Referring back to FIG. 51, the complete helmet models 140.12.99, 240.12.99, 340.12.99 are digitally tested to determine if the impact responses substantially matches the impact responses of the optimized helmet prototype models 130.28.99, 230.18.99, 330.54.99 in step 140.14, 240.14, 340.14. The computerized testing system performs this check because the energy attenuation member models may not be able to exactly match the mechanical properties of the energy attenuation members that are contained within the optimized helmet prototype model 130.28.99, 230.18.99, 330.54.99. Thus, this step helps ensure that any changes to the energy attenuation members does not substantially alter the performance of the helmet. To perform this check, both the optimized helmet prototype model 130.28.99, 230.18.99, 330.54.99 and the complete helmet model 140.12.99, 240.12.99, 340.12.99 are digitally tested. FIG. 53 shows the digital testing of the complete helmet models 140.12.99, 240.12.99, 340.12.99.

Referring back to FIG. 51, if the impact response of the complete helmet model 140.12.99, 240.12.99, 340.12.99 does not substantially match the optimized helmet prototype models 130.28.99, 230.18.99, 330.54.99 in step 140.14, 240.14, 340.14, then the electronic device 10 determines if it is possible to physically manufacture the optimized helmet prototype models 130.28.99, 230.18.99, 330.54.99 in step 140.16, 240.16, 340.16. If it appears to be possible in step 140.16, 240.16, 340.16, then the energy attenuation member models are modified in step 140.10, 240.10, 340.10 to better match the performance of the energy attenuation members contained within the optimized helmet prototype models 130.28.99, 230.18.99, 330.54.9. Alternatively, if it is determined that the optimized helmet prototype models 130.28.99, 230.18.99, 330.54.9 cannot be manufactured, then the ranges of the variables that were utilized in the optimization steps 130.18, 130.28, 230.18, 330.54 are altered in step 140.18, 240.18, 34018 and these optimization steps are re-run. In a further alternative, if the impact response of the complete helmet model 140.12.99, 240.12.99, 340.12.99 substantially matches the optimized helmet prototype models 130.28.99, 230.18.99, 330.54.99 in step 140.14, 240.14, 340.14, then the complete helmet models are generated and outputted for use in the next steps in designing and manufacturing the helmet 1000.

G. Manufacture Physical Prototypes

Figure 54:
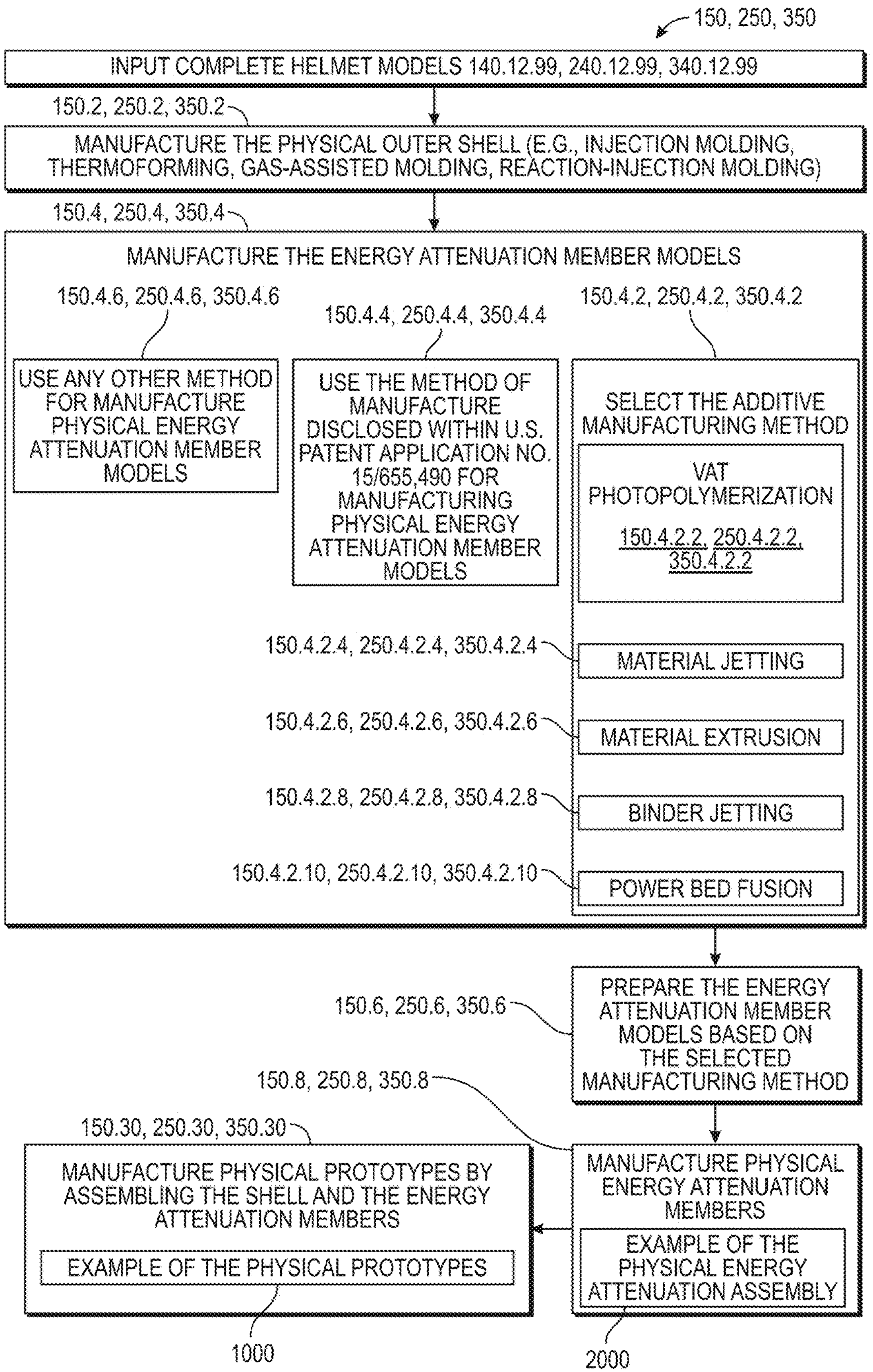
FIG. 54 is a flow chart showing a process of manufacturing physical helmets based on the complete helmet models.

Referring to FIG. 1, the next step is to manufacture physical prototypes based on the complete helmet model 140.12.99, 240.12.99, 340.12.99. Details about the manufacturing of the prototypes 150.30.99, 250.30.99, 350.30.99 is described in greater detail in FIG. 54. Referring now to FIG. 54, the first step in this process is inputting the complete helmet model 140.12.99, 240.12.99, 340.12.99. Next, a method of manufacturing the outer shell is selected in step 150.2, 250.2, 350.2. The selected manufacturing method may include: injection molding, thermoforming, gas-assisted molding, reaction-injection molding, or other similar manufacturing types. It should be understood that the selected manufacturing type should be able to accurately produce the outer shell 150.2.99, 250.2.99, 350.2.99 for the prototype helmets 150.30.99, 250.30.99, 350.30.99, whose mechanical and physical properties are similar to outer shell contained within the complete helmet model 140.12.99, 240.12.99, 340.12.99.

1. Select Manufacturing Process for the Energy Attenuation Member Models

Once the outer shells 150.2.99, 250.2.99, 350.2.99 are produced in step 150.2, 250.2, 350.2, the designer selects the method of manufacturing the energy attenuation member models in step 150.4, 250.4, 350.4. One method that the designer may select is an additive manufacturing method, which includes: (i) VAT photopolymerization 150.4.2.2, 250.4.2.2, 350.4.2.2, (ii) material jetting 150.4.2.4, 250.4.2.4, 350.4.2.4, (iii) material extrusion 150.4.2.6, 250.4.2.6, 350.4.2.6, (iv) binder jetting 150.4.2.8, 250.4.2.8, 350.4.2.8, or (v) power bed fusion 150.4.2.10, 250.4.2.10,

350.4.2.10. In particular, VAT photopolymerization 150.4.2.2, 250.4.2.2, 350.4.2.2 manufacturing technologies/products include: Stereolithography ("SLA"), Digital Light Processing ("DLP"), Direct UV Processing ("DUP"), or Continuous Liquid Interface Production ("CLIP"). Specifically, SLA can be done through an upside-down approach or a right-side-up approach. In both approaches, a UV laser is directed by at least one mirror towards a vat of liquid photopolymer resin. The UV laser traces one layer of the object (e.g., energy attenuation member model) at a time. This tracing causes the resin to selectively cure. After a layer is traced by the UV laser, the build platform moves to a new location, and the UV laser traces the next layer. For example, this method may be used to manufacture the energy attenuation member models, if they are made from a rigid polyurethane, flexible polyurethane, elastomeric polyurethane, a mixture of any of these polyurethanes, or any similar materials.

Alternatively, a DLP process uses a DLP chip along with a UV light source to project an image of the entire layer through a transparent window and onto the bottom of a vat of liquid photopolymer resin. Similar to SLA, the areas that are exposed to the UV light are cured. Once the resin is cured, the vat of resin tilts to unstick the cured resin from the bottom of the vat. The stepper motor then repositions the build platform to prepare to expose the next layer. The next layer is exposed to the UV light, which cures the next layer of resin. This process is repeated until the entire model is finished. DUP uses a process that is almost identical to DLP, the only difference is that the DLP projector is replaced in DUP with either: (i) an array of UV light emitting diodes ("LEDs") and an liquid crystal display ("LCD"), wherein the LCD acts as a mask to selectively allow the light from the LEDs to propagate through the LCD to selectively expose the resin or (ii) a UV emitting organic liquid crystal display ("OLED"), where the OLED acts as both the light source and the mask. Like SLA, this process may be used to manufacture the energy attenuation member models, if they are made from a rigid polyurethane, flexible polyurethane, elastomeric polyurethane, a mixture of any of these polyurethanes, or any similar materials.

Similar to DLP and DUP, CLIP uses a UV light source to set the shape of the object (e.g., energy attenuation member model). Unlike DLP and DUP, CLIP uses an oxygen permeable window that creates a dead zone that is positioned between the window and the lowest cured layer of the object. This dead zone helps ensure that the object does not stick to the window and thus the vat does not need to tilt to unstick the object from the window. Once the shape of the object is set by the UV light, the object is fully cured using an external thermal source or UV light. Information about CLIP, materials that can be used in connection with CLIP, and other additive manufacturing information is discussed in J. R. Tumbleston, et al., *Additive manufacturing. Continuous liquid interface production of* 3D *objects*. Science 347, 1349-1352 (2015), which is fully incorporated herein by reference for any purpose. Like SLA and DLP, this process may be used to manufacture the energy attenuation member models, if they are made from a rigid polyurethane, flexible polyurethane, elastomeric polyurethane, a mixture of any of these polyurethanes, or any similar materials.

Material jetting 150.4.2.4, 250.4.2.4, 350.4.2.4 manufacturing technologies/products include: PolyJet, Smooth Curvatures Printing, or Multi-Jet Modeling. Specifically, droplets of material are deposited layer by layer to make the object (e.g., energy attenuation member model) and then these droplets are either cured by a light source (e.g., UV light) or are thermally molten materials that then solidify in ambient temperatures. This method has the benefit of being able to print colors within the object; thus, a team's graphics or the player's name may be printed into the energy attenuation assembly. Material extrusion 150.4.2.6, 250.4.2.6, 350.4.2.6 manufacturing technologies/products include: Fused Filament Fabrication ("FFF") or Fused Deposition Modeling ("FDM"). Specifically, materials are extruded through a nozzle or orifice in tracks or beads, which are then combined into multi-layer models. The FFF method allows for the selective positioning of different materials within the object (e.g., energy attenuation member model). For example, one region of the energy attenuation member model may only contain semi-rigid polyurethane, where another region of the energy attenuation member model contains alternating layers of rigid polyurethane and flexible polyurethane.

Binder jetting 150.4.2.8, 250.4.2.8, 350.4.2.8 manufacturing technologies/products include: 3DP, ExOne, or Voxeljet. Specifically, liquid bonding agents are selectively applied onto thin layers of powdered material to build up parts layer by layer. Additionally, power bed fusion 150.4.2.10, 250.4.2.10, 350.4.2.10 manufacturing technologies/products include: selective laser sintering ("SLS"), direct selective laser melting ("SLM"), selective heat sintering ("SHS"), or multi-jet fusion ("MJF"). Specifically, powdered materials is selectively consolidated by melting it together using a heat source such as a laser or electron beam. Another method that the designer may select is a manufacturing method that is described within U.S. patent application Ser. No. 15/655,490 in 150.4.4, 250.4.4, 350.4.4 or any other method for manufacturing the energy attenuation member models in 150.4.6, 250.4.6, 350.4.6.

Figure 55:
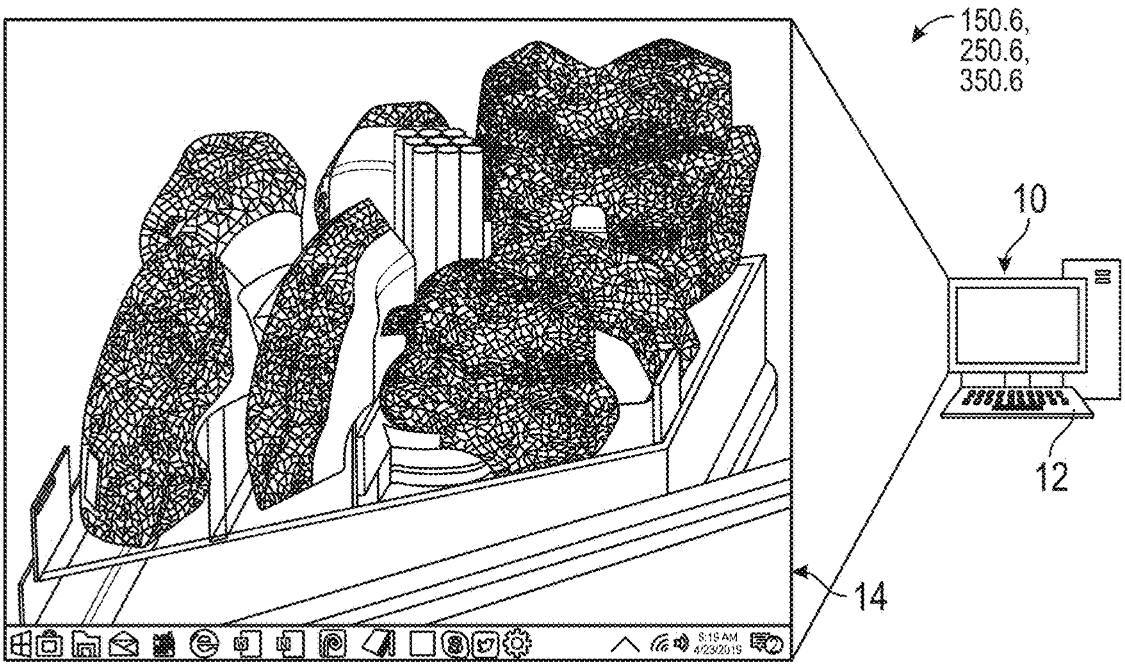
FIG. 55 shows the electronic device displaying the preparation of the energy attenuation member models for manufacturing.
Figures 56A, 56B, 56C:
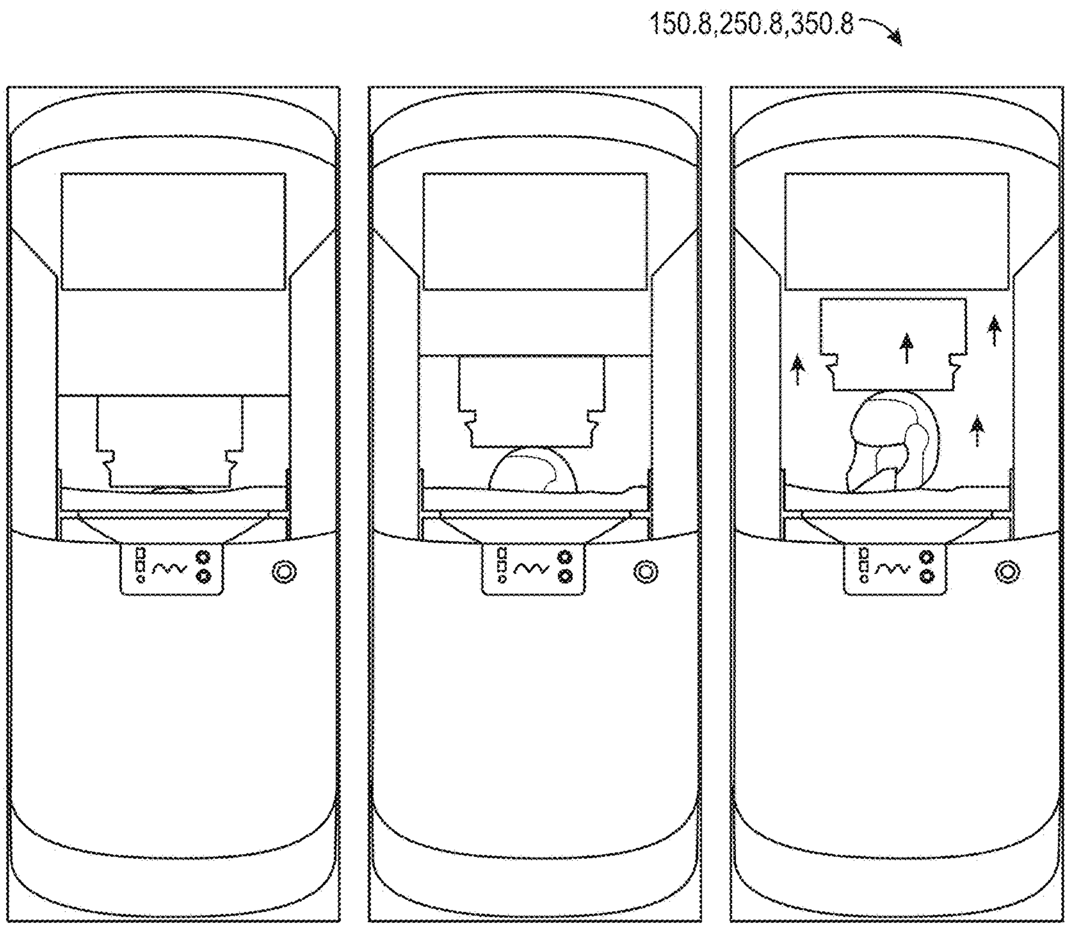
FIGS. 56A-C shows the manufacturing of the energy attenuation members.
Figure 57:
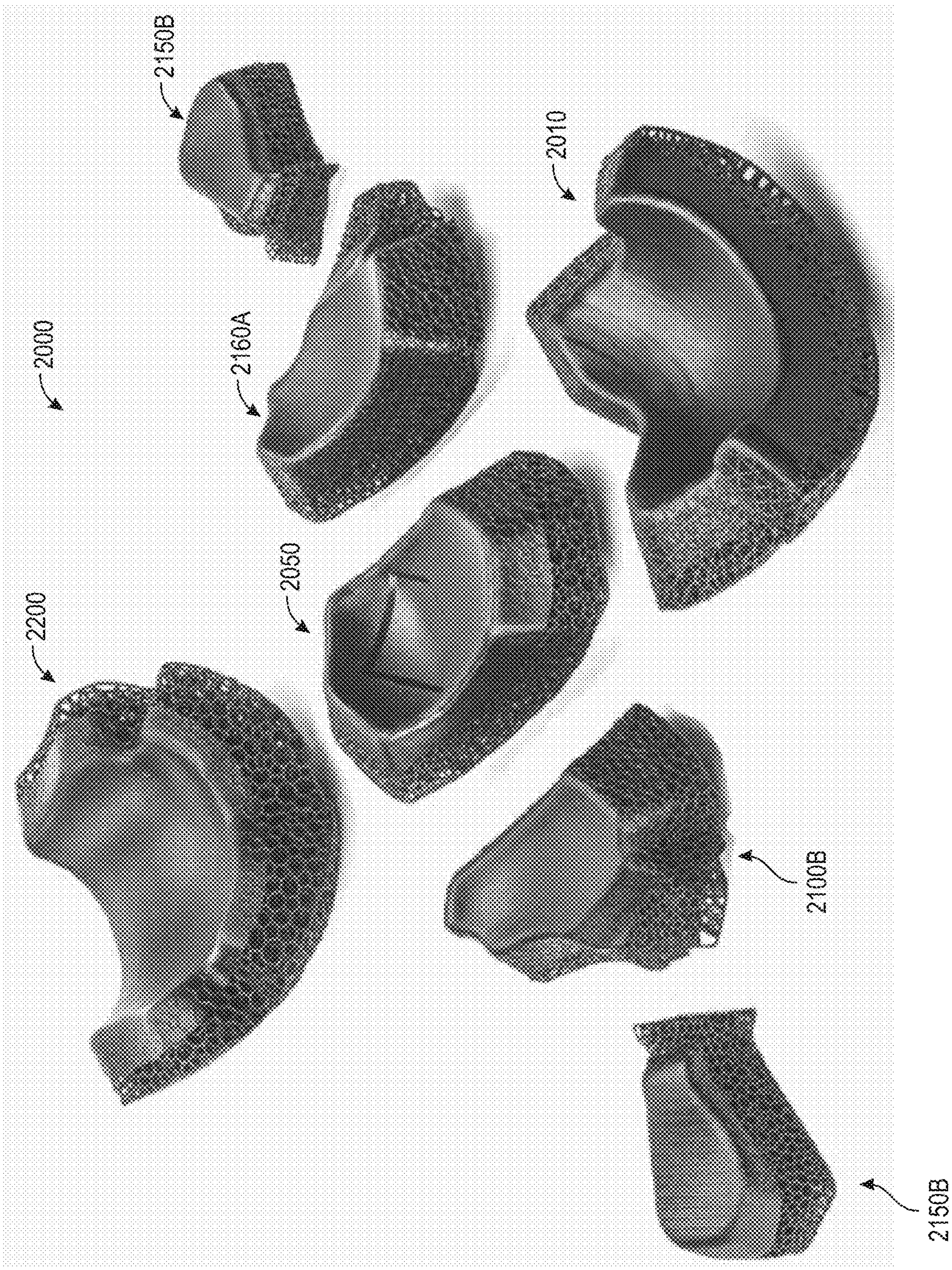
FIG. 57 shows an exemplary energy attenuation assembly suitable for installation within a protective sports helmet.
Figure 58A:
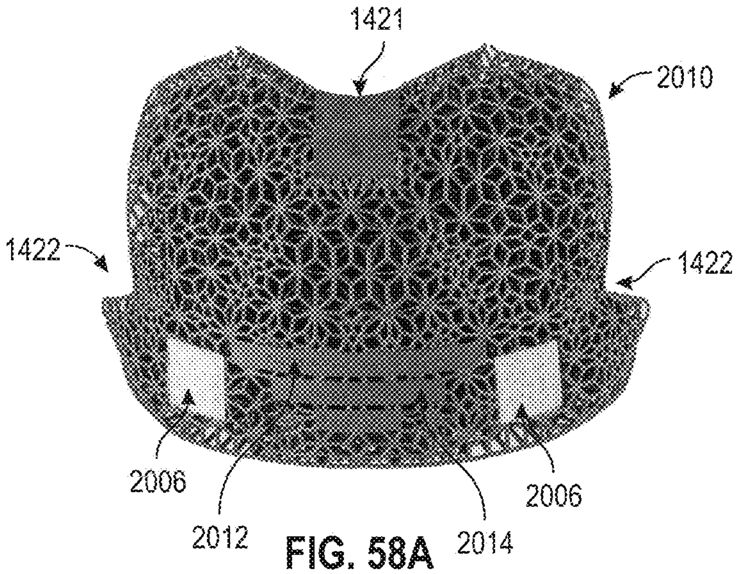
FIGS. 58A-C show various views of a front energy attenuation member of the energy attenuation assembly shown in FIG. 57.
Figure 58B:
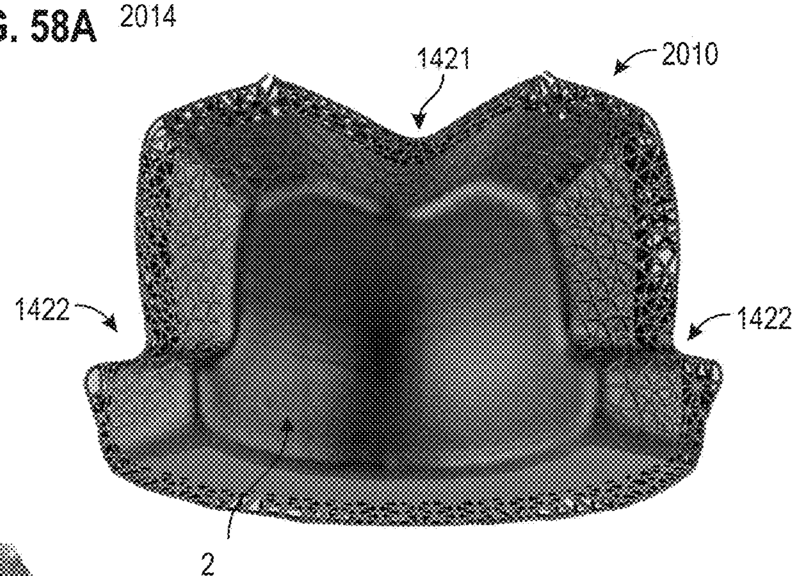
Figure 58C:
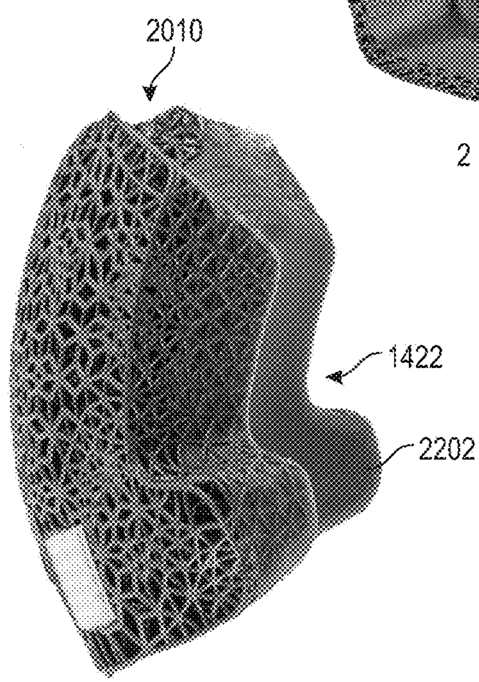
Figure 59A:
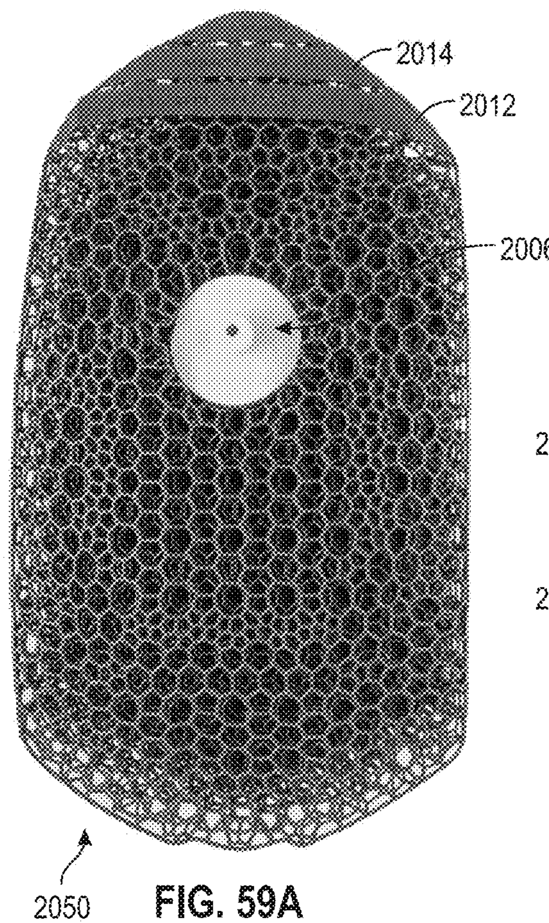
FIGS. 59A-C show various views of a crown energy attenuation member of the energy attenuation assembly shown in FIG. 57.
Figure 59B:
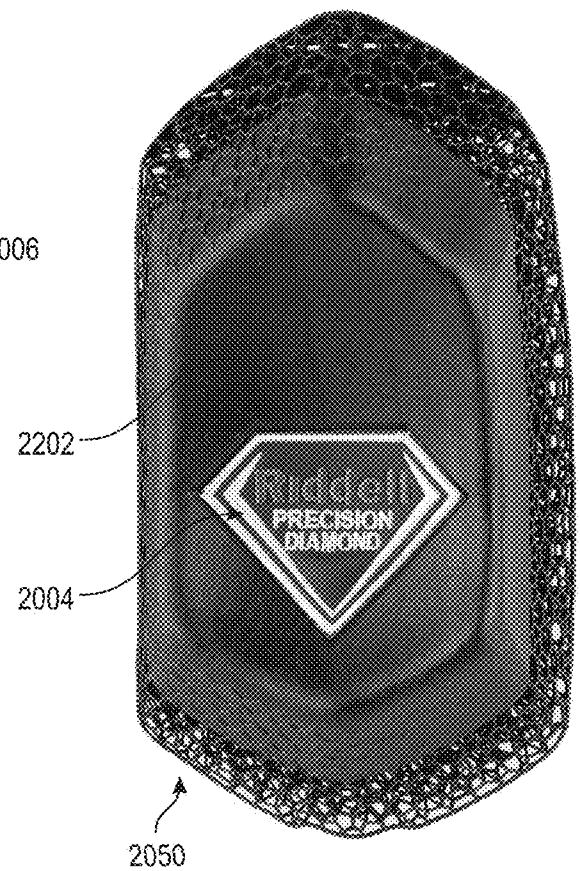
Figure 59C:
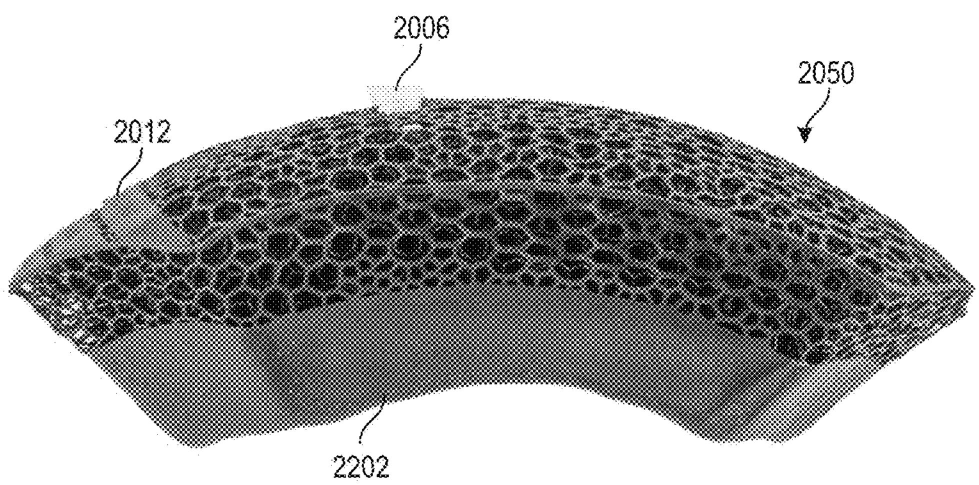
Figure 60A:
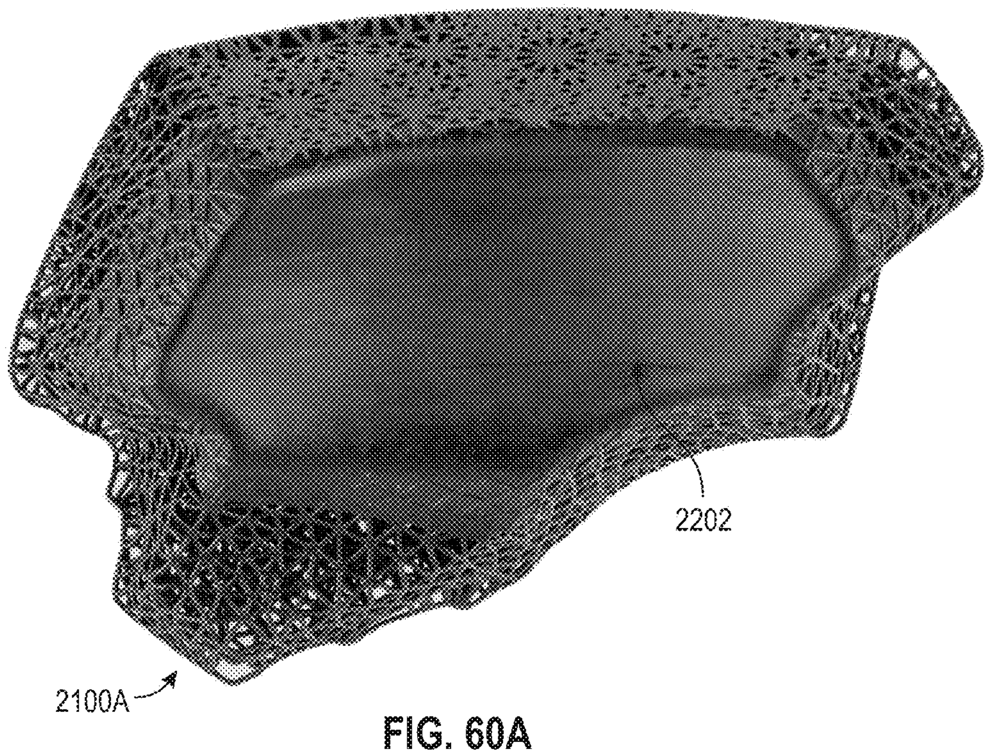
FIGS. 60A-B show various views of a left and right side energy attenuation members of the energy attenuation assembly shown in FIG. 57.
Figure 60B:
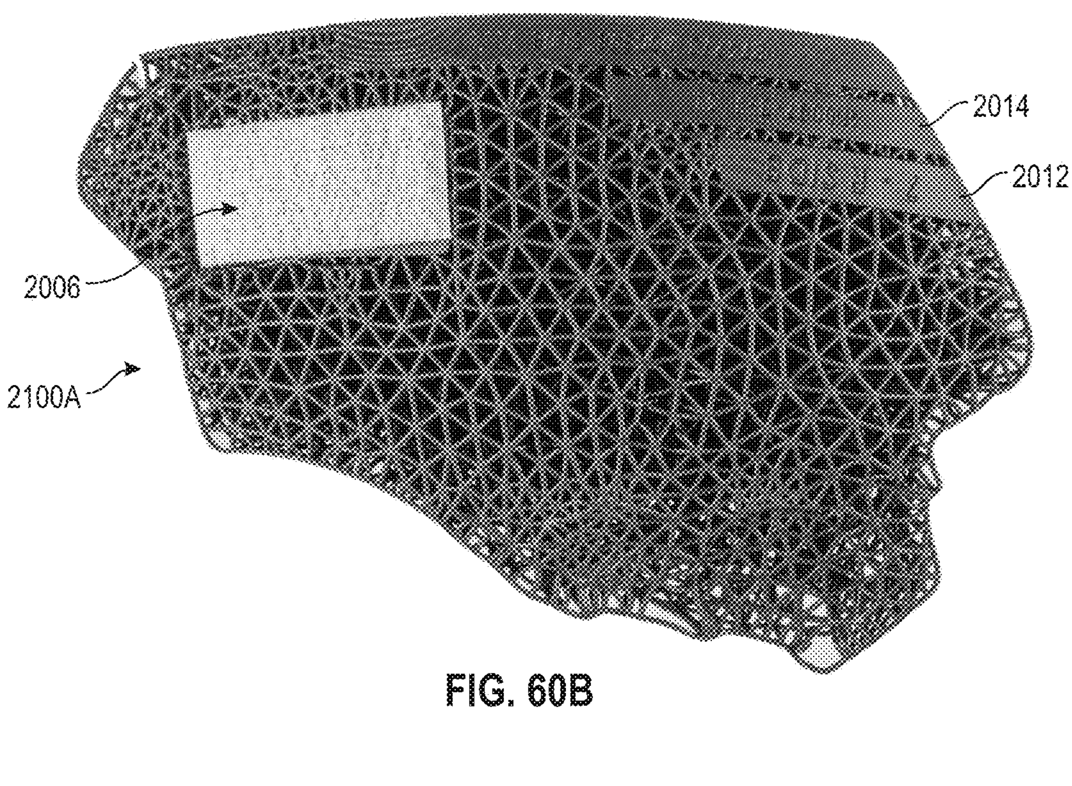
Figure 61A:
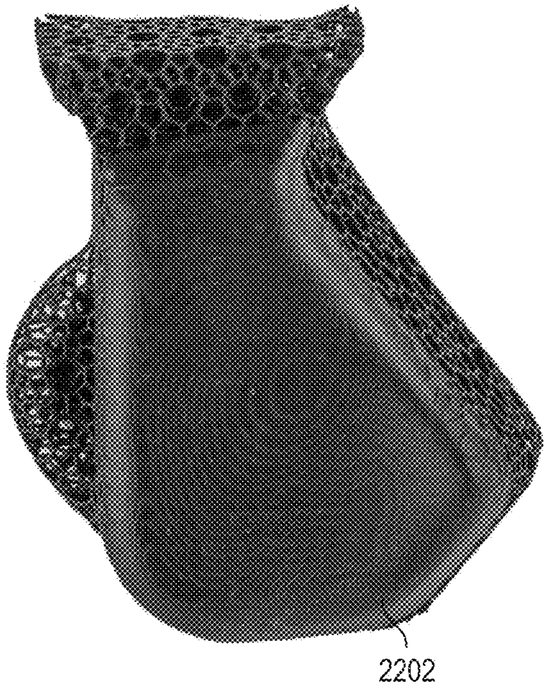
FIGS. 61A-B show various views of a left and right jaw energy attenuation members of the energy attenuation assembly shown in FIG. 57.
Figure 61B:
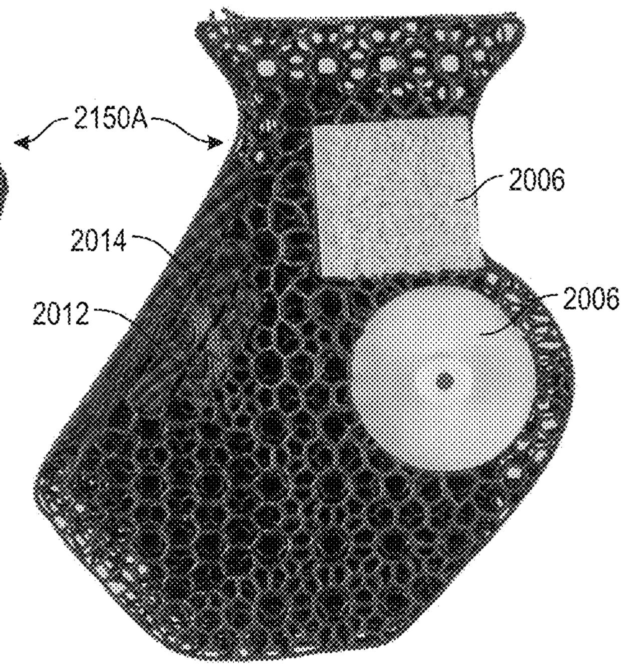
Figure 61C:
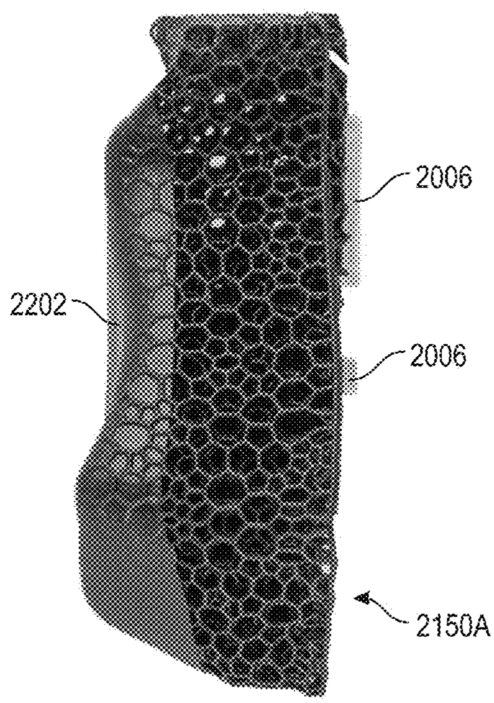
Figure 61D:
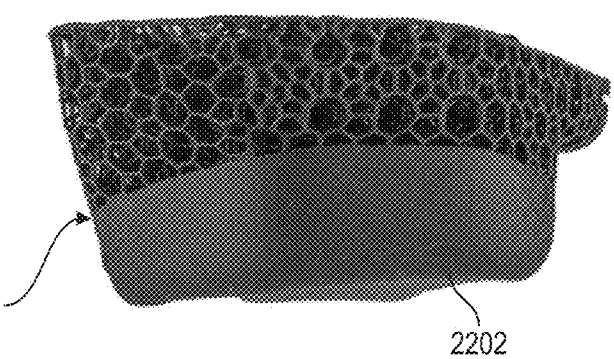

Next in step 150.6, 250.6, 350.6, the energy attenuation member models are prepared for manufacturing based upon the selected manufacturing method in step 150.4, 250.4, 350.4. An example of such preparation in connection with CLIP, may include: (i) providing the energy attenuation member model in an Object file (.obj), Stereolithography (.stl), a STEP file (.step), or any other similar file type, (ii) selecting an extent of the model that will be substantially flat and placing that in contact with the lowermost printing surface, (iii) arranging the other models within the printing area, (iv) slicing all models, and (v) reviewing the slices of the models to ensure that they properly manufacture the energy attenuation member models. An example of preparing the energy attenuation member models for manufacturing is shown in FIG. 55.

After the energy attenuation member models are prepared for manufacturing in step 150.6, 250.6, 350.6, the designer physically manufactures the energy attenuation member models in step 150.8, 250.8, 350.8. An example of manufacturing the energy attenuation member models using the CLIP technology is shown in FIGS. **56*a*-56*c*. Also, an example of the physical energy attenuation members are shown in FIGS. 57-62*c***.

2. Manufactured Energy Attenuation Assembly

The energy attenuation assembly 2000 is comprised of: (i) a front energy attenuation member 2010, (ii) a crown energy attenuation member 2050, (iii) left and right energy attenuation members **2100*a,b*, (iv) left and right jaw energy attenuation members 2150*a,b*, and (v) rear combination energy attenuation member 2200. As shown in FIGS. 62*c*, the energy attenuation assembly 2000 may include at least one badge which may have indicia such as a player's name, jersey number and/or signature, and/or a name, slogan or images of an entity such as a company. In particular, a player identification badge 2002, may be disposed on the rear combination energy attenuation member 2200 while a product identification badge 2004, identifying the helmet model and/or manufacturer, may be placed on the crown energy attenuation member 2050. The identification badge 2002 may also include a reproduction of the player's actual signature. In addition to enhancing aesthetic appeal and product desirability, the identification badge 2002** is useful in helping a player quickly ascertain his or her helmet from among a group of similarly-appearing helmets.

The shape, structural design, and material composition of the front energy attenuation member 2010, the crown energy attenuation member 2050, the left and right energy attenuation members 2100*a,b*, the left and right jaw energy attenuation members 2150*a,b*, and the rear combination energy attenuation member 2200, are discussed in greater detail below. However, it should at least be understood that each member contained within the energy attenuation assembly 2000 may have different impact responses when compared to other members within the energy attenuation assembly 2000. In fact, even different regions within the same member may have different impact responses when compared to one another. These differing impact responses may be utilized by the designer to adjust how the energy attenuation assembly 2000 and in turn the helmet 1000 responds to impact forces. As discussed in greater detail below, these differing impact responses may be obtained by varying the structural makeup and/or the chemical composition of the energy attenuation assembly 2000.

As shown in FIGS. 57-58*c*, 63*a*, 64*b*, and 65*b*, the front energy attenuation member 2010 has a curvilinear configuration that corresponds to the curvature of the inner surface 1017 of the shell 1012 and the cantilevered segment 1044. The front energy attenuation member 2010 also has: (i) a recessed central region 1421 that facilitates engagement of the crown energy attenuation member 2050 and (ii) peripheral recesses 1422 that facilitate engagement of the energy attenuation member 2010 with the left and right energy attenuation members 2100*a,b*. When the helmet 1000 is worn by the player P, the front energy attenuation member 2010 engages the player's frontal bone or forehead FH while extending laterally between the player's temple regions and extending vertically from the player's brow line BL across the player's forehead FH. The front energy attenuation member 2010 also includes means 2006 for securing or coupling, such as Velcro® or a snap connector, the energy attenuation member 2010 to the inner shell surface 1017. As shown in FIG. 58*a*, the front energy attenuation member 2010 also includes a surface or panel that allows for indicia 2012, such as the manufacturer of the helmet 1000, a team name, a player's name, and/or the month and year the member was manufactured. Further, the front energy attenuation member 2010 includes a surface or panel that allows for tracking device 2014, such as a bar code or QR code. In other embodiments, the tracking device 2014 may be RFID chips or other electronic chips that can be scanned from the exterior of the helmet and used for tracking purposes. From the above disclosure, it should be understood that both the structural makeup (e.g., lattice cell types, geometry of each lattice cell type, lattice densities, lattice angles) and the chemical compositions may vary depending on whether the front energy attenuation member 2010 is designed for: (i) a group of all players, (ii) a specific position (e.g., lineman), (iii) a specific playing level (e.g., NCAA players), or (iv) a position and playing level design (e.g., varsity quarterback). For example, FIG. 47 different possible designs for the front energy attenuation member 2010, where one design may be for a youth lineman, while another is designed for a varsity cornerback.

Figure 62A:
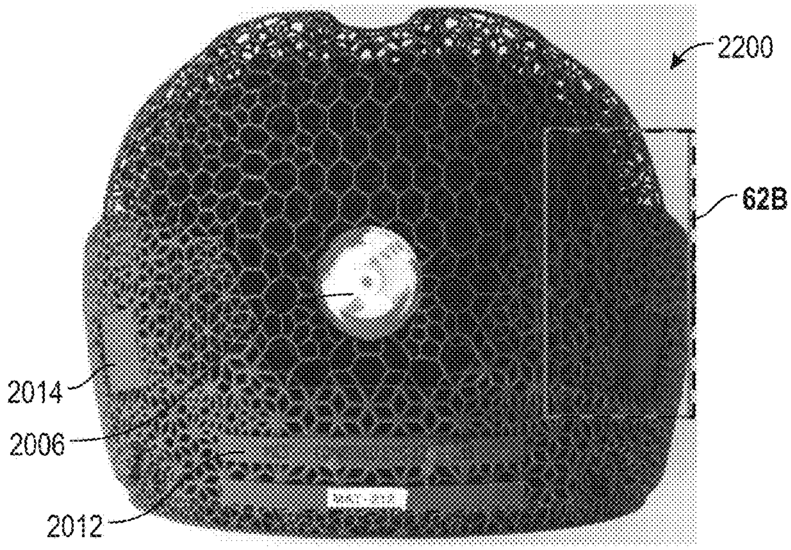
FIGS. 62A-C show various views of a rear energy attenuation member of the energy attenuation assembly shown in FIG. 57.
Figure 62B:
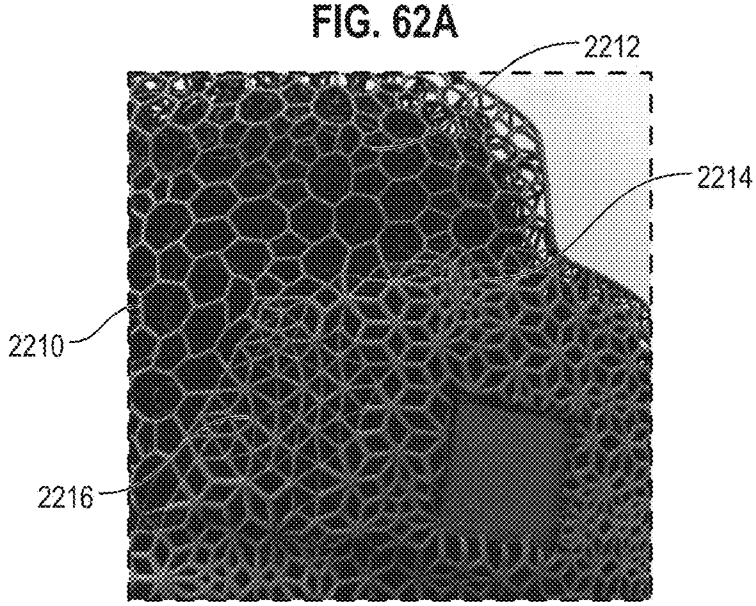
Figure 62C:
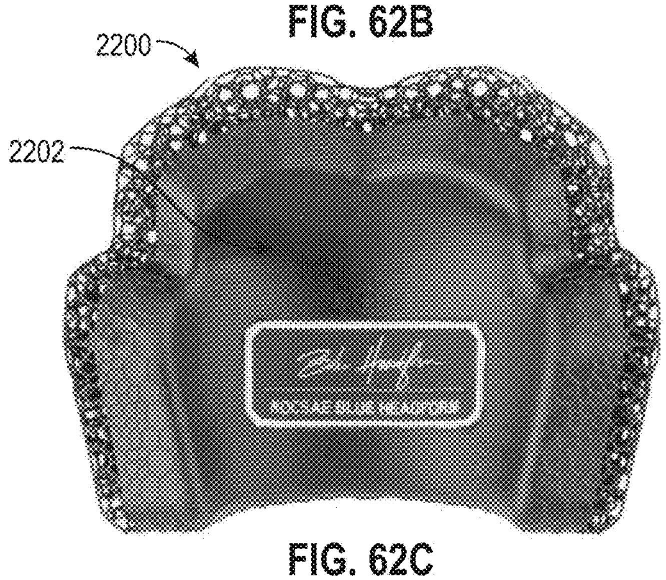

As shown in FIGS. 62*a*-62*c*, each member 2010, 2050, 2100, 2150, 2200 has a skin 2202 that creates a substantially smooth surface. This skin 2202 may be formed as a part of the member 2010, 2050, 2100, 2150, 2200, as shown in FIG. 62*a*-62*c*. Specifically, the lattice cells on the side of the member 2200 blend into the skin 2202 as the lattice cells approach the inner surface of the member 2010, 2050, 2100, 2150, 2200. This skin 2202 creates a substantially smooth surface that helps prevent the lattice cells from imprinting their pattern on the player's head H. Also, this skin 2202 does not hinder the compression of the lattice cells when a force is applied to the member 2200. In one embodiment, the skin 2202 is between 0.1 mm and 10 mm; however, it should be understood that the thickness of this skin 2202 may be changed. Further, like other components of the member, the thickness of this skin 2202 alters the mechanical characteristics (e.g., impact absorption) of the member 2200. It should be understood that in some embodiments the skin 2202 may be external to the member 2200 and/or removable. It should also be understood that the skin 2202 may extend around the side regions of the member 2200 or may completely encase the member 2200 (e.g., where the member has a substantially smooth surface on the outside of all sides of the member 2010, 2050, 2100, 2150, 2200, while a lattice unit cells are positioned within the skin 2202).

As shown in FIGS. 57, 60*a*-60*b*, 63*a*-63*b*, 64*b*, 65*b*, the left and right energy attenuation members 2100*a,b* have a curvilinear configuration that corresponds to the curvature of the inner surface 1017 of an extent of the side shell portions 1024. The left and right energy attenuation members 2100*a,b* also have: (i) first peripheral recesses 1424 that facilitate engagement of the energy attenuation members 2100*a,b* with the front energy attenuation member 2010, (ii) second peripheral recesses 1426 that facilitate engagement of the energy attenuation members 2100*a,b* with the left and right jaw energy attenuation members 2150*a,b*, and (iii) third peripheral recesses 1428 that facilitate engagement of the energy attenuation members 2100*a,b* with the rear combination energy attenuation member 2200. Like the front energy attenuation member 2010, the left and right energy attenuation members 2100*a,b* also include: (i) means for securing or coupling 2006, such as Velcro® or a snap connector, the members 2150*a,b* to the inner shell surface 1017, (ii) indicia 2012, and (iii) tracking device 2014. Also, the left and right energy attenuation members 2100*a,b* have the same flexibility in their structural makeup and chemical composition as discussed above in connection with FIG. 51 and the front energy attenuation member 2010. In other words, the combinations of structural makeups and chemical compositions discussed in connection with front energy attenuation member 2010 apply with equal force to the left and right energy attenuation members 2100*a,b*. It should be understood that the structural makeup and/or the chemical compositions of the left and right energy attenuation members 2100*a,b* may differ from: (i) all other members within the energy attenuation assembly 2000, (ii) a percentage of the members within the energy attenuation assembly 2000, or (iii) none of the members within the energy attenuation assembly 2000. In one embodiment, the left and right energy attenuation members 2100*a,b* may have a denser lattice than the crown energy attenuation member 2050.

FIGS. 63*a*-67*b* are physical helmet prototypes 1000. In addition to the impact attenuation system 1014, the helmet 1000 includes the shell 1012, a facemask or faceguard 1200, a chin strap assembly 1300, and an energy attenuation assembly 2000. The facemask or faceguard 1200 is attached at upper and lower frontal regions of the shell 1012 by connectors 1210 that are removably coupled to the shell by an elongated fastener 1215. The faceguard 1200 comprises an arrangement of elongated and intersecting members and is designed to span a frontal opening in the shell to protect the facial area and chin of the player P.

As shown in FIGS. 57, 61*a*-61*d*, 63*a*-63*b*, 64, 67*b*, the left and right jaw energy attenuation members 2150*a,b* have a curvilinear configuration that corresponds to the curvature of the inner surface 1017 of an extent of the ear flap 1026 portions of the shell 1012. The left and right jaw energy attenuation members 2150*a,b* are configured to engage with the left and right energy attenuation members 2100*a,b*. Like the front energy attenuation member 2010, the left and right jaw energy attenuation members 2150*a,b* also includes: (i) means for securing or coupling 2006, such as Velcro® or a snap connector, the energy attenuation members 2150*a,b* to the inner shell surface 1017, (ii) indicia 2012, and (iii) tracking device 2014. Like the front energy attenuation member 2010, the left and right jaw energy attenuation members 2150*a,b* have the same flexibility in their structural makeup and chemical composition as discussed above in connection with the front energy attenuation member 2010. In other words, the combinations of structural makeups and chemical compositions discussed in connection with front energy attenuation member 2010 apply with equal force to the left and right jaw energy attenuation members 2150*a,b*. It should be understood that the structural makeup and/or the chemical compositions of the left/right members may differ from: (i) all other members within the energy attenuation assembly 2000, (ii) a percentage of the members within the energy attenuation assembly 2000, or (iii) none of the members within the energy attenuation assembly 2000. In one embodiment, the left and right jaw energy attenuation members 2150*a,b* may have a less lattice than the front energy attenuation member 2010.

As shown in FIGS. 57, 62*a*-62*c*, 64*b*, 65*b*, 66*b*, 67*b*, the rear combination energy attenuation member 2200 has a curvilinear configuration that corresponds to the curvature of the inner surface 1017 of an extent of the rear portion of the shell 1012. The rear combination energy attenuation member 2200 are configured to engage with the left and right energy attenuation members 2100*a,b* and the crown energy attenuation member 2050. Like the front energy attenuation member 2010, the rear combination energy attenuation member 2200 also includes: (i) means for securing or coupling 2006, such as Velcro® or a snap connector, the energy attenuation member 2200 to the inner shell surface 1017, (ii) indicia 2012, and (iii) tracking device 2014. Like the front energy attenuation member 2010, the rear combination energy attenuation member 2200 have the same flexibility in their structural makeup and chemical composition as discussed above in connection with the front energy attenuation member 2010.

This combination member 2200 could not practically be done using the molding process that is described in U.S. patent application Ser. No. 15/655,490 because the mechanical properties (e.g., absorption of a force) of the members could not be altered enough to optimize how the members, in combination with the shell 1012, reacted to an impact force. However, additive manufacturing techniques allow for the creation of a member that has regions with vastly different mechanical properties (e.g., absorption of a force). For example, the combination member 2200 may be comprised of: (i) consistent composition of one type of polyurethane and a second type of polyurethane, (ii) a first region 2210, which has a first lattice cell type and a first density, (iii) a second region 2212, which has a first lattice cell type and a second density, (iv) a third region 2214, which has a second lattice cell type and a third density, and (v) a 2216 fourth region, which has a third lattice cell type and a fourth density. Even though the chemical composition of this combination member 2200 is substantially uniform, the mechanical properties of each region (e.g., first, second, third, and fourth regions) differs due in part to the differing lattice variables that are contained within each region. For example, a compression force will fully compress or bottom out the first region before the third or fourth regions bottom out. Likewise, a compression force will fully compress or bottom out the fourth region before the third region bottoms out.

3. Physical Helmet Prototype

FIGS. 63*a*-67*b* are physical helmet prototypes 1000. In addition to the impact attenuation system 1014, the helmet 1000 includes the shell 1012, a facemask or faceguard 1200, a chin strap assembly 1300, and an energy attenuation assembly 2000. The facemask or faceguard 1200 is attached at upper and lower frontal regions of the shell 1012 by connectors 1210 that are removably coupled to the shell by an elongated fastener 1215. The faceguard 1200 comprises an arrangement of elongated and intersecting members and is designed to span a frontal opening in the shell to protect the facial area and chin of the player P.

As shown in FIGS. 63*a*-67*b*, the shell 1012 includes an outer shell surface 1016 featuring complex contours and facets. The shell 1012 also includes a crown portion 1018 defining a top region of the helmet 1000, a front portion 1020 generally extending forwardly and downwardly from the crown portion 1018, left and right side portions 1024 extending generally downwardly and laterally from the crown portion 1018, and a rear portion 1022 extending generally rearwardly and downwardly from the crown portion 1018. The left and right side portions 1024 each include an ear flap 1026 generally positioned to overlie and protect the ear region of the player P when the helmet 1000 is worn. Each ear flap 1026 may be provided with an ear hole 1030 to improve hearing for the wearer. The shell 1012 is symmetric along a vertical plane dividing the shell 1012 into left and right halves. When the helmet 1000 is worn by the player P, this vertical plane is aligned with the midsagittal plane that divides the player P (including his head) into symmetric right and left halves, wherein the midsagittal plane is shown in the NOCSAE standard ND002 for newly manufactured football helmets. Therefore, features shown in Figures as appearing in one half of the shell 1012 are also present in the other half of the shell 1012.

Figure 64A:
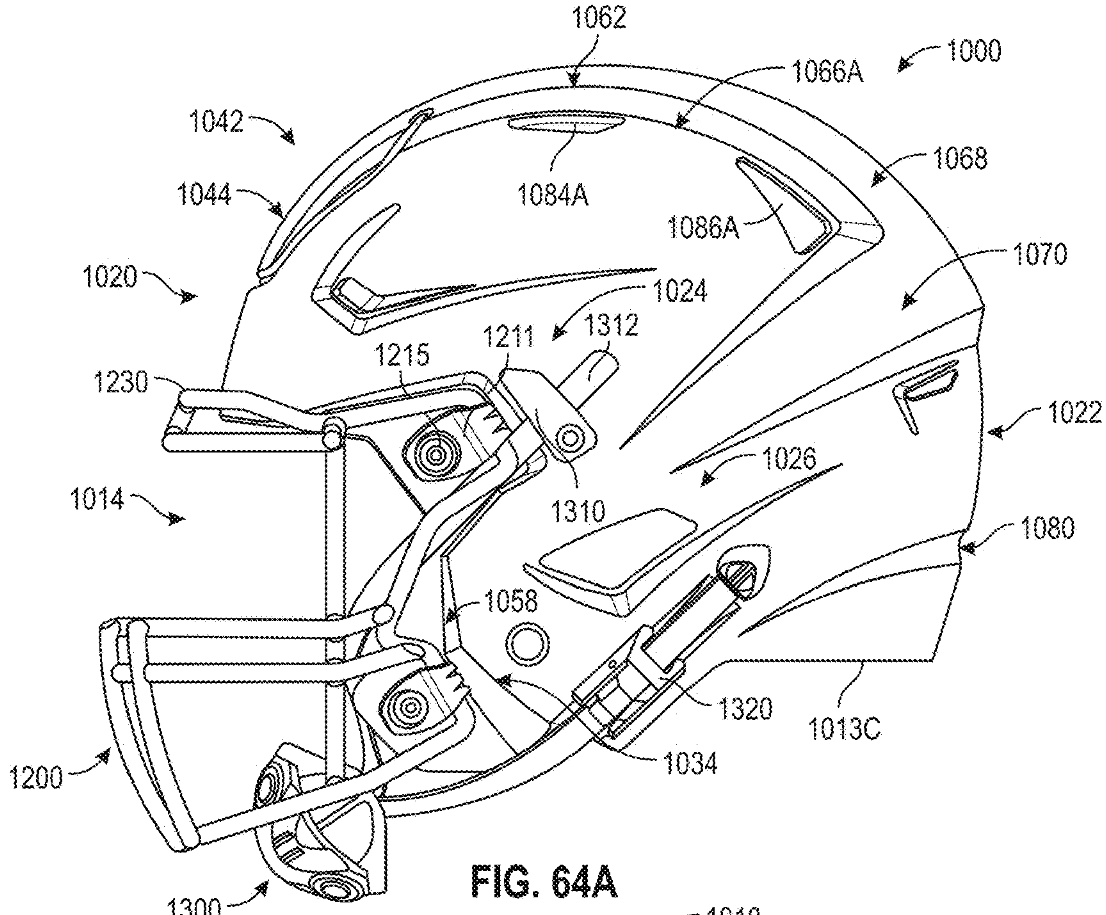
FIG. 64A show a side view of a physical protective sports helmet that includes the energy attenuation members and a helmet shell.
Figure 64B:
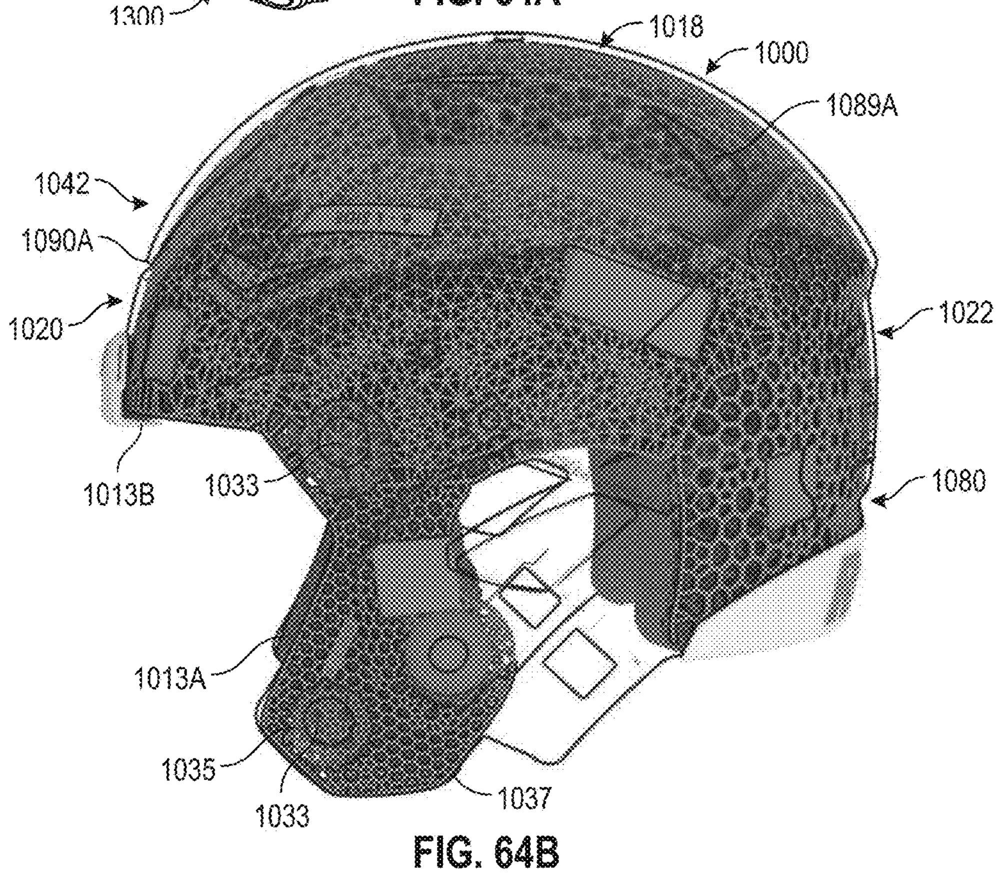
FIG. 64B is a side view of the helmet of FIG. 64A.

The shell 1012 also includes a pair of jaw flaps 1034, with each jaw flap 1034 generally extending forwardly from one of the ear flaps 1026 for protection of the mandible area of the player P. In the illustrated configuration, the jaw flaps 1034 also include a lower faceguard attachment region 1035. An upper faceguard attachment region 1036 is provided near a peripheral frontal edge 1013*a* of the shell 1012 and above the ear hole 1030. Each attachment region 1035, 1036 includes an aperture 1033 that receives a fastener extending through the faceguard connector 1210 to secure the faceguard 1200 to the shell 1012. Preferably, the lower faceguard attachment region 1035 is recessed inward compared to the adjacent outer surface 1034*a* of the jaw flap 1034, and the upper faceguard attachment region 1036 is recessed inward compared to the adjacent outer surface 1026*a* of the ear flap 1026. As shown in FIGS. 64*a*-64*b*, there is an angled transition wall 1038 extending inward from the ear flap outer surface 1026*a* and the jaw flap outer surface 1034*a* to the recessed attachment regions 1035, 1036. The angled transition wall 1038 extends from the central frontal edge 1013*b* in the front portion 1020 rearward and then downward to a lower edge 1037 of the jaw flap 1034. A chin strap securement member 1310 is positioned rearward of the upper faceguard attachment region 1036 and is configured to receive a strap member of the chin strap assembly 1300.

Figure 65A:
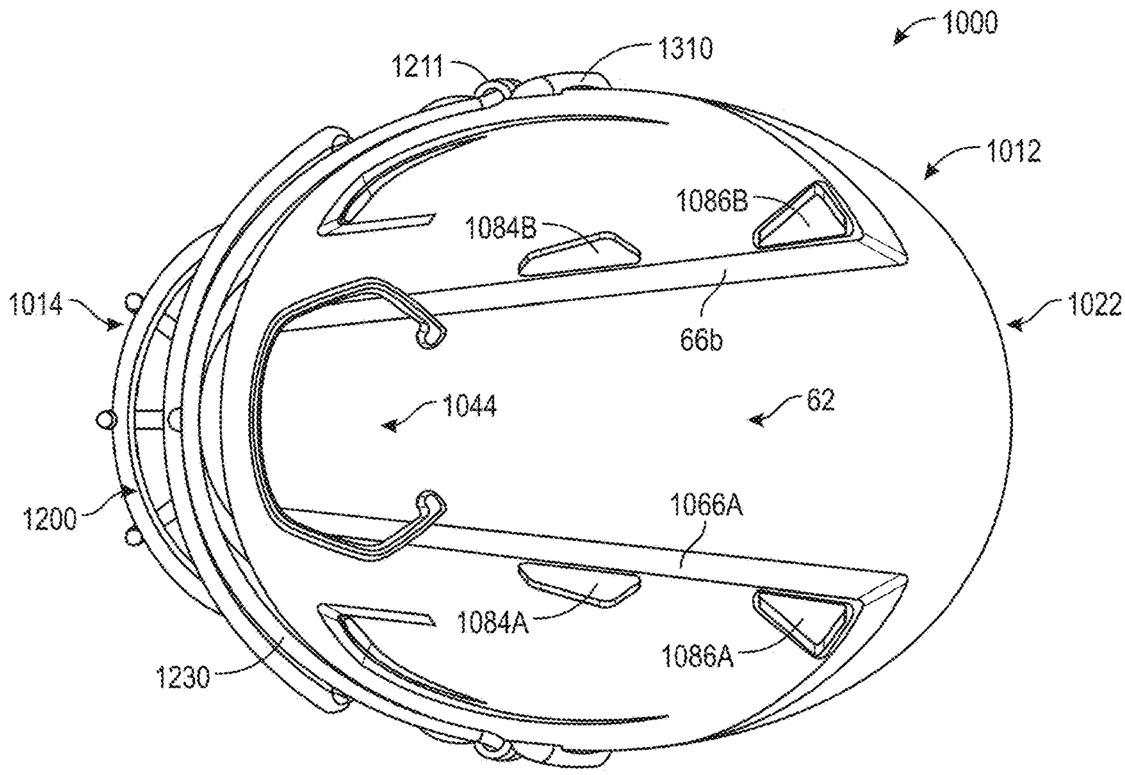
FIG. 65A show a top view of a physical protective sports helmet that includes the energy attenuation members and a helmet shell.
Figure 65B:
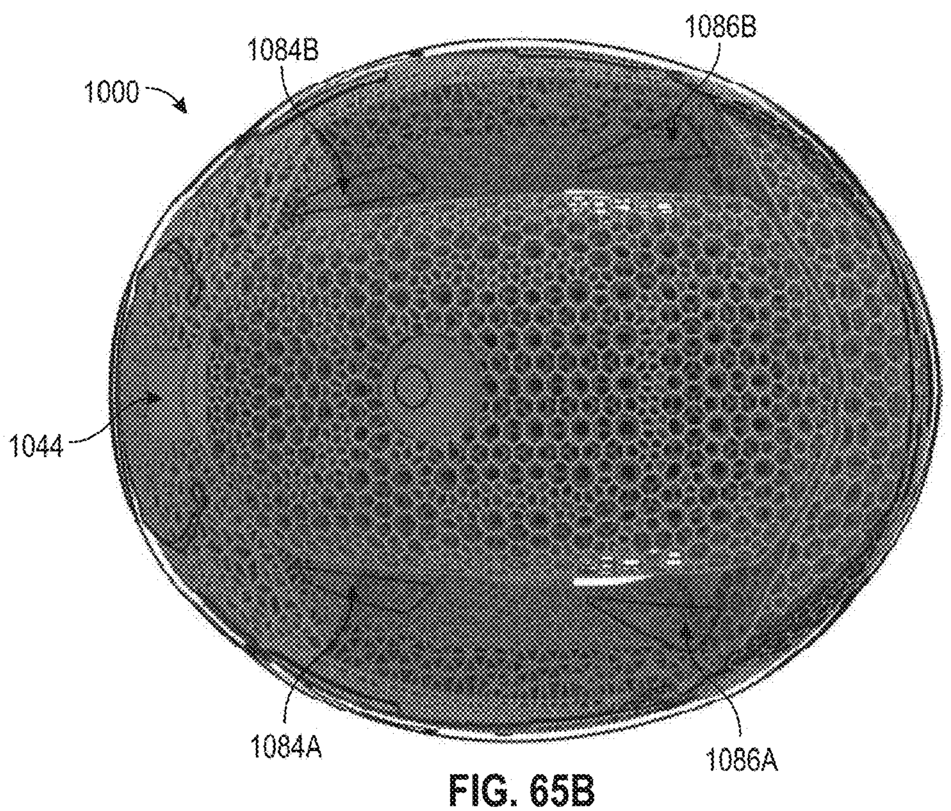
FIG. 65B is a top view of the helmet of FIG. 65A.
Figure 66A:
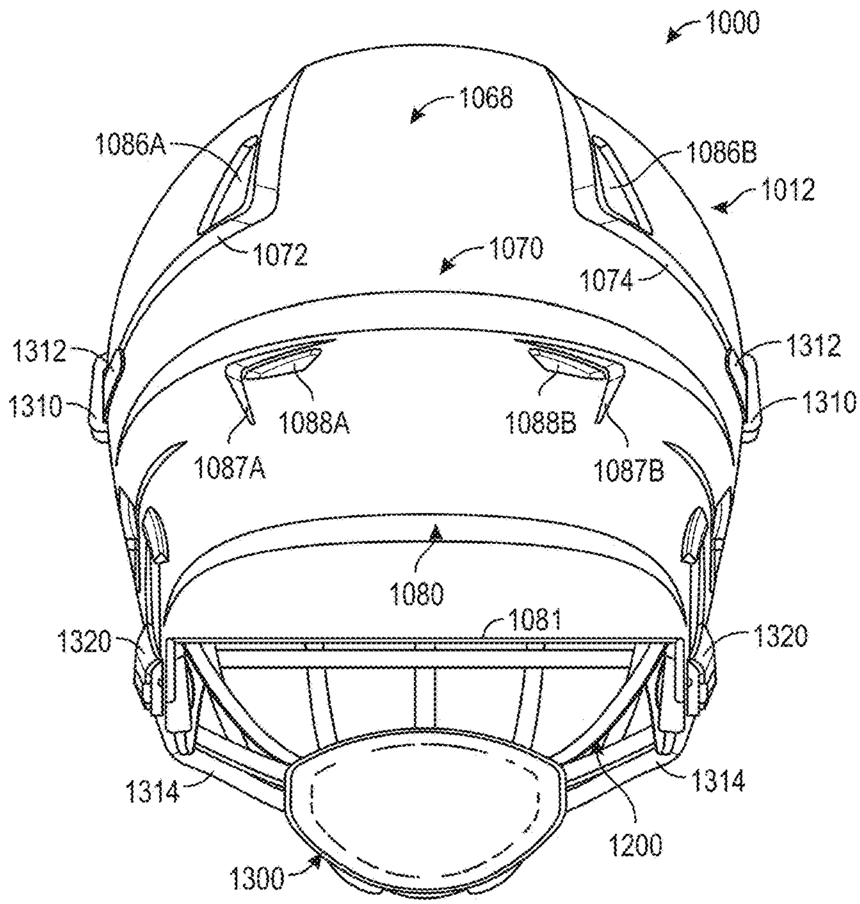
FIG. 66A show a rear view of a physical protective sports helmet that includes the energy attenuation members and a helmet shell.
Figure 66B:
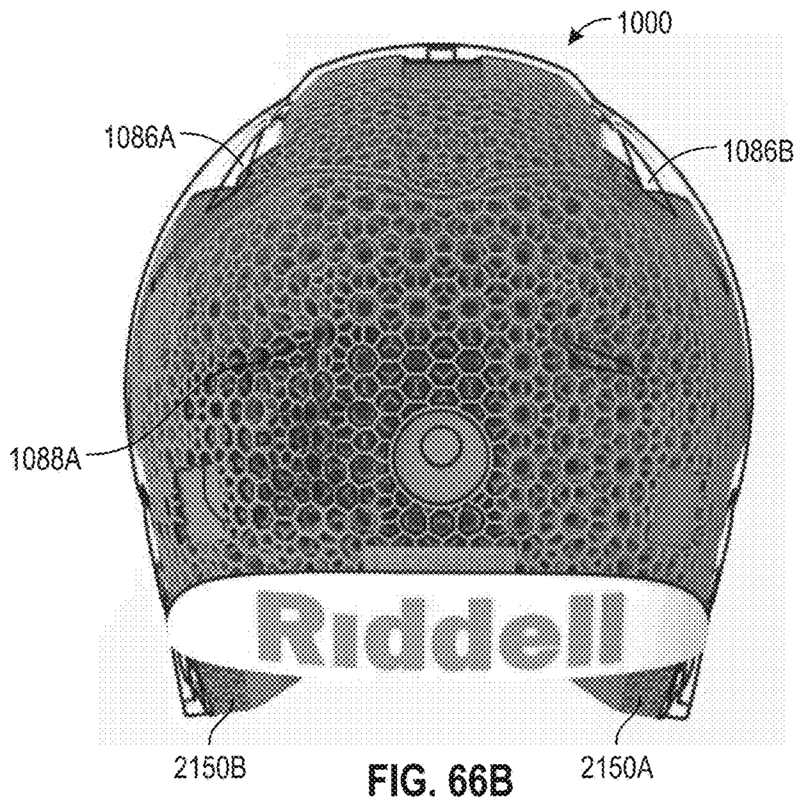
FIG. 66B is a rear view of the helmet of FIG. 66A.

The helmet 1000 also includes an integrally raised central band 1062 that extends from the front shell portion 1020 across the crown portion 1018 to the rear shell portion 1022. The band 1062 is defined by a pair of substantially symmetric raised sidewalls or ridges 1066 that extend upwardly at an angle from the outer shell surface 1016. When viewed from the side, the sidewalls 1066 define a curvilinear path as they extend across the crown portion 1018 to the rear shell portion 1022. As explained in detail below, a front portion 1064 of the band 1062 is coincident with the impact attenuation member 1042 and is positioned a distance above the central frontal edge 1013*b*. Referring to FIG. 65*a*, the band 1062 has a width that increases as the band 1062 extends from the front shell portion 1020 across the crown portion 1018 to the rear shell portion 1022. As shown in FIG. 66*a*, a rear portion 1068 of the band 1062 is coincident with and merges with a rear raised band 1070 that extends transversely between the left and right side portions 1024 of the shell 1012. Referring to FIG. 64*a*, the left sidewall 1066*a* intersects with an upper left sidewall 1072*a* of the transverse band 1070, and the right sidewall 1066*b* intersects with an upper right sidewall 1072*b* of the transverse band 1070, wherein each of these intersections define a substantially right angle. A lower transverse sidewall 1074 extends from the outer shell surface 1016 along the length of the transverse rear band 1070. Similar to the sidewalls 1066, the rear band sidewalls 1072, 1074 are sloped, meaning they extend outwardly and upwardly at an angle from the outer shell surface 1016. Referring to FIG. 64*a*, a lower channel 1080 extends transversely below the raised rear band 1070 and above a lower rear shell edge 1081.

As shown in the Figures, the helmet 1000 further includes numerous vent openings that are configured to facilitate circulation within the helmet 1000 when it is worn by the player P. A first pair of vent openings 1084 are formed in the crown portion 1018, wherein the left vent opening 1084*a* is substantially adjacent the left sidewall 1066*a* and the right vent opening 1084*b* is substantially adjacent to the right sidewall 1066*b*. The left and right vent openings 1084*a,b* have a longitudinal centerline that is generally aligned with an adjacent extent of the respective sidewall 1066*a,b*. A second pair of vent openings 1086 are formed in the rear shell portion 1022, wherein the left vent opening 1086*a* is substantially adjacent the left sidewall 1066*a* and left band sidewall 1072*a*, and the right vent opening 1086*b* is substantially adjacent the right sidewall 1066*b* and right band sidewall 1072*b*. The left and right vent openings 1086*a,b* have a longitudinal centerline that is generally aligned with the respective sidewall 1066*a, b*. In this manner, the left first and second vent openings 1084*a*, 1086*a* are substantially aligned along the left sidewall 1066*a*, and the right first and second vent openings 1084*a*, 1086*a* are substantially aligned along the right sidewall 1066*b*.

Figure 63A:
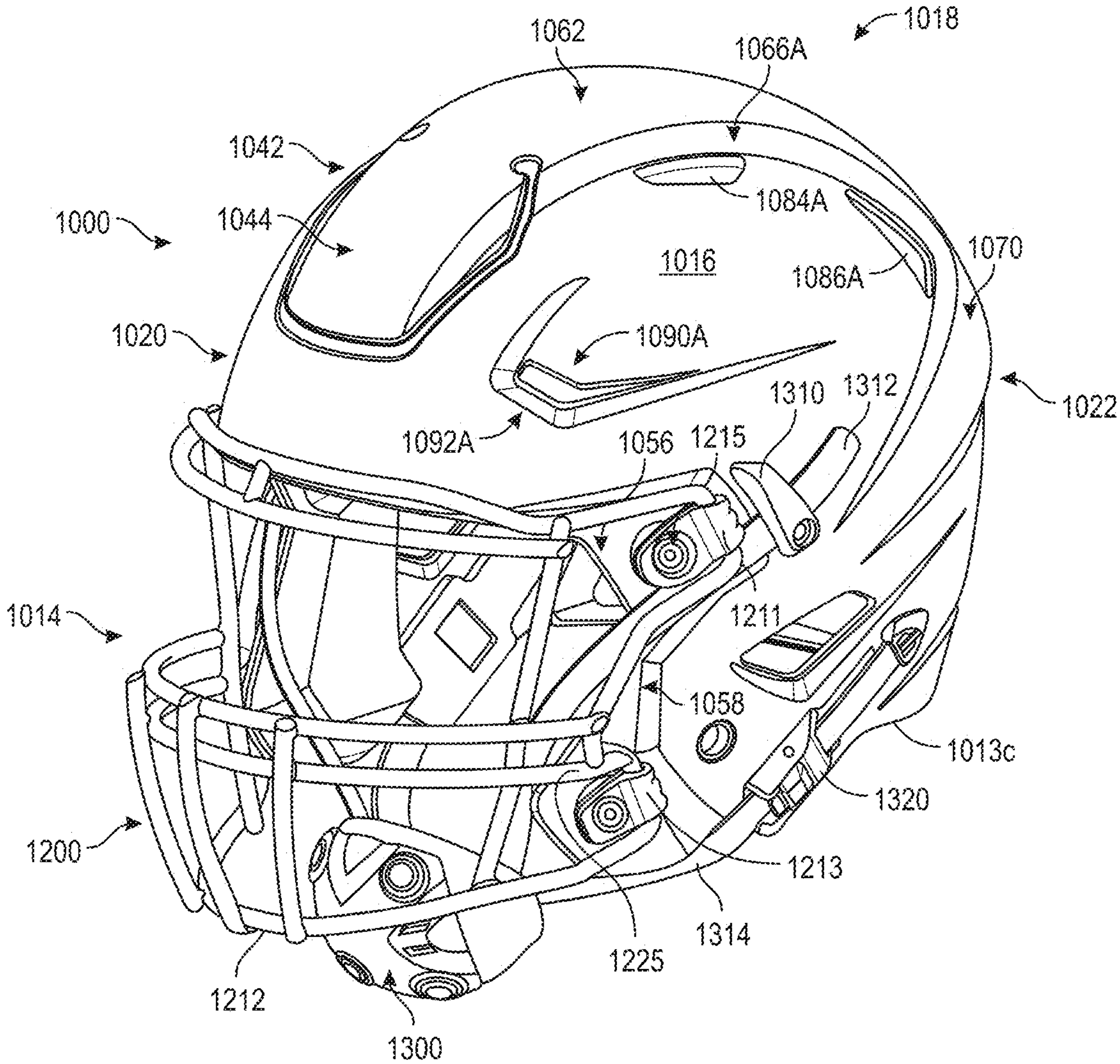
FIG. 63A show a perspective view of a physical protective sports helmet that includes the energy attenuation members and a helmet shell.
Figure 63B:
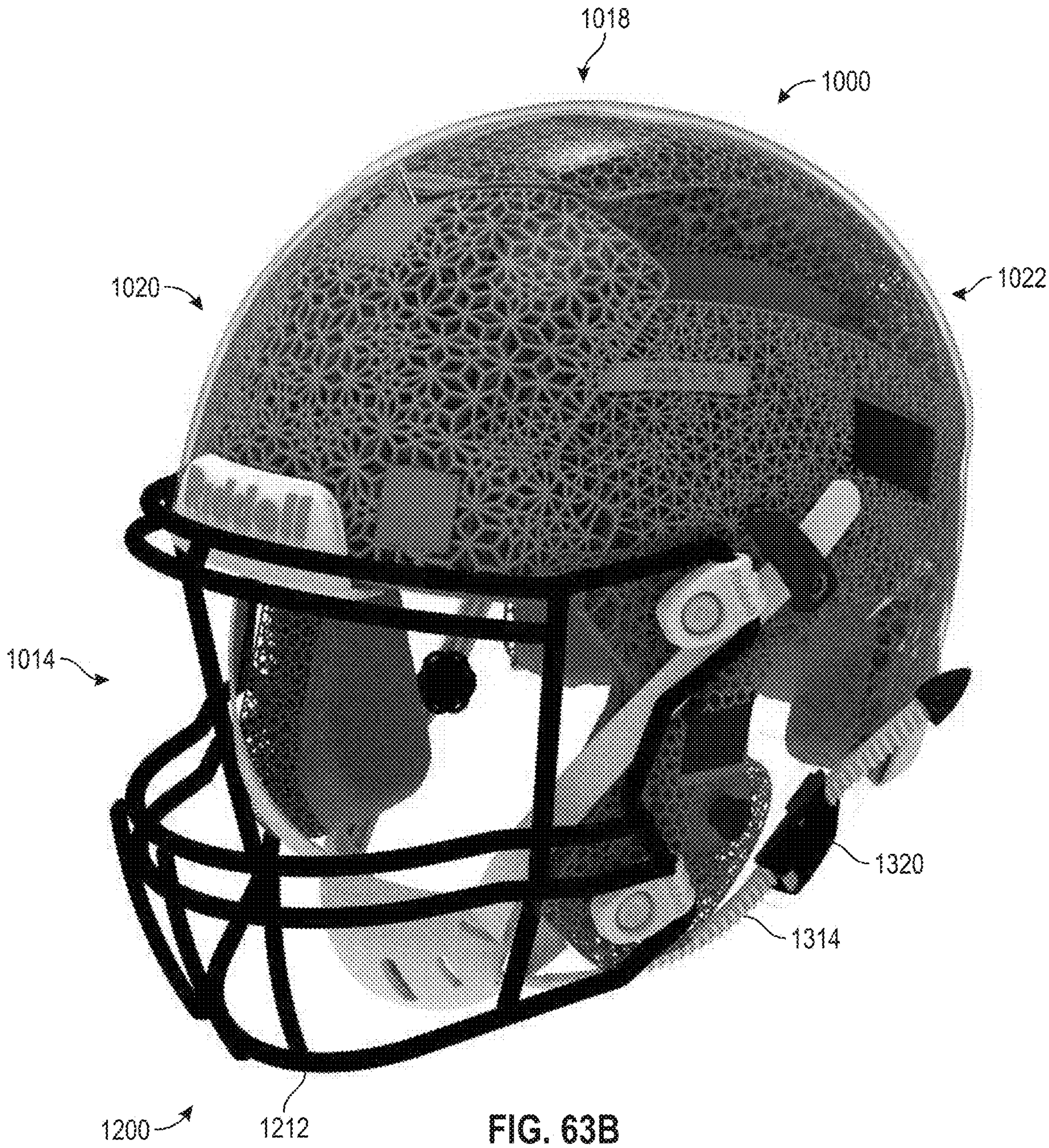
FIG. 63B is a perspective view of the helmet of FIG. 63A.

Referring to FIG. 66*a*, a third pair of vent openings 1088 are formed in the rear shell portion 1022 below the rear raised band 1070, wherein the left vent opening 1088*a* is positioned adjacent a left ridge 1087*a* formed by an angled sidewall 1085*a* and the right vent opening 1088*b* is positioned adjacent a right ridge 1087*b* formed by an angled sidewall 1085*b*. The third vent openings 1088*a,b* have a longitudinal centerline that is oriented substantially perpendicular to the raised central band 1062, and that would intersect, if extended, the ear opening 1030. A fourth pair of vent openings 1090 are formed in the front shell portion 1020, wherein the left vent opening 1090*a* is positioned adjacent a left frontal ridge 1092*a* and the right vent opening 1092*a* is positioned adjacent a right frontal ridge 1092*b*. The frontal ridges 1092*a,b* are located between the front shell portion 1020 and the side portion 1024 and thus generally overlie the temple region of the player P when the helmet 1000 is worn. Referring to FIGS. 63*a*-63*b*, the frontal ridges 1092*a,b* are also formed from an angled sidewall and include an upper inclined segment 1089*a,b*, a declining intermediate segment 1091*a,b*, and a lower segment 1093*a,b* that extends rearward at a slight angle towards the side shell portion 1024. The fourth vent openings 1090*a,b* have a major component 1095*a,b*, and a minor component 1097*a,b* wherein the major component 1095*a,b* is aligned with the upper segment 1089*a,b* and the intermediate segment 1091*a, b*, and the minor component 1097*a,b* has a width that tapers as it extends along the lower segment 1093*a,b*. The outer shell surface 1016 adjacent and rearward of the vent openings 1090*a,b* is recessed relative to the outer shell surface 16 adjacent and forward of the frontal ridges 92*a,b*. The first, second, third and fourth vent openings 1084*a,b*, 1086*a,b*, 1088*a,b* and 1090*a,b* are cooperatively positioned with voids in the energy attenuation assembly 2000 to facilitate the flow of air through the helmet 1000.

A front portion 1064 of the helmet 1000, the central band 1062 has a width of at least 2.0 inches, and preferably at least 2.25 inches, and most preferably at least 2.5 inches and less than 3.5 inches. Proximate the juncture of the raised central band 1062 and the raised rear band 1070, the raised central band 1062 has a width of at least 4.0 inches, and preferably at least 4.25 inches, and most preferably at least 4.5 inches and less than 5.0 inches. At this same juncture, the raised band 1070 has a height of at least 1.25 inch, and preferably at least 1.5 inches, and most preferably at least 1.5 inch and less than 2.0 inches. At the region where the terminal ends 1070*a* of the rear raised band 1070 merges flush with the outer shell surface 16, slightly rearward of the ear opening 1030 (see FIG. 4A), the terminal end 1070*a* of the raised band 1070 has a height of at least 0.75 inches, and preferably at least 1.0 inch and less than 1.75 inch. Accordingly, the height of the raised rear band 1070 tapers as each lateral band segment 1070*b* extends from the raised central band 1062 forward towards the respective ear flap 1026. Because the raised central band 1062 and the raised rear band 1070 are formed as corrugations in the shell 1012, the foregoing dimensions contribute to increasing the mechanical properties of the crown portion 1018 and the rear shell portion 1022, namely the structural modulus ($E_s$), of these portions 1018, 1022. The structural modulus provides a stiffness value of a respective portion of the helmet 1000 based upon its geometry. A higher structural modulus value corresponds to increased stiffness of that portion of the helmet 1000.

As explained above, the helmet's engineered impact attenuation system 1014 includes the impact attenuation member 1042 which adjusts how the portion of the helmet 1000 including the member 42 responds to impact forces compared to adjacent portions of the helmet 1000 lacking the member 1042. The impact attenuation member 1042 is formed by altering at least one portion of the shell 1012 wherein that alteration changes the configuration of the shell 1012 and its local response to impact forces. For example, in the illustrated configuration, the impact attenuation member 1042 includes an internal cantilevered segment or flap 1044 formed in the front shell portion 1020. Compared to the adjacent portions of the shell 1012 that lack the cantilevered segment 1044, the front shell portion 1020 has a lower structural modulus ($E_s$) which improves the attenuation of energy associated with impacts to at least the front shell portion 20. Thus, the configuration of the helmet 1000 provides localized structural modulus values for different portions of the helmet 1000.

As shown in the Figures, the illustrated cantilevered segment 1044 is formed by removing material from the shell 1012 to define a multi-segment gap or opening 1046, which partially defines a boundary of the cantilevered segment 1044. Unlike conventional impact force management techniques that involve adding material to a helmet, the impact attenuation system 1014 involves the strategic removal of material from the helmet 1000 to integrally form the cantilevered segment 1044 in the shell 1012. The cantilevered segment 1044 depends downward from an upper extent of the front shell portion 1020 near the interface between the front portion 1020 and the crown portion 1018. The cantilevered segment 1044 includes a base 1054 and a distal free end 58 and approximates the behavior of a living hinge when a substantially frontal impact is received by the front shell portion 20. The lowermost edge of the free end 1058 is positioned approximately 1.5-2.5 inches, preferably 2.0 inches from the central frontal edge 13*b*, wherein the lower shell portion 1020*a* of the front shell portion 1020 is there between.

As shown in FIGS. 63*b*, 65*a*, the opening 1046 and the cantilevered segment 1044 are generally U-shaped with an upward orientation, meaning that they are oriented upwards towards the crown portion 1018. The opening 1046 has a complex geometry with a number of distinct segments. A first generally vertical right segment 1046*a* extends downward and outward from a right endpoint 1048*a* towards the right side of the front shell portion 1020. A second generally vertical right segment 1046*b* extends downward and inward from the first right segment 1046*a* to a generally lateral segment 1049. Similarly, a first generally vertical left segment 1047*a* extends downward and outward from a left endpoint 1048*b* towards the left side of the front shell portion 1020. A second generally vertical left segment 1047*b* extends downward and inward from the first left segment 1047*a* to the lateral segment 49. The lateral segment 49 extends between the second right and left segments 1046*b*, 1047*b*. The lowermost extent of the lower, second right and left segments 1046*b*, 1047*b* is positioned approximately 1.5-2.5 inches, preferably 2.0 inches from the central frontal edge 1013*b*. In the illustrated embodiment, the lateral segment 49 forms an obtuse angle with the respective second right and left segments 1046*b*, 1047*b*, and the first right and left segments 1046*a*, 1047*a* form an obtuse angle with the respective second right and left segments 1046*b*, 1047*b*. Also, the left and right endpoints 1048*a,b* have a substantially circular configuration with a width that exceeds the width of the opening 46. Although the illustrated first and second segments 1046*a,b*, 1047*a,b* and the lateral segment 1049 are substantially linear, these segments can be configured as curvilinear or a combination of curvilinear and straight segments. Furthermore, the opening 1046 may be formed by more or less than the five segments 1046*a,b*, 1047*a,b* and 1049, as shown, for example, in the alternative embodiments discussed below.

Figure 67A:
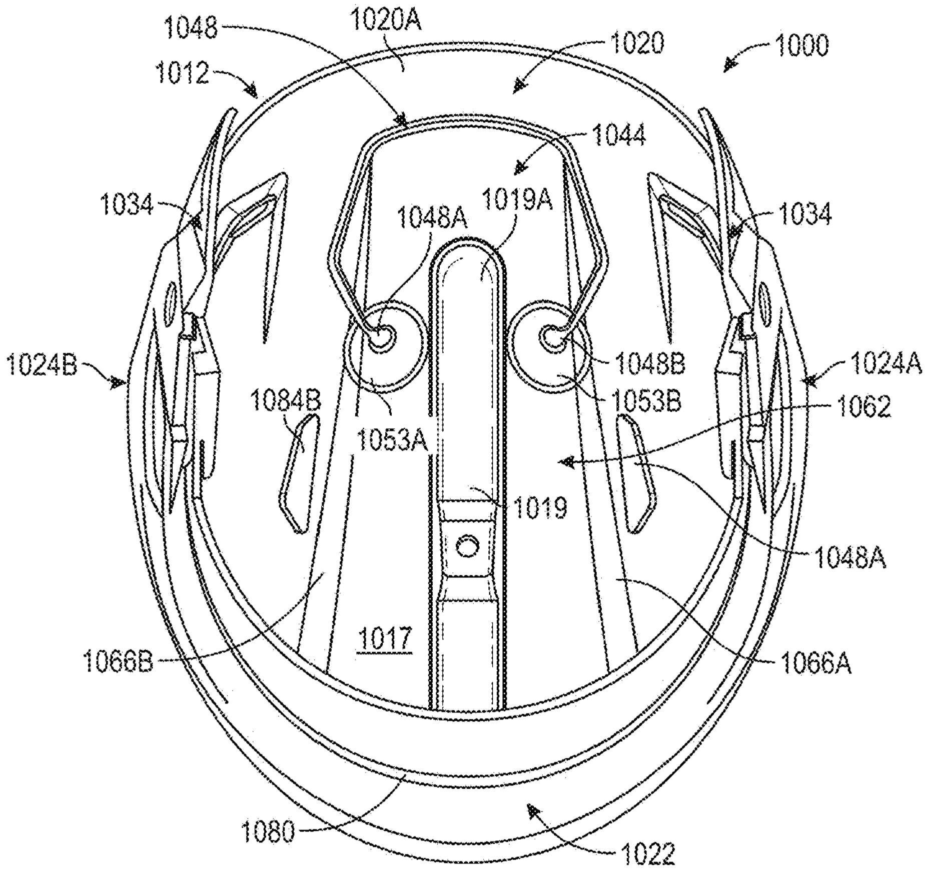
FIG. 67A show a bottom view of a physical protective sports helmet that includes the energy attenuation members and a helmet shell.
Figure 67B:
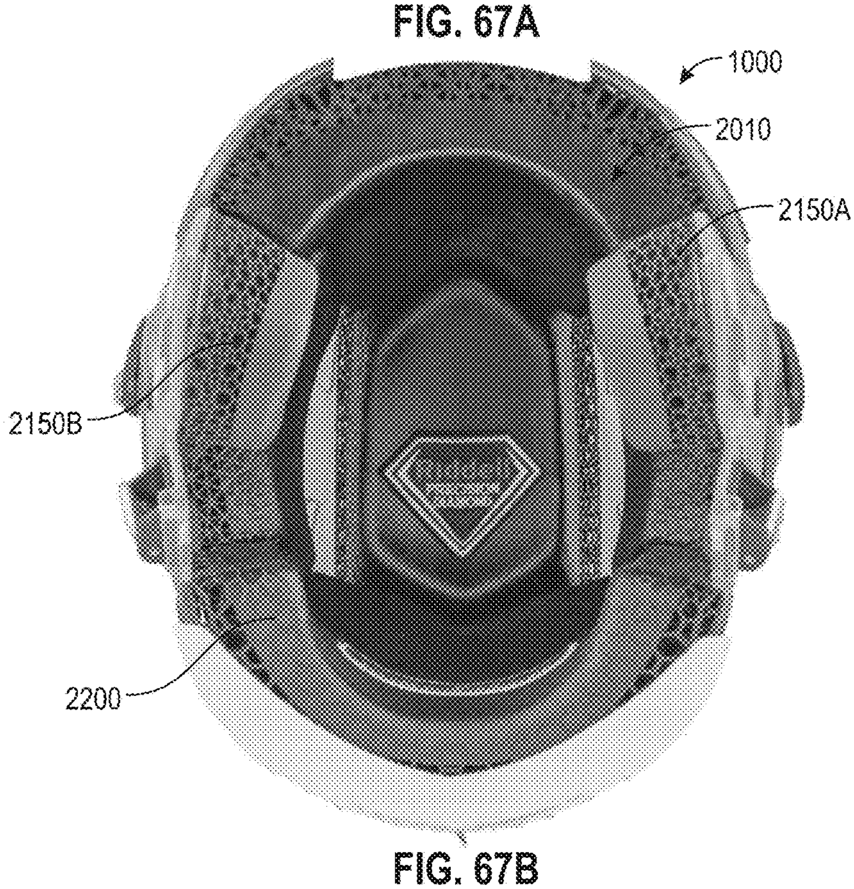
FIG. 67B is a bottom view of the helmet of FIG. 67A.

In the embodiment Figures, the raised central band 1062 and its sidewalls 1066*a,b* extend upward from the distal end 1058 across an intermediate portion 1059 and then beyond the base 1054 of the cantilevered segment 1044. In this manner, the leading edges of the raised central band 1062 and the sidewalls 1066*a,b* taper into and are flush with the distal end 1058 proximate the lateral segment 1049. Alternatively, the leading edges of the raised central band 1062 and the sidewalls 1066*a,b* are positioned above the distal end 1058 and closer to the base 1054. In another alternative, the leading edge of the raised central band 1062 and the sidewalls 1066*a,b* are positioned above the base 1054, whereby the raised central band 1062 is external to the cantilevered segment 44. As shown in FIG. 67*a*, the shell 1012 also includes an inner central bead 1019 formed from material added to the shell 1012, wherein the bead 1019 extends along the inner shell surface 1017 from the crown portion 1018 to the cantilevered segment 1044. The bead 1019 has a rounded nose 1019*a* that extends downward past the base 1054 to the intermediate portion 1059 and towards the distal end 1058. Preferably, a major extent of the cantilevered segment 1044 has the same wall thickness as the other portions of the front shell portion 1020 and the crown portion 1018. For example, the intermediate portion 1059 and the distal end 1058 of the cantilevered segment 1044, the front shell portion 1020 and the crown portion 1018 have a nominal wall thickness of 0.125-inch±0.005 inches. In addition, bosses 1053*a,b* are formed on the inner shell surface 1017 around the eyelets 1048*a,b* to increase the durability of this region of the shell 1012 and cantilevered segment 1044.

As shown in FIG. 64*a*, chin strap securement member 1310 is positioned rearward of the upper faceguard attachment region 1036 and is configured to receive an upper strap member 1312 of the chin strap assembly 1300. A multi-adjustable chin strap securement member 1320, which is positioned rearward of the lower faceguard attachment region 1035 and along a lower side shell edge 1013*c*, is configured to receive a lower strap member 1314 of the chin strap assembly 1300. The multi-adjustable chin strap securement member 1320 is received by a receptacle 1325 formed in a lower portion of the shell 1012. In the use position shown in FIG. 1, the upper strap member 1312 extends between the upper peripheral portion 1220 of the faceguard 1200 and the upper attachment region 1036. More specifically, the upper strap member 1312 extends through a gap or clearance formed between the outer surface of the upper attachment region 1036 and the inner surface of the upper peripheral faceguard portion 1220. The upper strap member 1312 can engage the second downward segment 1058*c* of the transition wall 58.

H. Test Physical Helmet Prototypes

1. Body Part Model+Impact Matrix

Figure 69:
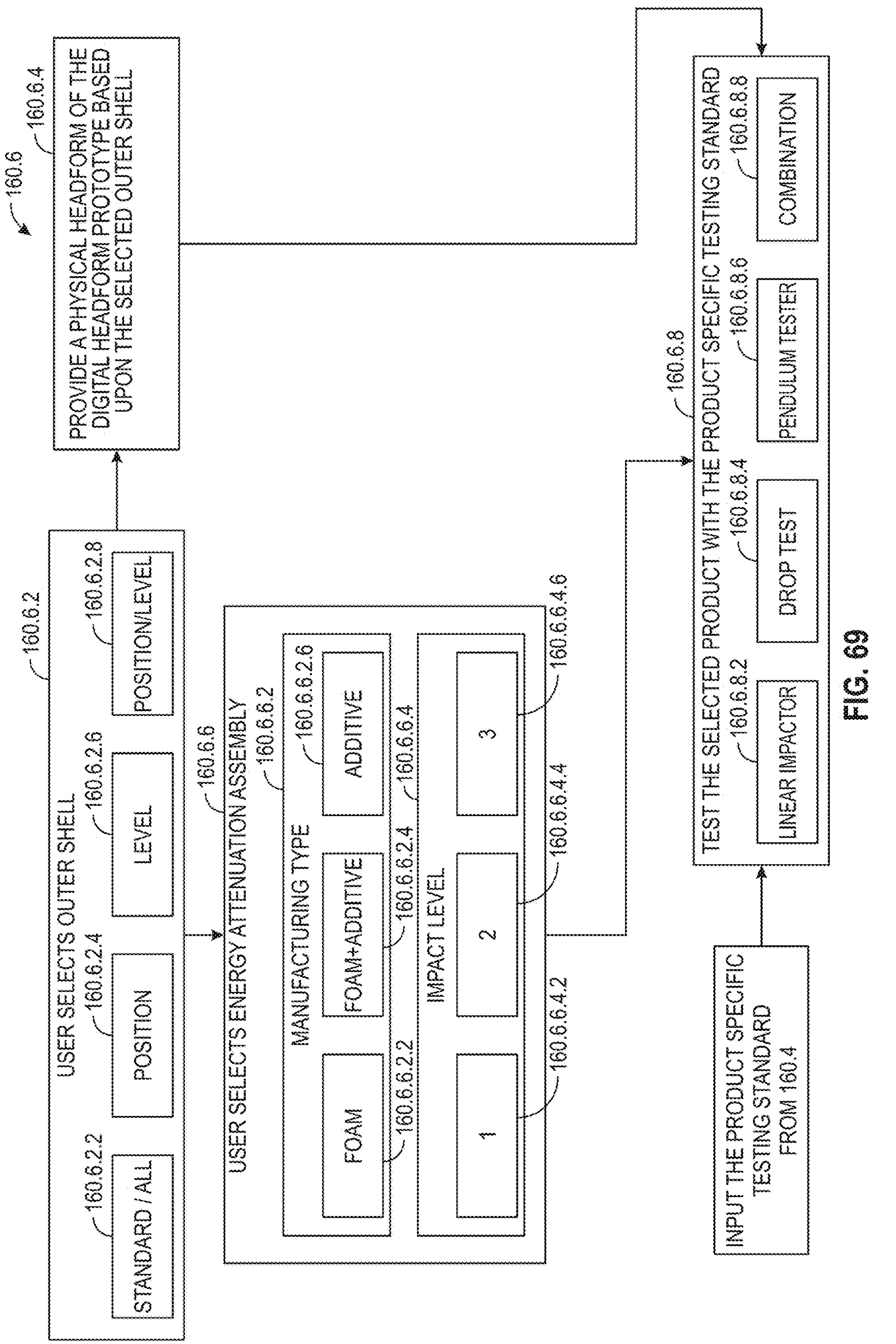
FIG. 69 is a flow chart showing a process of determining a product specific testing standard.

Referring to FIG. 1, the next step is to test the physical prototype helmets 1000 to determine whether it meets the helmet standards. The first step in this process is to: (i) obtain a manufactured physical headforms based upon the digital headform prototypes in step 160.1, (ii) obtain the physical prototype helmets 1000 in step 160.2, and (iii) input the helmet testing standards (e.g., player group-shape based standard 130.8.99 and the player group-shape+impact based standard 130.26.99) in step 160.4. Next, the designer selects one of the physical prototype helmets 1000 from a plurality of physical prototype helmets 1000 and tests the selected helmet in step 160.6. Additional details about the selection and testing of these physical prototype helmets 1000 is described within FIG. 69. Referring to FIG. 69, to select the physical prototype helmets 1000 from a plurality of physical prototype helmets 1000, the designer selects the outer shell in step 160.6.2. The outer shell is associated with specific shape based player data sets, an example of such are shown in FIG. 22. Thus, the first step in selecting the outer shell is to select an overall group of shells: (i) all 160.6.2.2, (ii) position specific 160.6.2.4, (iii) level specific 160.6.2.6, or (iv) position and level specific 160.6.2.8. Once this selection is made, then the designer must select a specific shell within one of these groupings. For example, the designer may select size 2 for running backs in connection with the position specific shells. Once this specific shell is selected by the designer, the designer is provided with a physical headform that is associated with the selected outer shell in step 160.6.4.

Figure 70:
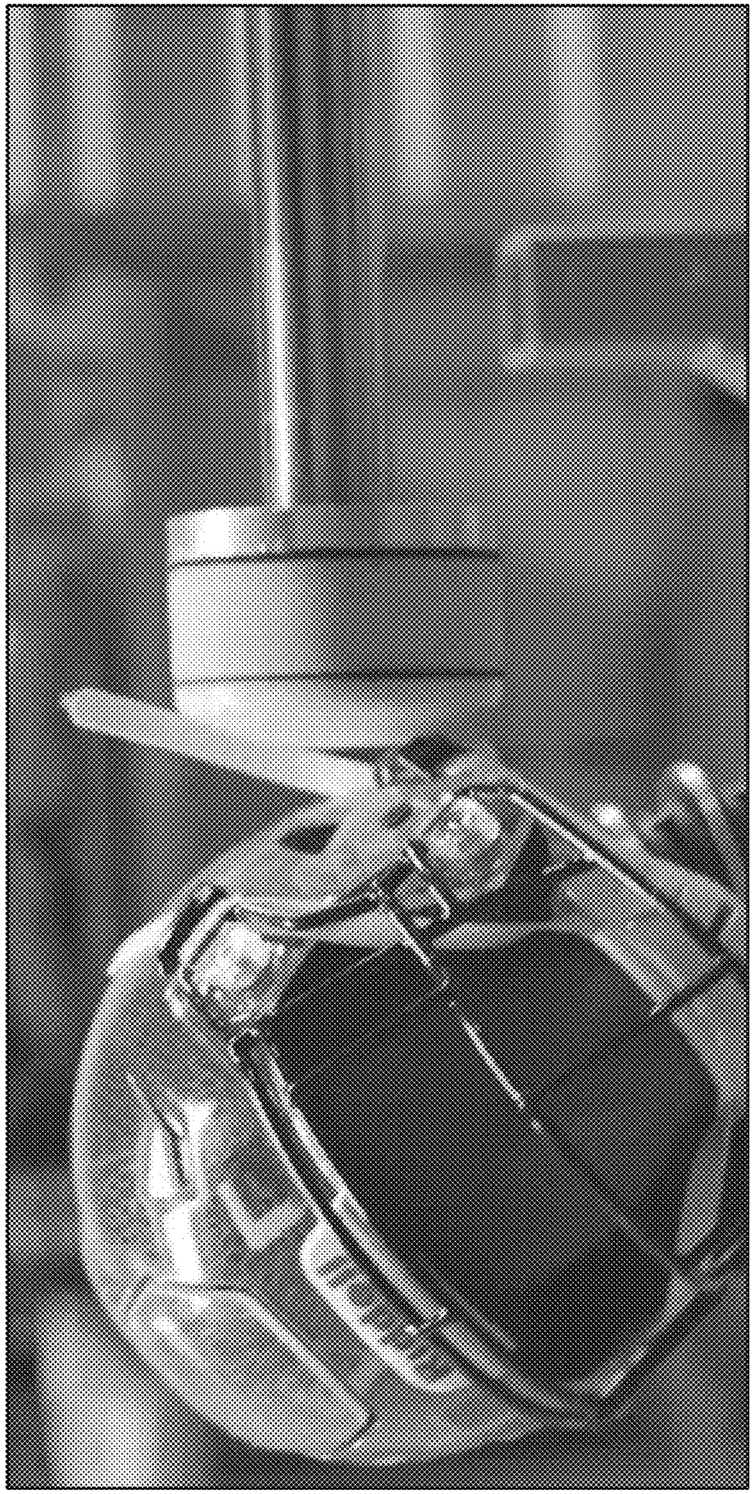
FIG. 70 shows the physical testing of the physical helmets.

Next, the designer selects the energy attenuation assembly in step 160.6.6 by selecting the manufacturing type in step 160.6.6.2 and the impact level in step 160.6.6.4. Manufacturing types include foam 160.6.6.2.2, foam+additive 160.6.6.2.4, and additive 160.6.6.2.4, while the impact levels include 160.6.6.4.2, 2 160.6.6.4.4, and 160.6.6.4.6. After the designer selects the energy attenuation assembly 2000 from the plurality of energy attention assemblies 2000, the physical helmet 1000 is assembled by releasably coupling the energy attenuation assembly 2000 to an inner surface of the helmet shell. Next, the physical helmet 1000 is fitted with the headform that is associated with the selected helmet. The selected physical prototype helmet 1000 is then tested to make sure it passes the player group-shape based standard that is associated with the selected helmet shell. If the selected physical prototype helmets 1000 passes its unique player group-shape based standard, then the physical prototype helmets 1000 is tested according to its associated player group-shape+impact based standard and other generic impact standards in step 160.6.8. For example, a linear impactor may be used in step 160.6.8.2 to perform part of the player group-shape+impact based standard testing. An example of the linear impactor testing is shown in FIG. 70.

Once the designer has completed the testing of the physical prototype helmets 1000, these test values are compared against the complete helmet model to ensure that physical prototype helmets 1000 have a substantial response. If not, then the complete helmet model 140.12.199 is modified to better match these results. Alternatively, if the test values do substantially match, then one last check to ensure that prototype is optimized, based on overall data analysis. If it is, the complete model 140.12.99 is accepted and the method of designing, testing, and manufacturing is completed. If not then, the designer starts the method over again at a selected step (e.g., step 130.28).

2. Body Part Model Only

Figure 68:
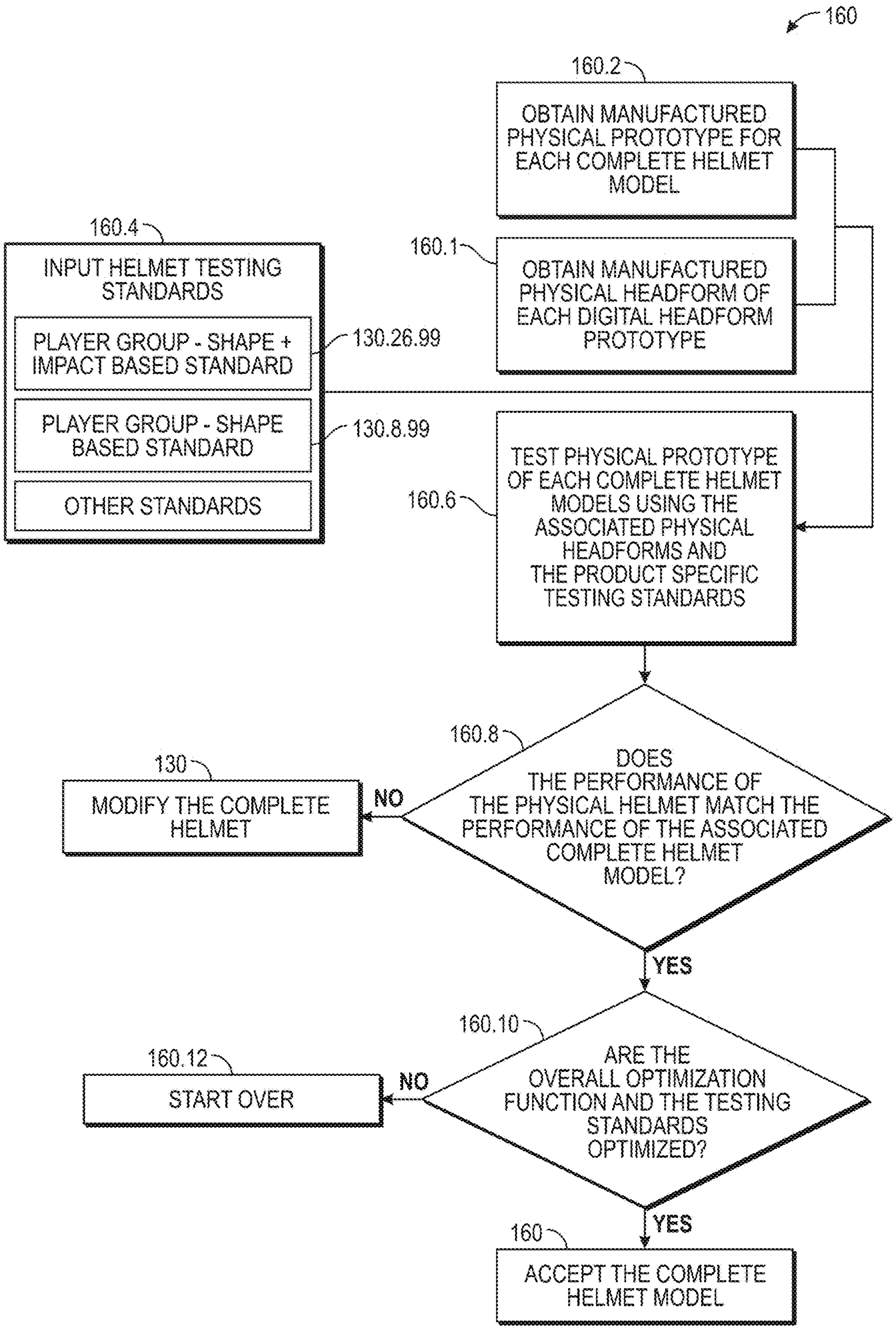
FIG. 68 is a flow chart showing a process of verifying that the physical helmets meet physical testing standards.
Figure 72:
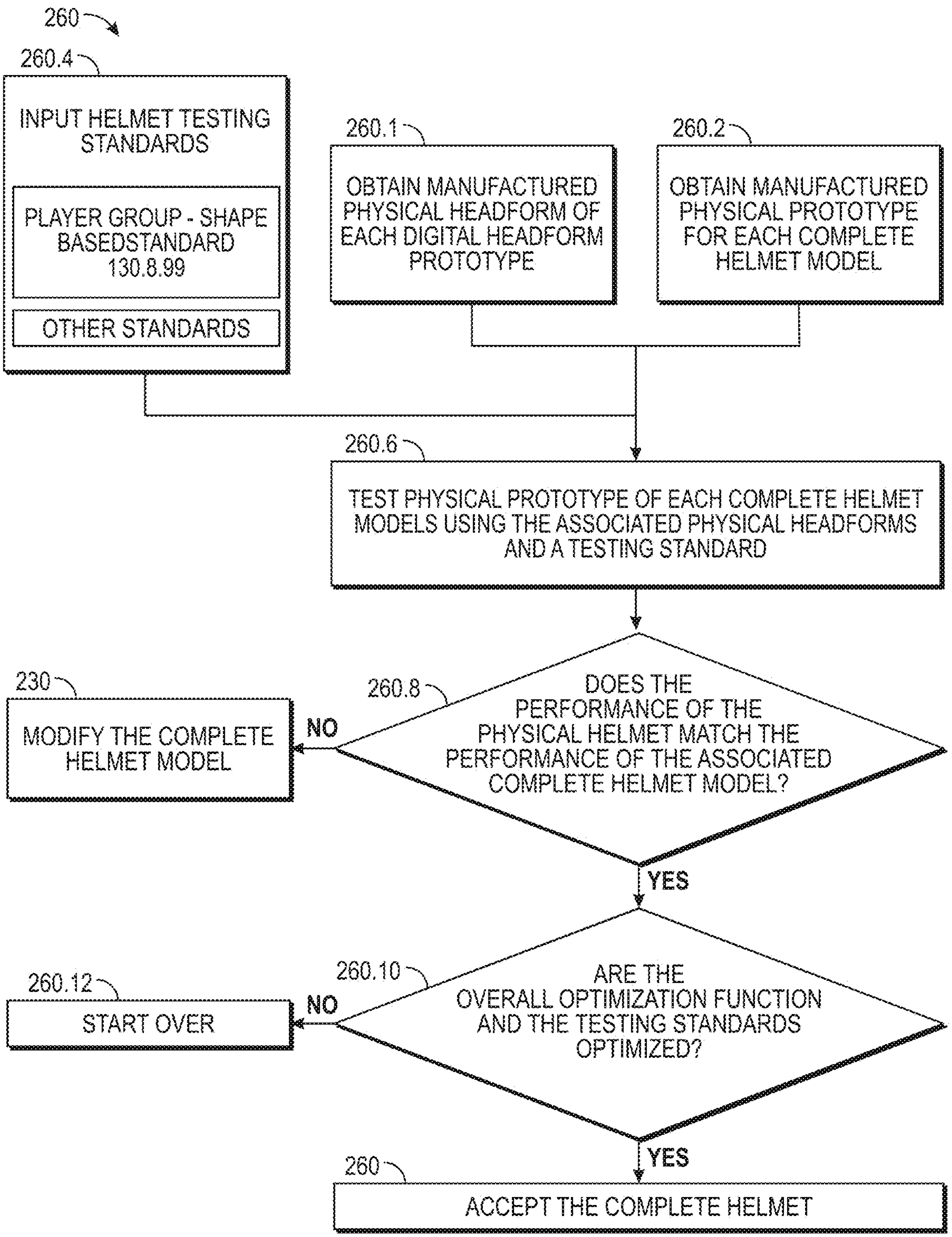
FIG. 72 is a flow chart showing a process of verifying that the physical helmet meets physical testing standards.
Figure 73:
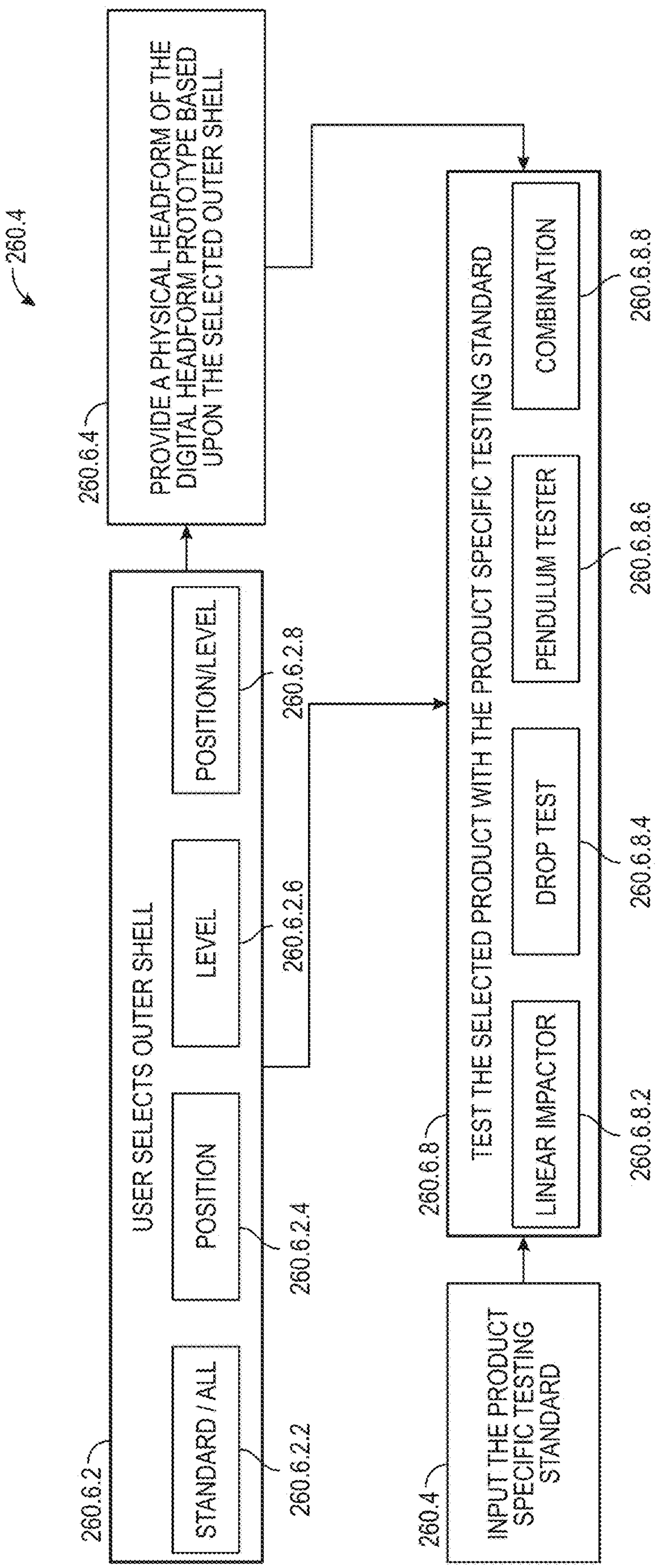
FIG. 73 is a flow chart showing a method of testing physical helmets, wherein the tester selects various components of the helmet to be tested.

Similar to FIG. 68, FIG. 72 describes a method of testing the physical prototype helmets 1000 to determine whether it meets the helmet standards. At a high level, the method obtains the physical headforms, physical helmets 1000 and the associated testing standards in steps 260.1, 260.2, 260.4. The designer then selects a physical helmet 1000 to be tested and its associated headform and testing standards from a plurality of physical helmets 1000 and their associated headforms and testing standards. If the physical helmet 1000 passes the tests and the helmet is optimized, then the complete model 240.12.99 is accepted and the method of designing, testing, and manufacturing is completed. If not then, the designer starts the method over again at a selected step. The primary difference between the method described in FIG. 68 and the method described in FIG. 72, is FIG. 72 does not apply a testing standard that has been customized based on the impact matrixes. Thus, the helmet standards that are applied are either generic testing standards or unique shape based testing standards. Not applying a unique impact based testing method may be desirable if the designer does not have enough data to support this analysis or is not desirable for the type of product that the designer is manufacturing.

3. Impact Matrix Only

Figure 80:
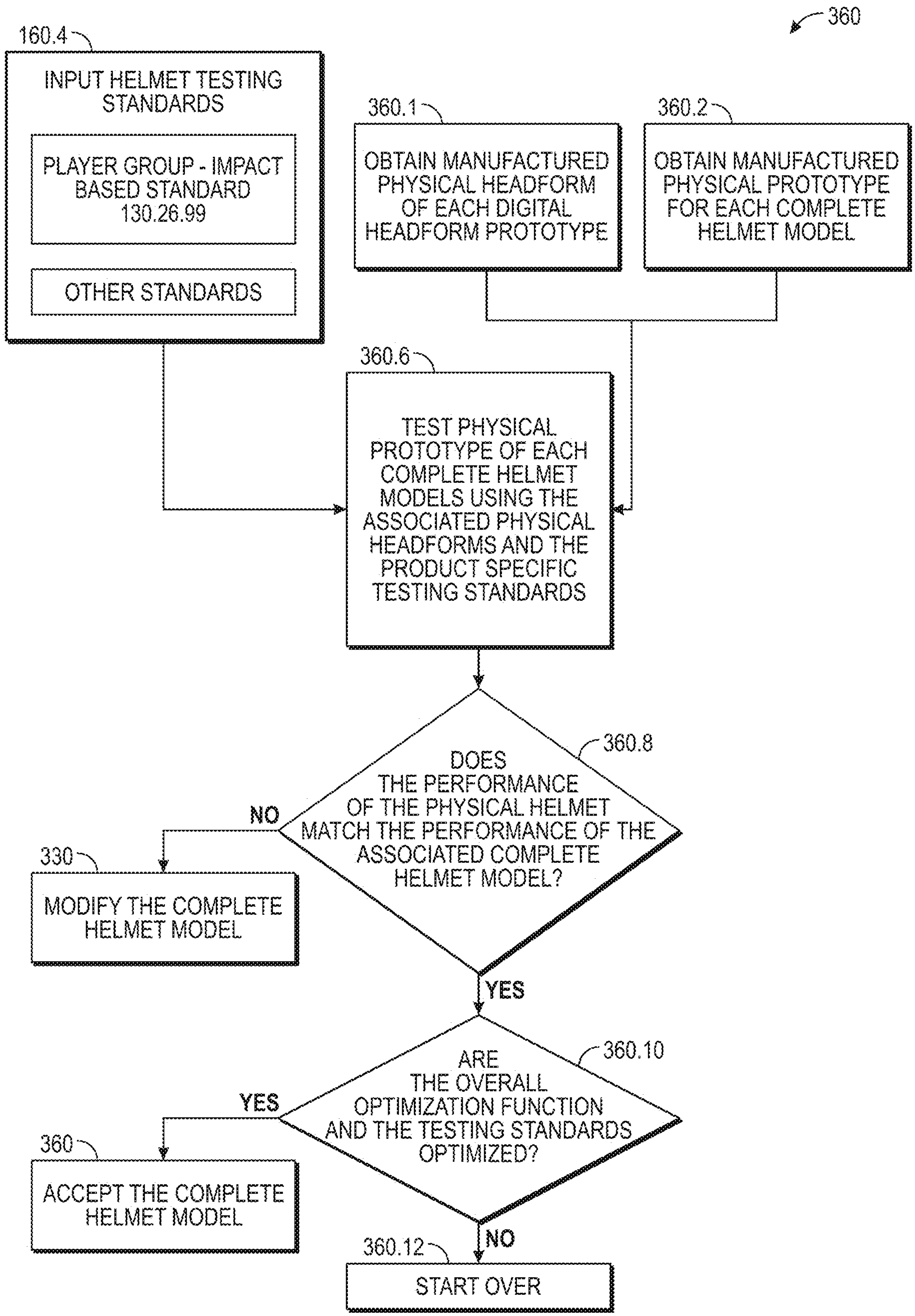
FIG. 80 is a flow chart showing a process of verifying that the physical helmet meet physical testing standards.
Figure 81:
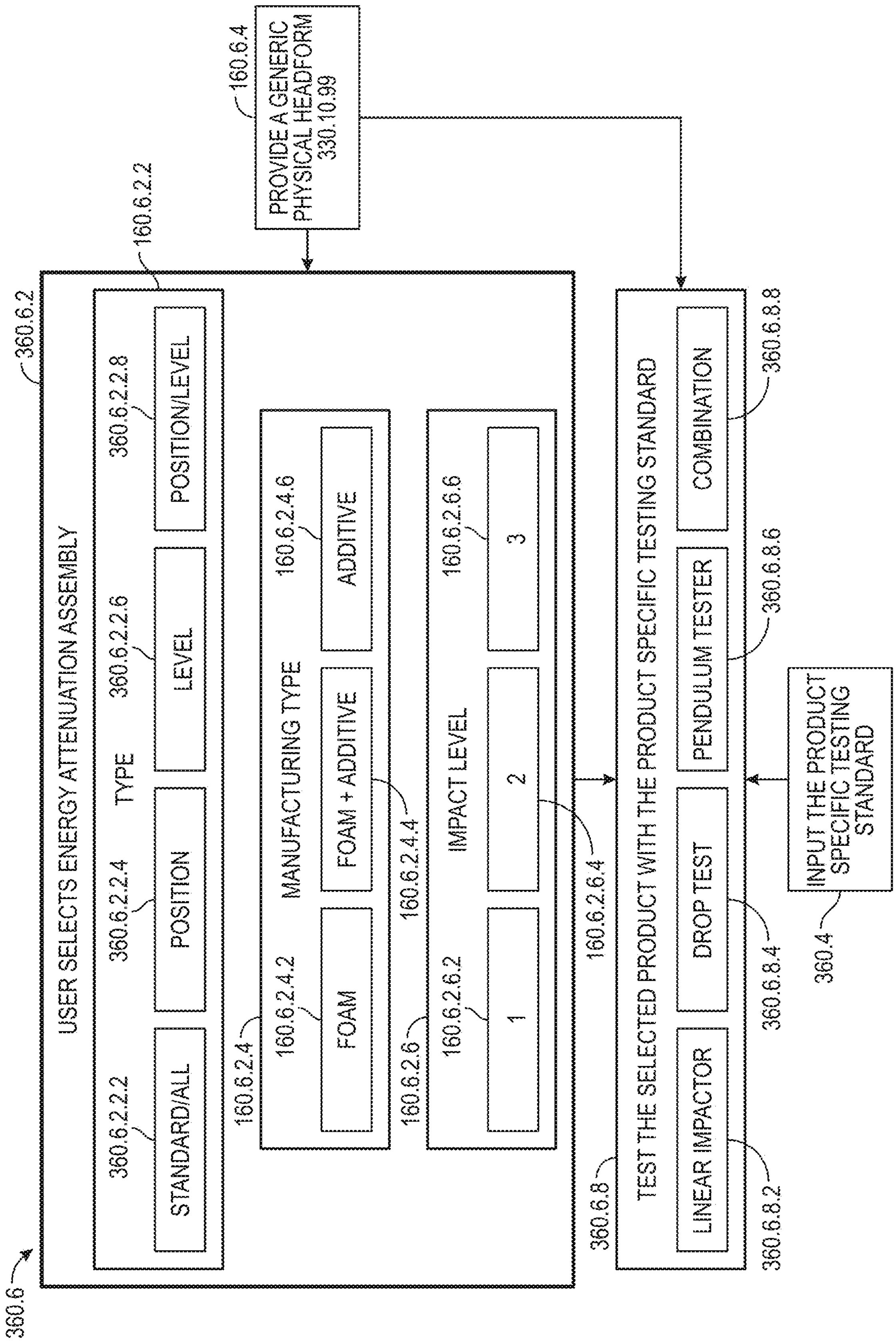
FIG. 81 is a flow chart showing a process of testing physical helmets, wherein the tester selects various components of the helmet to be tested.

Similar to FIGS. 68 and 72, FIG. 80 describes a method of testing the physical prototype helmets 1000 to determine whether it meets the helmet standards. At a high level, the method obtains the physical headforms, physical helmets 1000 and the associated testing standards in steps 360.1, 360.2, 360.4. The designer then selects a physical helmet 1000 to be tested and testing standards from a plurality of physical helmets 1000 and their associated headforms and testing standards. If the physical helmet 1000 passes the tests and the helmet is optimized, then the complete model 340.12.99 is accepted and the method of designing, testing, and manufacturing is completed. If not then, the designer starts the method over again at a selected step. The primary difference between the process described in FIG. 80 and the process described within is FIG. 72 is the fact the designer does not select the shell nor is a specific headform utilized in this testing process. Due to the similarity between these processes, a detailed explanation of the functionality will be omitted and one of skill in the art can understand this process from the flow charts and the description in connection with FIGS. 68 and 72. Like above, if the complete model 340.12.99 is accepted, and the method of designing, testing, and manufacturing is completed. If not, then the designer starts the method over again at a selected step (e.g., step 130.28).

I. Manufacture Stock Helmet and Helmet Components

Once the physical helmet prototypes 1000 pass their unique helmet standard, the complete model 140.12.99, 240.12.99, 340.12.99 can be mass manufactured to create the stock helmets 166*a*, 266*a*, 366*a* or helmet components 166*b*, 266*b*, 366*b* for future players whose characteristic and attributes place them within the selected group. It should be understood that the same or a different manufacturing process that was used to manufacture the physical prototype helmets 1000 may be used to manufacture the stock helmets 166*a*, 266*a*, 366*a* or helmet components 166*b*, 266*b*, 366*b*.

J. Industrial Application

As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims.

What is claimed is:

1. A protective sports helmet to be worn by a specific player engaged in a sporting activity, the protective sports helmet comprising:

an energy attenuation assembly positioned within a shell, said energy attenuation assembly including at least one energy attenuation member having:

(i) an inner surface, and (ii) an outer surface wherein the at least one energy attenuation member is selected using (a) a property of a first pre-manufactured energy attenuation member, (b) a property of a second pre-manufactured energy attenuation member, and (c) data obtained from the specific player; and wherein the protective sports helmet is designed to meet or exceed a helmet standard.

2. The protective sports helmet of claim 1, wherein the data obtained from the specific player is head shape data gathered using a computerized scanning apparatus.

3. The protective sports helmet of claim 1, wherein the property of the first pre-manufactured energy attenuation member is a compression ratio and the property of the second pre-manufactured member is a compression ratio that is different than the compression ratio of the first pre-manufactured member.

4. The protective sports helmet of claim 1, wherein the first pre-manufactured energy attenuation member is formed by an additive manufacturing process.

5. The protective sports helmet of claim 1, wherein the data obtained from the specific player includes: (i) helmet impact data gathered using an in-helmet impact sensor, or (ii) player's primary playing position.

6. The protective sports helmet of claim 1, wherein the protective sports helmet includes mechanical properties selected based upon a collection of helmet impact information associated with a group of player positions, and wherein one of the player positions within the group of player positions includes the player's primary position while engaged in the sporting activity.

7. The protective sports helmet of claim 6, wherein the helmet impact information associated with a group of player positions includes:

(i) a first set of helmet impact information associated with a first player position contained in the group of player positions;

(ii) a second set of helmet impact information associated with a second player position not contained in the group of player positions; and wherein a measurement within said first set of helmet impact information is statistically different from a measurement within said second set of helmet impact information.

8. The protective sports helmet of claim 7, wherein the measurements within the first and second sets of helmet impact information include the magnitude of helmet impacts received by the first player position and the second player position.

9. The protective sports helmet of claim 8, wherein the first player position is a football offensive lineman and the second player position is a football running back.

10. The protective sports helmet of claim 6, wherein the helmet impact information associated with a group of player positions includes:

(i) a first set of helmet impact information associated with a first player position contained in the plurality of player positions;

(ii) a second set of helmet impact information associated with a second player position not contained in the plurality of player positions; and wherein a measurement within said first set of helmet impact information is not statistically different from a measurement within said second set of helmet impact information.

11. The protective sports helmet of claim 10, wherein the measurements contained in the first and second sets of helmet impact information include the number of helmet impacts received by the first player position and the second player position.

12. The protective sports helmet of claim 1, wherein the properties of the first and second pre-manufactured members are determined from data gathered from a group of players that includes players beyond the specific player.

13. The protective sports helmet of claim 1, wherein a computer program generates a model from the data obtained from the specific player, and wherein said model is configured to be digitally displayed as a 3D object.

14. The protective sports helmet of claim 1, wherein the energy attenuation assembly exerts a pre-impact pressure that is less than 10 pounds per square inch on the specific player's head when the helmet is worn by said player.

15. The protective sports helmet of claim 1, wherein the energy attenuation assembly exerts a pre-impact pressure that is greater than 1 pounds per square inch on at least one point of the specific player's head when the helmet is worn by said player.

16. The protective sports helmet of claim 1, wherein said data obtained from the specific player is head data collected by using a structured-light scanner.

17. A protective sports helmet to be worn by a specific player, the helmet comprising:

a shell configured to receive a head of the player;

an energy attenuation assembly positioned within the shell, said energy attenuation assembly including a pre-manufactured energy attenuation member configured to be positioned within the shell and being selected from a group of pre-manufactured energy attenuation members using head data obtained from the specific player; and wherein said group of pre-manufactured energy attenuation members includes:

(a) a first pre-manufactured energy attenuation member having a first set of properties, and (b) a second pre-manufactured energy attenuation member having a second set of properties that is different than the first set of properties of the first pre-manufactured energy attenuation member; and wherein the protective sports helmet: (i) meets or exceeds a helmet standard, and (ii) applies a pre-impact pressure that is less than 10 pounds per square inch on at least one location of the specific player's head, when the protective sports helmet is worn by the specific player.

18. The protective sports helmet of claim 17, wherein the head data is obtained from the specific player using a structured-light scanner.

19. The protective sports helmet of claim 17, wherein a computer program is used to generate a digital head model from the head data obtained from the specific player.

20. The protective sports helmet of claim 17, wherein the first set of properties of the first pre-manufactured energy attenuation member includes an inner surface, and the second set of properties of the second pre-manufactured energy attenuation member includes an inner surface; and wherein said inner surface of the first pre-manufactured energy attenuation member and said inner surface of the second pre-manufactured energy attenuation member are compared against data derived from the obtained head data as part of said selection of the pre-manufactured member from the group of pre-manufactured members.

21. The protective sports helmet of claim 17, wherein when the helmet is worn by said specific player, the pre-impact pressure that is applied on at least one location of the specific player's head is greater than 1 pounds per square inch.

22. The protective sports helmet of claim 17, wherein the first set of properties of the first pre-manufactured energy attenuation member and second set of properties of the second pre-manufactured energy attenuation member are determined from data gathered from a group of players that includes players other than the specific player.

23. The protective sports helmet of claim 17, wherein said protective sports helmet includes mechanical properties selected based upon a collection of information associated with a specific playing position.

24. The protective sports helmet of claim 23, wherein said protective sports helmet is a football helmet and the specific playing position is offensive line; and the mechanical properties of the protective sports helmet are selected to ensure that a frontal portion of the football helmet absorbs a larger amount of force from an impact applied to the frontal portion as compared to the amount of force absorbed by a rear portion of the football helmet from the same impact applied to said rear portion.

25. A protective sports helmet to be worn by a specific player engaged in a sporting activity, the protective sports helmet comprising:

a shell;

an energy attenuation assembly configured to be positioned within the shell and having one pre-manufactured energy attenuation member;

wherein the protective sports helmet is designed to meet or exceed a helmet standard associated with a specific playing position in American football, wherein the helmet standard is developed based on analyzing helmet impact information associated with a first group of players that primarily play said specific playing position.

26. The protective sports helmet of claim 25, wherein the specific playing position is an offensive line position; and wherein the protective sports helmet is a football helmet that meets or exceeds the helmet standard associated with said offensive line position by absorbing a larger amount of force from an impact applied to a frontal portion of the football helmet as compared to the amount of force absorbed by a rear portion of the football helmet from the same impact applied to said rear portion.

27. The protective sports helmet of claim 25, wherein the specific playing position is an offensive line position; and wherein the protective sports helmet is a football helmet that meets or exceeds the helmet standard associated with the offensive line position by absorbing a larger amount of force from an impact applied to a frontal portion of the football helmet as compared to a requirement in a helmet standard for a specific playing position that is not the offensive line position.

28. The protective sports helmet of claim 25, wherein the specific playing position is an offensive line position; and a first local deformation of a frontal portion of the protective sports helmet is configured to be greater than a second local deformation of a frontal portion of a second protective sports helmet that does not meets or exceed the helmet standard associated with the offensive line position.

29. The protective sports helmet of claim 25, wherein the specific playing position is a quarterback position; and wherein the protective sports helmet is a football helmet that meets or exceeds the helmet standard associated with said quarterback position by absorbing a larger amount of force from an impact applied to a rear portion of the football helmet as compared to the amount of force absorbed by a frontal portion of the football helmet from the same impact applied to said frontal portion.

30. The protective sports helmet of claim 25, wherein the specific playing position is a quarterback position; and wherein the protective sports helmet is a football helmet that meets or exceeds the helmet standard associated with the quarterback position by absorbing a larger amount of force from an impact applied in a rear portion of the football helmet as compared to a requirement in a helmet standard for a specific playing position that is not the quarterback position.

31. The protective sports helmet of claim 25, wherein development of the helmet standard further includes analyzing helmet impact information associated with a second group of players that do not primarily play said specific playing position, wherein the helmet impact information associated with the first group of players is different than the helmet impact information associated with the second group of players.

32. The protective sports helmet of claim 25, wherein the pre-manufactured member is digitally selected from a group of pre-manufactured energy attenuation members based on a comparison between: (i) the pre-manufactured energy attenuation member contained in the group of pre-manufactured energy attenuation members, and (ii) head data of the specific player obtained using an electronic device.

33. The protective sports helmet of claim 25, wherein the one pre-manufactured energy attenuation member is formed by an additive manufacturing process.

34. The protective sports helmet of claim 1, wherein the helmet standard is the NOCSAE standard.

35. The protective sports helmet of claim 1, wherein the helmet standard is developed based on analyzing helmet impact information associated with a first group of players that primarily play a specific playing position.

36. The protective sports helmet of claim 35, wherein the specific playing position is a football offensive line position; and wherein the protective sports helmet meets or exceeds the helmet standard associated with the football offensive line position by absorbing a larger amount of force from an impact applied to a frontal portion of the protective sports helmet as compared to a requirement in a helmet standard for a specific playing position that is not the football offensive line position.

37. The protective sports helmet of claim 35, wherein the specific playing position is a football offensive line position; and a first local deformation of a frontal portion of the protective sports helmet is configured to be greater than a second local deformation of a frontal portion of a second protective sports helmet that does not meets or exceed the helmet standard associated with the football offensive line position.

38. The protective sports helmet of claim 35, wherein the specific playing position is a football quarterback position; and wherein the protective sports helmet meets or exceeds the helmet standard associated with the football quarterback position by absorbing a larger amount of force from an impact applied in a rear portion of the protective sports helmet as compared to a requirement in a helmet standard for a specific playing position that is not the football quarterback position.

39. The protective sports helmet of claim 35, wherein the specific playing position is a football quarterback position; and wherein a first amount of energy absorption in a rear portion of the protective sports helmet is greater than a second amount of energy absorption in a rear portion of a second protective sports helmet that does not meets or exceed the helmet standard associated with the football quarterback position.

40. The protective sports helmet of claim 1, wherein the property of the first pre-manufactured energy attenuation member is an inner surface and the property of the second pre-manufactured energy attenuation member is an inner surface that is different than the inner surface of the first pre-manufactured energy attenuation member.

41. The protective sports helmet of claim 1, wherein a computer is utilized in selecting the at least one energy attenuation member.

42. The protective sports helmet of claim 6, wherein the group of player positions include football offensive line; and wherein a frontal portion of the protective sports helmet absorbs a larger amount of force from an impact applied to the frontal portion as compared to the amount of force absorbed by a rear portion of the protective sports helmet from the same impact applied to said rear portion.

43. The protective sports helmet of claim 17, wherein the helmet standard is the NOCSAE standard.

44. The protective sports helmet of claim 17, wherein the helmet standard is developed based on analyzing helmet impact information associated with a first group of players that primarily play a specific playing position.

45. The protective sports helmet of claim 44, wherein the specific playing position is a football offensive line position; and wherein the protective sports helmet meets or exceeds the helmet standard associated with the football offensive line position by absorbing a larger amount of force from an impact applied to a frontal portion of the protective sports helmet as compared to a requirement in a helmet standard for a specific playing position that is not the football offensive line position.

46. The protective sports helmet of claim 44, wherein the specific playing position is a football quarterback position; and wherein the protective sports helmet meets or exceeds the helmet standard associated with the football quarterback position by absorbing a larger amount of force from an impact applied in a rear portion of the protective sports helmet as compared to a requirement in a helmet standard for a specific playing position that is not the football quarterback position.

47. The protective sports helmet of claim 44, wherein the specific playing position is a football quarterback position; and a first amount of energy absorption in a rear portion of the protective sports helmet is greater than a second amount of energy absorption in a rear portion of a second protective sports helmet that does not meets or exceed the helmet standard associated with the football quarterback position.

48. The protective sports helmet of claim 23, wherein the specific playing position is football offensive line; and wherein the selected mechanical properties are configured such that a frontal portion of the protective sports helmet absorbs a larger amount of force from an impact applied to the frontal portion as compared to the amount of force absorbed by a rear portion of the protective sports helmet from the same impact applied to said rear portion.

49. The protective sports helmet of claim 17, wherein a computer is utilized in selecting the pre-manufactured member from the group of pre-manufactured members.

50. The protective sports helmet of claim 17, wherein head data obtained from the specific player includes at least one of: (i) helmet impact data gathered using an in-helmet impact sensor, and (ii) the player's primary playing position.

51. The protective sports helmet of claim 1, wherein the property of the first pre-manufactured energy attenuation member is a first inner surface, and the property of the second pre-manufactured energy attenuation member is a second inner surface; and wherein using the first inner surface, second inner surface, and the data obtained from the specific player to select the at least one energy attenuation member includes digitally comparing said first and second inner surfaces with information that is derived from the data obtained from the specific player.

* * * * *